US012528801B2

(12) United States Patent
Cocito Armanino et al.

(10) Patent No.: US 12,528,801 B2
(45) Date of Patent: Jan. 20, 2026

(54) SUBSTITUTED AZACYLES AS TRPM8 MODULATORS

(71) Applicant: Givaudan SA, Vernier (CH)

(72) Inventors: Nicolas Cocito Armanino, Baden (CH); Agnes Bombrun, Zurich (CH); An Chai, Shanghai (CN); Julie Charpentier, Basel (CH); Chun Chen, Shanghai (CN); Roger Emter, Zurich (CH); Marion Mathys, Duebendorf (CH); Andreas Natsch, Uetikon (CH); Chao Wang, Shanghai (CN); Lijun Zhou, Shanghai (CN)

(73) Assignee: GIVAUDAN SA, Vernier (CH)

( * ) Notice: Subject to any disclaimer, the term of this patent is extended or adjusted under 35 U.S.C. 154(b) by 909 days.

(21) Appl. No.: 17/769,198

(22) PCT Filed: Oct. 15, 2020

(86) PCT No.: PCT/EP2020/079009
§ 371 (c)(1),
(2) Date: Apr. 14, 2022

(87) PCT Pub. No.: WO2021/074281
PCT Pub. Date: Apr. 22, 2021

(65) Prior Publication Data
US 2024/0132487 A1    Apr. 25, 2024

(30) Foreign Application Priority Data

Oct. 17, 2019  (WO) ............... PCT/CN2019/111690

(51) Int. Cl.
| C07D 417/14 | (2006.01) |
| A61K 31/454 | (2006.01) |
| A61K 31/4545 | (2006.01) |
| A61P 43/00 | (2006.01) |
| A61Q 11/00 | (2006.01) |
| C07D 401/04 | (2006.01) |
| C07D 401/06 | (2006.01) |
| C07D 401/14 | (2006.01) |
| C07D 405/14 | (2006.01) |
| C07D 409/14 | (2006.01) |
| C07D 413/04 | (2006.01) |
| C07D 413/06 | (2006.01) |
| C07D 413/14 | (2006.01) |
| C07D 417/04 | (2006.01) |
| C07D 417/06 | (2006.01) |

(52) U.S. Cl.
CPC ......... *C07D 417/14* (2013.01); *C07D 401/04* (2013.01); *C07D 401/14* (2013.01); *C07D 405/14* (2013.01); *C07D 409/14* (2013.01); *C07D 413/14* (2013.01); *C07B 2200/07* (2013.01); *C07B 2200/09* (2013.01)

(58) Field of Classification Search
CPC .. C07D 417/14; C07D 401/04; C07D 401/14; C07D 405/14; C07D 409/14; C07D 413/14; C07B 2200/07; C07B 2200/09
See application file for complete search history.

(56) References Cited

U.S. PATENT DOCUMENTS

| 3,988,433 | A | 10/1976 | Benedict |
| 4,083,955 | A | 4/1978 | Grabenstetter et al. |
| 4,528,180 | A | 7/1985 | Schaeffer |
| 4,849,213 | A | 7/1989 | Schaeffer |
| 5,145,666 | A | 9/1992 | Lukacovic et al. |
| 5,198,220 | A | 3/1993 | Damani |
| 5,213,790 | A | 5/1993 | Lukacovic et al. |
| 5,242,910 | A | 9/1993 | Damanj |
| 5,281,410 | A | 1/1994 | Lukacovic et al. |
| 10,093,678 | B2 | 10/2018 | Shishido et al. |
| 2010/0048589 | A1* | 2/2010 | Colburn ............... C07D 401/06 548/491 |

FOREIGN PATENT DOCUMENTS

| EP | 3315492 A1 | 5/2018 | |
| WO | 9840400 A1 | 9/1998 | |
| WO | 0236116 A2 | 5/2002 | |
| WO | 2007039782 A1 | 4/2007 | |
| WO | WO-2007039781 A2 * | 4/2007 | ........... C07D 413/04 |
| WO | 2008107137 A2 | 9/2008 | |
| WO | 2010059289 A1 | 5/2010 | |
| WO | 2012061698 A2 | 5/2012 | |
| WO | 2014037340 A1 | 3/2014 | |
| WO | 2019043164 A1 | 3/2019 | |
| WO | 2019121193 A1 | 6/2019 | |

OTHER PUBLICATIONS

Registry (STN) [online], Nov. 19, 2018 [Date of Search Feb. 25, 2025], CAS Registry No. 2249541-67-9. (Year: 2018).*
Andrews, M. D. et. al. ACS. Med. Chem. Lett. 2015, 6, 419-424 (Year: 2015).*
International Search Report for Application No. PCT/CN2019/111690 dated Jul. 22, 2020.
Written Opinion for Application No. PCT/CN2019/111690 dated Jul. 22, 2020.
International Search Report for Application No. PCT/EP2020/079009 dated Jan. 25, 2021.
Written Opinion for Application No. PCT/EP2020/079009 dated Jan. 25, 2021.
Essential Guide to Food Additives, Third Edition, Revised by Victoria Emerton and Eugenia Choi, Leatherhead Food International, 2008, ISBN No. 978-1-905224-50-0.

(Continued)

*Primary Examiner* — Clinton A Brooks
*Assistant Examiner* — Kendall Nicole Heitmeier
(74) *Attorney, Agent, or Firm* — Curatolo Sidoti & Trillis Co., LPA; Floyd Trillis, III; Salvatore A. Sidoti

(57) ABSTRACT

Disclosed are TRPM8 modulators as defined by formula (I) for achieving a cooling effect on skin and mucousa. The disclosure relates to a particular class of compounds capable to activate TRPM8 ion channels. It further relates to the use of these compounds for inducing a sensation of coldness, and to consumer products comprising these compounds.

6 Claims, No Drawings

(56) References Cited

OTHER PUBLICATIONS

M. Jesus Perez De Vega, et al., Transient Receptor Potential Melastatin 8 Channel (TRPM8) Modulation: cool Entryway for Treating Pain and Cancer, Journal of Medicinal Chemistry, Jul. 20, 2016, pp. 10006-10029, vol. 59, ACS Publications, American Chemical Society.

Mohammad Zakir Hossain, et al., Activation of TRPV1 and TRPM8 Channels in the Larynx and Associated Laryngopharyngeal Regions Facilitates the Swallowing Reflex, International Journal of Molecular Sciences, Dec. 18, 2018, pp. 1-18, vol. 19, MDPI.

Amanda H. Klein, Novel Menthol-Derived Cooling Compounds Activate Primary and Second-Order Trigeminal Sensory Neurons and Modulate Lingual Thermosensitivity, Chemical Senses, Apr. 21, 2011, pp. 649-658, Oxford University Press.

Henry J. Breslin, et al., Rationale, Design, and Synthesis of Novel Phenyl Imidazoles as Opioid Receptor Agonists for Gastrointestinal Disorders, Journal of Medicinal Chemistry, Sep. 4, 2004, pp. 5009-5020, vol. 47, Issue 21, American Chemical Society.

Gabor Wagner, et al., Corrigendum to Hit-to-lead optimization of disubstituted oxadiazoles and tetrazoles as mGluR5 NAMs, Bioorganic & Medicinal Chemistry Letters, pp. 3837-3838, 2011, vol. 21, Issue 12, Elsevier Ltd.

Jeffrey P. Lamb, et al., Discovery of molecular switches within the ADX-47273 mGlu5 PAM scaffold that modulate modes of pharmacology to afford potent mGlu5 NAMs, PAMs and partial antagonists, Bioorganic & Medicinal Chemistry Letters, May 1, 2011, vol. 21, Issue 9, Elsevier B.V.

American Chemical Society (ACS) STNext, Database Registry, http://next.stn.org, Sep. 4, 2019.

\* cited by examiner

SUBSTITUTED AZACYLES AS TRPM8 MODULATORS

CROSS REFERENCE TO RELATED APPLICATIONS

This application is a national stage application of International Application No. PCT/EP2020/079009, filed 15 Oct. 2020, which claims the benefit of the filing date from International Application No. PCT/CN2019/111690, filed 17 Oct. 2019, both of which applications are incorporated herein by reference.

TECHNICAL FIELD

The present invention relates to a particular class of compounds capable to activate TRPM8 ion channels. It further relates to the use of said compounds for inducing a sensation of coldness, and to consumer products comprising these compounds.

BACKGROUND

TRPM8 (transient receptor potential melastatin member 8, also known as Trp-p8 or MCR1) is activated by innocuous cool and thus plays an important role as sensor for temperature. The channels are widely distributed in different tissues (such as human skin and mucosa (such as oral mucosa, throat mucosa, and nasal mucosa), male urogenital tract, lung epithelium cells and artery myoctes). They are $Ca^{2+}$-permeable, nonselective cation channels that exhibit polymodal gating mechanisms, being activated by innocuous cool to cold temperature, membrane depolarization, and molecules which are known as cooling agents including natural and synthetic compounds. The receptor was described for the first time in 2002 as cold receptor in a number of publications.

The present invention is based on the finding that a particular class of compounds can be used to drive a cooling response when brought into contact with TRPM8 receptor in-vitro and in-vivo.

Compounds providing a cooling sensation have for a long time played an important role in the flavor and fragrance industry in order to produce an association with freshness and cleanliness. Cooling compounds are widely used in a variety of products such as foodstuffs, tobacco products, beverages, dentifrices, mouthwashes, toothpastes, and toiletries. The cooling sensation provided contributed to the appeal and acceptability of consumer products. In particular, oral care products, such as dentifrices and mouthwashes are formulated with coolants because they provide breath freshening effects and a clean, cool, fresh feeling in the mouth.

A large number of compounds providing cooling sensations have been described. The most well-known natural occurring compound is menthol, in particular L-menthol.

Among the synthetic compounds providing cooling sensations, many are derivatives of or are structurally related to menthol, i. e. containing the cyclohexane moiety, and derivatized with functional groups including carboxamide, ketal, ester, ether and alcohols.

Applicant surprisingly found a new class of chemical compounds which differ significantly in structural terms from the TRPM8 modulators known hitherto. It was surprisingly found that this class of chemical compounds as herein further described can provide long lasting cooling on the human skin and/or mucosa at very low concentrations.

SUMMARY

There is provided in a first aspect a compound of formula (I), a salt or solvate thereof (in particular for use in providing cooling sensation)

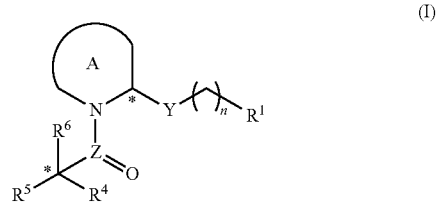

(I)

wherein
n is 0 or 1;
$R^1$ is selected from
i) halogen,
ii) $C_6$-$C_{10}$ aryl,
iii) $C_5$-$C_{10}$ mono- or bicyclic heteroaryl wherein up to 2 C-atoms are replaced by a hetero atoms independently selected from sulfur, nitrogen, and oxygen,
iv) $C_6$-$C_{10}$ aryl substituted with up to four substituents independently selected from the group consisting of halogen; OH; C≡N; $NO_2$; $C_1$-$C_6$ alky;
$C_1$-$C_6$ alkyl comprising up to 5 halogen atoms;
$C_1$-$C_3$ alkyl comprising up to 3 OH groups;
$C_2$-$C_6$ alkenyl;
$C_1$-$C_6$ alkoxy;
$C_1$-$C_6$ alkoxy comprising up to 3 halogen atoms;
$C_1$-$C_3$ alkoxy $C_1$-$C_3$ alkyl;
$C_3$-$C_7$ cycloalkyl;
—C(O)$R^{10}$ wherein $R^{10}$ is selected from $C_1$-$C_3$ alkyl;
—OC(O)$R^{11}$ wherein $R^{11}$ is selected from H, and $C_1$-$C_3$ alkyl;
—C(O)O—$R^{12}$ wherein $R^{12}$ is selected from hydrogen and $C_1$-$C_3$ alkyl;
$(CH_2)_m N(R^{13})R^{14}$ wherein m is 0 or 1, $R^{13}$ is selected from hydrogen, $C_1$-$C_3$ alkyl, and —$SO_2R^{15}$ wherein $R^{15}$ is $C_1$-$C_3$ alkyl, and $R^{14}$ is selected from hydrogen, $C_1$-$C_3$ alkyl, and —$SO_2R^{16}$ wherein $R^{16}$ is $C_1$-$C_3$ alkyl, or wherein $R^{13}$ and $R^{14}$ form together with the N atom to which they are attached morpholine, thiomorpholine, or 1,1-dioxothiomorpholine;
—$SR^{17}$ wherein $R^{17}$ is selected from hydrogen and $C_1$-$C_3$ alkyl; and
—$S(O)_2R^{18}$ wherein $R^{18}$ is selected from hydrogen and $C_1$-$C_3$ alkyl;
with the proviso that when the aryl ring is substituted with two or more substituents, two substituents may form a cyclic ring together with the carbon atoms to which they are attached,
and
v) $C_5$-$C_{10}$ mono- or bicyclic heteroaryl wherein up to 2 C-atoms are replaced by a hetero atoms independently selected from sulfur, nitrogen, and oxygen, substituted with up to tour substituents selected from the group consisting of halogen; OH (hydroxyl); C≡N (cyano); $NO_2$ (nitro); $C_1$-$C_6$ alky;
$C_1$-$C_6$ alky comprising up to 5 halogen atoms;
$C_2$-$C_6$ alkenyl;
$C_1$-$C_6$ alkoxy;
$C_1$-$C_6$ alkoxy comprising up to 3 halogen atoms;
$C_1$-$C_3$ alkoxy $C_1$-$C_3$ alkyl;

$C_3$-$C_7$ cycloalkyl;

—C(O)$R^{20}$ wherein R is selected from $C_1$-$C_3$ alkyl;

—OC(O)$R^{21}$ wherein $R^{21}$ is selected from H, and $C_1$-$C_3$ alkyl;

—C(O)O—$R^{22}$ wherein $R^{22}$ is selected from hydrogen and $C_1$-$C_3$ alkyl;

—(CH$_2$)$_m$N($R^{23}$)$R^{24}$ wherein m is 0 or 1, $R^{23}$ is selected from hydrogen, $C_1$-$C_3$ alkyl, and —SO$_2$$R^{25}$ wherein $R^{25}$ is $C_1$-$C_3$ alkyl, and $R^{24}$ is selected from hydrogen, $C_1$-$C_3$ alkyl, and —SO$_2$$R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;

—S$R^{27}$ wherein $R^{27}$ is selected from hydrogen and $C_1$-$C_3$ alkyl; and —S(O)$_2$$R^{28}$ wherein $R^{28}$ is selected from hydrogen and $C_1$-$C_3$ alkyl;

Y is a monocyclic or bicyclic, unsaturated or aromatic heterocyclic ring comprising one, two, three or four heteroatoms independently selected from nitrogen, sulfur and oxygen, wherein the ring is optionally mono-, di-, or tri-substituted with a group selected from halogen, methyl, ethyl, —N($R^{40}$)$R^{41}$, —CON($R^{40}$)$R^{41}$, —[C$R^{40}$$R^{41}$]$_p$—C(O)O$R^{40}$, —C(O)$R^{40}$, and —SO$_2$N($R^{40}$)$R^{41}$ wherein $R^{40}$ and $R^{41}$ are independently selected from hydrogen and $C_1$-$C_4$ alkyl, and p is 0, 1, or 2;

A is a 5 to 7 membered heterocyclic ring optionally comprising one additional hetero atom selected from oxygen and sulfur, wherein the heterocyclic ring A is optionally substituted by one or two groups selected from —OH and =O;

Z is either C, S or S(O); and $R^4$, $R^5$ and $R^6$ form together with the carbon atom to which they are attached a hydrocarbon group optionally comprising up to five hetero atoms selected from O, N, S, and F.

In accordance with a second aspect there is provided a method of modulating (in-vitro and in-vivo modulation) of transient receptor potential melastatin member 8 (TRPM8) comprising bringing the receptor into contact with a compound of formula (I), or a salt or solvate thereof.

There is provided in a third aspect a method of inducing a cooling sensation in a human or animal comprising contacting the human or animal with a compound of formula (I), or a salt or solvate thereof.

There is provided in a fourth aspect consumer products, in particular consumer products which get into contact with the human skin and/or mucosa comprising a compound as defined by formula (I), or a salt or solvate thereof.

There is provided in a fifth aspect a composition comprising a cool sensation wherein the composition comprises at least one compound of formula (I), a salt or solvate thereof, and a further cooling compound.

There is provided in a sixth aspect pharmaceutical composition comprising one or more compounds as defined by formula (I), or a salt or solvate thereof.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

The present invention is based, at least in part, on the surprising finding of a new class of chemical compounds which differ significantly in structural terms from the TRPM8 modulators known hitherto, that are capable to activate the TRPM8 ion channel, which brings about a $Ca^{2+}$ influx into the cold-sensitive neurons. The electrical signal produced as a result is ultimately perceived as sensation of coldness. Applicant surprising fount that this class of chemical compounds as herein further described can provide long lasting cooling on the human skin and/or mucosa at very low concentrations.

Thus, there is provided in a first aspect a compound of formula (I), a salt or solvate thereof (in particular for use in providing cooling sensation)

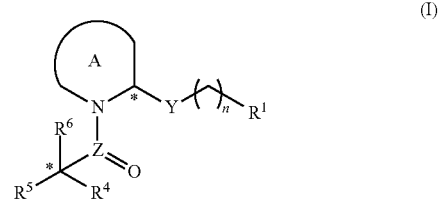

(I)

wherein n is 0 or 1;

$R^1$ is selected from halogen (including Br, Cl, and F), $C_6$-$C_{10}$ aryl (e.g. phenyl, or naphthyl) optionally substituted with up to four (e.g. 1, 2, or 3) substituents independently selected from the group consisting of halogen (including F, Cl, Br); OH (hydroxyl); C≡N (cyano); NO$_2$ (nitro);

$C_1$-$C_6$ alky optionally comprising up to 5 halogen atoms (e.g F), such as CH$_3$, CF$_3$, or CHF$_2$;

$C_1$-$C_3$ alkyl comprising up to 3 OH groups, such as CH$_2$OH;

$C_2$-$C_6$ alkenyl, such as —CH=CH$_2$;

$C_1$-$C_6$ alkoxy optionally comprising up to 3 halogen atoms (e.g. F), such as OCH$_3$, OCH$_3$, OCF$_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{10}$ wherein $R^{10}$ is selected from $C_1$-$C_3$ alkyl;

—OC(O)$R^{11}$ wherein $R^{11}$ is selected from H, and $C_1$-$C_3$ alkyl;

—C(O)O—$R^{12}$ wherein $R^{12}$ is selected from hydrogen and $C_1$-$C_3$ alkyl;

—(CH$_2$)$_m$N($R^{13}$)$R^{14}$ wherein m is 0 or 1, $R^{13}$ is selected from hydrogen, $C_1$-$C_3$ alkyl, and —SO$_2$$R^{15}$ wherein $R^{15}$ is $C_1$-$C_3$ alkyl, and $R^{14}$ is selected from hydrogen, $C_1$-$C_3$ alkyl, and —SO$_2$$R^{16}$ wherein $R^{16}$ is $C_1$-$C_3$ alkyl, or wherein $R^{13}$ and $R^{14}$ form together with the N atom to which they are attached morpholine, thiomorpholine, or 1,1-dioxothiomorpholine;

—S$R^{17}$ wherein $R^{17}$ is selected from hydrogen and $C_1$-$C_3$ alkyl; and —S(O)$_2$$R^{18}$ wherein $R^{18}$ is selected from hydrogen and $C_1$-$C_3$ alkyl;

with the proviso that when the aryl ring is substituted with two or more substituents two substituents may form a cyclic ring together with the carbon atoms to which they are attached, and $C_5$-$C_{10}$ mono- or bicyclic heteroaryl wherein up to 2 C-atoms are replaced by a hetero atoms independently selected from sulfur, nitrogen, and oxygen, optionally substituted with up to four (e.g. 1, 2, or 3) substituents selected from the group consisting of halogen (including F, Cl, Br); OH (hydroxyl); C≡N (cyano); $NO_2$ (nitro);

$C_1$-$C_6$ alky optionally comprising up to 5 halogen atoms (e.g F), such as $CH_3$, $CF_3$, or $CHF_2$;

$C_2$-$C_6$ alkenyl, such as —CH=$CH_2$;

$C_1$-$C_6$ alkoxy optionally comprising up to 3 halogen atoms (e.g. F), such as $OCH_3$, $OCH_3$, $OCF_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{20}$ wherein $R^{20}$ is selected from $C_1$-$C_3$ alkyl;

—OC(O)$R^{21}$ wherein $R^{21}$ is selected from H, and $C_1$-$C_3$ alkyl;

—C(O)O—$R^{22}$ wherein $R^{22}$ is selected from hydrogen and $C_1$-$C_3$ alkyl);

—$(CH_2)_m$N($R^{23}$)$R^{24}$ wherein m is 0 or 1, $R^{23}$ is selected from hydrogen, $C_1$-$C_3$ alkyl, and —$SO_2R^{25}$ wherein $R^{25}$ is $C_1$-$C_3$ alkyl, and $R^{24}$ is selected from hydrogen, $C_1$-$C_3$ alkyl, and —$SO_2R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;

—$SR^{27}$ wherein $R^{27}$ is selected from hydrogen and $C_1$-$C_3$ alkyl; and —$S(O)_2R^{26}$ wherein $R^{26}$ is selected from hydrogen and $C_1$-$C_3$ alkyl;

Y is a monocyclic or bicyclic, unsaturated or aromatic heterocyclic ring comprising one, two, three or four heteroatoms independently selected from nitrogen, sulfur and oxygen, wherein the ring is optionally mon-, di-, or tri-substituted with a group selected from halogen (including Br, Cl, and F), methyl, ethyl, —N($R^{40}$)$R^{41}$, —CON($R^{40}$)$R^{41}$, —[$CR^{40}R^{41}$]$_p$—C(O)O$R^{40}$, —C(O)$R^{40}$, and —$SO_2$N($R^{40}$)$R^{41}$ wherein $R^{40}$ and $R^{41}$ are independently selected from hydrogen and $C_1$-$C_4$ alkyl (including ethyl and propyl), and p is 0, 1 or 2;

A is a 5 to 7 membered heterocyclic ring optionally comprising one additional hetero atom selected from oxygen and sulfur, wherein the heterocyclic ring A is optionally substituted by one or two groups selected from —OH and =O;

Z is either C, S or S(O); and $R^4$, $R^5$ and $R^6$ form together with the carbon atom to which they are attached a hydrocarbon group optionally comprising up to five (e.g. 1, 2, 3, 4) hetero atoms selected from O, N, S, and F (preferably the hydrocarbon group comprises 2 to 15 C-atoms (e.g. 3, 4, 5, 6, 7, 8, 9, 10, 11, 12, 13, or 14 C-atoms).

Non-limiting examples are compounds of formula (I), a salt or solvate thereof, wherein $R^4$ is selected from hydrogen and methyl; and $R^5$ is selected from hydrogen, $C_1$-$C_2$ alkyl, $C_1$-$C_3$ alkenyl;

$R^6$ is selected from $C_1$-$C_4$ alkyl, $C_2$-$C_5$ alkenyl containing one or two double bonds, $C_1$-$C_3$ alkoxy, $C_1$-$C_4$ alkyl-C(O)—, $C_1$-$C_4$ alkyl-S—, $C_1$-$C_4$ alkyl-$SCH_2$—, $C_1$-$C_4$ alkenyl-S—, $C_1$-$C_4$ alkyl-S(O)—, $C_1$-$C_4$ alkyl-S(O)$_2$—, $C_1$-$C_4$ alkenyl-S(O)—, $C_1$-$C_4$ alkenyl-S(O)$_2$—, —SH, $CF_3$S—, cyclopropyl, cyclobutyl, furyl (e.g. 2-furyl or 3-furyl) optionally substituted with methyl. $C_1$-$C_6$ fluoro-alkyl (such as pentafuloroethyl, difluoromethyl, trifluoromethyl, 2,2,2-trifluoroethyl or difluoroethyl), and —$NR^{30}R^{31}$ wherein $R^{30}$ and $R^{31}$ are independently selected from hydrogen and $C_1$-$C_3$ alkyl; or $R^6$ and $R^5$ form together with the carbon atom to which they are attached a) a carbonyl group (C=O) or vinyl group (C=$CR^{32}R^{33}$ wherein $R^{32}$ and $R^{33}$ are independently selected from H or $C_1$-$C_3$ alkyl); or b) a 3 to 7-membered saturated or unsaturated cycle ring comprising up to 3 heteroatoms selected from oxygen, nitrogen and sulfur, wherein the cyclic ring is optionally substituted with one or two groups independently selected from $C_1$-$C_3$ alkyl (e.g. methyl, ethyl, isopropyl), $C_1$-$C_3$ alkoxy; (e.g. $R^5$ and $R^6$ form together with the carbon atom to which they are attached thiodiazole, or furanyl).

Further non-limiting examples are compounds of formula (I), a salt or solvate thereof wherein Y is a 5 membered unsaturated heterocyclic ring comprising one, two, three or four heteroatoms independently selected from nitrogen, sulfur and oxygen (e.g. Y is selected from imidazole, oxazole, thiazole, triazole, tetrazole, oxadiazole, thiadiazole, pyrrole, furan, thiophene, and isoxazole), or Y is benzimidazole.

Further non-limiting examples are compounds of formula (I), a salt or solvate thereof wherein Z is C;

$R^1$ is selected from $C_6$-$C_{10}$ aryl (e.g. phenyl, or naphthyl) optionally substituted with up to four (e.g. 1, 2, or 3) substituents independently selected from the group consisting of halogen (including F, Cl, Br); OH (hydroxyl); C≡N (cyano); $NO_2$ (nitro);

$C_1$-$C_6$ alky optionally comprising up to 5 halogen atoms (e.g F), such as $CH_3$, $CF_3$, or $CHF_2$;

$C_1$-$C_3$ alkyl comprising up to 3 OH groups, such as $CH_2OH$;

$C_2$-$C_6$ alkenyl, such as —CH=$CH_2$;

$C_1$-$C_6$ alkoxy optionally comprising up to 3 halogen atoms (e.g. F), such as $OCH_3$, $OCH_3$, $OCF_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{10}$ wherein $R^{10}$ is selected from $C_1$-$C_3$ alkyl;

—OC(O)$R^{11}$ wherein $R^{11}$ is selected from H, and $C_1$-$C_3$ alkyl;

—C(O)O—$R^{12}$ wherein $R^{12}$ is selected from hydrogen and $C_1$-$C_3$ alkyl;

—$(CH_2)_m$N($R^{13}$)$R^{14}$ wherein m is 0 or 1, $R^{13}$ is selected from hydrogen, $C_1$-$C_3$ alkyl, and —$SO_2R^{15}$ wherein $R^{15}$ is $C_1$-$C_3$ alkyl, and $R^{14}$ is selected from hydrogen, $C_1$-$C_3$ alkyl, and —$SO_2R^{16}$ wherein $R^{16}$ is $C_1$-$C_3$ alkyl, or wherein $R^4$ and $R^{14}$ form together with the N atom to which they are attached morpholine, thiomorpholine, or 1,1-dioxothiomorpholine;

—$SR^{17}$ wherein $R^{17}$ is selected from hydrogen and $C_1$-$C_3$ alkyl; and —$S(O)_2R^{18}$ wherein $R^{18}$ is selected from hydrogen and $C_1$-$C_3$ alkyl;

with the proviso that when the aryl ring is substituted with two or more substituents two substituents may form a cyclic ring together with the carbon atoms to which they are attached, and $R^4$, $R^5$ and $R^6$ form together with the carbon atom to which they are attached a hydrocarbon group selected from 3-thiabut-2-yl, 2-methyl-3-thiabut-2-yl, 3-thiapent-2-yl, 4-thiapent-2-yl, 2-thiaprop-1-yl, 2-methyl-3-thiapent-2-yl, 3-oxo-3-thiabut-2-yl, 3-oxo-2-methyl-3-thiabut-2-yl, 3-oxo-3-thiapent-2-yl, 4-oxo-4-thiapent-2-yl, 2-oxo-2-thiaprop-1-yl, 3-oxo-2-methyl-3-thiapent-2-yl, but-2-yl, pent-2-yl, but-3-en-2-yl, pent-3-en-2-yl, but-2-en-2-yl, pent-2-en-2-yl, but-1-en-2-yl, pent-1-en-2-yl, 2-methylbut-2-yl, 2-methylpent-2-yl, 2-methylbut-3-en-2-yl, 3-methylbut-2-yl, 3-methylbut- 3-en-2-yl, 3-methylbut-2-en-2-yl, 2,3-dimethylbut-2-yl, 2,3-dimethylpent-2-yl, 2,3-dimethylbut-3-en-2-yl, 2,3-dimethylpent-3-en-2-yl, 2-methylpent-3-en-2-yl, prop-2-yl, prop-1-yl, ethyl, cyclopropyl, 1,1-dimethylcycloprop-2-yl, 1-methylcycloprop-2-yl, 1-methylcycloprop-1-yl, 3-thiahex-5-en-2-yl, 2-methyl-3-thiahex-5-en-2-yl, 1-mercaptoeth-1-yl, 2-mercaptoprop-2-yl, 3,3,3-trifluoroprop-2-yl, 2-methyl-3,3,3-trifluoroprop-2-yl, 1-(2-furyl)eth-1-yl, 1-(5-methylfur-2-yl)eth-1-yl, 2-(2-furyl)prop-2-yl, 1-(3-furyl)eth-1-yl, 1-(5-methylfur-3-yl)eth-1-yl, 2-(3-furyl)prop-2-yl, 1-(2-tetrahydrofuryl)eth-1-yl, 2-(2-tetrahydrofuryl)prop-2-yl, 1-(3-tetrahydrofuryl)eth-1-yl, 2-(3-tetrahydrofuryl)prop-2-yl, 1-cyclopropyleth-1-yl, 2-cyclopropylprop-2-yl, 1-cyclobutyleth-1-yl, 2-cyclobutylprop-2-yl, cyclobutyl, cyclopentyl, pent-2-en-3-yl, 1-methoxyprop-1-yl, 1-methoxyeth-1-yl, 1,1,1-trifluorobut-3-yl and 3-thiacyclobut-1-yl.

Further, non-limiting examples are compounds of formula (Ia), a salt or solvate thereof

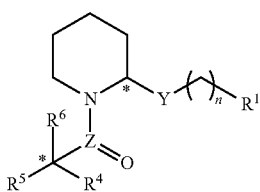

(Ia)

wherein n is 0 or 1;

$R^1$ is selected from halogen (including Br, Cl, and F);

$C_6$-$C_{10}$ aryl (e.g. phenyl, or naphthyl) optionally substituted with up to four (e.g. 1, 2, or 3) substituents independently selected from the group consisting of halogen (including F, Cl, Br); OH (hydroxyl); C≡N (cyano); $NO_2$ (nitro); $C_1$-$C_6$ alky optionally comprising up to 5 halogen atoms (e.g F), such as $CH_3$, $CF_3$, or $CHF_2$;

$C_1$-$C_3$ alkyl comprising up to 3 OH groups, such as $CH_2OH$;

$C_2$-$C_6$ alkenyl, such as —CH=$CH_2$;

$C_1$-$C_6$ alkoxy optionally comprising up to 3 halogen atoms (e.g. F), such as $OCH_3$, $OCH_3$, $OCF_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{10}$ wherein $R^{10}$ is selected from $C_1$-$C_3$ alkyl;

—OC(O)$R^{11}$ wherein $R^{11}$ is selected from H, and $C_1$-$C_3$ alkyl;

—C(O)O—$R^{12}$ wherein $R^{12}$ is selected from hydrogen and $C_1$-$C_3$ alkyl;

$(CH_2)_m N(R^{13})R^{14}$ wherein m is 0 or 1, $R^{13}$ is selected from hydrogen, $C_1$-$C_3$ alkyl, and —$SO_2R^{15}$ wherein $R^{15}$ is $C_1$-$C_3$ alkyl, and $R^{14}$ is selected from hydrogen, $C_1$-$C_3$ alkyl, and —$SO_2R^{16}$ wherein $R^{16}$ is $C_1$-$C_3$ alkyl, or wherein $R^{13}$ and $R^{14}$ form together with the N atom to which they are attached morpholine, thiomorpholine, or 1,1-dioxothiomorpholine;

—$SR^{17}$ wherein $R^{17}$ is selected from hydrogen and $C_1$-$C_3$ alkyl; and —$S(O)_2R^{18}$ wherein $R^{18}$ is selected from hydrogen and $C_1$-$C_3$ alkyl;

with the proviso that when the aryl ring is substituted with two or more substituents two substituents may form a cyclic ring together with the carbon atoms to which they are attached, and $C_5$-$C_{10}$ mono- or bicyclic heteroaryl wherein up to 2 C-atoms are replaced by a hetero atoms independently selected from sulfur, nitrogen, and oxygen, optionally substituted with up to four (e.g. 1, 2, or 3) substituents selected from the group consisting of halogen (including F, Cl, Br); OH (hydroxyl); C≡N (cyano); $NO_2$ (nitro);

$C_1$-$C_6$ alky optionally comprising up to 5 halogen atoms (e.g F), such as $CH_3$, $CF_3$, or $CHF_2$;

$C_2$-$C_6$ alkenyl, such as —CH=$CH_2$;

$C_1$-$C_6$ alkoxy optionally comprising up to 3 halogen atoms (e.g. F), such as $OCH_3$, $OCH_3$, $OCF_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{20}$ wherein $R^{20}$ is selected from $C_1$-$C_3$ alkyl;

—OC(O)$R^{21}$ wherein $R^{21}$ is selected from H, and $C_1$-$C_3$ alkyl;

—C(O)O—$R^{22}$ wherein $R^{22}$ is selected from hydrogen and $C_1$-$C_3$ alkyl);

—$(CH_2)_m N(R^{23})R^{24}$ wherein m is 0 or 1, $R^{23}$ is selected from hydrogen, $C_1$-$C_3$ alkyl, and —$SO_2R^{25}$ wherein $R^{25}$ is $C_1$-$C_3$ alkyl, and $R^{24}$ is selected from hydrogen, $C_1$-$C_3$ alkyl, and —$SO_2R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;

—$SR^{27}$ wherein $R^{27}$ is selected from hydrogen and $C_1$-$C_3$ alkyl; and —$S(O)_2R^{28}$ wherein $R^{28}$ is selected from hydrogen and $C_1$-$C_3$ alkyl;

Y is a monocyclic or bicyclic, unsaturated or aromatic heterocyclic ring comprising one, two, three or four heteroatoms independently selected from nitrogen, sulfur and oxygen, wherein the ring is optionally mon-, di-, or tri-substituted with a group selected from halogen (including Br, Cl, and F), methyl, ethyl, —N($R^{40}$)$R^{41}$, —CON($R^{40}$)$R^{41}$, —$[CR^{40}R^{41}]_p$C(O)O$R^{40}$, —C(O)$R^{40}$, and —$SO_2N(R^{40})R^{41}$ wherein $R^{40}$ and $R^{41}$ are independently selected from hydrogen and $C_1$-$C_4$ alkyl (including ethyl and propyl), and p is 0, 1 or 2;

Z is either C, S or S(O); and $R^4$, $R^5$ and $R^6$ form together with the carbon atom to which they are attached a hydrocarbon group optionally comprising up to five (e.g. 1, 2, 3, 4) hetero atoms selected from O, N, S, and F (preferably the hydrocarbon group comprises 2 to 15 C-atoms (e.g. 3, 4, 5, 6, 7, 8, 9, 10, 11, 12, 13, or 14 C-atoms).

Further non-limiting examples are compounds of formula (Ia), a salt or solvate thereof wherein $R^4$ is selected from hydrogen and methyl; $R^5$ is selected from hydrogen, $C_1$-$C_2$ alkyl, and $C_2$-$C_3$ alkenyl; and $R^6$ is selected from $C_1$-$C_4$ alkyl, $C_2$-$C_5$ alkenyl containing one or two double bonds, $C_1$-$C_3$ alkoxy, $C_1$-$C_4$ alkyl-C(O)—, $C_1$-$C_4$ alkyl-S—, $C_1$-$C_4$ alkyl-$SCH_2$—, $C_1$-$C_4$ alkenyl-S—, $C_1$-$C_4$ alkyl-S(O)—, $C_1$-$C_4$ alkyl-S(O)—, $C_1$-$C_4$ alkenyl-S(O)—, $C_1$-$C_4$ alkenyl-S(O)$_2$—, —SH, $CF_3S$—, cyclopropyl, cyclobutyl, furyl (e.g. 2-furyl or 3-furyl) optionally substituted with methyl. $C_1$-$C_6$ fluoro-alkyl (such as pentafuloroethyl, difluoromethyl, trifluoromethyl, 2,2,2-trifluoroethyl or difluoroethyl), and —$NR^{30}R^{31}$ wherein $R^{30}$ and $R^{31}$ are independently selected from hydrogen and $C_1$-$C_3$ alkyl; or $R^6$ and $R^5$ form together with the carbon atom to which they are attached
a) a carbonyl group (C=O) or vinyl group (C=$CR^{32}R^{33}$ wherein $R^{32}$ and $R^{33}$ are independently selected from H or $C_1$-$C_3$ alkyl); or
b) a 3 to 7-membered saturated or unsaturated cycle ring comprising up to 3 heteroatoms selected from oxygen, nitrogen and sulfur, wherein the cyclic ring is optionally substituted with one or two groups independently selected from $C_1$-$C_3$ alkyl (e.g. methyl, ethyl, isopropyl), $C_1$-$C_3$ alkoxy; (e.g. $R^5$ and $R^6$ form together with the carbon atom to which they are attached thiodiazole, or furanyl).

Further non-limiting examples are compounds of formula (Ia), a salt or solvate thereof wherein Z is C, and $R^4$, $R^5$ and $R^6$ form together with the carbon atom to which they are attached a hydrocarbon group selected from 3-thiabut-2-yl, 2-methyl-3-thiabut-2-yl, 3-thiapent-2-yl, 4-thiapent-2-yl, 2-thiaprop-1-yl, 2-methyl-3-thiapent-2-yl, 3-oxo-3-thiabut-2-yl, 3-oxo-2-methyl-3-thiabut-2-yl, 3-oxo-3-thiapent-2-yl, 4-oxo-4-thiapent-2-yl, 2-oxo-2-thiaprop-1-yl, 3-oxo-2-methyl-3-thiapent-2-yl, but-2-yl, pent-2-yl, but-3-en-2-yl, pent-3-en-2-yl, but-2-en-2-yl, pent-2-en-2-yl, but-1-en-2-yl, pent-1-en-2-yl, 2-methylbut-2-yl, 2-methylpent-2-yl, 2-methylbut-3-en-2-yl, 3-methylbut-2-yl, 3-methylbut-3-en-2-yl, 3-methylbut-2-en-2-yl, 2,3-dimethylbut-2-yl, 2,3-dimethylpent-2-yl, 2,3-dimethylbut-3-en-2-yl, 2,3-dimethylpent-3-en-2-yl, 2-methylpent-3-en-2-yl, prop-2-yl, prop-1-yl, ethyl, cyclopropyl, 1,1-dimethylcycloprop-2-yl, 1-methylcycloprop-2-yl, 1-methylcycloprop-1-yl, 3-thiahex-5-en-2-yl, 2-methyl-3-thiahex-5-en-2-yl, 1-mercaptoeth-1-yl, 2-mercaptoprop-2-yl, 3,3,3-trifluoroprop-2-yl, 2-methyl-3,3,3-trifluoroprop-2-yl, 1-(2-furyl)eth-1-yl, 1-(5-methylfur-2-yl)eth-1-yl, 2-(2-furyl)prop-2-yl, 1-(3-furyl) eth-1-yl, 1-(5-methylfur-3-yl)eth-1-yl, 2-(3-furyl)prop-2-yl, 1-(2-tetrahydrofuryl)eth-1-yl, 2-(2-tetrahydrofuryl)prop-2-yl, 1-(3-tetrahydrofuryl)eth-1-yl, 2-(3-tetrahydrofuryl)prop-2-yl, 1-cyclopropyleth-1-yl, 2-cyclopropylprop-2-yl, 1-cyclobutyleth-1-yl, 2-cyclobutylprop-2-yl, cyclobutyl, cyclopentyl, pent-2-en-3-yl, 1-methoxyprop-1-yl, 1-methoxyeth-1-yl, 1,1,1-trifluorobut-3-yl and 3-thiacyclobut-1-yl.

Further non-limiting examples are compounds of formula (Ib), a salt or solvate thereof

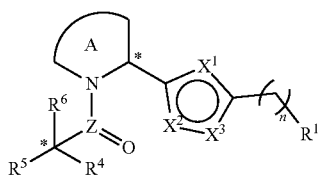

(Ib)

wherein
n is 0 or 1
$R^1$ is selected from
halogen (including Br, Cl, and F),
$C_6$-$C_{10}$ aryl (e.g. phenyl, or naphthyl) optionally substituted with up to four (e.g. 1, 2, or 3) substituents independently selected from the group consisting of
halogen (including F, Cl, Br); OH (hydroxyl); C≡N (cyano); $NO_2$ (nitro);
$C_1$-$C_6$ alky optionally comprising up to 5 halogen atoms (e.g F), such as $CH_3$, $CF_3$, or $CHF_2$;

$C_1$-$C_3$ alkyl comprising up to 3 OH groups, such as $CH_2OH$;
$C_2$-$C_6$ alkenyl, such as —CH=$CH_2$;
$C_1$-$C_6$ alkoxy optionally comprising up to 3 halogen atoms (e.g. F), such as $OCH_3$, $OCH_3$, $OCF_3$;
$C_1$-$C_3$ alkoxy $C_1$-$C_3$ alkyl, such as 2-methoxy-ethyl;
$C_3$-$C_7$ cycloalkyl, such as cyclopropyl, cyclobutyl;
—C(O)$R^{10}$ wherein $R^{10}$ is selected from $C_1$-$C_3$ alkyl;
—OC(O)$R^{11}$ wherein $R^{11}$ is selected from H, and $C_1$-$C_3$ alkyl;
—C(O)O—$R^{12}$ wherein $R^{12}$ is selected from hydrogen and $C_1$-$C_3$ alkyl;
$(CH_2)_mN(R^{13})R^{14}$ wherein m is 0 or 1, $R^{13}$ is selected from hydrogen, $C_1$-$C_3$ alkyl, and —$SO_2R^{15}$ wherein $R^{15}$ is $C_1$-$C_3$ alkyl, and $R^{14}$ is selected from hydrogen, $C_1$-$C_3$ alkyl, and —$SO_2R^{16}$ wherein $R^{16}$ is $C_1$-$C_3$ alkyl, or wherein $R^{13}$ and $R^{14}$ form together with the N atom to which they are attached morpholine, thiomorpholine, or 1,1-dioxothiomorpholine;
—$SR^{17}$ wherein $R^{17}$ is selected from hydrogen and $C_1$-$C_3$ alkyl; and
—$S(O)_2R^{18}$ wherein $R^{18}$ is selected from hydrogen and $C_1$-$C_3$ alkyl;
with the proviso that when the aryl ring is substituted with two or more substituents two substituents may form a cyclic ring together with the carbon atoms to which they are attached, and $C_5$-$C_{10}$ mono- or bicyclic heteroaryl wherein up to 2 C-atoms are replaced by a hetero atoms independently selected from sulfur, nitrogen, and oxygen, optionally substituted with up to four (e.g. 1, 2, or 3) substituents selected from the group consisting of
halogen (including F, Cl, Br); OH (hydroxyl); C≡N (cyano); $NO_2$ (nitro);
$C_1$-$C_6$ alky optionally comprising up to 5 halogen atoms (e.g F), such as $CH_3$, $CF_3$, or $CHF_2$;
$C_2$-$C_6$ alkenyl, such as —CH=$CH_2$;
$C_1$-$C_6$ alkoxy optionally comprising up to 3 halogen atoms (e.g. F), such as $OCH_3$, $OCH_3$, $OCF_3$;
$C_1$-$C_3$ alkoxy $C_1$-$C_3$ alkyl, such as 2-methoxy-ethyl;
$C_3$-$C_7$ cycloalkyl, such as cyclopropyl, cyclobutyl;
—C(O)$R^{20}$ wherein $R^{11}$ is selected from $C_1$-$C_3$ alkyl;
—OC(O)$R^{21}$ wherein $R^{21}$ is selected from H, and $C_1$-$C_3$ alkyl;
—C(O)O—$R^{22}$ wherein $R^{22}$ is selected from hydrogen and $C_1$-$C_3$ alkyl);
—$(CH_2)_mN(R^{23})R^{24}$ wherein m is 0 or 1, $R^{23}$ is selected from hydrogen, $C_1$-$C_3$ alkyl, and —$SO_2R^{25}$ wherein $R^{25}$ is $C_1$-$C_3$ alkyl, and $R^{24}$ is selected from hydrogen, $C_1$-$C_3$ alkyl, and —$SO_2R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;
—$SR^{27}$ wherein $R^{27}$ is selected from hydrogen and $C_1$-$C_3$ alkyl; and
—$S(O)_2R^{28}$ wherein $R^{28}$ is selected from hydrogen and $C_1$-$C_3$ alkyl;
A is a 5 to 7 membered heterocyclic ring optionally comprising one additional hetero atom selected from oxygen and sulfur, wherein the heterocyclic ring A is optionally substituted by one or two groups selected from —OH and =O;
Z is either C, S or S(O);
$R^4$, $R^5$ and $R^6$ form together with the carbon atom to which they are attached a hydrocarbon group optionally comprising up to five (e.g. 1, 2, 3, 4) hetero atoms selected from O, N, S, and F (preferably the hydrocarbon group comprises 2 to 15 C-atoms (e.g. 3, 4, 5, 6, 7, 8, 9, 10, 11, 12, 13, or 14 C-atoms);

$X^1$ is NH, O, or S; and $X^2$ and $X^3$ are independently selected from C, N, and O, with the proviso that either $X^2$ or $X^3$ is not C.

Further non-limiting examples are compounds of formula (Ib), a salt or solvate thereof wherein $R^1$ is selected from halogen (including Br, Cl, and F), $C_6$-$C_{10}$ aryl (e.g. phenyl, or naphthyl) optionally substituted with up to four (e.g. 1, 2, or 3) substituents independently selected from the group consisting of halogen (including F, Cl, Br); OH (hydroxyl); C≡N (cyano); $NO_2$ (nitro);

$C_1$-$C_6$ alky optionally comprising up to 5 halogen atoms (e.g F), such as $CH_3$, $CF_3$, or $CHF_2$;

$C_1$-$C_3$ alkyl comprising up to 3 OH groups, such as $CH_2OH$;

$C_2$-$C_6$ alkenyl, such as —CH=$CH_2$;

$C_1$-$C_6$ alkoxy optionally comprising up to 3 halogen atoms (e.g. F), such as $OCH_3$, $OCH_3$, $OCF_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{10}$ wherein $R^{10}$ is selected from $C_1$-$C_3$ alkyl;

—OC(O)$R^{11}$ wherein $R^{11}$ is selected from H, and $C_1$-$C_3$ alkyl;

—C(O)O—$R^{12}$ wherein $R^{12}$ is selected from hydrogen and $C_1$-$C_3$ alkyl;

—$(CH_2)_m$N($R^{13}$)$R^{14}$ wherein m is 0 or 1, $R^{13}$ is selected from hydrogen, $C_1$-$C_3$ alkyl, and —$SO_2R^{15}$ wherein $R^{15}$ is $C_1$-$C_3$ alkyl, and $R^{14}$ is selected from hydrogen, $C_1$-$C_3$ alkyl, and —$SO_2R^{16}$ wherein $R^{16}$ is $C_1$-$C_3$ alkyl, or wherein $R^{13}$ and $R^{14}$ form together with the N atom to which they are attached morpholine, thiomorpholine, or 1,1-dioxothiomorpholine;

—$SR^{17}$ wherein $R^{17}$ is selected from hydrogen and $C_1$-$C_3$ alkyl; and —$S(O)_2R^{18}$ wherein $R^{18}$ is selected from hydrogen and $C_1$-$C_3$ alkyl;

with the proviso that when the aryl ring is substituted with two or more substituents two substituents may form a cyclic ring together with the carbon atoms to which they are attached, and $C_5$-$C_{10}$ mono- or bicyclic heteroaryl wherein up to 2 C-atoms are replaced by a hetero atoms independently selected from sulfur, nitrogen, and oxygen, optionally substituted with up to four (e.g. 1, 2, or 3) substituents selected from the group consisting of halogen (including F, Cl, Br); OH (hydroxyl); C≡N (cyano); $NO_2$ (nitro);

$C_1$-$C_6$ alky optionally comprising up to 5 halogen atoms (e.g F), such as $CH_3$, $CF_3$, or $CHF_2$;

$C_2$-$C_6$ alkenyl, such as —CH=$CH_2$;

$C_1$-$C_6$ alkoxy optionally comprising up to 3 halogen atoms (e.g. F), such as $OCH_3$, $OCH_3$, $OCF_3$;

$C_1$-$C_3$ alkoxy $C_1$-$C_3$ alkyl, such as 2-methoxy-ethyl;

$C_3$-$C_7$ cycloalkyl, such as cyclopropyl, cyclobutyl;

—C(O)$R^{20}$ wherein $R^{20}$ is selected from $C_1$-$C_3$ alkyl;

—OC(O)$R^{21}$ wherein $R^{21}$ is selected from H, and $C_1$-$C_3$ alkyl;

—C(O)O—$R^{22}$ wherein $R^{22}$ is selected from hydrogen and $C_1$-$C_3$ alkyl);

—$(CH_2)_m$N($R^{23}$)$R^{24}$ wherein m is 0 or 1, $R^{23}$ is selected from hydrogen, $C_1$-$C_3$ alkyl, and —$SO_2R^{25}$ wherein $R^{25}$ is $C_1$-$C_3$ alkyl, and $R^{24}$ is selected from hydrogen, $C_1$-$C_3$ alkyl, and —$SO_2R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;

—$SR^{27}$ wherein $R^{27}$ is selected from hydrogen and $C_1$-$C_3$ alkyl; and —$S(O)_2R^{28}$ wherein $R^{28}$ is selected from hydrogen and $C_1$-$C_3$ alkyl;

and $R^4$, $R^5$ and $R^6$ form together with the carbon atom to which they are attached a hydrocarbon group selected from 3-thiabut-2-yl, 2-methyl-3-thiabut-2-yl, 3-thiapent-2-yl, 4-thiapent-2-yl, 2-thiaprop-1-yl, 2-methyl-3-thiapent-2-yl, 3-oxo-3-thiabut-2-yl, 3-oxo-2-methyl-3-thiabut-2-yl, 3-oxo-3-thiapent-2-yl, 4-oxo-4-thiapent-2-yl, 2-oxo-2-thiaprop-1-yl, 3-oxo-2-methyl-3-thiapent-2-yl, but-2-yl, pent-2-yl, but-3-en-2-yl, pent-3-en-2-yl, but-2-en-2-yl, pent-2-en-2-yl, but-1-en-2-yl, pent-1-en-2-yl, 2-methylbut-2-yl, 2-methylpent-2-yl, 2-methylbut-3-en-2-yl, 3-methylbut-2-yl, 3-methylbut-3-en-2-yl, 3-methylbut-2-en-2-yl, 2,3-dimethylbut-2-yl, 2,3-dimethylpent-2-yl, 2,3-dimethylbut-3-en-2-yl, 2,3-dimethylpent-3-en-2-yl, 2-methylpent-3-en-2-yl, prop-2-yl, prop-1-yl, ethyl, cyclopropyl, 1,1-dimethyl-cyclopropyl, 1-methylcycloprop-2-yl, 1-methylcycloprop-1-yl, 3-thiahex-5-en-2-yl, 2-methyl-3-thiahex-5-en-2-yl, 1-mercaptoeth-1-yl, 2-mercaptoprop-2-yl, 3,3,3-trifluoroprop-2-yl, 2-methyl-3,3,3-trifluoroprop-2-yl, 1-(2-furyl)eth-1-yl, 1-(5-methylfur-2-yl)eth-1-yl, 2-(2-furyl)prop-2-yl, 1-(3-furyl)eth-1-yl, 1-(5-methylfur-3-yl)eth-1-yl, 2-(3-furyl)prop-2-yl, 1-(2-tetrahydrofuryl)eth-1-yl, 2-(2-tetrahydrofuryl)prop-2-yl, 1-(3-tetrahydrofuryl)eth-1-yl, 2-(3-tetrahydrofuryl)prop-2-yl, 1-cyclopropyleth-1-yl, 2-cyclopropylprop-2-yl, 1-cyclobutyleth-1-yl, 2-cyclobutylprop-2-yl, cyclobutyl, cyclopentyl, pent-2-en-3-yl, 1-methoxyprop-1-yl, 1-methoxyeth-1-yl, 1,1,1-trifluorobut-3-yl and 3-thiacyclobut-1-yl.

Further non-limiting examples are compounds of formula (Ib), a salt or solvate thereof wherein Z is C.

Further non-limiting examples are compounds of formula (Ib), a salt or solvate thereof wherein Z is C, $R^4$ is selected from hydrogen and methyl; $R^5$ is selected from hydrogen, $C_1$-$C_2$ alkyl, and $C_2$-$C_3$ alkenyl; and $R^6$ is selected from $C_1$-$C_4$ alkyl, $C_2$-$C_5$ alkenyl containing one or two double bonds, $C_1$-$C_3$ alkoxy, $C_1$-$C_4$ alkyl-C(O)—, $C_1$-$C_4$ alkyl-S—, $C_1$-$C_4$ alkyl-$SCH_2$—, $C_1$-$C_4$ alkenyl-S—, $C_1$-$C_4$ alky-S(O)—, $C_1$-$C_4$ alkyl-S(O)—, $C_1$-$C_4$ alkenyl-S(O)—, $C_1$-$C_4$ alkenyl-S(O)—, —SH, $CF_3$S—, cyclopropyl, cyclobutyl, furyl (e.g. 2-furyl or 3-furyl) optionally substituted with methyl. $C_1$-$C_6$ fluoro-alkyl (such as pentafuloroethyl, difluoromethyl, trifluoromethyl, 2,2,2-trifluoroethyl or difluoroethyl), and —$NR^{30}R^{31}$ wherein $R^{30}$ and $R^{31}$ are independently selected from hydrogen and $C_1$-$C_3$ alkyl; or $R^6$ and $R^5$ form together with the carbon atom to which they are attached a) a carbonyl group (C=O) or vinyl group (C=$CR^{32}R^{33}$ wherein $R^{32}$ and $R^{33}$ are independently selected from H or $C_1$-$C_3$ alkyl); or b) a 3 to 7-membered saturated or unsaturated cycle ring comprising up to 3 heteroatoms selected from oxygen, nitrogen and sulfur, wherein the cyclic ring is optionally substituted with one or two groups independently selected from $C_1$-$C_3$ alkyl (e.g. methyl, ethyl, isopropyl), $C_1$-$C_3$ alkoxy; (e.g. $R^5$ and $R^6$ form together with the carbon atom to which they are attached thiodiazole, or furanyl).

Further non-limiting examples are compounds of formula (Ic), a salt or solvate thereof

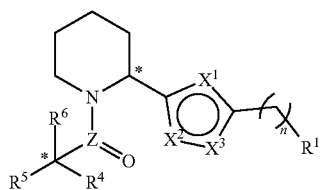

wherein
n is 0 or 1;
R$^1$ is selected from
halogen (including Br, Cl, and F),
C$_6$-C$_{10}$ aryl (e.g. phenyl, or naphthyl) optionally substituted with up to four (e.g. 1, 2, or 3) substituents independently selected from the group consisting of
halogen (including F, Cl, Br); OH (hydroxyl); C≡N (cyano); NO$_2$ (nitro);
C$_1$-C$_6$ alky optionally comprising up to 5 halogen atoms (e.g F), such as CH$_3$, CF$_3$, or CHF$_2$;
C$_1$-C$_3$ alkyl comprising up to 3 OH groups, such as CH$_2$OH;
C$_2$-C$_6$ alkenyl, such as —CH=CH$_2$;
C$_1$-C$_6$ alkoxy optionally comprising up to 3 halogen atoms (e.g. F), such as OCH$_3$, OCH$_3$, OCF$_3$;
C$_1$-C$_3$ alkoxy C$_1$-C$_3$ alkyl, such as 2-methoxy-ethyl;
C$_3$-C$_7$ cycloalkyl, such as cyclopropyl, cyclobutyl;
—C(O)R$^{10}$ wherein R$^{10}$ is selected from C$_1$-C$_3$ alkyl;
—OC(O)R$^{11}$ wherein R$^{11}$ is selected from H, and C$_1$-C$_3$ alkyl;
—C(O)O—R$^{12}$ wherein R$^{12}$ is selected from hydrogen and C$_1$-C$_3$ alkyl;
—(CH$_2$)$_m$N(R$^{13}$)R$^{14}$ wherein m is 0 or 1, R$^{13}$ is selected from hydrogen, C$_1$-C$_3$ alkyl, and —SO$_2$R$^{15}$ wherein R$^{15}$ is C$_1$-C$_3$ alkyl, and R$^{14}$ is selected from hydrogen, C$_1$-C$_3$ alkyl, and —SO$_2$R$^{16}$ wherein R$^{16}$ is C$_1$-C$_3$ alkyl, or wherein R$^{13}$ and R$^{14}$ form together with the N atom to which they are attached morpholine, thiomorpholine, or 1,1-dioxothiomorpholine;
—SR$^{17}$ wherein R$^{17}$ is selected from hydrogen and C$_1$-C$_3$ alkyl; and
—S(O)$_2$R$^{18}$ wherein R$^{18}$ is selected from hydrogen and C$_1$-C$_3$ alkyl;
with the proviso that when the aryl ring is substituted with two or more substituents two substituents may form a cyclic ring together with the carbon atoms to which they are attached, and
C$_5$-C$_{10}$ mono- or bicyclic heteroaryl wherein up to 2 C-atoms are replaced by a hetero atoms independently selected from sulfur, nitrogen, and oxygen, optionally substituted with up to four (e.g. 1, 2, or 3) substituents selected from the group consisting of
halogen (including F, Cl, Br); OH (hydroxyl); C≡N (cyano); NO$_2$ (nitro);
C$_1$-C$_6$ alky optionally comprising up to 5 halogen atoms (e.g F), such as CH$_3$, CF$_3$, or CHF$_2$;
C$_2$-C$_6$ alkenyl, such as —CH=CH$_2$;
C$_1$-C$_6$ alkoxy optionally comprising up to 3 halogen atoms (e.g. F), such as OCH$_3$, OCH$_3$, OCF$_3$;
C$_1$-C$_3$ alkoxy C$_1$-C$_3$ alkyl, such as 2-methoxy-ethyl;
C$_3$-C$_7$ cycloalkyl, such as cyclopropyl, cyclobutyl;
—C(O)R$^{20}$ wherein R$^{20}$ is selected from C$_1$-C$_3$ alkyl;
—OC(O)R$^{21}$ wherein R$^{21}$ is selected from H, and C$_1$-C$_3$ alkyl;
—C(O)O—R$^{22}$ wherein R$^{22}$ is selected from hydrogen and C$_1$-C$_3$ alkyl);
—(CH$_2$)$_m$N(R$^{23}$)R$^{24}$ wherein m is 0 or 1, R$^{23}$ is selected from hydrogen, C$_1$-C$_3$ alkyl, and —SO$_2$R$^{25}$ wherein R$^{25}$ is C$_1$-C$_3$ alkyl, and R$^{24}$ is selected from hydrogen, C$_1$-C$_3$ alkyl, and —SO$_2$R$^{26}$ wherein R$^{26}$ is C$_1$-C$_3$ alkyl, or wherein R$^{23}$ and R$^{24}$ form together with the N atom to which they are attached morpholine, thiomorpholine, or 1,1-dioxothiomorpholine;
—SR$^{27}$ wherein R$^{27}$ is selected from hydrogen and C$_1$-C$_3$ alkyl; and
—S(O)$_2$R$^{28}$ wherein R$^{28}$ is selected from hydrogen and C$_1$-C$_3$ alkyl;
Z is either C, S or S(O); and
R$^4$, R$^5$ and R$^6$ form together with the carbon atom to which they are attached a hydrocarbon group optionally comprising up to five (e.g. 1, 2, 3, 4) hetero atoms selected from O, N, S, and F (preferably the hydrocarbon group comprises 2 to 15 C-atoms (e.g. 3, 4, 5, 6, 7, 8, 9, 10, 11, 12, 13, or 14 C-atoms);
X$^1$ is NH or O; and
X$^2$ and X$^3$ are independently selected from C, N, and O, with the proviso that either X$^2$ or X$^3$ is not C.

Further non-limiting examples are compounds of formula (Ic), a salt or solvate thereof wherein Z is C.

Further non-limiting examples are compounds of formula (Ic), a salt or solvate thereof wherein Z is C,
R$^4$ is selected from hydrogen and methyl;
R$^5$ is selected from hydrogen, C$_1$-C$_2$ alkyl, and C$_2$-C$_3$ alkenyl; and
R$^6$ is selected from C$_1$-C$_4$ alkyl, C$_2$-C$_5$ alkenyl containing one or two double bonds, C$_1$-C$_3$ alkoxy, C$_1$-C$_4$ alkyl-C(O)—, C$_1$-C$_4$ alkyl-S—, C$_1$-C$_4$ alkyl-SCH$_2$, C$_1$-C$_4$ alkenyl-S—, C$_1$-C$_4$ alkyl-S(O)—, C$_1$-C$_4$ alkyl-S(O)$_2$—, C$_1$-C$_4$ alkenyl-S(O)—, C$_1$-C$_4$ alkenyl-S(O)$_2$—, —SH, CF$_3$S—, cyclopropyl, cyclobutyl, furyl (e.g. 2-furyl or 3-furyl) optionally substituted with methyl, C$_1$-C$_6$ fluoro-alkyl (such as pentafuloroethyl, difluoromethyl, trifluoromethyl, 2,2,2-trifluoroethyl or difluoroethyl), and —NR$^{30}$R$^{31}$ wherein R$^{30}$ and R$^{31}$ are independently selected from hydrogen and C$_1$-C$_3$ alkyl; or
R$^6$ and R$^5$ form together with the carbon atom to which they are attached
a) a carbonyl group (C=O) or vinyl group (C=CR$^{32}$R$^{33}$ wherein R$^{32}$ and R$^{33}$ are independently selected from H or C$_1$-C$_3$ alkyl); or
b) a 3 to 7-membered saturated or unsaturated cycle ring comprising up to 3 heteroatoms selected from oxygen, nitrogen and sulfur, wherein the cyclic ring is optionally substituted with one or two groups independently selected from C$_1$-C$_3$ alkyl (e.g. methyl, ethyl, isopropyl), C$_1$-C$_3$ alkoxy; (e.g. R and R form together with the carbon atom to which they are attached thiodiazole, or furanyl).

Further non-limiting examples are compounds of formula (Ic), a salt or solvate thereof wherein Z is C, R$^4$ is selected from hydrogen and methyl; R$^5$ is selected from hydrogen, C$_1$-C$_2$ alkyl, C$_2$-C$_3$ alkenyl; and R$^6$ is selected from C$_1$-C$_4$ alkyl, C$_2$-C$_5$ alkenyl containing one or two double bonds, C$_1$-C$_3$ alkoxy, C$_1$-C$_4$ alkyl-C(O)—, C$_1$-C$_4$ alkyl-S—, C$_1$-C$_4$ alkyl-SCH$_2$—, C$_1$-C$_4$ alkenyl-S—, C$_1$-C$_4$ alkyl-S(O)—, C$_1$-C$_4$ alkyl-S(O)$_2$—, C$_1$-C$_4$ alkenyl-S(O)—, C$_1$-C$_4$ alkenyl-S(O)$_2$—, —SH, CF$_3$S—, cyclopropyl, cyclobutyl, furyl (e.g. 2-furyl or 3-furyl) optionally substituted with methyl. C$_1$-C$_6$ fluoro-alkyl (such as pentafuloroethyl, difluoromethyl, trifluoromethyl, 2,2,2-trifluoroethyl or difluoroethyl), and —NR$^{30}$R$^{31}$ wherein R$^{30}$ and R$^{31}$ are independently selected from hydrogen and C$_1$-C$_3$ alkyl.

Further non-limiting examples are compounds of formula (Ic) wherein Z is C, and R$^4$, R$^5$ and R$^6$ form together with the carbon atom to which they are attached a hydrocarbon group selected from 3-thiabut-2-yl, 2-methyl-3-thiabut-2-yl, 3-thiapent-2-yl, 4-thiapent-2-yl, 2-thiaprop-1-yl, 2-methyl-3-thiapent-2-yl, 3-oxo-3-thiabut-2-yl, 3-oxo-2-methyl-3-thiabut-2-yl, 3-oxo-3-thiapent-2-yl, 4-oxo-4-thiapent-2-yl, 2-oxo-2-thiaprop-1-yl, 3-oxo-2-methyl-3-thiapent-2-yl, but-2-yl, pent-2-yl, but-3-en-2-yl, pent-3-en-2-yl, but-2-en-2-yl, pent-2-en-2-yl, but-1-en-2-yl, pent-1-en-2-yl, 2-methylbut-2-yl, 2-methylpent-2-yl, 2-methylbut-3-en-2-yl, 3-methylbut-2-yl, 3-methylbut-3-en-2-yl, 3-methylbut-2-en-2-yl, 2,3-dimethylbut-2-yl, 2,3-dimethylpent-2-yl, 2,3-dimethylbut-3-en-2-yl, 2,3-dimethylpent-3-en-2-yl, 2-methylpent-3-en-2-yl, prop-2-yl, prop-1-yl, ethyl, cyclopropyl, 1,1-dimethylcycloprop-2-yl, 1-methylcycloprop-2-yl, 1-methylcycloprop-1-yl, 3-thiahex-5-en-2-yl, 2-methyl-3-thiahex-5-en-2-yl, 1-mercaptoeth-1-yl, 2-mercaptoprop-2-yl, 3,3,3-trifluoroprop-2-yl, 2-methyl-3,3,3-trifluoroprop-2-yl, 1-(2-furyl)eth-1-yl, 1-(5-methylfur-2-yl)eth-1-yl, 2-(2-furyl)prop-2-yl, 1-(3-furyl)eth-1-yl, 1-(5-methylfur-3-yl)eth-1-yl, 2-(3-furyl)prop-2-yl, 1-(2-tetrahydrofuryl)eth-1-yl, 2-(2-tetrahydrofuryl)prop-2-yl, 1-(3-tetrahydrofuryl)eth-1-yl, 2-(3-tetrahydrofuryl)prop-2-yl, 1-cyclopropyleth-1-yl, 2-cyclopropylprop-2-yl, 1-cyclobutyleth-1-yl, 2-cyclobutylprop-2-yl, cyclobutyl, cyclopentyl, pent-2-en-3-yl, 1-methoxyprop-1-yl, 1-methoxyeth-1-yl, 1,1,1-trifluorobut-3-yl and 3-thiacyclobut-1-yl.

Further non-limiting examples are compounds of formula (I), (Ia), (Ib) and (Ic) wherein n is 0.

Further non-limiting examples are compounds of formula (I), (Ia), (Ib) and (Ic) wherein R$^1$ is para-methyl-phenyl.

Further non-limiting examples are compounds of formula (I), (Ia), (Ib) and (Ic) wherein n is 0, and R$^1$ is para-methyl-phenyl.

Further non-limiting examples are compounds of formula (I), (Ia), (Ib) and (Ic) wherein Z is C, n is 0, and R$^1$ is para-methyl-phenyl.

Further non-limiting examples are compounds of formula (I), (Ia), (Ib) and (Ic) wherein n is 0, Z is C, R$^4$ is selected from hydrogen and methyl, R$^5$ is selected from hydrogen, C$_1$-C$_2$ alkyl, C$_2$-C$_3$ alkenyl, and R$^6$ is selected from C$_1$-C$_4$ alkyl, C$_2$-C$_5$ alkenyl containing one or two double bonds, C$_1$-C$_4$ alkoxy, C$_1$-C$_4$ alkyl-C(O)—, C$_1$-C$_4$ alkyl-S—, C$_1$-C$_4$ alkyl-SCH$_2$—, C$_1$-C$_4$ alkenyl-S—, C$_1$-C$_4$ alkyl-S(O)—, C$_1$-C$_4$ alkyl-S(O)$_2$—, C$_1$-C$_4$ alkenyl-S(O)—, C$_1$-C$_4$ alkenyl-S(O)—, and —SH.

Further non-limiting examples are compounds of formula (I), (Ia) or (Ib) selected from the group consisting of (2-(4-phenyl-1H-imidazol-2-yl)piperidin-1-yl)(1,2,3-thiadiazol-5-yl)methanone, (2-(4-phenyl-1H-imidazol-2-yl)piperidin-1-yl)(thietan-3-yl)methanone, (2,2-dimethylcyclopropyl)(2-(4-phenyl-1H-imidazol-2-yl)piperidin-1-yl)methanone, (2-ethoxycyclopropyl)(2-(4-phenyl-1H-imidazol-2-yl)piperidin-1-yl)methanone, (2-methoxycyclopropyl)(2-(4-phenyl-1H-imidazol-2-yl)piperidin-1-yl)methanone, (2-methylcyclopropyl)(2-(4-phenyl-1H-imidazol-2-yl)piperidin-1-yl)methanone, (2S)-2-methyl-1-(2-(5-(p-tolyl)-1H-imidazol-2-yl)piperidin-1-yl)butan-1-one, (5-methyltetrahydrofuran-3-yl)(2-(4-phenyl-1H-imidazol-2-yl)piperidin-1-yl)methanone, (E)-1-(2-(5-(3,4-difluorophenyl)-1H-imidazol-2-yl)piperidin-1-yl)-2-methylbut-2-en-1-one, (E)-2-methyl-1-(2-(5-(p-tolyl)-1H-imidazol-2-yl)piperidin-1-yl)but-2-en-1-one, (E)-2-methyl-1-(2-(5-(p-tolyl)-1H-imidazol-2-yl)piperidin-1-yl)pent-3-en-1-one, (R)-2-(methylthio)-1-((R)-2-(5-(p-tolyl)-1H-imidazol-2-yl)piperidin-1-yl)propan-1-one, (S)-2-(methylthio)-1-((R)-2-(5-(p-tolyl)-1H-imidazol-2-yl)piperidin-1-yl) propan-1-one, (S)-2-(methylthio)-1-((S)-2-(5-(p-tolyl)-1H-imidazol-2-yl)piperidin-1-yl)propan-1-one, (S)-2-methyl-1-((R)-2-(5-(p-tolyl)-1H-imidazol-2-yl)piperidin-1-yl)butan-1-one, (tetrahydrofuran-3-yl)(2-(5-(p-tolyl)-1H-imidazol-2-yl)piperidin-1-yl)methanone, 1-(2-(1H-benzo[d]imidazol-2-yl)piperidin-1-yl)-2-(methylthio)propan-1-one, 1-(2-(4-(1-methyl-1H-pyrazol-4-yl)-1H-imidazol-2-yl)piperidin-1-yl)-2-(methylthio)propan-1-one, 1-(2-(4-(2,2-difluorobenzo[d][1,3]dioxol-5-yl)-1H-imidazol-2-yl)piperidin-1-yl)-2-(methylthio)propan-1-one, 1-(2-(4-(2,3-dihydrobenzofuran-5-yl)-1H-imidazol-2-yl)piperidin-1-yl)-2-(methylthio) propan-1-one, 1-(2-(4-(2,3-dihydrobenzofuran-6-yl)-1H-imidazol-2-yl)piperidin-1-yl)-2-(methylthio)propan-1-one, 1-(2-(4-(2,5-dimethylphenyl)-1H-imidazol-2-yl)piperidin-1-yl)-2-(methylthio)propan-1-one, 1-(2-(4-(2-chlorophenyl)-1H-imidazol-2-yl)piperidin-1-yl)-2-(methylthio)propan-1-one, 1-(2-(4-(2-cyclopropyloxazol-5-yl)-1H-imidazol-2-yl)piperidin-1-yl)-2-(methylthio)propan-1-one, 1-(2-(4-(2-fluorophenyl)-1H-imidazol-2-yl)piperidin-1-yl)-2-(methylthio)propan-1-one, 1-(2-(4-(2-hydroxyphenyl)-1H-imidazol-2-yl)piperidin-1-yl)-2-(methylthio)propan-1-one, 1-(2-(4-(3-((dimethylamino)methyl)phenyl)-1H-imidazol-2-yl)piperidin-1-yl)-2-(methylthio)propan-1-one, 1-(2-(4-(3,5-difluorophenyl)-1H-imidazol-2-yl)piperidin-1-yl)-2-(methylthio)propan-1-one, 1-(2-(4-(3,5-dimethylisoxazol-4-yl)-1H-imidazol-2-yl)piperidin-1-yl)-2-(methylthio)propan-1-one, 1-(2-(4-(3-chloro-4-methylphenyl)-1H-imidazol-2-yl)piperidin-1-yl)-2-(methylthio)propan-1-one, 1-(2-(4-(3-methylfuran-2-yl)-1H-imidazol-2-yl)piperidin-1-yl)-2-(methylthio)propan-1-one, 1-(2-(4-(4-((1,1-dioxidothiomorpholino)methyl)phenyl)-1H-imidazol-2-yl)piperidin-1-yl)-2-(methylthio)propan-1-one, 1-(2-(4-(4-(1-hydroxyethyl)phenyl)-1H-imidazol-2-yl)piperidin-1-yl)-2-(methylthio)propan-1-one, 1-(2-(4-(4-(difluoromethoxy)-3-fluorophenyl)-1H-imidazol-2-yl)piperidin-1-yl)-2-(methylthio)propan-1-one, 1-(2-(4-(4-(difluoromethyl)thiophen-3-yl)-1H-imidazol-2-yl)piperidin-1-yl)-2-(methylthio)propan-1-one, 1-(2-(4-(4-(methylsulfonyl)phenyl)-1H-imidazol-2-yl)piperidin-1-yl)-2-(methylthio) propan-1-one, 1-(2-(4-(4-(tert-butyl)phenyl)-1H-imidazol-2-yl)piperidin-1-yl)-2-(methylthio)propan-1-one, 1-(2-(4-(4-cyclobutylphenyl)-1H-imidazol-2-yl)piperidin-1-yl)-2-(methylthio)propan-1-one, 1-(2-(4-(4-cyclopropyl-2-fluorophenyl)-1H-imidazol-2-yl)piperidin-1-yl)-2-(methylthio)propan-1-one, 1-(2-(4-(4-fluorophenyl)-1H-imidazol-2-yl)piperidin-1-yl)-2-(methylthio)propan-1-one, 1-(2-(4-(4-hydroxyphenyl)-1H-imidazol-2-yl)piperidin-1-yl)-2-(methylthio)propan-1-one, 1-(2-(4-(4-isopropylphenyl)-1H-imidazol-2-yl)piperidin-1-yl)-2-(methylthio)propan-1-one, 1-(2-(4-(4-methyl-3-(trifluoromethyl)phenyl)-1H-imidazol-2-yl)piperidin-1-yl)-2-(methylthio)propan-1-one, 1-(2-(4-(5-((dimethylamino)methyl)thiophen-2-yl)-1H-imidazol-2-yl)piperidin-1-yl)-2-(methylthio)propan-1-one, 1-(2-(4-(5-methylfuran-2-yl)-1H-imidazol-2-yl)piperidin-1-yl)-2-(methylthio)propan-1-one, 1-(2-(4-(5-methylpyridin-3-yl)-1H-imidazol-2-yl)piperidin-1-yl)-2-(methylthio)propan-1-one, 1-(2-(4-(6-methylpyridin-3-yl)-1H-imidazol-2-yl)piperidin-1-yl)-2-(methylthio)propan-1-one, 1-(2-(4-(benzo[b]thiophen-6-yl)-1H-imidazol-2-yl)piperidin-1-yl)-2-(methylthio)propan-1-one, 1-(2-(4-methyl-5-phenyl-1H-imidazol-2-yl)piperidin-1-yl)-2-(methylthio)propan-1-one, 1-(2-(4-phenyl-1H-imidazol-2- yl)piperidin-1-yl)-2-((trifluoromethyl)thio)ethan-1-one, 1-(2-(4-phenyl-1H-imidazol-2-yl)piperidin-1-yl)butan-1-one, 1-(2-(4-phenyl-1H-imidazol-2-yl)piperidin-1-yl)hexa-3,5-dien-1-one, 1-(2-(4-phenyl-1H-imidazol-2-yl)piperidin-1-yl)pent-4-en-1-one, 1-(2-(4-phenyl-1H-imidazol-2-yl) piperidin-1-yl)propan-1-one, 1-(2-(5-(2,3-difluorophenyl)-1H-imidazol-2-yl)piperidin-1-yl)-2-(methylthio)propan-1-one, 1-(2-(5-(2,4-difluorophenyl)-1H-imidazol-2-yl) piperidin-1-yl)-2-(methylthio)propan-1-one, 1-(2-(5-(2,5-difluorophenyl)-1H-imidazol-2-yl)piperidin-1-yl)-2-(methylthio)propan-1-one, 1-(2-(5-(2-fluoro-4-methoxyphenyl)-1H-imidazol-2-yl)piperidin-1-yl)-2-(methylthio)propan-1-one, 1-(2-(5-(2-fluoro-4-methylphenyl)-1H-imidazol-2-yl)piperidin-1-yl)-2-(methylthio)propan-1-one, 1-(2-(5-(2-methoxypyrimidin-5-yl)-1H-imidazol-2-yl)piperidin-1-yl)-2-(methylthio)propan-1-one, 1-(2-(5-(3-(methylamino)phenyl)-1H-imidazol-2-yl)piperidin-1-yl)-2-(methylthio)propan-1-one, 1-(2-(5-(3,4-difluorophenyl)-1H-imidazol-2-yl)piperidin-1-yl)-2-(methylthio)propan-1-one, 1-(2-(5-(3,4-difluorophenyl)-1H-imidazol-2-yl)piperidin-1-yl)-2-methylbut-3-en-1-one, 1-(2-(5-(3,4-dimethoxyphenyl)-1H-imidazol-2-yl)piperidin-1-yl)-2-(methylthio)propan-1-one, 1-(2-(5-(3,4-dimethylphenyl)-1H-imidazol-2-yl)piperidin-1-yl)-2-(methylthio) propan-1-one, 1-(2-(5-(3-fluoro-4-(methoxymethyl) phenyl)-1H-imidazol-2-yl)piperidin-1-yl)-2-(methylthio) propan-1-one, 1-(2-(5-(3-fluoro-4-methylphenyl)-1H-imidazol-2-yl)piperidin-1-yl)-2-(methylthio)propan-1-one, 1-(2-(5-(3-fluorophenyl)-1H-imidazol-2-yl)piperidin-1-yl)-2-(methylthio)propan-1-one, 1-(2-(5-(3-methoxyisothiazol-4-yl)-1H-imidazol-2-yl)piperidin-1-yl)-2-(methylthio)propan-1-one, 1-(2-(5-(3-methoxyphenyl)-1H-imidazol-2-yl) piperidin-1-yl)-2-(methylthio)propan-1-one, 1-(2-(5-(4-((methylamino)methyl)phenyl)-1H-imidazol-2-yl) piperidin-1-yl)-2-(methylthio)propan-1-one, 1-(2-(5-(4-(2-methoxyethyl)phenyl)-1H-imidazol-2-yl)piperidin-1-yl)-2-(methylthio)propan-1-one, 1-(2-(5-(4-(aminomethyl) phenyl)-1H-imidazol-2-yl)piperidin-1-yl)-2-(methylthio) propan-1-one, 1-(2-(5-(4-(dimethylamino)phenyl)-1H-imidazol-2-yl)piperidin-1-yl)-2-(methylthio)propan-1-one, 1-(2-(5-(4-(hydroxymethyl)phenyl)-1H-imidazol-2-yl)piperidin-1-yl)-2-(methylthio)propan-1-one, 1-(2-(5-(4-acetylphenyl)-1H-imidazol-2-yl)piperidin-1-yl)-2-(methylthio)propan-1-one, 1-(2-(5-(4-aminophenyl)-1H-imidazol-2-yl)piperidin-1-yl)-2-(methylthio)propan-1-one, 1-(2-(5-(4-chloro-3-fluorophenyl)-1H-imidazol-2-yl)piperidin-1-yl)-2-(methylthio)propan-1-one, 1-(2-(5-(4-chlorophenyl)-1H-imidazol-2-yl)piperidin-1-yl)-2-(methylthio)propan-1-one, 1-(2-(5-(4-ethylphenyl)-1H-imidazol-2-yl)piperidin-1-yl)-2-(methylthio)propan-1-one, 1-(2-(5-(4-fluorophenyl)-4H-1,2,4-triazol-3-yl)piperidin-1-yl)-2-(methylthio)propan-1-one, 1-(2-(5-(4-methoxy-2-methylphenyl)-1H-imidazol-2-yl)piperidin-1-yl)-2-(methylthio)propan-1-one, 1-(2-(5-(4-methoxyphenyl)-1H-imidazol-2-yl)piperidin-1-yl)-2-(methylthio)propan-1-one, 1-(2-(5-(4-methyl-6-(methylthio)pyridin-3-yl)-1H-imidazol-2-yl)piperidin-1-yl)-2-(methylthio)propan-1-one, 1-(2-(5-(5-(methoxymethyl)thiophen-3-yl)-1H-imidazol-2-yl) piperidin-1-yl)-2-(methylthio)propan-1-one, 1-(2-(5-(6-methoxypyridin-3-yl)-1H-imidazol-2-yl)piperidin-1-yl)-2-(methylthio)propan-1-one, 1-(2-(5-(benzo[d][1,3]dioxol-5-yl)-1H-imidazol-2-yl)piperidin-1-yl)-2-(methylthio)propan-1-one, 1-(2-(5-(p-tolyl)-1H-imidazol-2-yl)piperidin-1-yl) propan-1-one, 1-(2-(5-benzyl-1H-imidazol-2-yl)piperidin-1-yl)-2-(methylthio)propan-1-one, 1-(2-(5-bromo-1H-imidazol-2-yl)piperidin-1-yl)-2-(methylthio)propan-1-one, 2-(2-(1-(2-(methylthio)propanoyl)piperidin-2-yl)-1H-imidazol-5-yl)benzonitrile, 2-(2-(4-phenyl-1H-imidazol-2-yl) piperidine-1-carbonyl)cyclopropane-1-carbonitrile, 2-(5-methylfuran-2-yl)-1-(2-(4-phenyl-1H-imidazol-2-yl) piperidin-1-yl)propan-1-one, 2-(allylthio)-1-(2-(5-(p-tolyl)-1H-imidazol-2-yl)piperidin-1-yl)propan-1-one, 2-(dimethylamino)-1-(2-(4-phenyl-1H-imidazol-2-yl)piperidin-1-yl)butan-1-one, 2-(dimethylamino)-1-(2-(4-phenyl-1H-imidazol-2-yl)piperidin-1-yl)propan-1-one, 2-(ethylthio)-1-(2-(5-(p-tolyl)-1H-imidazol-2-yl)piperidin-1-yl) propan-1-one, 2-(furan-2-yl)-1-(2-(4-phenyl-1H-imidazol-2-yl)piperidin-1-yl)ethan-1-one, 2-(furan-2-yl)-1-(2-(4-phenyl-1H-imidazol-2-yl)piperidin-1-yl)propan-1-one, 2-(furan-3-yl)-1-(2-(4-phenyl-1H-imidazol-2-yl)piperidin-1-yl)ethan-1-one, 2-(furan-3-yl)-1-(2-(5-(p-tolyl)-1H-imidazol-2-yl)piperidin-1-yl)propan-1-one, 2-(methylamino)-N-(4-(2-(1-(2-(methylthio)propanoyl)piperidin-2-yl)-1H-imidazol-5-yl)phenyl)acetamide, 2-(methylsulfinyl)-1-(2-(5-(p-tolyl)-1H-imidazol-2-yl)piperidin-1-yl)propan-1-one, 2-(methylsulfonyl)-1-(2-(4-phenyl-1H-imidazol-2-yl)piperidin-1-yl)ethan-1-one, 2-(methylsulfonyl)-1-(2-(4-phenyl-1H-imidazol-2-yl)piperidin-1-yl)propan-1-one, 2-(methylthio)-1-(2-(2-(p-tolyl)-2H-tetrazol-5-yl)piperidin-1-yl) propan-1-one, 2-(methylthio)-1-(2-(3-phenyl-1,2,4-oxadiazol-5-yl)piperidin-1-yl)propan-1-one, 2-(methylthio)-1-(2-(4-(1-(trifluoromethyl)-1H-pyrazol-4-yl)-1H-imidazol-2-yl)piperidin-1-yl)propan-1-one, 2-(methylthio)-1-(2-(4-(4-(morpholinomethyl)phenyl)-1H-imidazol-2-yl)piperidin-1-yl)propan-1-one, 2-(methylthio)-1-(2-(4-(5-(trifluoromethyl)furan-2-yl)-1H-imidazol-2-yl) piperidin-1-yl)propan-1-one, 2-(methylthio)-1-(2-(4-(5-(trifluoromethyl)thiophen-2-yl)-1H-imidazol-2-yl) piperidin-1-yl)propan-1-one, 2-(methylthio)-1-(2-(4-(5-methylthiophen-3-yl)-1H-imidazol-2-yl)piperidin-1-yl) propan-1-one, 2-(methylthio)-1-(2-(4-(m-tolyl)-1H-imidazol-2-yl)piperidin-1-yl)propan-1-one, 2-(methylthio)-1-(2-(4-(o-tolyl)-1H-imidazol-2-yl)piperidin-1-yl)propan-1-one, 2-(methylthio)-1-(2-(4-(pyridin-3-yl)-1H-imidazol-2-yl)piperidin-1-yl)propan-1-one, 2-(methylthio)-1-(2-(4-(pyridin-4-yl)-1H-imidazol-2-yl)piperidin-1-yl)propan-1-one, 2-(methylthio)-1-(2-(4-(pyrimidin-5-yl)-1H-imidazol-2-yl)piperidin-1-yl)propan-1-one, 2-(methylthio)-1-(2-(4-(quinoxalin-6-yl)-1H-imidazol-2-yl)piperidin-1-yl)propan-1-one, 2-(methylthio)-1-(2-(4-(thiophen-3-yl)-1H-imidazol-2-yl)piperidin-1-yl)propan-1-one, 2-(methylthio)-1-(2-(4-phenyl-1H-imidazol-2-yl)piperidin-1-yl)ethan-1-one, 2-(methylthio)-1-(2-(5-(2-(trifluoromethyl)phenyl)-1H-imidazol-2-yl)piperidin-1-yl)propan-1-one, 2-(methylthio)-1-(2-(5-(2,3,4-trifluorophenyl)-1H-imidazol-2-yl)piperidin-1-yl)propan-1-one, 2-(methylthio)-1-(2-(5-(2,4,5-trifluorophenyl)-1H-imidazol-2-yl)piperidin-1-yl)propan-1-one, 2-(methylthio)-1-(2-(5-(3-(trifluoromethyl)phenyl)-1H-imidazol-2-yl)piperidin-1-yl)propan-1-one, 2-(methylthio)-1-(2-(5-(4-(trifluoromethoxy)phenyl)-1H-imidazol-2-yl)piperidin-1-yl)propan-1-one, 2-(methylthio)-1-(2-(5-(4-(trifluoromethyl)phenyl)-1H-imidazol-2-yl)piperidin-1-yl)propan-1-one, 2-(methylthio)-1-(2-(5-(4-propylphenyl)-1H-imidazol-2-yl)piperidin-1-yl)propan-1-one, 2-(methylthio)-1-(2-(5-(4-vinylphenyl)-1H-imidazol-2-yl)piperidin-1-yl)propan-1-one, 2-(methylthio)-1-(2-(5-(5-methylthiophen-2-yl)-1H-imidazol-2-yl)piperidin-1-yl) propan-1-one, 2-(methylthio)-1-(2-(5-(p-tolyl)-1,3,4-oxadiazol-2-yl)piperidin-1-yl)propan-1-one, 2-(methylthio)-1-(2-(5-(p-tolyl)-1H-imidazol-2-yl)azepan-1-yl)propan-1-one, 2-(methylthio)-1-(2-(5-(p-tolyl)-1H-imidazol-2-yl)piperidin-1-yl)propan-1-one, 2-(methylthio)-1-(2-(5-(p-tolyl)-4H-1,2,4-triazol-3-yl)piperidin-1-yl)propan-1-one, 2-(methylthio)-1-(2-(5-(p-tolyl)isoxazol-3-yl)

piperidin-1-yl)propan-1-one, 2-(methylthio)-1-(2-(5-(p-tolyl)oxazol-2-yl)piperidin-1-yl)propan-1-one, 2-(methylthio)-1-(2-(5-(p-tolyl)thiazol-2-yl)piperidin-1-yl)propan-1-one, 2-(methylthio)-1-(2-(5-phenyl-1H-imidazol-2-yl)piperidin-1-yl)propan-1-one, 2-(methylthio)-1-(2-(5-phenyl-1H-imidazol-2-yl)pyrrolidin-1-yl)propan-1-one, 2-(methylthio)-1-(2-(5-phenyl-4H-1,2,4-triazol-3-yl)piperidin-1-yl)propan-1-one, 2-(methylthio)-1-(2-(5-phenyloxazol-2-yl)piperidin-1-yl)propan-1-one, 2-(methylthio)-1-(4-(5-(p-tolyl)-1H-imidazol-2-yl)thiazolidin-3-yl)propan-1-one, 2,2,3-trimethyl-1-(2-(5-(p-tolyl)-1H-imidazol-2-yl)piperidin-1-yl)but-3-en-1-one, 2,2,3-trimethyl-1-(2-(5-(p-tolyl)-1H-imidazol-2-yl)piperidin-1-yl)butan-1-one, 2,2-dimethyl-1-(2-(5-(p-tolyl)-1H-imidazol-2-yl)piperidin-1-yl)but-3-en-1-one, 2,2-dimethyl-1-(2-(5-(p-tolyl)-1H-imidazol-2-yl)piperidin-1-yl)butan-1-one, 2,3-dimethoxy-1-(2-(4-phenyl-1H-imidazol-2-yl)piperidin-1-yl)propan-1-one, 2,3-dimethyl-1-(2-(4-phenyl-1H-imidazol-2-yl)piperidin-1-yl)butan-1-one, 2,5-difluoro-4-(2-(1-(2-(methylthio)propanoyl)piperidin-2-yl)-1H-imidazol-4-yl)benzonitrile, 2-amino-1-(2-(5-(p-tolyl)-1H-imidazol-2-yl)piperidin-1-yl)propan-1-one, 2-cyclobutyl-1-(2-(4-phenyl-1H-imidazol-2-yl)piperidin-1-yl)propan-1-one, 2-cyclopentyl-2-ethoxy-1-(2-(4-phenyl-1H-imidazol-2-yl)piperidin-1-yl)ethan-1-one, 2-cyclopropyl-1-(2-(4-phenyl-1H-imidazol-2-yl)piperidin-1-yl)ethan-1-one, 2-cyclopropyl-1-(2-(4-phenyl-1H-imidazol-2-yl)piperidin-1-yl)propan-1-one, 2-cyclopropyl-2-methoxy-1-(2-(4-phenyl-1H-imidazol-2-yl)piperidin-1-yl)ethan-1-one, 2-ethoxy-1-(2-(5-(3-fluorophenyl)-1H-imidazol-2-yl)piperidin-1-yl)propan-1-one, 2-ethyl-1-(2-(4-phenyl-1H-imidazol-2-yl)piperidin-1-yl)but-2-en-1-one, 2-ethyl-1-(2-(4-phenyl-1H-imidazol-2-yl)piperidin-1-yl)butan-1-one, 2-fluoro-4-(2-(1-(2-(methylthio)propanoyl)piperidin-2-yl)-1H-imidazol-5-yl)benzonitrile, 2-mercapto-1-(2-(5-(p-tolyl)-1H-imidazol-2-yl)piperidin-1-yl)propan-1-one, 2-methoxy-1-(2-(4-phenyl-1H-imidazol-2-yl)piperidin-1-yl)butan-1-one, 2-methoxy-1-(2-(4-phenyl-1H-imidazol-2-yl)piperidin-1-yl)propan-1-one, 2-methoxy-1-(2-(5-(p-tolyl)-1H-imidazol-2-yl)piperidin-1-yl)propan-1-one, 2-methyl-1-(2-(4-phenyl-1H-imidazol-2-yl)piperidin-1-yl)butan-1-one, 2-methyl-1-(2-(4-phenyl-1H-imidazol-2-yl)piperidin-1-yl)propan-1-one, 2-methyl-1-(2-(5-(p-tolyl)-1H-imidazol-2-yl)piperidin-1-yl)but-3-en-1-one, 2-methyl-1-(2-(5-(p-tolyl)-1H-imidazol-2-yl)piperidin-1-yl)butan-1-one, 2-methyl-1-(2-(5-(p-tolyl)-1H-imidazol-2-yl)piperidin-1-yl)butane-1,3-dione, 2-methyl-1-(2-(5-(p-tolyl)-1H-imidazol-2-yl)piperidin-1-yl)pentan-1-one, 2-methyl-1-(2-(5-(p-tolyl)-1H-imidazol-2-yl)piperidin-1-yl)prop-2-en-1-one, 2-methyl-1-(2-(5-(p-tolyl)-1H-imidazol-2-yl)piperidin-1-yl)propan-1-one, 2-methyl-2-(methylthio)-1-(2-(5-(p-tolyl)-1H-imidazol-2-yl)piperidin-1-yl)propan-1-one, 2-methyl-3-(methylthio)-1-(2-(4-phenyl-1H-imidazol-2-yl)piperidin-1-yl)propan-1-one, 2-methylene-1-(2-(5-(p-tolyl)-1H-imidazol-2-yl)piperidin-1-yl)butan-1-one, 3-(2-(1-(2-(methylthio)propanoyl)piperidin-2-yl)-1H-imidazol-4-yl)benzonitrile, 3,3,3-trifluoro-2-methyl-1-(2-(4-phenyl-1H-imidazol-2-yl)piperidin-1-yl)propan-1-one, 3,3,4,4,4-pentafluoro-1-(2-(4-phenyl-1H-imidazol-2-yl)piperidin-1-yl)butan-1-one, 3,3-difluoro-1-(2-(4-phenyl-1H-imidazol-2-yl)piperidin-1-yl)butan-1-one, 3-fluoro-4-(2-(1-(2-(methylthio)propanoyl)piperidin-2-yl)-1H-imidazol-5-yl)benzonitrile, 3-methyl-1-(2-(4-phenyl-1H-imidazol-2-yl)piperidin-1-yl)but-2-en-1-one, 3-methyl-1-(2-(4-phenyl-1H-imidazol-2-yl)piperidin-1-yl)butan-1-one, 4-(2-(1-(2-(methylthio)propanoyl)piperidin-2-yl)-1H-imidazol-4-yl)benzonitrile, 4-(2-(1-(2-(methylthio)propanoyl)piperidin-2-yl)-1H-imidazol-5-yl)benzaldehyde, 4,4,4-trifluoro-2-methyl-1-(2-(4-phenyl-1H-imidazol-2-yl)piperidin-1-yl)butan-1-one, bicyclo[1.1.1]pentan-1-yl(2-(4-phenyl-1H-imidazol-2-yl)piperidin-1-yl)methanone, cyclobutyl(2-(5-(3-fluorophenyl)-1H-imidazol-2-yl)piperidin-1-yl)methanone, cyclopentyl(2-(4-phenyl-1H-imidazol-2-yl)piperidin-1-yl)methanone, cyclopropyl(2-(4-phenyl-1H-imidazol-2-yl)piperidin-1-yl)methanone, methyl 4-(2-(1-(2-(methylthio)propanoyl)piperidin-2-yl)-1H-imidazol-5-yl)benzoate, N-(2-hydroxyethyl)-4-(2-(1-(2-(methylthio)propanoyl)piperidin-2-yl)-1H-imidazol-4-yl)benzenesulfonamide, 2-(methylthio)-1-(2-(5-(3-nitrophenyl)-1H-imidazol-2-yl)piperidin-1-yl)propan-1-one, N-(4-(2-(1-(2-(methylthio)propanoyl)piperidin-2-yl)-1H-imidazol-4-yl)phenyl)methane-sulfonamide, 2-(methylthio)-1-(2-(5-(4-nitrophenyl)-1H-imidazol-2-yl)piperidin-1-yl)propan-1-one, 1-(sec-butylsulfinyl)-2-(5-(p-tolyl)-1H-imidazol-2-yl)piperidine, 1-(sec-butylsulfonyl)-2-(5-(p-tolyl)-1H-imidazol-2-yl)piperidine, 1-(isopropylsulfinyl)-2-(5-(p-tolyl)-1H-imidazol-2-yl)piperidine, 1-(isopropylsulfonyl)-2-(5-(p-tolyl)-1H-imidazol-2-yl)piperidine, 1-((1-(methylthio)ethyl)sulfinyl)-2-(5-(p-tolyl)-1H-imidazol-2-yl)piperidine, 1-((1-(methylthio)ethyl)sulfonyl)-2-(5-(p-tolyl)-1H-imidazol-2-yl)piperidine, 1-((2-(methylthio)propan-2-yl)sulfinyl)-2-(5-(p-tolyl)-1H-imidazol-2-yl)piperidine, 1-((2-(methylthio)propan-2-yl)sulfonyl)-2-(5-(p-tolyl)-1H-imidazol-2-yl)piperidine, 1-(but-3-en-2-ylsulfinyl)-2-(5-(p-tolyl)-1H-imidazol-2-yl)piperidine, 1-(but-3-en-2-ylsulfonyl)-2-(5-(p-tolyl)-1H-imidazol-2-yl)piperidine, 1-(pent-3-en-2-ylsulfinyl)-2-(5-(p-tolyl)-1H-imidazol-2-yl)piperidine, 1-(pent-3-en-2-ylsulfonyl)-2-(5-(p-tolyl)-1H-imidazol-2-yl)piperidine, 1-((2-methylbut-3-en-2-yl)sulfinyl)-2-(5-(p-tolyl)-1H-imidazol-2-yl)piperidine, 1-((2-methylbut-3-en-2-yl)sulfonyl)-2-(5-(p-tolyl)-1H-imidazol-2-yl)piperidine, 1-(2-(5-(4-(hydroxymethyl)-phenyl)-1H-imidazol-2-yl)piperidin-1-yl)-2-methylbutan-1-one, 2-(methylsulfonyl)-1-(2-(5-(p-tolyl)-1H-imidazol-2-yl)piperidin-1-yl)propan-1-one, 1-(4-hydroxy-2-(5-(p-tolyl)-1H-imidazol-2-yl)piperidin-1-yl)-2-(methylthio)propan-1-one, 1-(5-hydroxy-2-(5-(p-tolyl)-1H-imidazol-2-yl)piperidin-1-yl)-2-(methylthio)propan-1-one, 1-(4-hydroxy-2-(5-(p-tolyl)-1H-imidazol-2-yl)piperidin-1-yl)-2-methylbutan-1-one, 1-(5-hydroxy-2-(5-(p-tolyl)-1H-imidazol-2-yl)piperidin-1-yl)-2-methylbutan-1-one, 1-(2-(5-(4-(hydroxymethyl)phenyl)-1H-imidazol-2-yl)piperidin-1-yl)-2-(methylsulfonyl)propan-1-one, 1-(4-hydroxy-2-(5-(p-tolyl)-1H-imidazol-2-yl)piperidin-1-yl)-2-(methylsulfonyl)propan-1-one, 1-(5-hydroxy-2-(5-(p-tolyl)-1H-imidazol-2-yl)piperidin-1-yl)-2-(methylsulfonyl)propan-1-one, 1-(2-hydroxy-6-(5-(p-tolyl)-1H-imidazol-2-yl)piperidin-1-yl)-2-(methylthio)propan-1-one, 1-(2-hydroxy-6-(5-(p-tolyl)-1H-imidazol-2-yl)piperidin-1-yl)-2-methylbutan-1-one, 1-(2-hydroxy-6-(5-(p-tolyl)-1H-imidazol-2-yl)piperidin-1-yl)-2-(methylsulfonyl)propan-1-one, 1-(3-hydroxy-2-(5-(p-tolyl)-1H-imidazol-2-yl)piperidin-1-yl)-2-(methylthio)propan-1-one, 1-(3-hydroxy-2-(5-(p-tolyl)-1H-imidazol-2-yl)piperidin-1-yl)-2-methylbutan-1-one, 1-(3-hydroxy-2-(5-(p-tolyl)-1H-imidazol-2-yl)piperidin-1-yl)-2-(methylsulfonyl)propan-1-one, 1-(2-(5-(4-(hydroxymethyl)phenyl)-1H-imidazol-2-yl)piperidin-1-yl)-2-(methylsulfinyl)-propan-1-one, 1-(4-hydroxy-2-(5-(p-tolyl)-1H-imidazol-2-yl)piperidin-1-yl)-2-(methylsulfinyl)propan-1-one, 1-(5-hydroxy-2-(5-(p-tolyl)-1H-imidazol-2-yl)piperidin-1-yl)-2-(methylsulfinyl)propan-1-one, 1-(2-hydroxy-6-(5-(p-tolyl)-1H-imidazol-2-yl)piperidin-1-yl)-2-(methylsulfinyl)propan-1-one, 1-(3-hydroxy-2-(5-(p-tolyl)-1H-imidazol-2-yl)piperidin-1-yl)-2-

(methylsulfinyl)propan-1-one, 1-(2-hydroxy-6-(5-(4-(hydroxymethyl)phenyl)-1H-imidazol-2-yl)piperidin-1-yl)-2-(methylthio)propan-1-one, 1-(5-hydroxy-2-(5-(4-(hydroxymethyl)phenyl)-1H-imidazol-2-yl)piperidin-1-yl)-2-(methylthio)propan-1-one, 1-(4-hydroxy-2-(5-(4-(hydroxymethyl)phenyl)-1H-imidazol-2-yl)piperidin-1-yl)-2-(methylthio)propan-1-one, 1-(3-hydroxy-2-(5-(4-(hydroxymethyl)-phenyl)-1H-imidazol-2-yl)piperidin-1-yl)-2-(methylthio)propan-1-one, 1-(2-hydroxy-6-(5-(4-(hydroxymethyl)phenyl)-1H-imidazol-2-yl)piperidin-1-yl)-2-methylbutan-1-one, 1-(5-hydroxy-2-(5-(4-(hydroxymethyl)phenyl)-1H-imidazol-2-yl)piperidin-1-yl)-2-methylbutan-1-one, 1-(4-hydroxy-2-(5-(4-(hydroxymethyl)phenyl)-1H-imidazol-2-yl)piperidin-1-yl)-2-methylbutan-1-one, 1-(3-hydroxy-2-(5-(4-(hydroxymethyl)phenyl)-1H-imidazol-2-yl)piperidin-1-yl)-2-methylbutan-1-one, 4-(2-(1-(2-methylbutanoyl)piperidin-2-yl)-1H-imidazol-5-yl)benzaldehyde, 4-(2-(1-(2-(methylthio)propanoyl)piperidin-2-yl)-1H-imidazol-5-yl)benzoic acid, 4-(2-(1-(2-methylbutanoyl)piperidin-2-yl)-1H-imidazol-5-yl)benzoic acid, (2,2-dimethylcyclopropyl)(2-(5-(p-tolyl)-1H-imidazol-2-yl)piperidin-1-yl)methanone, 1-(2-(5-bromo-1H-imidazol-2-yl)piperidin-1-yl)-2-methylbutan-1-one, 1-(2-(5-(4-chlorophenyl)-1H-imidazol-2-yl)piperidin-1-yl)-2-methylbutan-1-one, 2-(4-(2-(1-(2-(methylthio)propanoyl)piperidin-2-yl)-1H-imidazol-5-yl)phenyl)acetonitrile, 2-(4-(2-(1-(2-methylbutanoyl)piperidin-2-yl)-1H-imidazol-5-yl)phenyl)acetonitrile, 2-(4-(2-(1-(2-methylbutanoyl)piperidin-2-yl)-1H-imidazol-5-yl)phenyl)acetonitrile, 2,3-dimethyl-1-(2-(5-(p-tolyl)-1H-imidazol-2-yl)piperidin-1-yl)butan-1-one, 2-methyl-1-(2-(5-(o-tolyl)-1H-imidazol-2-yl)piperidin-1-yl)butan-1-one, 2-methyl-1-(2-(5-(m-tolyl)-1H-imidazol-2-yl)piperidin-1-yl)butan-1-one, 1-(2-(5-(4-(hydroxymethyl)phenyl)-1H-imidazol-2-yl)piperidin-1-yl)-2-methylbutan-1-one, 1-(isopropylsulfonyl)-2-(5-(p-tolyl)-1H-imidazol-2-yl)piperidine, 1-(sec-butylsulfonyl)-2-(5-(p-tolyl)-1H-imidazol-2-yl)piperidine, 2-methyl-1-(2-(5-(5-methylthiophen-2-yl)-1H-imidazol-2-yl)piperidin-1-yl)butan-1-one, 2-(methylthio)-1-(2-(5-(p-tolyl)-1H-imidazol-2-yl)piperazin-1-yl)propan-1-one, 2-(methylthio)-1-(2-(4-(p-tolyl)oxazol-2-yl)piperidin-1-yl)propan-1-one, and 2-methyl-1-(2-(4-(p-tolyl)oxazol-2-yl)piperidin-1-yl)butan-1-one.

The compounds as defined by formula (I) (which encompass the compounds of formula (Ia), (Ib), and (Ic)) comprise several chiral centers (two of which are indicated by * in the respective formulae) and as such may exist as a mixture of stereoisomers, or they may be resolved as isomerically pure forms. Resolving stereoisomers adds to the complexity of manufacture and purification of these compounds and so it is preferred to use the compounds as mixtures of their stereoisomers simply for economic reasons. However, if it is desired to prepare individual stereoisomers, this may be achieved according to methods known in the art, e.g. preparative HPLC and GC, crystallization or stereoselective synthesis. The compounds as defined by formula (I) (which encompass the compounds of formula (Ia), (Ib), and (Ic)) may also exist in various tautomeric forms, including the enol-keto form, lactam-lactim form, amide-imidic acid form, amine-imine form and 1H-Imidazole-3H-Imidazole form. Accordingly, the chemical structures depicted herein encompass all possible stereoisomers and tautomeric forms of the illustrated compounds.

It is also noted that the compounds as defined by formula (I) (which encompass the compounds of formula (Ia), (Ib) and (Ic)) may exist in unsolvated forms as well as solvated forms, including hydrated forms and as N-oxides. In general, compounds may be hydrated, solvated or N-oxides. Certain compounds may exist in multiple crystalline or amorphous forms. In general, all physical forms are equivalent for the uses contemplated herein and are intended to be within the scope of the present invention.

"Solvate" means a compound formed by solvation (the combination of solvent molecules with molecules or ions of the solute), or an aggregate that consists of a solute ion or molecule, i.e., a compound as defined by formula (I) (which encompass the compounds of formula (Ia), (Ib) and (Ic)), with one or more solvent molecules. When water is the solvent, the corresponding solvate is "hydrate". Further suitable solvents can be but are not limited to: acetone, acetonitrile, benzene, cyclohexane, dihydrolevoglucosenone, methyl-tetrahydrofuran, pentylene glycol, ethylene glycol, petroleum ether, ethyl lactate, methyl lactate, propyl lactate, diethylether, tert-butyl methyl ether, dimethylsulfoxide, N,N-dimethylformamide, N,N-dimethylacetamide, dioxane, ethanol, ethyl acetate, ethylene glycol, diethylene glycol, propylene glycol, heptane, hexane, methanol, toluene and xylene.

"Salt" refers to a salt of a compound as defined by formula (I) (which encompass the compounds of formula (Ia), (Ib) and (Ic)), which possesses the desired pharmacological activity of the parent compound. Such salts include: (1) acid addition salts, formed with inorganic acids such as hydrochloric acid, hydrobromic acid, sulfuric acid, nitric acid, phosphoric acid, and the like; or formed with organic acids such as amino acids, acetic acid, trifluoroacetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl) benzoic acid, cinnamic acid, mandelic acid, methanesulfonic acid, ethanesulfonic acid, 1,2-ethane-disulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, and the like; or (2) salts formed when an acidic proton present in the parent compound is replaced by a metal ion, e.g., an alkali metal ion, an alkaline earth ion, or an aluminum ion; or coordinates with an organic base such as ethanolamine, diethanolamine, triethanolamine, N-methylglucamine and the like.

The compounds as defined by formula (I) (which encompass the compounds of formula (Ia), (Ib) and (Ic)) are "TRPM8 agonist", which means that they have an agonistic effect on the cellular $Ca^{2+}$ ion permeability of the TRPM8 channels. Accordingly, by "TRPM8 agonist" is meant any compound, which when brought into contact with the TRPM8 receptor, produces an increase in fluorescence over background, using the FLIPR method as described, e.g., by Klein et al., (Chem. Senses 36: 649-658, 2011), which is also described in more details in the experimental part.

Accordingly there is provided in a second aspect a method of modulating (in-vitro and in-vivo modulation) of transient receptor potential melastatin member 8 (TRPM8) comprising bringing the receptor into contact with a compound of formula (I), or a salt or solvate thereof.

In certain embodiments of the second aspect of the invention the modulating method is an in-vitro method.

There is provided in a third aspect a non-medical method of inducing a cooling sensation in a human or animal comprising contacting the human or animal with a compound of formula (I) (which encompass the compounds of formula (Ia), (Ib) and (Ic)), or a salt or solvate thereof.

In certain embodiments, the method is a method of achieving a cooling effect on the skin or mucosa comprising contacting the skin or mucosa with a product comprising one or more compounds of formula (I), or a salt or solvate thereof.

The compounds of formula (I) (which encompass the compounds of formula (Ia), (Ib) and (Ic)), may be applied directly or as a solution or suspension, comprising an effective amount of a compound of formula (I). An amount to be effective depends, inter alia, upon the target TRPM8 area of the body but also on the cooling potency of compound or mixture of compounds.

There is provided in a fourth aspect consumer products, in particular consumer products which get into contact with the human skin and/or mucosa comprising a compound as defined by formula (I), which encompass the compounds of formula (Ia), (Ib) and (Ic).

Consumer products which get in contact with the mucosa include, but are not limited to food products, beverages, chewing gum, tobacco and tobacco replacement products, dental care products, personal care products, including lip care products, sexual health and intimate care products.

In certain embodiments dental care products are oral care products, tooth care products, cleaners for dental prostheses, adhesives for dental prostheses, and the like.

In certain embodiments food products are iced consumable products such as ice cream, sorbet; confectioneries such as candies and chocolates; food products containing mint or mint flavour, sauces, dairy products such as milk-based drinks and yoghurts; and snacks.

In certain embodiments tobacco replacement products are liquids or solids which are suitable to be consumed by electrical means, e.g., liquids to vape.

In certain embodiments personal care products getting in contact with the mucosa are lip balms, nose sprays and eye drops.

Consumer products which get in contact with the human skin include, but are not limited to cosmetic products. In certain embodiments cosmetic products are skincare products, especially bath products, skin washing and cleansing products, skincare products, eye makeup, nail care products, foot care products, and the like. In certain embodiments cosmetic products are products with specific effects, especially sunscreens, insect repellent products, tanning products, de-pigmenting products, deodorants, antiperspirants, hair removers, and shaving products. In a certain embodiments cosmetic products are hair care products, especially hair shampoos, hair care products, hair setting products, hair-shaping products, and hair coloring products as well as scalp-care products such as scalp-cooling shampoos and creams.

In certain embodiments, the consumer product is selected from air care products, such as an air freshener or a "ready to use" powdered air freshener which can be used in the home space (rooms, refrigerators, cupboards, shoes or car) and/or in a public space (halls, hotels, malls, etc . . . ).

The consumer products can be in any physical form, such as a solid, semi-solid, plaster, solution, suspension, lotion, cream, foam, gel, paste, or a combination thereof. The physical form of the consumer product suitable manly depends on the specific actions, such as cleaning, softening, caring, cooling, and the like, such a consumer product should fulfill.

In a certain embodiment consumer products getting in contact with the human skin are fabric care products (such as fabric detergents, fabric conditioner (including tumble dryer sheets), and scent boosters (liquid or solid)) which in a first step are applied to a fabric, e.g., when washing the fabric, said treaded fabrics then getting in contact with the human skin.

The level of use for compounds of the present invention (compounds as defined by formula (I), which encompass compounds of formula (Ia), (Ib) and (Ic)) depend, inter alia, upon the target TRPM8 area of the body but also on the cooling potency of compound or mixture of compounds. For examples in an oral application of a compound of the present invention, such as dentifrice, floss, chewing gum, or white strip, the levels of use may be from about 0.00001% (0.01 ppm) to about 0.1% (1000 ppm); from about 0.00005% (0.5 ppm) to about 0.1% (1000 ppm); from about 0.0001% (1 ppm) to about 0.05% (500 ppm); or from about 0.001% (10 ppm) to about 0.01% (100 ppm) by weight of the composition. When a compound of the present invention is used in a mouthwash, the level of use may be from about 0.000001% (10 ppb) to about 0.01% (100 ppm) or from about 0.0001% (1 ppm) to about 0.001% (10 ppm) by weight of the composition. When a compound of the present invention is delivered to topically, for example in shampoos and lotions the levels may be from about 0.001% (10 ppm) to about 0.5% (5000 ppm) by weight of the composition or from about 0.01% (100 ppm) to about 0.4% (4000 ppm) by weight of the composition.

The cooling potency (strength) of a compound is defined by its $EC_{50}$ value. $EC_{50}$ (half maximal effective concentration) refers to the concentration of a compound which induces a response halfway between the baseline and maximum after a specified exposure time. It is commonly used as a measure of potency. $EC_{50}$ is a measure of concentration, expressed in μM (μmolar) unites, where 1 μM is equivalent to 1 μmol/L.

Compounds with an $EC_{50}$ of 10 μM or less are perceived by the human as cooling. The lower the $EC_{50}$ value the higher the cooling potency. For example, compounds having an $EC_{50}$ value of about 0.1 μM are perceived as strong cooling compounds.

Cooling properties of a compound however are not only defined by its strength (potency; EC50) but also its longevity, which refers to the period of time (in minutes) over which a cooling effect is perceived. The longevity can range from a few seconds after rinsing to several hours or even days. In the context of oral care products, a preferred "long-lasting" effect ranges typically between 20 minutes after rinsing to 3 hours.

The compounds as defined by formula (I) (which encompass the compounds of formula (Ia), (Ib), and (Ic)) are generally well soluble in water at the desired concentrations. However, to increase the solubility, a specific isomer may be used instead of an isomeric mixture. As is well known to the person skilled in the art, cis/trans-Isomers and/or diastereomers may have different solubility properties and thus either a mixture of isomers or the individual isomers may be selected for the use in consumer products, depending on which cooling effect is to be achieved.

The compounds of formula (I) (which encompass the compounds of formula (Ia), (Ib) and (Ic)) are very potent at relative low concentrations. Thus it is preferred to prepare a stock solution which is further diluted, before admixing it to a consumer product. Beside water, particular suitable solvents are triacetin and propylene glycol. One may also mention acetone, benzyl alcohol, dihydrolevoglucosenone, methyl-tetrahydrofuran, pentylene glycol, ethylene glycol, ethyl lactate, methyl lactate, propyl lactate, dimethylsulfoxide, ethanol, ethyl acetate, ethylene glycol, diethylene glycol, propylene glycol, and triacetin which are suitable solvents for the compounds of formula (I) (which encompass the compounds of formula (Ia), (Ib) and (Ic)). But other solvent systems comprising surfactants may also be used.

To modify the cooling effect of a compound as defined herein by formula (I) (which encompass the compounds of formula (Ia), (Ib) and (Ic)), the compound, a salt or solvate thereof may be combined with a compound selected from calcium ions and salts, magnesium ions and salts, arginine, or any chelating agent which is able to bind calcium or magnesium.

These compounds are known to be able to modulate the concentration of such ions in the extracellular space and therefore influence the response of the TRPM8 ion-channel, leading to a change in the perceived cooling effect.

According to Kizilbash et al. (WO2019/121193 A1) both, the cooling intensity and the flavour intensity may be enhanced when combined with agents which possess the property to potentiating said effects. Thus the compounds as defined herein by formula (I) may be combined in one particular embodiment with potentiating agents disclosed in WO2019/121193 which is incorporated by reference, in particular with regard to the potentiating agents.

As a further enhancement agent one may cite N-lactoyl ethanolamine (2-hydroxy-N-(2-hydroxyethyl)propanamide; CAS 5422-34-4) which is known as an enhancer for cooling agents, for example, from PCT International publication WO 2008/107137 which is incorporated by reference, in particular with regard to the cooling enhancing substances as defined by formula (I).

The compounds of formula (I) (which encompass the compounds of formula (Ia), (Ib) and (Ic)), might be used in combination with other cooling compounds known in the art.

Thus there is provided in a fifth aspect a composition comprising a cool sensation wherein the composition comprises at least one compound of formula (I), a salt or solvate thereof, and a further cooling compound.

In one particular embodiment the compounds of formula (I) (which encompass the compounds of formula (Ia), (Ib) and (Ic)) may be combined with menthol (e.g., in form of peppermint oil, and/or spearmint oil), menthone, p-menthanecarboxamides, N-2,3-trimethyl-2-isopropyl-butanamide (WS-23), menthyl lactate (Frescolat® ML), menthone glycerol acetal (Frescolat® MGA), 3-(1-menthoxy)-propane-1,2-diol (TK-10), p-menthane-3,8-diol (known as Coolact 38D), isopulegol (known as Coolact P), monomenthyl succinate (Physcool®), monomenthyl glutarate, o-menthylglycerol, menthyl N,N-dimethylsuccinamate, 2-(sec-butyl)cyclohexan-1-one (Freskomenthe), N-(pyrazol-3-yl)-N-(thiophen-2-ylmethyl)-2-(p-tolyloxy)acetamide, 2-(4-ethylphenoxy)-N-(pyrazol-3-yl)-N-(thiophen-2-ylmethyl) acetamide, 3-(benzo[d][1,3]dioxol-5-yl)-N,N-diphenylacrylamide, 4-(2-(4-allyl-2,6-dimethoxyphenoxy)-1-ethoxypropyl)-2-methoxyphenol, 4-(2-(4-allyl-2,6-dimethoxyphenoxy)-1-((2-isopropyl-5-methylcyclohexyl)oxy)propyl)-2-methoxyphenol (including 4-(2-(4-allyl-2,6-dimethoxyphenoxy)-1-(((1S,2R,5S)-2-isopropyl-5-methylcyclohexyl)oxy)propyl)-2-methoxyphenol) and 4-(2-(4-allyl-2,6-dimethoxyphenoxy)-1-(((1R,2S,5R)-2-isopropyl-5-methylcyclohexyl)oxy)propyl)-2-methoxyphenol), N-(2-Hydroxy-2-phenylethyl)-2-isopropyl-5,5-dimethylcyclohexane-1-carboxamide, N-(4-(Cyanomethyl)phenyl)-2-isopropyl-5,5-dimethylcyclohexanecarboxamide and N-(3-Hydroxy-4-methoxyphenyl)-2-isopropyl-5,5-dimethylcyclohexanecarboxamide.

Examples of p-methanecarboxamides include compounds such as N-ethyl-p-menthan-3-carboxamide (known commercially as WS-3), N-ethoxycarbonylmethyl-p-menthan-3-carboxamide (WS-5), N-(4-methoxyphenyl)-p-menthan-3-carboxamide (WS-12) and N-tert-butyl-p-menthan-3-carboxamide (WS-14), N-(4-(cyanomethyl)phenyl)-2-isopropyl-5-methylcyclohexane-1-carboxamide (known commercially as Evercool 180), 2-isopropyl-5-methyl-N-(2-(pyridin-2-yl)ethyl)cyclohexane-1-carboxamide (known commercially as Evercool 190), and (1R,2S,5R)—N—((S)-2-((R)-2-aminopropanamido)-2-phenylethyl)-2-isopropyl-5-methylcyclohexane-1-carboxamide.

In order to achieve more than just a cooling effect, the compounds of formula (I) (which encompass the compounds of formula (Ia), (Ib) and (Ic)), a salt or solvate thereof, may be combined with other actives, such as, flavours, fragrances, and sweetening agents.

Examples of flavour ingredients include natural flavors, artificial flavors, spices, seasonings, and the like. Exemplary flavor ingredients include synthetic flavor oils and flavoring aromatics and/or oils, oleoresins, essences, and distillates, and a combination comprising at least one of the foregoing.

Flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors such as vanilla, and citrus oils including lemon, orange, lime, grapefruit, yuzu, sudachi, and fruit essences including apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, and so forth.

Additional exemplary flavors imparted by a flavoring composition include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a *Zanthoxyli Fructus* flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

Generally any flavoring or food additive (including food colors) such as those described in "Essential guide to food additives", Third edition 2008, page 101-321 (ISBN: 978-

1-905224-50-0) by Leatherhead Food International Ltd., can be used. The publication is incorporated herein by reference.

In one particular embodiment the compounds of formula (I) (which encompass the compounds of formula (Ia), (Ib) and (Ic)) may be combined with anethole, menthol laevo, carvone laevo, ethyl maltol, vanillin, eucalyptol, eugenol, menthol racemic, cis-3-hexenol, linalol, mint oil (e.g. peppermint arvensis oil, peppermint piperita oil, spearmint native oil, spearmint scotch oil), corylone, ethyl butyrate, cis-3-hexenyl acetate, citral, eucalyptus oil, ethyl-vanillin, methyl salicylate, 2'-hydroxypropiophenone, ethyl acetate, methyl dihydro jasmonate, geraniol, lemon oil, iso amyl acetate, thymol, ionone beta, linalyl acetate, decanal, cis jasmone, ethyl hexanoate, melonal (2,6-dimethylhept-5-enal), citronellol, ethyl aceto acetate, nutmeg oil and clove oil, or mixtures thereof.

In one specific embodiment the compound of formula (I) is selected from 2-methyl-1-(2-(5-(p-tolyl)-1H-imidazol-2-yl)piperidin-1-yl)butan-1-one (including (2S)-2-methyl-1-(2-(5-(p-tolyl)-1H-imidazol-2-yl)piperidin-1-yl)butan-1-one, or a racemic mixture), 2-(methylthio)-1-(2-(5-(p-tolyl)-1H-imidazol-2-yl)piperidin-1-yl)propan-1-one, 2-methyl-2-(methylthio)-1-(2-(5-(p-tolyl)-1H-imidazol-2-yl)piperidin-1-yl)propan-1-one, 2,2-dimethyl-1-(2-(5-(p-tolyl)-1H-imidazol-2-yl)piperidin-1-yl)but-3-en-1-one, 2-(methylthio)-1-(2-(4-(p-tolyl)oxazol-2-yl)piperidin-1-yl) propan-1-one, and 2-methyl-1-(2-(4-(p-tolyl)oxazol-2-yl)piperidin-1-yl)butan-1-one, or a mixture thereof.

Examples of sweetening agents include, but are not limited to, sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, and saccharine, and mixtures thereof; trilobatin, hesperetin dihydrochalcone glucoside, naringin dihydrochalcone, mogroside V, Luo Han Guo extract, rubusoside, rubus extract, glycyphyllin, isomogroside V, mogroside IV, siamenoside 1, neomogroside, mukurozioside IIb, (+)-hernandulcin, 4 β-hydroxyhernandulcin, baiyunoside, phlomisoside I, bryodulcoside, bryoside bryonoside, abrusosides A-E, cyclocarioside A, cyclocaryoside I, albiziasaponins A-E, glycyrrhizin, araboglycyrrhizin, periandrins I-V, pterocaryosides A and B, osladin, polypodosides A and B, telosmoside A8-18, phyllodulcin, huangqioside E neoastilbin, monatin, 3-acetoxy-5,7-dihydroxy-4'-methoxyflavanone, 2R,3R-(+)-3-Acetoxy-5,7,4'-trihydroxyflavanone, (2R,3R)-dihydroquercetin 3-O-acetate, dihydroquercetin 3-O-acetate 4'-methyl ether, brazzein, curculin, mabinlin, monellin, neoculin, pentadin, thaumatin, and combinations thereof. Some of the compounds listed above are known sweetness enhancers as well as sweeteners. When used as sweetness enhancers they are normally used below their sweetness detection thresholds.

In certain embodiments, the compounds of formula (I) may be combined with additional ingredients collectively refereed to orally acceptable carrier materials.

In some aspects, the orally acceptable carrier may comprise one or more compatible solid or liquid excipients or diluents which are suitable for topical oral administration. By "compatible," as used herein, is meant that the components of the composition are capable of being commingled without interaction in a manner which would substantially reduce stability and/or efficacy. The carriers can include the usual and conventional components of dentifrices, non-abrasive gels, subgingival gels, mouthwashes or rinses, mouth sprays, chewing gums, lozenges and breath mints. The choice of a carrier to be used is basically determined by the way the composition is to be introduced into the oral cavity. Carrier materials for toothpaste, tooth gel or the like include abrasive materials, sudsing agents, binders, humectants, flavoring and sweetening agents, etc. as disclosed in e.g., U.S. Pat. No. 3,988,433, to Benedict. Carrier materials for biphasic dentifrice formulations are disclosed in U.S. Pat. Nos. 5,213,790; 5,145,666 and 5,281,410 all to Lukacovic et al., and in U.S. Pat. Nos. 4,849,213 and 4,528,180 to Schaeffer. Mouthwash, rinse or mouth spray carrier materials typically include water, flavoring and sweetening agents, etc., as disclosed in, e.g., U.S. Pat. No. 3,988,433 to Benedict. Lozenge carrier materials typically include a candy base; chewing gum carrier materials include a gum base, flavoring and sweetening agents, as in, e.g., U.S. Pat. No. 4,083,955, to Grabenstetter et al. Sachet carrier materials typically include a sachet bag, flavoring and sweetening agents. For subgingival gels used for delivery of actives into the periodontal pockets or around the periodontal pockets, a "subgingival gel carrier" is chosen as disclosed in. e.g. U.S. Pat. Nos. 5,198,220 and 5,242,910 both to Damani. Carriers suitable for the preparation of compositions of the present disclosure are well known in the art. Their selection will depend on secondary considerations like taste, cost, and shelf stability, and the like.

Further suitable types of orally acceptable carrier materials or excipients are listed in WO2010/059289, in particular on page 17-31, which is incorporated by reference.

Scientific literature points out that the activation of TRPM8 channels may be useful for the treatment of most TRPM8-mediated pathologies (*J. Med. Chem.* 2016, 59 (22), 10006-10029). Thus one may assume that the compounds of formula (I) might also be suitable for treating prostate carcinomas, bladder weakness, inflammation, or pain comprising contacting a patient with one or more compounds of formula (I) as defined herein. One may also assume that the compounds of formula (I) as defined herein are suitable for alleviating the symptoms of coughs and colds, irritations, sore throat or hoarseness, as well as the treatment of laryngopharyngeal dysphagia (*Int. J. Mol. Sci.* 2018, 19, 4113).

Thus there is provided in a sixth aspect pharmaceutical composition comprising one or more compounds as defined by formula (I) (which encompass compounds of formula (Ia), (Ib) and (Ic)), or a salt or solvate thereof.

Depending upon the particular treatment regimen contemplated, pharmaceutical compositions comprising one or more compounds of formula (I) may be administered parenterally, topically, orally, or locally. The pharmaceutical compositions may be a liquid, suspensions or a solid formulation.

In certain embodiments, the pharmaceutical composition is nasal spray, topical cream, skin sprays, throat spray, or eye drops.

Whereas some compounds as such are known from the literature, other compounds falling within the definition of formula (I) as hereinabove defined are not described in the literature and are thus novel in their own right.

Thus, there is provided in a further aspect of the invention a compound of formula (Ib)

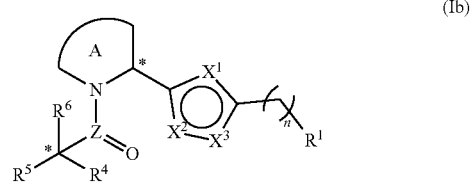

(Ib)

wherein n is 0 or 1;

$R^1$ is selected from i) $C_6$ aryl or heteroaryl wherein up to 2 C atoms are replaced by a N atom, substituted with 1-4 (e.g. 2 or 3) substituents selected from the group consisting of halogen; OH (hydroxyl); C≡N (cyano); $NO_2$ (nitro); $C_1$-$C_6$ alky;

$C_1$-$C_6$ alky comprising up to 5 halogen atoms;

$C_2$-$C_6$ alkenyl;

$C_1$-$C_6$ alkoxy;

$C_1$-$C_6$ alkoxy comprising up to 3 halogen atoms;

$C_1$-$C_3$ alkoxy $C_1$-$C_3$ alkyl;

$C_3$-$C_7$ cycloalkyl;

—C(O)$R^{20}$ wherein $R^{20}$ is selected from $C_1$-$C_3$ alkyl;

—OC(O)$R^{21}$ wherein $R^{21}$ is selected from H, and $C_1$-$C_3$ alkyl;

—C(O)O—$R^{22}$ wherein $R^{22}$ is selected from hydrogen and $C_1$-$C_3$ alkyl;

(CH$_2$)$_m$N($R^{23}$)$R^{24}$ wherein m is 0 or 1, $R^{23}$ is selected from hydrogen, $C_1$-$C_3$ alkyl, and —SO$_2$$R^{25}$ wherein $R^{25}$ is $C_1$-$C_3$ alkyl, and $R^{24}$ is selected from hydrogen, $C_1$-$C_3$ alkyl, and —SO$_2$$R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;

—S$R^{27}$ wherein $R^{27}$ is selected from hydrogen and $C_1$-$C_3$ alkyl; and —S(O)$_2$$R^{28}$ wherein $R^{28}$ is selected from hydrogen and $C_1$-$C_3$ alkyl;

with the proviso that one substituent is attached to the para-position relative to the attachment of $R^1$ to the rest of the formula (Ib) (e.g. $R^1$ is para-tolyl); and ii) thiophene, substituted with up to three substituents selected from the group consisting of halogen; OH (hydroxyl); C≡N (cyano); $NO_2$ (nitro); $C_1$-$C_6$ alky;

$C_1$-$C_6$ alky comprising up to 5 halogen atoms;

$C_2$-$C_6$ alkenyl;

$C_1$-$C_6$ alkoxy;

$C_1$-$C_6$ alkoxy comprising up to 3 halogen atoms;

$C_1$-$C_3$ alkoxy $C_1$-$C_3$ alkyl;

$C_3$-$C_7$ cycloalkyl;

—C(O)$R^{20}$ wherein $R^{20}$ is selected from $C_1$-$C_3$ alkyl;

—OC(O)$R^{21}$ wherein $R^{21}$ is selected from H, and $C_1$-$C_3$ alkyl;

—C(O)O—$R^{22}$ wherein $R^{22}$ is selected from hydrogen and $C_1$-$C_3$ alkyl;

—(CH$_2$)$_m$N($R^{23}$)$R^{24}$ wherein m is 0 or 1, $R^{23}$ is selected from hydrogen, $C_1$-$C_3$ alkyl, and —SO$_2$$R^{25}$ wherein $R^{25}$ is $C_1$-$C_3$ alkyl, and $R^{24}$ is selected from hydrogen, $C_1$-$C_3$ alkyl, and —SO$_2$$R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;

—S$R^{27}$ wherein $R^{27}$ is selected from hydrogen and $C_1$-$C_3$ alkyl; and —S(O)$_2$$R^{28}$ wherein $R^{28}$ is selected from hydrogen and $C_1$-$C_3$ alkyl;

A is a 5 to 7 membered heterocyclic ring optionally comprising one additional hetero atom selected from oxygen and sulfur, wherein the heterocyclic ring A is optionally substituted by one or two groups selected from —OH and ═O;

Z is either C, S or S(O);

$X^1$ is NH, O, or S;

$X^2$ and $X^3$ are independently selected from C, N, and O, with the proviso that either $X^2$ or $X^3$ is not C;

$R^4$ is selected from hydrogen and methyl;

$R^5$ is selected from hydrogen, $C_1$-$C_2$ alkyl, $C_1$-$C_3$ alkenyl;

$R^6$ is selected from $C_1$-$C_4$ alkyl, $C_2$-$C_5$ alkenyl containing one or two double bonds, $C_1$-$C_3$ alkoxy, $C_1$-$C_4$ alkyl-C(O)—, $C_1$-$C_4$ alkyl-S—, $C_1$-$C_4$ alkyl-SCH$_2$—, $C_1$-$C_4$ alkenyl-S—, $C_1$-$C_4$ alkyl-S(O)—, $C_1$-$C_4$ alkyl-S(O)$_2$—, $C_1$-$C_4$ alkenyl-S(O)—, $C_1$-$C_4$ alkenyl-S(O)$_2$—, —SH, CF$_3$S—, cyclopropyl, cyclobutyl, furyl (e.g. 2-furyl or 3-furyl) optionally substituted with methyl. $C_1$-$C_6$ fluoro-alkyl (such as pentafuloroethyl, difluoromethyl, trifluoromethyl, 2,2,2-trifluoroethyl or difluoroethyl), and —N$R^{30}$$R^{31}$ wherein $R^{30}$ and $R^{31}$ are independently selected from hydrogen and $C_1$-$C_3$ alkyl;

or $R^6$ and $R^5$ form together with the carbon atom to which they are attached a carbonyl group (C═O), a vinyl group (C═C$R^{32}$$R^{33}$ wherein $R^{32}$ and $R^{33}$ are independently selected from H or $C_1$-$C_3$ alkyl), or 2,2-dimethylcyclopropyl;

with the proviso that $R^5$ and $R^6$ together with the carbon atom to which they are attached comprises at least 4 C-atoms (e.g. 5, 6, 7, 8, 9, 10, 11, 12, 13, or 14 C-atoms) wherein one C-atom is optionally replaced by one heteroatom selected from S and N.

The compounds of formula (I) may be prepared generally by reacting a secondary amine of type 2 with a suitable reaction partner 3. When this reaction partner is an acyl halide, sulfonyl halide or sulfinyl halide (e.g. halide is a chloride, bromide or fluoride) (3a), this reaction can take place in the presence of a base such as an organic base (e.g. triethylamine, diisopropylethylamine) or inorganic base (e.g. potassium carbonate, potassium phosphate, sodium bicarbonate, sodium hydroxide) in a suitable solvent (e.g. dichloromethane, water, dioxane, N,N-dimethylformamide, tetrahydrofuran) or under solvent-free conditions. When the reaction partner is a carboxylic acid 3b, the reaction can take place with the help of amide-coupling reagents (e.g. dicyclohexylcarbodiimide (DCC), 1-ethyl-3-(3-dimethylaminopropyl)carbodiimide (EDC or EDCl) or its hydrochloride salt 1-ethyl-3-(3-dimethylaminopropyl)carbodiimide hydrochloride (EDC·HCl)), a nucleophilic mediator (e.g. 4-dimethylaminopyridine (DMAP), 1-hydroxy-benzotriazole (HOBt)) and an organic base (e.g. triethylamine, diisopropylethylamine) in an appropriate solvent such as N,N-dimethylformamide or dichloromethane. In some instances, the amide coupling reagent and the nucleophilic mediator can be combined in a single, commercially available reagent such as 1-[bis(dimethylamino)methylene]-1H-1,2,3-triazolo[4,5-b]pyridinium 3-oxid hexafluorophosphate (HATU) or N,N,N',N'-tetramethyl-O-(1H-benzotriazol-1-yl)uronium hexafluorophosphate (HBTU). Other conditions for the functionalization of the amine 2 can be employed which are known to the person skilled in the art of organic synthesis.

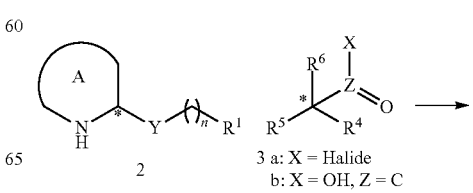

-continued

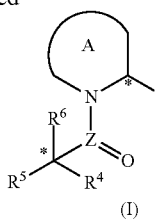
(I)

Secondary amine 2 can be prepared by deprotection of its carbamate-protected form (4). When the carbamate is a tert-butyl carbamate (PG=Boc group=tert-butoxycarbonyl), this deprotection can be done by treatment of 4 with an acid (e.g. protic acid such as trifluoroacetic acid or hydrochloric acid) in a suitable solvent such as dichloromethane. When the carbamate is a benzyl carbamate (PG=Cbz group=benzyloxycarbonyl), this deprotection can be done through hydrogenolysis of the benzyl group by exposing 4 to hydrogen gas (typically at ambient pressure but sometimes also at higher pressures) in the presence of a hydrogenation catalyst such as palladium on charcoal and a suitable solvent such as tetrahydrofuran, ethyl acetate, ethanol or methanol. Other conditions for the deprotection of carbamates 4 can be employed which are known to the person skilled in the art of organic synthesis. It must be noticed that the use of a protecting group for the secondary amine may not be necessary as it may be orthogonal to the other functional groups present in the compound, allowing its direct preparation in unprotected form. The protection is explicitly mentioned here as it provides a more generally applicable synthetic method.

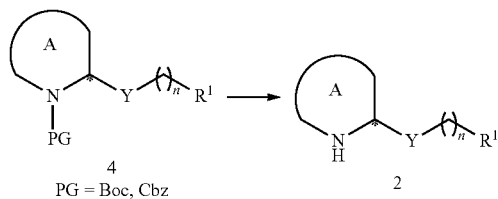

Preparation of 4 may be done by cross-coupling reaction (e.g. Suzuki cross coupling) from a heterocycle halide 5 and an organometallic compound, e.g. an organoboron compound of type 6 (note that -B(pin) is a 4,4,5,5-Tetramethyl-1,3,2-dioxaborolyl group) or similar organo-tin, organo-zinc or organo-magnesium compounds. This is typically done by reacting compounds 5 and 6 or similar in the presence of a transition metal catalyst (usually palladium- or nickel-catalyst) such as palladium acetate, or tris(dibenzylideneacetone)-dipalladium ($Pd_2(dba)_3$), often in conjunction with a suitable ligand (typically a phosphine-based ligand such as triphenylphosphine, 1,1'-bis(diphenylphosphino)ferrocene (dppf)). The metal catalyst and ligand can be added to the reaction in the form of a pre-formed complex such as tetrakis(triphenylphosphine)palladium(0) or 1,1'-bis(diphenylphosphino)ferrocene-palladium(II)dichloride dichloromethane complex. The reaction is typically conducted in the presence of a base, typically an ionorganic base such as sodium carbonate, potassium carbonate or caesium carbonate, and a suitable solvent system, typically a mixture of water and organic solvent such as tetrahydrofuran or dioxane, although single-solvent systems may also be suitable. The reactions are usually conducted at elevated temperatures (e.g. 80° C. or 100° C.) often under atmosphere of inert gas such as dinitrogen or argon. Other conditions for cross-couplings of halides 5 with organometallic compounds 6 or similar can be employed which are known to the person skilled in the art of organic synthesis.

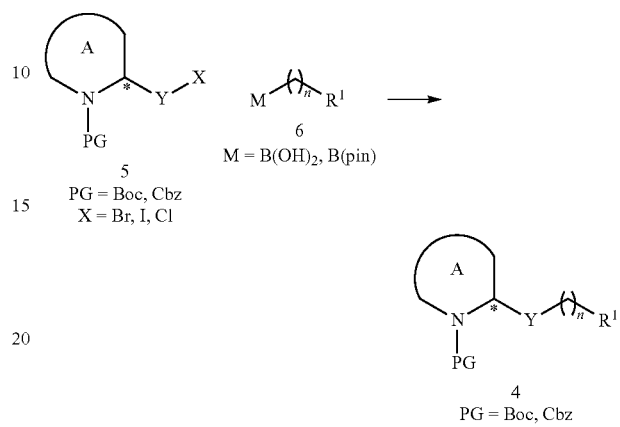

Halides of type 5 can be prepared by halogenation of the heterocycle Y. This is typically done by exposing the heterocycle 6 to a halogenating agent such as bromine, chlorine, iodine, N-bromosuccinimide, N-chlorosuccinimide or N-iodosuccinimide in a suitable solvent such as dichloromethane or chloroform. In some cases, the reaction may lead to over-halogenation, yielding, for instance, compounds bearing two halogen atoms on the heterocycle Y. In this case, a selective removal of the undesired halogens is achieved by exposing this resulting over-halogenated intermediate to a reductant such as sodium sulfite or sodium thiosulfate in a suitable solvent such as ethanol/water mixture at elevated temperatures (e.g. 100° C.).

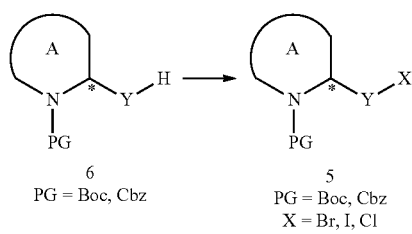

The formation of the heterocycle Y in compounds 6 as well as 4 can be achieved in a number of ways applying synthetic strategies known to those skilled in the art.

For instance, imidazoles 7 may be prepared by reaction of aldehydes 8 with a $C_2$-building block at a suitable oxidation state such as glyoxal and a source of ammonia such as aqueous ammonia solution. The reaction is carried out in a suitable solvent such as methanol, and at suitable temperature such as but not restricted to ambient temperature. A person skilled in the art will recognize that extending the $C_2$-building block to various 1,2-dicarbonyl compounds allows this preparation method to yield more substituted imidazoles of type 4 (where Y is an imidazole).

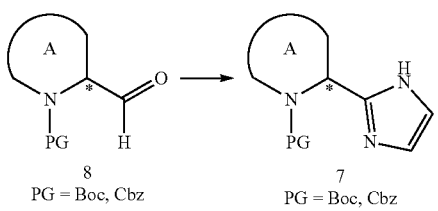

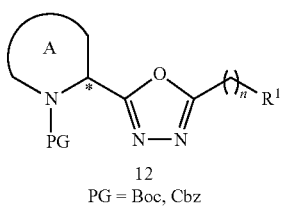

Oxazoles of type 9 may be prepared in two steps starting by amide bond formation from carboxylic acid 10 and a suitable primary amine 11 (which may be employed as a salt, e.g. hydrochloride) under similar conditions as those described for the preparation of (I) from 3b above. The resulting amide intermediate can then be subjected to dehydrative condensation by reacting it with a dehydrating agent such as phosphoryl chloride ($POCl_3$) or sulfuric acid in an appropriate solvent such as MeCN at elevated temperatures (e.g. 80° C.-100° C.).

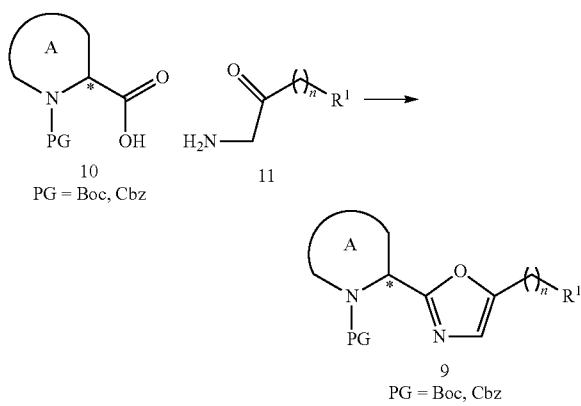

Moreover, the amide intermediate prepared by the coupling of carboxylic acid 10 and amine 11 can be converted directly to imidazoles 4 by exposing it to an ammonia source such as ammonium acetate or ammonium carbonate, optionally under catalytic action of an acid additive such as acetic acid or propionic acid, in a suitable solvent such as toluene or xylene at elevated temperatures (e.g. 100° C. or 140° C. or 160° C.).

Oxadiazoles of type 12 can be prepared in two steps starting by amide bond formation from carboxylic acid 10 and a suitable hydrazide 13 (which may be employed as a salt, e.g. hydrochloride) under similar conditions as those described for the preparation of (I) from 3b above. The resulting intermediate can then be subjected to dehydrative condensation by reacting it with a dehydrating agent such as p-toluenesulfonyl chloride (TsCl) often in combination with a base (e.g. amine base such as triethylamine or diisopropylethylamine) in a suitable solvent such as acetonitrile at appropriate temperatures (e.g. 0° C. or room temperature).

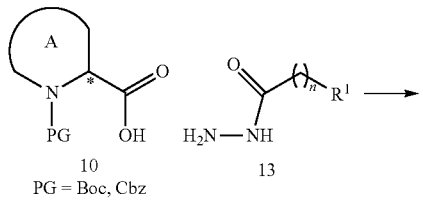

Isoxazoles 14 can be prepared by 1,3-dipolar cycloaddition between alkyne 15 and the nitrile oxide obtained from aldehyde 8. The aldehyde 8 is typically first reacted with hydroxylamine, which can be used as a free base or as its salt, e.g. hydrochloride salt, in which case a base is added, e.g. an inorganic base such as sodium carbonate or potassium carbonate. The reaction is carried out in a suitable solvent such as a mixture of ethanol and water or a mixture of methanol and water at a suitable temperature, e.g. between 0° C. and room temperature. The formed oxime is then oxidized by reacting it with a suitable oxidant such as N-chlorosuccinimide, chlorine or diacetoxyiodobenzene in a suitable solvent such as N,N-dimethylformamide or tetrahydrofuran at a suitable temperature such as 40° C. or room temperature. The resulting intermediate can then be exposed to a base such as an organic base, for instance triethylamine or diisopropylethylamine or an inorganic base in a suitable solvent such as dichloromethane or tetrahydrofuran and reacted in the presence of alkyne 15.

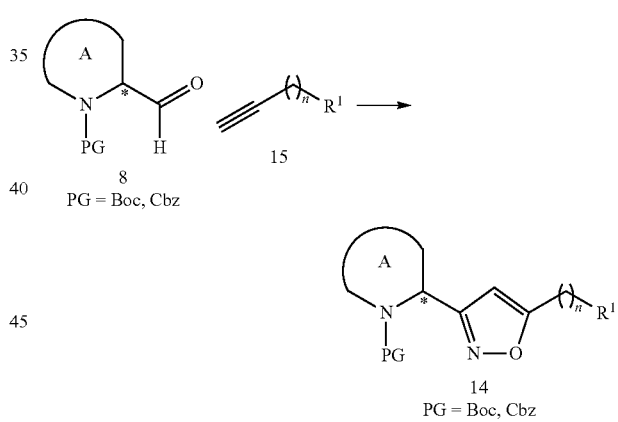

Triazoles 16 can be prepared by reacting a nitrile 17 with and a suitable hydrazide 13 (which may be employed as a salt, e.g. hydrochloride) in the presence of a base such as an inorganic base, for instance potassium carbonate or sodium carbonate, in a suitable solvent such as ethanol or butanol, typically at elevated temperatures (e.g. 70° C. or 120° C.).

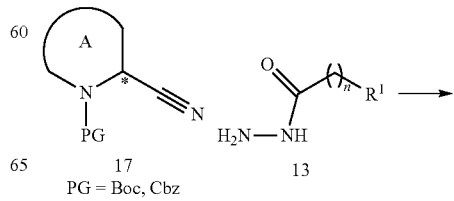

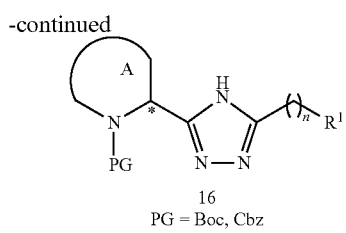

16
PG = Boc, Cbz

Thiazoles of type 18 can be prepared in a similar way to oxazoles of type 9 but by subjecting the intermediately formed amide, obtained from acid 10 and amine 11, to a sulfur source such as 2,4-bis(4-methoxyphenyl)-2,4-dithioxo-1,3,2,4-dithiadiphosphetane (Lawesson's reagent) or 2,4-Bis(p-tolylthio)-1,3,2,4-dithiadiphosphetane 2,4-disulfide, in an appropriate solvent such as tetrahydrofuran, dichloromethane or toluene at an appropriate temperature (e.g. 40° C. 70° C. or 100° C.).

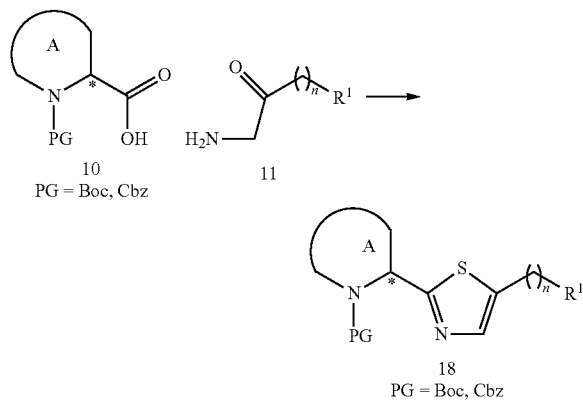

Nitrile 17 can be prepared from aldehyde 8 by condensing it with hydroxylamine which can be used as its salt, e.g. hydrochloride salt, in which case a base is added, e.g. an inorganic base such as sodium carbonate or potassium carbonate, in an appropriate solvent such as a mixture of water and ethanol or a mixture of water and methanol, at a suitable temperature, e.g. between 0° C. and room temperature. The resulting oxime can then be dehydrated, for instance by reacting with catalytic copper(II) acetate in an appropriate solvent such as acetonitrile, at elevated temperatures (e.g. 70° C. or 80° C.). Other conditions for conversion of aldehydes 8 to nitriles 17 can be employed which are known to the person skilled in the art of organic synthesis.

Aldehydes of type 8 can be prepared from acids of type 10 by selective reduction. This is typically done in a two- or three-step protocol, first reacting the acid 10 with an activating agent such as thionyl chloride, oxallyl chloride (with the addition of catalytic N,N-dimethylformamide) or carbonyldiimidazole, in an appropriate solvent such as but not limited to dichloromethane or tetrahydrofuran or under solvent-free conditions at a suitable temperature (0° C. to 100° C. depending on activating agent). The activated acid is then exposed, either in the same step or in a separate step in an appropriate solvent such as dichloromethane or tetrahydrofuran, to N,O-dimethylhydroxylamine (optionally in its salt form, as e.g. a hydrochloride) and optionally in the presence of a base, for instance an inorganic base such as sodium carbonate or potassium carbonate or organic base such as triethylamine, pyridine or diisopropylethylamine, at an appropriate temperature (e.g. 0° C. or room temperature). The thus obtained amide can then be selectively reduced by reaction with a reducing agent such as but not limited to lithium aluminum hydride or diisobutylaluminum hydride, in an appropriate solvent such as tetrahydrofuran or dichloromethane at an appropriate temperature (−78° C., −20° C., 0° C. or room temperature).

Hydrazide 13 can be prepared from simple esters 19 by reacting them with a hydrazine source such as hydrazine monohydrate in an appropriate solvent such as ethanol or methanol at an appropriate temperature (e.g. 70° C. or 80° C.).

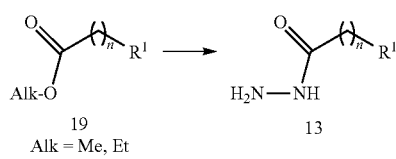

It must be added that a different order of steps may also be possible and in some cases advantageous. For example, formation of the amide described for the formation of (I) may be conducted first (i.e. formation of the N—Z bond), followed by the steps used in the installation of the aromatic heterocycle Y. As someone skilled in the art will appreciate, this also obviates the need for a protecting group for the secondary amine.

Furthermore, it must be mentioned that certain sensitive functional groups may be carried through the preparation sequence in protected or masked form and removed at the end of the synthetic sequence by standard methods known to those skilled in the art.

In the formulae 2-19 depicted in the reaction schemes above, the parameters A, Y, Z, n, $R^1$, $R^4$, $R^5$ and $R^6$ have the same meaning as defined for formula (I) (which encompass the compounds of formula (Ia), (Ib), and (Ic)).

The invention is now further described with reference to the following non-limiting examples. These examples are for the purpose of illustration only and it is understood that variations and modifications can be made by one skilled in the art.

EXAMPLES

Example 1: tert-buty-2-(5-bromo-1H-imidazol-2-yl)piperidine-1-carboxylate

Example 1a: tert-butyl-2-(1H-imidazol-2-yl)piperidine-1-carboxylate

To a solution of tert-butyl-2-formylpiperidine-1-carboxylate (9.5 g, 35.6 mmol) and glyoxal solution (40% in water, 25.9 g, 178 mmol) in methanol (100 mL) were added dropwise ammonia solution (25% in water, 17.0 g, 249 mmol) at 0° C. The solution was allowed to warm up to rt. (room temperature) and stirred at rt. for 16 h. Then the solution was concentrated under reduced pressure, and the result residue was extracted with ethyl acetate (100 mL*3). Any precipitate was removed by filtration, and the organic phase was washed with saturated aqueous $NaHCO_3$ solution (100 mL) and brine (100 mL). The solution was then concentrated under reduced pressure to give tert-butyl-2-(1H-imidazol-2-yl)piperidine-1-carboxylate (5.2 g, yield:

58%) as white solid. GC/MS (EI): m/z (%): 251 (3) [M+], 195 (4), 178 (10), 150 (20), 134 (13), 122 (5), 95 (100), 82 (10), 57(21).

Example 1b: tert-butyl-2-(4,5-dibromo-1H-imidazol-2-yl)piperidine-1-carboxylate

N-bromosuccinimide (7.4 g, 41.8 mmol) was added portionwise to a solution of tert-butyl-2-(1H-imidazol-2-yl)piperidine-1-carboxylate (5.0 g, 19.9 mmol) in dichloromethane (100 mL) over 10 min at 0° C. The mixture was stirred at 0° C. for another 2 h and then concentrated by rotary evaporate. The residue was dissolved in ethyl acetate (250 mL), washed with water (100 mL*2) and brine (100 mL), dried with $MgSO_4$, and concentrated to get a very brown residue. The residue was recrystallized by dichloromethane/hexanes (1:1) to get tert-butyl-2-(4,5-dibromo-1 imidazol-2-yl)piperidine-1-carboxylate (6.0 g, yield: 74%) as white solid. GC/MS (EI): m/z (%): 411 (2) [M+], 409 (4) [M+], 407 (2) [M+], 355 (6), 353 (12), 351 (6), 311 (11), 309 (22), 307 (11), 294 (11), 292 (22), 290 (11), 255 (50), 253 (100), 251 (50), 242 (12), 240 (24), 238 (12), 148 (9), 57 (50).

Example 1c: tert-butyl-2-(5-bromo-1H-imidazol-2-yl)piperidine-1-carboxylate

A suspension of the tert-butyl-2-(4,5-dibromo-1H-imidazol-2-yl)piperidine-1-carboxylate (34.0 g, 90%, 74.8 mmol) and $Na_2SO_3$ (94 g, 748 mmol) in ethanol (300 mL) and water (300 mL) was refluxed overnight. Then cool down and concentrated. The residue was partitioned between $CH_2Cl_2$ (200 mL) and $H_2O$ (200 mL). The aqueous layer was extracted with ethyl acetate (200 mL*3). The combined organic layers were washed with brine (200 mL), dried with $Na_2SO_4$, filtered and evaporated. The residue was purified by column chromatography on silica gel to give tert-butyl-2-(5-bromo-1H-imidazol-2-yl)piperidine-1-carboxylate (23.0 g, yield: 93%) as white solid. GC/MS (EI): m/z (%): 329 (3) [M+], 331 (3) [M+], 275 (10), 273 (10), 258 (9), 256 (9), 230 (20), 228 (20), 214 (26), 212 (26), 175 (100), 173 (100), 162 (9), 160 (9), 93 (8), 57 (44).

Example 2: 1-(2-(5-(2-fluoro-4-methylphenyl)-1H-imidazol-2-yl)piperidin-1-yl)-2-(methylthio)propan-1-one Example 2a: tert-butyl-2-(5-(2-fluoro-4-methylphenyl)-1H-imidazol-2-yl)piperidine-1-carboxylate A mixture of tert-butyl-2-(5-bromo-1H-imidazol-2-yl)piperidine-1-carboxylate (300 mg, 0.91 mmol), (2-fluoro-4-methylphenyl)boronic acid (182 mg, 1.18 mmol), sodium carbonate (193 mg, 1.82 mmol), and 1,1'-bis(diphenylphosphino)ferrocene-palladium(II)dichloride dichloromethane complex (37 mg, 0.045 mmol) in tetrahydrofuran (9 mL) and water (1.5 mL) were stirred and reflux for overnight under argon atmosphere. The completion of reaction was monitored by TLC. The mixture was cooled down to room temperature and the reaction solution was poured into water (30 mL) and was extracted with MTBE (methyl tert-butyl ether) (30 mL*3). The combined organic layers was washed once with brine (30 mL), dried with $MgSO_4$, filtered and concentrated. The crude oil was purified by silica gel chromatography (hexane:MTBE=5:1) to give tert-butyl-2-(5-(2-fluoro-4-methylphenyl)-1H-imidazol-2-yl)piperidine-1-carboxylate (300 mg, yield: 92%) as white solid. GC/MS (EI): m/z (%): 359 (5) [M+], 303 (18), 258 (35), 242 (18), 203 (100), 190 (15), 177 (6), 134 (6), 84(3), 57 (14).

Example 2b: 1-(2-(5-(2-fluoro-4-methylphenyl)-1H-imidazol-2-yl)piperidin-1-yl)-2-(methylthio)propan-1-one a) To a solution tert-butyl-2-(5-(2-fluoro-4-methylphenyl)-1H-imidazol-2-yl)piperidine-1-carboxylate (300 mg, 0.835 mmol) in dichloromethane (20 mL) was added 2,2,2-trifluoroacetic acid (761 mg, 6.68 mmol) at 5° C., and the mixture was stirred at rt. for 2 h. The completion of reaction was monitored by TLC. The reaction solution was cooled to room temperature and saturated $NaHCO_3$ solution (20 mL) was added, extracted with EA (Ethyl Acetate) (40 mL*3) was added and the organic phase was concentrated to give 2-(5-(2,4-difluorophenyl)-1H-imidazol-2-yl)piperidine as a pale yellow oil (111 mg, 0.925 mmol).

b) To a solution of 2-(methylthio)propanoic acid (111 mg, 0.925 mmol) in dichloromethane (20 mL) was added HOBt (1-Hydroxybenzotriazole hydrate) (142 mg, 0.925 mmol) and 3-(((ethylimino)methylene)amino)-N,N-dimethylpropan-1-amine (144 mg, 0.925 mmol) at 0~5° C. and the mixture was stirred at rt. for 0.5 h. Then 2-(5-(2-fluoro-4-methylphenyl)-1H-imidazol-2-yl)piperidine (200 mg, 0.771 mmol) and DIPEA (N,N-diisopropylethylamine) (0.269 mL, 1.54 mmol) was added and the mixture was stirred at rt. for 16 h. The mixture was filtered and solvent was removed and purified by silica gel chromatography (hexane:MTBE=3:1) to give 1-(2-(5-(2-fluoro-4-methylphenyl)-1H-imidazol-2-yl)piperidin-1-yl)-2-(methylthio)propan-1-one (200 mg, yield: 72%) as white solid. GC/MS (EI): m/z (%): 361 (8) [M+], 346 (6), 315 (2), 286 (9), 258 (100), 231 (13), 203 (16), 177 (5), 103 (2), 75 (8). $^1$H NMR (300 MHz, DMSO-$d_6$, mixture of stereoisomers and tautomers) δ 12.19, 11.96 (brs, 1H), 8.05-7.58 (m, 1H), 7.47-7.16 (m, 1H), 7.12-6.94 (m, 2H), 5.82-5.44 (m, 1H), 4.55-2.97 (m, 3H), 2.69-2.14 (m, 1H), 2.31 (s, 3H), 2.10-1.95 (m, 3H), 1.93-1.47 (m, 5H), 1.44-1.31 (m, 3H). $^{13}$C NMR (75 MHz, DMSO-$d_6$, mixture of stereoisomers and tautomers) δ 170.8 (q), 170.3 (q), 170.0 (q), 160.7 (q), 157.4 (q), 146.9 (q), 146.8 (q), 146.6 (q), 137.6 (q), 137.5 (q), 137.4 (q), 133.9 (q), 133.8 (q), 133.4 (q), 127.4 (t), 125.4 (t), 119.9 (q), 119.8 (q), 116.4 (t), 116.3 (t), 116.1 (t), 115.9 (t), 51.4 (t), 47.2 (t), 46.9 (t), 43.2 (d), 43.0 (d), 38.8 (d), 37.9 (t), 37.6 (t), 37.3 (t), 28.5 (d), 28.1 (d), 27.9 (d), 26.0 (d), 25.7 (d), 25.4 (d), 20.9 (s), 20.3 (d), 20.1 (d), 18.2 (s), 17.9 (s), 17.8 (s), 11.8 (s), 11.6 (s) ppm.

Example 3: 1-(2-(5-(2,4-difluorophenyl)-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (2,4-difluorophenyl)boronic acid and 2-(methylthio)propanoic acid to give the title product as a white solid. GC/MS (EI): m/z (%): 365 (8) [M+], 350 (5), 319 (3), 290 (11), 262 (100), 235 (11), 207 (24), 75 (9).

$^1$H NMR (300 MHz, DMSO-$d_6$, mixture of stereoisomers and tautomers) δ 12.52-12.03 (m, 1H), 8.34-7.57 (m, 1H), 7.53-7.03 (m, 3H), 5.91-5.47 (m, 1H), 4.67-3.04 (m, 3H), 2.81-2.18 (m, 1H), 2.15-1.97 (m, 3H), 1.93-1.52 (m, 5H), 1.49-1.32 (m, 3H).

$^{13}$C NMR (75 MHz, DMSO-$d_6$, mixture of stereoisomers and tautomers) δ 170.3 (q), 170.1 (q), 169.8 (q), 162.5 (q), 162.3 (q), 160.6 (q), 160.5 (q), 159.2 (q), 159.0 (q), 157.3 (q), 157.2 (q), 148.1 (q), 147.9 (q), 147.2 (q), 147.1 (q), 146.9 (q), 133.0 (q), 132.9 (q), 132.6 (q), 132.3 (t), 132.2 (t), 128.7 (t), 128.6 (t), 128.5 (t), 119.6 (q), 119.4 (q), 116.6 (t), 116.4 (t), 116.2 (t), 116.1 (t), 116.0 (t), 112.1 (t), 111.8 (t), 104.7 (t), 104.6 (t), 104.4 (t), 104.0 (t), 51.4 (t), 47.2 (t), 46.9 (t), 43.2 (d), 43.0 (d), 38.8 (d), 37.9 (t), 37.6 (t), 37.3 (t), 28.5 (d), 28.1 (d), 28.0 (d), 26.0 (d), 25.6 (d), 25.4 (d), 20.2 (d), 20.1 (d), 18.1 (s), 17.9 (s), 17.8 (s), 11.7 (s), 11.6 (s) ppm.

Example 4: 3-fluoro-4-(2-(1-(2-(methylthio)propanoyl)piperidin-2-yl)-1H-imidazol-5-yl)benzonitrile Prepared following an analogous procedure as described in Example 2, using tert-butyl-2-(5-bromo-1H-imidazol-2-yl)piperidine-1-carboxylate, (4-cyano-2-fluorophenyl)boronic acid and 2-(methylthio)propanoic acid to give the title product as a white solid. GC/MS (EI): m/z (%): 372 (9) [M+], 357 (10), 326 (6), 297 (11), 269 (100), 75 (16). $^1$H NMR (300 MHz, DMSO-$d_6$, mixture of stereoisomers and tautomers) δ 12.49, 12.37 (brs, 1H), 8.36-8.09 (m, 1H), 7.88-7.84 (m, 1H), 7.76-7.55 (m, 2H), 5.82-5.32 (m, 1H), 4.54-3.00 (m, 3H), 2.68-2.31 (m, 1H), 2.14-1.92 (m, 3H), 1.89-1.49 (m, 5H), 1.46-1.32 (m, 3H). $^{13}$C NMR (75 MHz, DMSO-$d_6$, mixture of stereoisomers and tautomers) δ 170.4 (q), 170.1 (q), 159.8 (q), 156.5 (q), 148.2 (q), 148.0 (q), 147.9 (q), 132.3 (q), 129.4 (t), 129.3 (t), 128.3 (t), 128.3 (t), 127.9 (q), 127.8 (q), 120.1 (t), 119.8 (t), 119.5 (t), 119.3 (t), 118.6 (q), 109.0 (q), 108.9 (q), 51.4 (t), 47.2 (t), 46.9 (t), 43.2 (d), 43.0 (d), 38.9 (d), 37.7 (t), 37.6 (t), 37.3 (t), 28.5 (d), 28.0 (d), 27.8 (d), 25.9 (d), 25.6 (d), 25.4 (d), 20.2 (d), 20.0 (d), 18.1 (s), 17.9 (s), 17.8 (s), 11.7 (s), 11.6 (s) ppm.

Example 5: 1-(2-(5-(4-chlorophenyl)-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (4-chlorophenyl)boronic acid and 2-(methylthio)propanoic acid to give the title product as a white solid. GC/MS (EI): m/z (%): 363 (8) [M+], 348 (5), 317 (4), 288 (10), 260 (100), 233 (9), 75 (11). $^1$H NMR (300 MHz, DMSO-$d_6$, mixture of stereoisomers and tautomers) δ 12.21, 12.14, 11.92 (brs, 1H), 7.91-7.74 (m, 2H), 7.73-7.57 (m, 1H), 7.52-7.27 (m, 2H), 5.79-5.42 (m, 1H), 4.57-2.99 (m, 3H), 2.72-2.16 (m, 1H), 2.13-1.97 (m, 3H), 1.93-1.50 (m, 5H), 1.46-1.30 (m, 3H). $^{13}$C NMR (75 MHz, DMSO-$d_6$, mixture of stereoisomers and tautomers) δ 170.3 (q), 170.1 (q), 147.5 (q), 147.4 (q), 147.2 (q), 139.2 (q), 139.1 (q), 134.3 (q), 134.2 (q), 130.6 (q), 130.5 (q), 128.8 (t), 126.3 (t), 114.2 (t), 113.9 (t), 113.7 (t), 51.5 (t), 47.3 (t), 47.0 (t), 43.2 (d), 43.0 (d), 38.8 (d), 38.0 (t), 37.6 (t), 37.3 (t), 28.5 (d), 28.1 (d), 27.9 (d), 26.0 (d), 25.6 (d), 25.4 (d), 20.3 (d), 20.1 (d), 18.2 (s), 17.9 (s), 17.8 (s), 11.8 (s), 11.7 (s) ppm.

Example 6: 1-(2-(5-(3,4-dimethoxyphenyl)-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (3,4-dimethoxyphenyl)boronic acid and 2-(methylthio)propanoic acid to give the title product as a white solid.
GC/MS (EI): m/z (%): 389 (10) [M+], 374 (5), 314 (5), 286 (100), 259 (14), 231 (11), 75 (9). $^1$H NMR (300 MHz, CDCl$_3$, mixture of stereoisomers and tautomers) δ 11.97, 11.73 (brs, 1H), 7.49-7.15 (m, 3H), 6.98-6.90 (m, 1H), 5.76-5.40 (m, 1H), 4.40-3.11 (m, 9H), 2.51-2.15 (m, 1H), 2.05-2.03 (m, 3H), 1.93-1.49 (m, 5H), 1.45-1.31 (m, 3H) ppm.

Example 7: 1-(2-(5-(3-fluoro-4-methylphenyl)-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (3-fluoro-4-methylphenyl)boronic acid and 2-(methylthio)propanoic acid to give the title product as a white solid. GC/MS (EI): m/z (%): 361 (8) [M+], 346 (5), 315 (2), 286 (8), 258 (100), 231 (11), 203 (17), 75 (8). $^1$H NMR (300 MHz, DMSO-$d_6$, mixture of stereoisomers and tautomers) δ 12.10-11.88 (m, 1H), 7.63-7.17 (m, 4H), 5.79-5.42 (m, 1H), 4.49-3.00 (m, 3H), 2.67-2.33 (m, 1H), 2.22 (s, 3H), 2.12-1.95 (m, 3H), 1.94-1.49 (m, 5H), 1.44-1.28 (m, 3H). $^{13}$C NMR (75 MHz, DMSO-$d_6$, mixture of stereoisomers and tautomers) δ 169.9 (q), 169.7 (q), 162.6 (q), 159.4 (q), 146.9 (q), 146.7 (q), 146.6 (q), 138.8 (q), 135.1 (q), 135.0 (q), 131.6 (t), 131.5 (t), 121.3 (q), 121.0 (q), 119.9 (t), 119.9 (t), 113.7 (t), 113.3 (t), 113.2 (t), 110.5 (t), 110.2 (t), 51.1 (t), 46.9 (t), 46.6 (t), 42.8 (d), 42.6 (d), 38.3 (d), 37.5 (t), 37.2 (t), 36.9 (t), 28.2 (d), 28.1 (d), 27.7 (d), 27.5 (d), 25.6 (d), 25.2 (d), 25.0 (d), 19.9 (d), 19.7 (d), 17.8 (s), 17.5 (s), 17.4 (s), 13.9 (s), 13.9 (s), 11.4 (s), 11.2 (s) ppm.

Example 8: 2-(methylthio)-1-(2-(5-(3-(trifluoromethylphenyl)-1H-imidazol-2-yl)piperidin-1-yl)propan-1-one Prepared following an analogous procedure as described in Example 2, using tert-butyl-2-(5-bromo-1H-imidazol-2-yl)piperidine-1-carboxylate, (3-trifluoromethylphenyl)boronic acid and 2-(methylthio)propanoic acid to give the title product as a white solid.
GC/MS (EI): m/z (%): 397 (5) [M+], 382 (3), 351 (9), 322 (10), 294 (100), 267 (9), 239 (29), 75 (12). $^1$H NMR (300 MHz, DMSO-$d_6$, mixture of stereoisomers and tautomers) δ 12.26, 12.03 (s, 1H), 8.21-8.02 (m, 2H), 7.85-7.79 (m, 1H), 7.65-7.40 (m, 2H), 5.83-5.46 (m, 1H), 4.57-2.89 (m, 3H), 2.65-2.14 (m, 1H), 2.14-1.99 (m, 3H), 1.96-1.51 (m, 5H), 1.47-1.34 (m, 3H).
$^{13}$C NMR (75 MHz, DMSO-$d_6$, mixture of stereoisomers and tautomers) δ 169.9 (q), 169.6 (q), 147.3 (q), 147.2 (q), 147.0 (q), 138.4 (q), 137.9 (q), 136.1 (q), 136.1 (q), 136.0 (q), 130.0 (q), 129.8 (q), 129.7 (q), 129.6 (q), 129.4 (t), 129.2 (q), 128.8 (q), 128.6 (q), 127.9 (q), 127.9 (t), 126.2 (q), 122.6 (q), 122.2 (t), 122.1 (t), 120.3 (t), 120.3 (t), 114.8 (t), 114.4 (t), 114.2 (t), 51.1 (t), 46.9 (t), 46.7 (t), 42.8 (d), 42.6 (d), 38.4 (d), 37.3 (t), 37.2 (t), 36.9 (t), 29.0 (d), 28.7 (d), 28.2 (d), 28.0 (d), 27.6 (d), 27.4 (d), 25.5 (d), 25.2 (d), 25.0 (d), 20.5 (d), 19.9 (d), 19.7 (d), 17.8 (s), 17.5 (s), 17.3 (s), 11.2 (s), 11.2 (s) ppm.

Example 9: 1-(2-(5-(3,4-dimethylphenyl-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (3,4-dimethylphenyl)boronic acid and 2-(methylthio)propanoic acid to give the title product as a white solid. GC/MS (EI): m/z (%): 357 (8) [M+], 342 (6), 282 (8), 254 (100), 227 (13), 199 (13), 173 (4), 131 (6), 115 (3), 75 (8). $^1$H NMR (300 MHz, DMSO-$d_6$, mixture of stereoisomers and tautomers) δ 12.05-11.75 (m, 1H), 7.60-7.02 (4, 1H), 5.77-5.40 (m, 1H), 4.49-2.93 (m, 3H), 2.66-2.34 (m, 1H), 2.27-2.16 (m, 6H), 2.08-1.98 (m, 3H), 1.95-1.52 (m, 5H), 1.43-1.31 (m, 3H). $^{13}$C NMR (75 MHz, DMSO-d$_6$, mixture of stereoisomers and tautomers) δ 170.4 (q), 170.3 (q), 170.0 (q), 146.9 (q), 146.8 (q), 146.7 (q), 140.5 (q), 137.0 (q), 136.3 (q), 136.2 (q), 134.1 (q), 134.0 (q), 133.0 (q), 132.9 (q), 130.2 (t), 129.9 (t), 125.9 (t), 122.2 (t), 113.0 (t), 112.6 (t), 112.4 (t), 51.6 (t), 47.4 (t), 47.1 (t), 43.2 (d), 43.0 (d), 38.8 (d), 38.0 (t), 37.6 (t), 37.4 (t), 29.5 (d), 28.5 (d), 28.2 (d), 28.0 (d), 26.1 (d), 25.7 (d), 25.5 (d), 20.3 (d), 20.1 (d), 20.0 (s), 19.9 (s), 19.6 (s), 18.3 (s), 18.0 (s), 17.8 (s), 12.0 (s), 11.7 (s), 11.6 (s) ppm.

Example 10: 1-(2-(5-(4-(dimethylamino)phenyl)-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (4-(dimethylamino)phenyl)boronic acid and 2-(methylthio)propanoic acid to give the title product as a white solid. GC/MS (EI): m/z (%): 372 (18) [M$^+$], 357 (5), 297 (5), 269 (100), 240 (13), 214 (10), 188 (4), 159 (3), 146 (5), 75 (6). $^1$H NMR (300 MHz, DMSO-d$_6$, mixture of stereoisomers and tautomers) δ 11.86-11.63 (m, 1H), 7.80-6.92 (m, 3H), 6.69 (d, J=8.4 Hz, 2H), 5.77-5.38 (m, 1H), 4.48-3.01 (m, 3H), 2.89 (s, 6H), 2.57-2.24 (m, 1H), 2.04 (s, 3H), 1.91-1.47 (m, 5H), 1.42-1.34 (m, 3H) ppm.

Example 11: 1-(2-(5-(4-chloro-3-fluorophenyl)-1H-imidazol-2-yl)piperidin-1-yl)-2-(methylthio)propan-1-one Prepared following an analogous procedure as described in Example 2, using tert-butyl-2-(5-bromo-1 imidazol-2-yl)piperidine-1-carboxylate, (4-chloro-3-fluorophenyl)boronic acid and 2-(methylthio)propanoic acid to give the title product as a white solid. GC/MS (EI): m/z (%): 381 (5) [M$^+$], 366 (4), 335 (5), 306 (8), 278 (100), 223 (29), 75 (17). $^1$H NMR (300 MHz, DMSO-d$_6$, mixture of stereoisomers and tautomers) δ 12.22, 12.15, 12.01 (brs, 1H), 7.81-7.41 (m, 4H), 5.80-5.43 (m, 1H), 4.52-3.00 (m, 3H), 2.64-2.13 (m, 1H), 2.11-1.98 (m, 3H), 1.94-1.49 (m, 5H), 1.42-1.34 (m, 3H). $^{13}$C NMR (75 MHz, DMSO-d$_6$, mixture of stereoisomers and tautomers, major peaks) δ 170.8 (q), 170.3 (q), 170.1 (q), 159.6 (q), 156.4 (q), 147.8 (q), 147.6 (q), 147.5 (q), 138.3 (q), 138.2 (q), 136.9 (q), 136.8 (q), 131.3 (t), 131.0 (t), 121.6 (t), 121.6 (t), 116.7 (q), 116.6 (q), 116.5 (q), 116.4 (q), 115.4 (t), 115.0 (t), 114.9 (t), 112.5 (t), 112.2 (t), 51.5 (t), 47.3 (t), 47.0 (t), 43.2 (d), 43.0 (d), 38.8 (d), 37.9 (t), 37.6 (t), 37.3 (t), 28.5 (d), 28.1 (d), 27.9 (d), 26.0 (d), 25.7 (d), 25.4 (d), 20.3 (d), 20.1 (d), 18.2 (s), 18.0 (s), 17.8 (s), 11.8 (s), 11.7 (s) ppm.

Example 12: 1-(2-(5-(4-acetylphenyl)-1H-imidazol-2-yl)piperidin-1-yl)-2-(methylthio)propan-1-one Prepared following the analogous procedure as described in Example 2, using tert-butyl-2-(5-bromo-1H-imidazol-2-yl)piperidine-1-carboxylate, (4-acetylphenyl)boronic acid and 2-(methylthio)propanoic acid to give the title product as a white solid. GC/MS (EI): m/z (%): 371 (6) [M$^+$], 356 (5), 325 (4), 296 (9), 268 (100), 241 (9), 213 (16), 75 (10). $^1$H NMR (300 MHz, DMSO-d$_6$, mixture of stereoisomers and tautomers) δ 12.27, 12.05 (s, 1H), 8.17-7.87 (m, 5H), 5.83-5.46 (m, 1H), 4.61-2.97 (m, 3H), 2.58 (s, 3H), 2.68- 2.38 (m, 1H), 2.06, 2.05 (s, 3H), 1.95-1.50 (m, 5H), 1.43-1.34 (m, 3H). $^{13}$C NMR (75 MHz, DMSO-d$_6$, mixture of stereoisomers and tautomers) δ 197.6 (q), 170.4 (q), 170.3 (q), 147.9 (q), 147.7 (q), 140.0 (q), 139.9 (q), 139.4 (q), 139.3 (q), 138.8 (q), 134.7 (q), 134.6 (q), 129.2 (t), 124.4 (t), 116.0 (t), 115.6 (t), 51.6 (t), 47.3 (t), 47.1 (t), 43.2 (d), 43.1 (d), 38.9 (d), 38.0 (t), 37.6 (t), 37.4 (t), 28.5 (d), 28.1 (d), 27.9 (d), 26.9 (s), 26.0 (d), 25.7 (d), 25.5 (d), 20.3 (d), 20.2 (d), 18.2 (s), 18.0 (s), 17.9 (s), 11.9 (s), 11.7 (s) ppm.

Example 13: 2-(ethylthio)-1-(2-(5-(p-tolyl)-1H-imidazol-2-yl)piperidin-1-yl)propan-1-one Prepared following an analogous procedure as described in Example 2, using tert-butyl-2-(5-bromo-1H-imidazol-2-yl)piperidine-1-carboxylate, (4-methylphenyl)boronic acid and 2-(ethylthio)propanoic acid to give the title product as a white solid. GC/MS (EI, mixture of stereoisomers, ratio 1:1): isomer 1: m/z (%): 357 (6) [M$^+$], 328 (20), 268 (9), 240 (100), 213 (9), 185 (15), 117 (6), 89 (6), isomer 2: m/z (%): 357 (7) [M$^+$], 328 (21), 268 (9), 240 (100), 213 (10), 185 (15), 117 (6), 89 (6). $^1$H NMR (300 MHz, DMSO-d$_6$, mixture of stereoisomers and tautomers) δ 12.02, 11.79 (brs, 1H), 7.65 (d, J=6.6 Hz, 2H), 7.49 (s, 1H), 7.14 (d, J=7.2 Hz, 2H), 5.79-5.42 (m, 1H), 4.49-3.00 (m, 3H), 2.70-2.36 (m, 2H), 2.29 (s, 3H), 1.95-1.51 (m, 5H), 1.40 (m, 3H), 1.27-1.13 (m, 3H). $^{13}$C NMR (75 MHz, DMSO-d$_6$, mixture of stereoisomers and tautomers) δ 170.7 (q), 170.5 (q), 147.0 (q), 146.7 (q), 140.4 (q), 140.0 (q), 135.3 (q), 132.7 (q), 129.4 (t), 124.7 (t), 113.1 (t), 112.6 (t), 51.6 (t), 47.3 (t), 47.0 (t), 43.2 (d), 43.0 (d), 38.8 (d), 38.0 (t), 37.6 (t), 37.5 (t), 28.7 (d), 28.1 (d), 26.2 (d), 25.7 (d), 25.3 (d), 23.3 (d), 23.0 (d), 21.2 (s), 20.3 (d), 20.1 (d), 19.3 (s), 19.1 (s), 19.0 (s), 15.4 (s), 14.9 (s), 14.9 (s) ppm.

Example 14: (E-2-methyl-1-(2-(5-(p-tolyl)-1H-imidazol-2-yl)piperidin-1-yl)but-2-en-1-one Prepared following an analogous procedure as described in Example 2, using tert-butyl-2-(5-bromo-1H-imidazol-2-yl)piperidine-1-carboxylate, (4-methylphenyl)boronic acid and (E)-2-methylbut-2-enoic acid to give the title product as a white solid. GC/MS (EI): m/z (%): 323 (6) [M$^+$], 308 (3), 268 (1), 240 (100), 185 (10), 172 (3), 83 (5), 55 (13). $^1$H NMR (300 MHz, DMSO-d$_6$, mixture of tautomers) δ 12.08, 11.86 (s, 1H), 7.76-7.52 (m, 2H), 7.49 (s, 1H), 7.27-7.09 (m, 2H), 5.76-5.46 (m, 2H), 4.22-2.81 (m, 2H), 2.55-2.33 (m, 1H), 2.29 (s, 3H), 1.85-1.27 (m, 11H) ppm.

Example 15: 2-methylene-1-(2-(5-(p-tolyl)-1H-imidazol-2-yl)piperidin-1-yl)butan-1-one Prepared following an analogous procedure as described in Example 2, using tert-butyl-2-(5-bromo-1H-imidazol-2-yl)piperidine-1-carboxylate, (4-methylphenyl)boronic acid and 2-methylenebutanoic acid to give the title product as a pale yellow solid. GC/MS (EI): m/z (%): 323 (8) [M$^+$], 308 (4), 240 (100), 185 (12), 172 (3), 159 (43), 83 (4), 55 (15). $^1$H NMR (300 MHz, DMSO-d$_6$, mixture of tautomers) δ 12.11-11.86 (m, 1H), 7.72-7.01 (m, 5H), 5.76-5.05 (m, 3H), 4.67-2.61 (m, 2H), 2.42-2.17 (m, 6H), 1.84-1.16 (m, 5H), 1.12-0.93 (m, 3H). $^{13}$C NMR (75 MHz, DMSO-d$_6$, mixture of tautomers) δ 171.1 (q), 171.0 (q), 146.7 (q), 146.6 (q), 140.2 (q), 136.2 (q), 135.3 (q), 132.6 (q), 129.7 (t), 129.4 (t), 124.6 (t), 113.0 (t), 112.4 (d), 53.6 (t), 46.7 (t), 44.4 (d), 38.5 (d), 29.3 (d), 28.5 (d), 27.2 (d), 25.8 (d), 25.6 (d), 21.2 (s), 20.4 (d), 12.1 (s) ppm.

Example 16: 1-(2-(5-(3,4-difluorophenyl)-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, (3,4-difluorophenyl)boronic acid and 2-(methylthio)propanoic acid to give the title product as a white solid. GC/MS (EI): m/z (%): 365 (10) [$M^+$], 350 (5), 319 (4), 290 (10), 262 (100), 235 (6), 75 (13). $^1$H NMR (300 MHz, DMSO-$d_6$, mixture of stereoisomers and tautomers) δ 12.2-11.9 (m, 1H), 7.78-7.33 (m, 4H), 5.77-5.41 (m, 1H), 4.40-3.07 (m, 3H), 2.56-2.38 (m, 1H), 2.16-1.37 (m, 11H). $^{13}$C NMR (75 MHz, DMSO-$d_6$, mixture of stereoisomers and tautomers) δ 170.8 (q), 170.4 (q), 170.1 (q), 151.8 (q), 151.6 (q), 149.9 (q), 149.7 (q), 148.6 (q), 148.4 (q), 147.6 (q), 147.4 (q), 147.3 (q), 146.7 (q), 146.5 (q), 138.4 (q), 138.0 (q), 133.3 (q), 133.1 (q), 121.1 (t), 118.0 (t), 117.8 (t), 114.6 (t), 114.2 (t), 114.0 (t), 113.2 (t), 113.0 (t), 51.4 (t), 47.3 (t), 47.0 (t), 43.2 (d), 43.0 (d), 38.8 (d), 37.9 (t), 37.6 (t), 37.3 (t), 28.0 (d), 27.9 (d), 26.0 (d), 25.6 (d), 25.4 (d), 20.3 (d), 20.1 (d), 18.2 (s), 17.9 (s), 17.8 (s), 11.8 (s), 11.7 (s) ppm.

Example 17: 2-(methylthio)-1-(2-(5-(4-nitrophenyl)-1H-imidazol-2-yl)piperidin-1-yl)propan-1-one Prepared following an analogous procedure as described in Example 2, using tert-butyl-2-(5-bromo-1H-imidazol-2-yl)piperidine-1-carboxylate, (4-nitrophenyl)boronic acid and 2-(methylthio)propanoic acid to give the title product as a pale yellow solid. GC/MS (EI): m/z (%): 374 (1) [$M^+$], 359 (2), 328 (3), 299 (4), 271 (100), 216 (11), 170 (8), 156 (3), 75(54). $^1$H NMR (300 MHz, CDCl3, mixture of stereoisomers and tautomers) δ 10.3-9.76 (m, 1H), 8.24-7.38 (m, 5H), 5.83-5.75 (m, 1H), 3.88-3.63 (m, 2H), 3.16-3.07 (m, 1H), 2.81-1.47 (m, 12H) ppm.

Example 18: 1-(2-(5-(4-aminophenyl)-1H-imidazol-2-yl)piperidin-1-yl)-2-(methylthio)propan-1-one A solution of 2-(methylthio)-1-(2-(5-(4-nitrophenyl)-1H-imidazol-2-yl)piperidin-1-yl)propan-1-one (100 mg, 0.24 mmol) in ethyl acetate (10 mL) was treated under nitrogen atmosphere with Pd/C (palladium on charcoal) (10 wt %) (48.1 mg, 0.048 mmol) and the mixture purged with hydrogen and allowed to react under hydrogen atmosphere (1 bar) at room temperature overnight. The resulting mixture was purged with nitrogen, filtered over celite and concentrated to give the title product (51 mg, yield: 58%) as yellow solid. GC/MS (EI): m/z (%): 344 (9) [$M^+$], 329 (4), 269 (6), 241 (100), 214 (16), 198 (8), 185 (20), 75 (44). $^1$H NMR (300 MHz, DMSO-$d_6$, mixture of stereoisomers and tautomers) δ 11.80-11.57 (m, 1H), 7.42-7.23 (m, 3H), 6.59-6.53 (m, 2H), 5.76-5.37 (m, 1H), 5.14-4.98 (m, 2H), 4.38-3.16 (m, 3H), 2.50-2.37 (m, 1H), 2.04-1.94 (m, 3H), 1.70-1.58 (m, 5H), 1.38-1.36 (m, 3H). $^{13}$C NMR (75 MHz, DMSO-$d_6$, mixture of stereoisomers and tautomers) δ 170.8 (q), 170.3 (q), 170.1 (q), 168.7 (q), 148.0 (q), 147.4 (q), 146.3 (q), 141.3 (q), 140.9 (q), 125.7 (t), 123.7 (t), 122.5 (t), 118.7 (t), 114.4 (t), 110.7 (t), 110.3 (t), 51.5 (t), 47.3 (t), 43.2 (d), 43.0 (d), 38.8 (d), 38.1 (t), 37.6 (t), 37.4 (t), 28.6 (d), 28.2 (d), 26.2 (d), 25.8 (d), 25.5 (d), 18.3 (s), 17.9 (s), 12.0 (s), 11.7 (s) ppm.

Example 19: 2-(methylthiol-1-(2-(5-(2,4,5-trifluorophenyl)-1H-imidazol-2-yl)piperidin-1-yl)propan-1-one Prepared following an analogous procedure as described in Example 2, using tert-butyl-2-(5-bromo-1H-imidazol-2-yl)piperidine-1-carboxylate, (2,4,5-trifluorophenyl)boronic acid and 2-(methylthio)propanoic acid to give the title product as a white solid. GC/MS (EI): m/z (%): 383 (7) [$M^+$], 368 (5), 337 (5), 308 (10), 280 (100), 253 (5), 225 (25), 75 (13). $^1$H NMR (300 MHz, DMSO-$d_6$, mixture of stereoisomers and tautomers) δ 12.37-11.82 (m, 1H), 8.00-7.76 (m, 1H), 7.67-7.28 (m, 2H), 5.82-5.31 (m, 1H), 4.55-3.00 (m, 3H), 2.65-2.18 (m, 1H), 2.10-1.93 (m, 3H), 1.84-1.29 (m, 8H) ppm.

Example 20: 1-(2-(5-(3,4-difluorophenyl-1H-imidazol-2-v piperidin-1-yl)-2-methylbut-3-en-1-one Prepared following an analogous procedure as described in Example 2, using tert-butyl-2-(5-bromo-1H-imidazol-2-yl)piperidine-1-carboxylate, (3,4-difluorophenyl)boronic acid and 2-methylbut-3-enoic acid to give the title product as a pale yellow solid. GC/MS (EI, mixture of stereoisomers, ratio 4:5): isomer1: GC/MS (EI): m/z (%): 345 (1) [$M^+$], 330 (1), 290 (8), 262 (100), 234 (9), 219 (10), 194 (68), 55 (49). Isomer 2: GC/MS (EI): m/z (%): 345 (1) [$M^+$], 330 (1), 290 (6), 262 (100), 234 (8), 219 (9), 207 (30), 194 (56), 55 (45). $^1$H NMR (300 MHz, DMSO-$d_6$, mixture of stereoisomers and tautomers) δ 12.21-1.94 (brs, 1H), 7.73-7.58 (m, 3H), 7.39-7.33 (m, 1H), 5.92-5.77 (m, 2H), 5.24-4.91 (m, 2H), 4.44-3.10 (m, 3H), 2.52-2.20 (m, 1H), 1.72-1.30 (m, 5H), 1.21-1.10 (m, 3H). $^{13}$C NMR (75 MHz, DMSO-$d_6$, mixture of stereoisomers and tautomers) δ 173.2 (q), 173.0 (q), 172.7 (q), 151.8 (q), 151.6 (q), 149.9 (q), 149.7 (q), 148.6 (q), 148.4 (q), 147.6 (q), 147.3 (q), 146.7 (q), 146.5 (q), 139.5 (t), 139.3 (t), 139.0 (t), 138.5 (t), 138.0 (t), 133.1 (q), 121.1 (t), 118.0 (t), 117.8 (t), 115.6 (d), 115.3 (d), 114.5 (t), 114.1 (t), 113.2 (t), 113.0 (t), 51.3 (t), 47.2 (t), 47.0 (t), 42.8 (d), 42.7 (d), 38.7 (d), 29.3 (d), 29.0 (d), 28.3 (d), 28.0 (d), 27.7 (d), 25.9 (d), 25.6 (d), 25.1 (d), 20.1 (d), 18.3 (s), 18.0 (s), 17.9 (s) ppm.

Example 21: (E)-1-(2-(5-(3,4-difluorophenyl)-1H-imidazol-2-yl)piperidin-1-yl)-2-methylbut-2-en-1-one Obtained as an isomerization byproduct in the last step of the preparation of Example according to the general procedure of Example 2. The title product was obtained as a pale yellow solid. GC/MS (EI): m/z (%): 345 (3) [$M^+$], 330 (2), 290 (1), 262 (100), 234 (6), 219 (7), 181 (12), 83 (24), 55 (49). $^1$H NMR (300 MHz, DMSO-$d_6$, mixture of tautomers) δ 12.2-12.0 (m, 1H), 7.77-7.33 (m, 4H), 5.66-5.46 (m, 2H), 4.77-2.89 (m, 2H), 2.35-2.20 (m, 1H), 1.76-1.32 (m, 11H) ppm.

Example 22: 1-(2-(5-(2,5-difluorophenyl-1H-imidazol-2-yl)piperidin-1-yl)-2-(methylthio)propan-1-one

Example 22a: 1-(2-(5-bromo-1H-imidazol-2-yl)piperidin-1-yl)-2-(methylthio)propan-1-one a) To a solution tert-butyl-2-(5-bromo-1H-imidazol-2-yl)piperidine-1-carboxylate (6.00 g, 18.17 mmol) in dichloromethane (100 mL) was added 2,2,2-trifluoroacetic acid (16.57 g, 145.00 mmol) at 5° C., and the mixture was stirred 16 h at rt. After the solution was cooled to 5° C., diluted NaHCO$_3$ solution was added, extracted with ethyl acetate (50 mL*3), and the organic phase was concentrated to give 2-(5-bromo-1H-imidazol-2-yl)piperidine as yellow solid.

b) To a solution of 2-(methylthio)propanoic acid (2.51 g, 20.86 mmol) in dichloromethane (150 mL) was added HOBt (1-Hydroxybenzotriazole hydrate) (3.19 g, 20.86 mmol) and 3-(((ethylimino)methylene)amino)-N,N-dimethylpropan-1-amine (3.24 g, 20.86 mmol) at 0~5° C. and the mixture was stirred for 0.5 h at rt. Then 2-(5-bromo-1H-imidazol-2-yl)piperidine (5.00 g, 17.38 mmol) and DIPEA (6.07 mL, 34.80 mmol) was added and the mixture was stirred at r.t. for 16 h. The mixture was filtered and solvent was removed and purified by silica gel chromatography (hexane:MTBE=2:1) to give 1-(2-(5-bromo-1H-imidazol-2-yl)piperidin-1-yl)-2-(methylthio)propan-1-one (4.40 g, yield: 75%) as white solid. GC/MS (EI): m/z (%): 333 (5) [M$^+$], 331 (5) [M$^+$], 318 (5), 316 (5), 287 (25), 285 (26), 258 (15), 256 (15), 230 (100), 228 (100), 175 (36), 173 (36), 75 (44). $^1$H NMR (300 MHz, CDCl$_3$, mixture of stereoisomers and tautomers) δ 10.90-9.90 (m, 1H), 7.06-6.80 (m, 1H), 5.75-5.24 (m, 1H), 3.90-3.08 (m, 3H), 2.64-1.37 (m, 12H).

Example 22b: 1-(2-(5-(2,5-difluorophenyl)-1H-imidazol-2-yl)piperidin-1-yl)-2-(methylthio)propan-1-one A mixture of 1-(2-(5-bromo-1H-imidazol-2-yl)piperidin-1-yl)-2-(methylthio)propan-1-one (150 mg, 0.451 mmol), (2,5-difluorophenyl)boronic acid (143 mg, 0.903 mmol), sodium carbonate (96 mg, 0.903 mmol), and 1,1'-bis(diphenylphosphino)ferrocene-palladium(II)dichloride dichloromethane complex (74 mg, 0.090 mmol) in tetrahydrofuran (6 mL) and water (1.2 mL) were stirred and refluxed for 16 h under argon atmosphere. The reaction was monitored by GC-MS. The mixture was cooled down to 10° C. and the reaction was poured into water and was extracted with ethyl acetate. The combined organic layers was washed once with brine solution, dried with MgSO$_4$, filtered and concentrated. The crude oil was purified by silica gel chromatography (hexane:MTBE=3:1) to give 1-(2-(5-(2,5-difluorophenyl)-1H-imidazol-2-yl)piperidin-1-yl)-2-(methylthio)propan-1-one (95 mg, yield: 58%) as pale yellow solid. GC/MS (EI): m/z (%): 365 (9) [M$^+$], 350 (5), 319 (8), 290 (13), 262 (100), 235 (12), 75 (13). $^1$H NMR (300 MHz, DMSO-d$_6$, mixture of stereoisomers and tautomers) δ 12.34, 12.11 (brs, 1H), 7.87-7.64 (m, 1H), 7.59-7.41 (m, 1H), 7.38-7.18 (m, 1H), 7.17-6.98 (m, 1H), 5.81-5.45 (m, 1H), 4.54-3.00 (m, 3H), 2.69-2.15 (m, 1H), 2.11-1.96 (m, 3H), 1.93-1.49 (m, 5H), 1.45-1.33 (m, 3H) ppm.

Example 23: 1-(2-(5-(2,3-difluorophenyl)-1H-imidazol-2-yl)piperidin-1-yl)-2-(methylthio)propan-1-one Following the general procedure described in Example 22b: 1-(2-(5-bromo-1H-imidazol-2-yl)piperidin-1-yl)-2-(methylthio)propan-1-one (150 mg, 0.451 mmol), (2,3-difluorophenyl)boronic acid (143 mg, 0.903 mmol), sodium carbonate (96 mg, 0.903 mmol), and 1,1'-bis(diphenylphosphino)ferrocene-palladium(II)dichloride dichloromethane complex (74 mg, 0.09 mmol) in tetrahydrofuran (6 mL) and water (1.2 mL) were reacted to give the title product (100 mg, yield: 61%) as pale yellow solid. GC/MS (EI): m/z (%): 365 (6) [M$^+$], 350 (5), 319 (6), 290 (11), 262 (100), 235 (9), 75 (11). $^1$H NMR (300 MHz, DMSO-d$_6$, mixture of stereoisomers and tautomers) δ 12.39, 12.16 (s, 1H), 8.00-7.79 (m, 1H), 7.70-7.43 (m, 1H), 7.39-7.13 (m, 2H), 5.85-5.49 (m, 1H), 4.57-3.04 (m, 3H), 2.75-2.18 (m, 1H), 2.14-1.99 (m, 3H), 1.97-1.51 (m, 5H), 1.47-1.35 (m, 3H). $^{13}$C NMR (75 MHz, DMSO-d$_6$, mixture of stereoisomers and tautomers) δ 170.4 (q), 170.1 (q), 152.3 (q), 152.1 (q), 149.1 (q), 148.9 (q), 148.6 (q), 148.4 (q), 147.5 (q), 147.3 (q), 147.2 (q), 145.3 (q), 145.2 (q), 132.8 (q), 132.5 (q), 125.1 (t), 125.0 (t), 124.9 (t), 122.7 (t), 117.8 (t), 117.6 (t), 117.4 (t), 117.3 (t), 114.6 (t), 114.4 (t), 51.4 (t), 47.2 (t), 46.9 (t), 43.2 (d), 43.0 (d), 38.8 (d), 37.9 (d), 37.7 (t), 37.3 (t), 28.5 (d), 28.1 (d), 27.9 (d), 26.0 (d), 25.6 (d), 25.4 (d), 20.2 (d), 20.1 (d), 18.1 (s), 17.9 (s), 17.8 (s), 11.8 (s), 11.6 (s) ppm.

Example 24: 2-(methylthio)-1-(2-(5-(2,3,4-trifluorophenyl)-1H-imidazol-2-yl)piperidin-1-yl)propan-1-one Following the general procedure described in Example 22b: 1-(2-(5-bromo-1H-imidazol-2-yl)piperidin-1-yl)-2-(methylthio)propan-1-one (200 mg, 0.602 mmol), (2,3,4-trifluorophenyl)boronic acid (212 mg, 1.204 mmol), sodium carbonate (128 mg, 1.204 mmol), and 1,1'-bis(diphenylphosphino)ferrocene-palladium(II)dichloride dichloromethane complex (98 mg, 0.120 mmol) in tetrahydrofuran (6 mL) and water (1.2 mL) were reacted to give the title product (95 mg, yield: 41%) as pale yellow solid. GC/MS (EI): m/z (%): 383 (8) [M$^+$], 368 (5), 337 (7), 308 (11), 280 (100), 225 (28), 75 (13). $^1$H NMR (300 MHz, DMSO-d$_6$, mixture of stereoisomers and tautomers) δ 12.38-12.16 (m, 1H), 8.04-7.76 (m, 1H), 7.71-7.44 (m, 1H), 7.41-7.22 (m, 1H), 5.84, 5.48 (brs, 1H), 4.67-3.02 (m, 3H), 2.79-2.18 (m, 1H), 2.16-1.97 (m, 3H), 1.91-1.51 (m, 5H), 1.49-1.32 (m, 3H). $^{13}$C NMR (75 MHz, DMSO-d$_6$, mixture of stereoisomers and tautomers) δ 170.4 (q), 170.1 (q), 150.4 (q), 150.3 (q), 149.2 (q), 149.1 (q), 147.6 (q), 147.4 (q), 147.3 (q), 147.1 (q), 147.0 (q), 146.0 (q), 145.8 (q), 141.6 (q), 141.4 (q), 141.1 (q), 138.3 (q), 138.1 (q), 137.9 (q), 132.1 (q), 131.8 (q), 121.6 (t), 121.5 (t), 121.4 (t), 121.3 (t), 121.1 (q), 121.0 (q), 120.9 (q), 120.8 (q), 117.2 (t), 117.0 (t), 116.8 (t), 116.7 (t), 113.0 (t), 112.8 (t), 51.4 (t), 47.2 (t), 46.9 (t), 43.2 (d), 43.0 (d), 38.8 (d), 37.9 (t), 37.6 (t), 37.3 (t), 28.5 (d), 28.0 (d), 27.9 (d), 25.9 (d), 25.6 (d), 25.4 (d), 20.2 (d), 20.0 (d), 18.1 (s), 17.9 (s), 17.8 (s), 11.7 (s), 11.6 (s) ppm.

Example 25: 1-(2-(5-(benzo[d][1,3]dioxol-5-yl)-1H-imidazol-2-yl)piperidin-1-yl)-2-(methylthio)propan-1-one Following the general procedure described in Example 22b: 1-(2-(5-bromo-1H-imidazol-2-yl)piperidin-1-yl)-2-(methylthio)propan-1-one (200 mg, 0.602 mmol), benzo[d][1,3]dioxol-5-ylboronic acid (300 mg, 1.806 mmol), sodium carbonate (191 mg, 1.806 mmol), and 1,1'-bis(diphenylphosphino)ferrocene-palladium(II)dichloride dichloromethane complex (98 mg, 0.120 mmol) in tetrahydrofuran (6 mL) and water (1.2 mL) were reacted to give the title product (81 mg, yield: 36%) as pale yellow solid. GC/MS (EI): m/z (%): 373 (10) [M$^+$], 358 (5), 327 (2), 298 (6), 270 (100), 243 (11), 75 (9). $^1$H NMR (300 MHz, DMSO-d$_6$, mixture of stereoisomers and tautomers) δ 11.98-11.76 (m, 1H), 7.57-7.39 (m, 1H), 7.35-7.11 (m, 2H), 6.88 (d, J=7.8 Hz, 1H), 5.99 (s, 2H), 5.76-5.32 (m, 1H), 4.50-3.01 (m, 3H), 2.65-2.14 (m, 1H), 2.00 (s, 3H), 1.92-1.44 (m, 5H), 1.38 (d, J=6.5 Hz, 3H). $^{13}$C NMR (75 MHz, DMSO-d$_6$, mixture of stereoisomers and tautomers) δ 170.2 (q), 170.1 (q), 147.9

(q), 146.8 (q), 146.6 (q), 145.8 (q), 140.1 (q), 129.9 (q), 117.9 (t), 112.9 (t), 112.5 (t), 112.5 (t), 108.8 (t), 105.3 (t), 101.1 (d), 51.5 (t), 47.3 (t), 47.0 (t), 43.0 (d), 38.8 (d), 37.9 (t), 37.6 (t), 37.3 (t), 29.5 (d), 28.2 (d), 27.9 (d), 25.7 (d), 25.5 (d), 20.1 (d), 17.9 (s), 17.8 (s), 11.9 (s), 11.7 (s) ppm.

Example 26: 1-(2-(5-(4-methoxyphenyl-1H-imidazol-2-yl)piperidin-1-yl)-2-(methylthio)propan-1-one Following the general procedure described in Example 22b: 1-(2-(5-bromo-1H-imidazol-2-yl)piperidin-1-yl)-2-(methylthio)propan-1-one (200 mg, 0.602 mmol), (4-methoxyphenyl)boronic acid (274 mg, 1.806 mmol), sodium carbonate (191 mg, 1.806 mmol), and 1,1'-bis(diphenylphosphino)ferrocene-palladium(II)dichloride dichloromethane complex (98 mg, 0.120 mmol) in tetrahydrofuran (6 mL) and water (1.2 mL) were reacted to give the title product (143 mg, yield: 66%) as white solid. GC/MS (EI): m/z (%): 359 (9) [M$^+$], 344 (5), 256 (100), 229 (13), 75 (10). $^1$H NMR (300 MHz, DMSO-d$_6$, mixture of stereoisomers and tautomers) δ 11.96, 11.74 (brs, 1H), 7.76-7.42 (m, 3H), 6.91 (d, J=7.9 Hz, 2H), 5.78-5.32 (m, 1H), 4.52-3.01 (m, 6H), 2.68-2.13 (m, 1H), 2.04 (s, 3H), 1.80-1.50 (m, 5H), 1.38 (d, J=6.6 Hz, 3H). $^{13}$C NMR (75 MHz, DMSO-d$_6$, mixture of stereoisomers and tautomers, main peaks) δ 170.2 (q), 158.2 (q), 146.8 (q), 140.2 (q), 128.2 (q), 125.9 (t), 114.3 (t), 111.9 (t), 55.5 (s), 51.5 (t), 47.3 (t), 47.0 (t), 43.0 (d), 43.0 (d), 38.8 (d), 38.0 (t), 37.6 (t), 37.4 (t), 28.2 (d), 25.7 (d), 25.5 (d), 20.3 (d), 20.1 (d), 18.0 (s), 17.9 (s), 11.9 (s), 11.7 (s) ppm.

Example 27: 2-(methylthio)-1-(2-(5-(4-(trifluoromethoxy)phenyl)-1H-imidazol-2-yl)piperidin-1-yl)propan-1-one Following the general procedure described in Example 22b: 1-(2-(5-bromo-1H-imidazol-2-yl)piperidin-1-yl)-2-(methylthio)propan-1-one (200 mg, 0.602 mmol), (4-(trifluoromethoxy)phenyl)boronic acid (372 mg, 1.806 mmol), sodium carbonate (191 mg, 1.806 mmol), and 1,1'-bis(diphenylphosphino)ferrocene-palladium(II)dichloride dichloromethane complex (98 mg, 0.120 mmol) in tetrahydrofuran (6 mL) and water (1.2 mL) were reacted to give the title product (95 mg, yield: 38%) as pale yellow solid. GC/MS (EI): m/z (%): 413 (9) [M$^+$], 398 (5), 367 (4), 338 (9), 310 (100), 281 (19), 75 (14). $^1$H NMR (300 MHz, DMSO-d$_6$, mixture of stereoisomers and tautomers) δ 12.16, 11.94 (brs, 1H), 8.05-7.72 (m, 2H), 7.65 (t, J=8.2 Hz, 1H), 7.47-7.24 (m, 2H), 5.80-5.32 (m, 1H), 4.54-2.99 (m, 3H), 2.65-2.17 (m, 1H), 2.11-1.97 (m, 3H), 1.94-1.51 (m, 5H), 1.39 (d, J=6.6 Hz, 3H). $^{13}$C NMR (75 MHz, DMSO-d$_6$, mixture of stereoisomers and tautomers) δ 170.3 (q), 170.1 (q), 147.7 (q), 147.5 (q), 147.3 (q), 146.9 (q), 139.0 (q), 134.9 (q), 126.2 (t), 122.3 (q), 122.0 (t), 121.6 (t), 118.9 (q), 114.5 (t), 114.1 (t), 113.9 (t), 51.5 (t), 47.3 (t), 47.0 (t), 43.2 (d), 43.0 (d), 38.8 (d), 37.9 (t), 37.6 (t), 37.3 (t), 28.6 (d), 28.1 (d), 27.9 (d), 26.1 (d), 25.7 (d), 25.5 (d), 20.3 (d), 20.1 (d), 18.2 (s), 18.0 (s), 17.8 (s), 11.8 (s), 11.7 (s) ppm.

Example 28: 2-fluoro-4-(2-(1-(2-(methylthio)propanoyl)piperidin-2-yl)-1H-imidazol-5-yl)benzonitrile Following the general procedure described in Example 22b: 1-(2-(5-bromo-1H-imidazol-2-yl)piperidin-1-yl)-2-(methylthio)propan-1-one (200 mg, 0.602 mmol), (4-(trifluoromethoxy)phenyl)boronic acid (372 mg, 1.806 mmol), sodium carbonate (191 mg, 1.806 mmol), and 1,1'-bis(diphenylphosphino)ferrocene-palladium(II)dichloride dichloromethane complex (49 mg, 0.060 mmol) in tetrahydrofuran (6 mL) and water (1 mL) were reacted to give the title product (108 mg, yield: 48%) as white solid. GC/MS (EI): m/z (%): 372 (5) [M$^+$], 357 (6), 326 (14), 269 (100), 75 (16). $^1$H NMR (300 MHz, DMSO-d$_6$, mixture of stereoisomers and tautomers) δ 12.42, 12.22 (brs, 1H), 7.98-7.74 (m, 4H), 5.87-5.45 (m, 1H), 4.56-2.96 (m, 3H), 2.62-2.14 (m, 1H), 2.10-1.92 (m, 3H), 1.91-1.51 (m, 5H), 1.39 (d, J=6.5 Hz, 3H). $^{13}$C NMR (75 MHz, DMSO$_6$-d$_6$, mixture of stereoisomers and tautomers) δ 170.4 (q), 170.1 (q), 165.2 (q), 161.8 (q), 148.5 (q), 148.4 (q), 148.2 (q), 143.2 (q), 143.1 (q), 137.8 (q), 134.4 (t), 121.1 (t), 118.0 (t), 117.7 (t), 117.5 (t), 115.1 (t), 111.4 (t), 111.1 (t), 96.7 (q), 96.5 (q), 51.5 (t), 47.2 (t), 47.0 (t), 43.2 (d), 43.0 (d), 38.9 (d), 37.8 (t), 37.6 (t), 37.3 (t), 28.5 (d), 28.0 (d), 27.8 (d), 26.0 (d), 25.6 (d), 25.4 (d), 20.3 (d), 20.1 (d), 18.2 (s), 18.0 (s), 17.8 (s), 11.8 (s), 11.6 (s) ppm.

Example 29: 2-(2-(1-(2-(methylthio)propanoyl)piperidin-2-yl)-1H-imidazol-5-yl)benzonitrile Following the general procedure described in Example 22b: 1-(2-(5-bromo-1H-imidazol-2-yl)piperidin-1-yl)-2-(methylthio)propan-1-one (150 mg, 0.451 mmol), (2-cyanophenyl)boronic acid (133 mg, 0.903 mmol), sodium carbonate (144 mg, 1.354 mmol), and 1,1'-bis(diphenylphosphino)ferrocene-palladium(II)dichloride dichloromethane complex (55 mg, 0.068 mmol) in tetrahydrofuran (6 mL) and water (1 mL) were reacted to give the title product (90 mg, yield: 56%) as white solid. GC/MS (EI): m/z (%): 354 (5) [M$^+$], 339 (6), 308 (8), 279 (14), 251 (100), 224 (10), 196 (32), 75 (13). $^1$H NMR (300 MHz, DMSO-d$_6$, mixture of stereoisomers and tautomers) δ 12.39, 12.19 (brs, 1H), 8.15-7.95 (m, 1H), 7.87-7.62 (m, 3H), 7.40 (t, J=7.5 Hz, 1H), 5.83-5.47 (m, 1H), 4.48-2.99 (m, 3H), 2.71-2.12 (m, 1H), 2.09-1.95 (m, 3H), 1.91-1.47 (m, 5H), 1.44-1.32 (m, 3H). $^{13}$C NMR (75 MHz, DMSO-d$_6$, mixture of stereoisomers and tautomers) δ 170.8 (q), 170.4 (q), 169.9 (q), 147.9 (q), 147.6 (q), 147.5 (q), 137.9 (q), 136.9 (q), 136.8 (q), 134.5 (t), 133.7 (t), 127.6 (t), 127.1 (t), 120.0 (q), 116.7 (t), 116.3 (t), 116.2 (t), 107.1 (q), 106.4 (q), 51.4 (t), 47.1 (t), 46.7 (t), 43.1 (d), 43.0 (d), 38.8 (d), 38.0 (t), 37.7 (t), 37.3 (t), 28.6 (d), 28.2 (d), 28.0 (d), 26.1 (d), 25.7 (d), 25.5 (d), 20.2 (d), 20.0 (d), 18.2 (s), 18.0 (s), 17.8 (s), 11.8 (s), 11.7 (s) ppm.

Example 30: 2-(methylthio)-1-(2-(5-(3-nitrophenyl)-1H-imidazol-2-yl)piperidin-1-yl)propan-1-one Following the general procedure described in Example 22b: 1-(2-(5-bromo-1H-imidazol-2-yl)piperidin-1-yl)-2-(methylthio)propan-1-one (200 mg, 0.602 mmol), (3-nitrophenyl)boronic acid (0.201 g, 1.204 mmol), sodium carbonate (191 mg, 1.806 mmol), and 1,1'-bis(diphenylphosphino)ferrocene-palladium(II)dichloride dichloromethane complex (49 mg, 0.060 mmol) in tetrahydrofuran (6 mL) and water (1 mL) were reacted to give the title product (90 mg, yield: 40%) as pale yellow solid. GC/MS (EI): m/z (%): 374 (6) [M$^+$], 359 (5), 328 (9), 299 (10), 271 (100), 216 (25), 75 (16). $^1$H NMR (300 MHz, DMSO-d$_6$, mixture of stereoisomers and tautomers) δ 12.31, 12.08 (s, 1H), 8.57 (s, 1H), 8.22-8.15 (m, 1H), 8.05-7.98 (m, 1H), 7.92-7.83 (m, 1H), 7.67-7.58 (m, 1H), 5.82-5.44 (m, 1H), 4.43-3.05 (m, 3H), 2.58-2.21 (m, 1H), 2.05-2.04 (m, 3H), 1.72-1.50 (m, 5H), 1.42-1.33 (m, 3H). $^{13}$C NMR (75 MHz, DMSO-d$_6$, mixture of stereoisomers and tautomers) δ 170.3 (q), 170.0 (q), 148.7 (q), 147.9 (q), 147.8 (q), 147.7 (q), 138.1 (q), 137.8 (q), 137.3 (q), 137.2 (q), 137.1 (q), 132.1 (t), 130.8 (t), 130.7 (t), 130.4 (t), 129.1 (t), 120.8 (t), 120.7 (t), 118.6 (t), 115.9 (t), 115.5 (t), 115.5 (t), 47.3 (t), 47.1 (t), 43.2 (d), 43.1 (d), 38.8 (d), 37.7 (t), 37.6 (t), 37.3 (t), 28.6 (d), 28.0 (d), 27.8 (d), 26.0 (d), 25.7 (d), 25.5 (d), 20.3 (d), 20.2 (d), 18.2 (s), 17.9 (s), 17.8 (s), 11.7 (s), 11.6 (s) ppm.

Example 31: 2-(methylthio)-1-(2-(5-(2-(trifluoromethyl)phenyl)-1H-imidazol-2-yl)piperidin-1-yl)propan-1-one Following the general procedure described in Example 22b: 1-(2-(5-bromo-1H-imidazol-2-yl)piperidin-1-yl)-2-(methylthio)propan-1-one (150 mg, 0.451 mmol), (2-(trifluoromethyl)phenyl)boronic acid (171 mg, 0.903 mmol), sodium carbonate (144 mg, 1.354 mmol), and 1,1'-bis(diphenylphosphino)ferrocene-palladium(II)dichloride dichloromethane complex (37 mg, 0.045 mmol) in tetrahydrofuran (6 mL) and water (1 mL) were reacted to give the title product (90 mg, yield: 50%) as white solid. GC/MS (EI): m/z (%): 397 (8) [M+], 382 (10), 351 (23), 322 (13), 294 (100), 254 (36), 139 (21), 75 (19). $^1$H NMR (300 MHz, DMSO-$d_6$, mixture of stereoisomers and tautomers) δ 12.21, 11.98 (s, 1H), 7.93-7.39 (m, 4H), 7.35-6.89 (m, 1H), 5.81-5.44 (m, 1H), 4.53-2.96 (m, 3H), 2.70-2.11 (m, 1H), 2.09-1.89 (m, 3H), 1.88-1.47 (m, 5H), 1.36 (t, J=5.8 Hz, 3H). $^{13}$C NMR (75 MHz, DMSO-$d_6$, mixture of stereoisomers and tautomers) δ 170.4 (q), 170.3 (q), 169.9 (q), 147.0 (q), 146.8 (q), 146.6 (q), 137.2 (q), 137.1 (q), 136.6 (q), 134.6 (q), 132.7 (t), 132.5 (t), 131.7 (t), 131.6 (t), 131.5 (t), 127.2 (t), 127.1 (t), 127.0 (t), 126.7 (t), 126.6 (t), 126.5 (t), 125.9 (q), 125.5 (q), 123.1 (q), 116.3 (t), 116.2 (t), 115.8 (t), 51.4 (t), 47.1 (t), 46.7 (t), 43.1 (d), 42.9 (d), 38.7 (d), 38.1 (t), 37.6 (t), 37.3 (t), 28.27 (d), 28.3 (d), 28.1 (d), 26.1 (d), 25.7 (d), 25.5 (d), 20.2 (d), 20.0 (d), 19.9 (d), 18.2 (s), 17.9 (s), 17.8 (s), 11.8 (s), 11.6 (s) ppm.

Example 32: 4-(2-(1-(2-(methylthio)propanoyl)piperidin-2-yl)-1H-imidazol-5-yl)benzaldehyde Following the general procedure described in Example 22b: 1-(2-(5-bromo-1H-imidazol-2-yl)piperidin-1-yl)-2-(methylthio)propan-1-one (500 mg, 1.505 mmol), (4-formylphenyl)boronic acid (451 mg, 3.01 mmol), sodium carbonate (478 mg, 4.51 mmol), and 1,1'-bis(diphenylphosphino)ferrocene-palladium(II)dichloride dichloromethane complex (184 mg, 0.226 mmol) in tetrahydrofuran (10 mL) and water (1.5 mL) were reacted to give the title product (385 mg, yield: 72%) as white solid. GC/MS (EI): m/z (%): 357 (9) [M+], 342 (6), 311 (6), 282 (9), 254 (100), 227 (5), 199 (15), 75 (8). $^1$H NMR (300 MHz, DMSO-$d_6$, mixture of stereoisomers and tautomers) δ 12.29, 12.09 (s, 1H), 9.95 (s, 1H), 8.00 (d, J=7.9 Hz, 2H), 7.93-7.79 (m, 3H), 5.82-5.45 (m, 1H), 4.57-2.91 (m, 3H), 2.66-2.17 (m, 1H), 2.08-2.00 (m, 3H), 1.56-1.48 (m, 5H), 1.39 (d, J=6.5 Hz, 3H). $^{13}$C NMR (75 MHz, DMSO-$d_6$, mixture of stereoisomers and tautomers) δ 192.7 (t), 170.4 (q), 170.3 (q), 170.0 (q), 148.2 (q), 148.1 (q), 147.9 (q), 141.3 (q), 141.2 (q), 139.2 (q), 139.1 (q), 134.3 (q), 134.2 (q), 130.7 (t), 130.5 (t), 124.8 (t), 116.6 (t), 116.2 (t), 116.1 (t), 51.5 (t), 47.3 (t), 47.0 (t), 43.2 (d), 43.0 (d), 38.8 (d), 37.3 (d), 28.5 (d), 28.0 (d), 27.0 (d), 26.0 (d), 25.6 (d), 25.4 (d), 20.3 (d), 20.1 (d), 18.2 (s), 17.9 (s), 17.8 (s), 11.8 (s), 11.6 (s) ppm.

Example 33: 1-(2-(5-(4-(aminomethyl)phenyl)-1H-imidazol-2-yl)piperidin-1-yl)-2-(methylthio)propan-1-one To a solution of 4-(2-(1-(2-(methylthio)propanoyl)piperidin-2-yl)-1H-imidazol-5-yl)benzaldehyde (300 mg, 0.839 mmol) in methanol (10 mL) was added 25% aqueous ammonium hydroxide (1176 mg, 8.390 mmol) and the mixture was stirred at rt for 24 h under argon atmosphere. The mixture was then treated with NaBH$_4$ (32 mg, 0.839 mmol) at 10° C. and stirred for 6 h at rt. The mixture was filtered and solvent was removed and purified by silica gel chromatography (hexane:EA=1:2) to give 1-(2-(5-(4-(aminomethyl)phenyl)-1H-imidazol-2-yl)piperidin-1-yl)-2-(methylthio)propan-1-one (62 mg, yield: 21%) as pale yellow solid. $^1$H NMR (300 MHz, DMSO-$d_6$, mixture of stereoisomers and tautomers) δ 12.11-11.80 (m, 1H), 7.78-7.15 (m, 5H), 5.78-5.41 (m, 1H), 5.17-5.13 (m, 1H), 4.55-4.42 (m, 2H), 4.41-2.17 (m, 5H), 2.09-1.97 (m, 3H), 1.86-1.22 (m, 8H). $^{13}$C NMR (75 MHz, DMSO-$d_6$, mixture of stereoisomers and tautomers) δ 170.2 (q), 170.1 (q), 147.1 (q), 147.0 (q), 146.8 (q), 140.5 (q), 140.4 (q), 140.3 (q), 140.3 (q), 133.9 (q), 127.3 (t), 127.0 (t), 124.4 (t), 113.3 (t), 113.0 (t), 63.3 (d), 63.1 (d), 51.5 (t), 47.3 (t), 47.0 (t), 43.2 (d), 43.0 (d), 38.8 (d), 38.0 (t), 37.6 (t), 37.3 (t), 28.6 (d), 28.1 (d), 28.0 (d), 26.1 (d), 25.7 (d), 25.4 (d), 20.3 (d), 20.1 (d), 18.3 (s), 18.0 (s), 17.8 (s), 11.9 (s), 11.7 (s) ppm.

Example 34: 1-(2-(5-(4-((methylamino)methyl)phenyl)-1H-imidazol-2-yl)piperidin-1-yl)-2-(methylthio)propan-1-one To a solution of 4-(2-(1-(2-(methylthio)propanoyl)piperidin-2-yl)-1H-imidazol-5-yl)benzaldehyde (200 mg, 0.559 mmol) in methanol (10 mL) was added methanamine hydrochloride (378 mg, 5.59 mmol) and triethylamine (566 mg, 5.59 mmol) and the mixture was stirred at rt for 24 h at under argon atmosphere. The mixture was then treated with NaBH$_4$ (21 mg, 0.559 mmol) at 10° C. and stirred for 6 h at rt. The mixture was filtered and solvent was removed and purified by silica gel chromatography (hexane:EA=1:2) to give 1-(2-(5-(4-((methylamino)methyl)phenyl)-1f-imidazol-2-yl)piperidin-1-yl)-2-(methylthio)propan-1-one (25 mg, yield: 12%) as pale yellow solid. GC/MS (EI): m/z (%): 370 (3) [M–2]+, 355 (5), 295 (10), 267 (100), 240 (11), 212 (12), 75 (40). $^1$H NMR (300 MHz, DMSO-$d_6$, mixture of stereoisomers and tautomers) δ 12.12-11.81 (m, 1H), 8.06-7.16 (m, 5H), 5.87-5.32 (m, 1H), 4.55-2.24 (m, 9H), 2.09-1.96 (m, 4H), 1.83-1.21 (m, 8H). $^{13}$C NMR (75 MHz, DMSO-$d_6$, mixture of stereoisomers and tautomers) δ 170.2 (q), 170.1 (q), 147.0 (q), 146.9 (q), 140.3 (q), 140.2 (q), 137.0 (q), 137.0 (q), 134.1 (q), 134.0 (q), 129.5 (t), 129.2 (t), 124.5 (t), 113.4 (t), 113.0 (t), 61.2 (d), 61.0 (d), 51.5 (t), 47.3 (t), 47.0 (t), 43.2 (d), 43.0 (d), 42.1 (s), 38.8 (d), 38.0 (t), 37.6 (t), 37.3 (t), 29.4 (d), 29.1 (d), 28.5 (d), 28.1 (d), 28.0 (d), 26.1 (d), 25.7 (d), 25.4 (d), 20.2 (d), 20.1 (d), 18.3 (s), 18.0 (s), 17.8 (s), 11.9 (s), 11.7 (s) ppm.

Example 35: methyl 4-(2-(1-(2-(methylthio)propanoyl)piperidin-2-yl)-1H-imidazol-5-yl)benzoate Following the general procedure described in Example 22b: 1-(2-(5-bromo-1H-imidazol-2-yl)piperidin-1-yl)-2-(methylthio)propan-1-one (500 mg, 1.505 mmol), (4-(methoxycarbonyl)phenyl)boronic acid (542 mg, 3.01 mmol), sodium carbonate (478 mg, 4.51 mmol), and 1,1'-bis(diphenylphosphino)ferrocene-palladium(II)dichloride dichloromethane complex (184 mg, 0.226 mmol) in tetrahydrofuran (10 mL) and water (1.5 mL) were reacted to give the title product (478 mg, yield: 82%) as white solid. GC/MS (EI): m/z (%): 387 (9) [M+], 341 (3), 312 (10), 284 (100), 257 (10), 229 (16), 75 (8). $^1$H NMR (300 MHz, DMSO-$d_6$, mixture of stereoisomers and tautomers) δ 12.26-12.04 (m, 1H), 7.96-7.77 (m, 5H), 5.81-5.44 (m, 1H), 4.55-2.95 (m, 3H), 3.86 (s, 3H), 2.66-2.16 (m, 1H), 2.13-1.33 (m, 11H). $^{13}$C NMR (75 MHz, DMSO-$d_6$, mixture of stereoisomers and tautomers) δ 170.7 (q), 170.4 (q), 170.3 (q), 170.0 (q), 166.6 (q), 148.0 (q), 147.8 (q), 147.7 (q), 140.1 (q), 140.0 (q), 139.2 (q), 138.8 (q), 130.0 (t), 127.1 (t), 127.0 (t), 124.5 (q), 115.9 (t), 115.5 (t), 115.4 (t), 52.3 (s), 51.5 (t), 47.3 (t), 47.0 (t), 43.2 (d), 43.0 (d), 38.8 (d), 38.0 (t), 37.6 (t), 37.3 (t), 28.5 (d), 28.0 (d), 27.9 (d), 26.0 (d), 25.6 (d), 25.4 (d), 20.3 (d), 20.1 (d), 18.2 (s), 17.9 (s), 17.8 (s), 11.8 (s), 11.6 (s) ppm.

Example 36: 2-(f ran-2-yl)-1-(2-(5-phenylimidazol-2-yl)piperidin-1-yl)ethan-1-one To a solution of 2-(5-phenylimidazol-2-yl)piperidine (200 mg, 0.88 mmol) in dichloromethane (2 mL) was added HOBt (162 mg, 1.056 mmol, 1.2 equiv.) and 3-(((ethylimino)methylene)amino)-N,N-dimethylpropan-1-amine hydrochloride (202 mg, 1.056 mmol, 1.2 equiv.) at 0~5° C. and the mixture was stirred at room temperature for 0.5 h. The mixture was then treated with 2-(furan-2-yl)acetic acid (122 mg, 0.968 mmol, 1.1 equiv.) and N,N-diisopropylethylamine (114 mg, 0.88 mmol, 1 equiv.) and the resulting mixture was stirred at rt. for 16 h. The mixture was filtered and solvent was removed and the crude purified by silica gel chromatography (gradient of EtOAc in Heptane) to give 2-(furan-2-yl)-1-(2-(5-phenylimidazol-2-yl)piperidin-1-yl) ethan-1-one (270 mg, 0.81 mmol, 91% yield) as a yellow liquid. MS (EI, 70 eV): 335 (5, [M]+*), 227 (13), 226 (79), 171 (28), 170 (11), 145 (16), 118 (12), 91 (13), 82 (10), 81 (100), 53 (52). $^1$H NMR (400 MHz, DMSO, mixture of stereoisomers and tautomers) δ 12.16, 12.07, 11.88 (brs, 1H), 7.82-7.72 (m, 2H), 7.71-7.51 (m, 2H), 7.45-7.29 (m, 2H), 7.28-7.11 (m, 1H), 6.46-6.19 (m, 2H), 5.79, 5.75, 5.33 (brs, 1H), 4.46-3.14 (m, 4H), 2.76-2.17 (m, 1H), 1.75-1.48 (m, 4H), 1.43-1.13 (m, 2H), 0.86 (t, J=6.9 Hz, 1H).

Example 37: 2-(methylthio)-1-(2-(5-phenylimidazol-2-yl)piperidin-1-yl)propan-1-one Prepared in the same way as Example 36, using 2-(5-phenylimidazol-2-yl)piperidine and 2-(methylthio)propanoic acid. Obtained the target compound as a white solid. MS (EI, 70 eV): 329 (2, [M]+*), 227 (16), 226 (100), 199 (13), 171 (25), 170 (12), 75 (69), 56 (16), 55 (15), 47 (19), 41 (19). $^1$H NMR (400 MHz, DMSO, mixture of stereoisomers and tautomers) δ 12.14, 12.05, 11.82 (brs, 1H), 7.82-7.71 (m, 2H), 7.69-7.50 (m, 1H), 7.45-7.28 (m, 2H), 7.27-7.11 (m, 1H), 5.82-5.40 (m, 1H), 4.50-3.06 (m, 3H), 2.76-2.12 (m, 1H), 2.08-1.97 (m, 3H), 1.95-1.44 (m, 5H), 1.41-1.32 (m, 3H) ppm.

Example 38: 2-(methylthio)-1-(2-(5-(p-tolyl)-1H-imidazol-2-yl)piperidin-1-yl)propan-1-one

Example 38a: tert-butyl 2-(5-(p-tolyl)-1H-imidazol-2-yl)piperidine-1-carboxylate A pressure vessel was charged with tert-butyl 2-(5-bromoimidazol-2-yl)piperidine-1-carboxylate (400 mg, 1.211 mmol), p-tolylboronic acid (181 mg, 1.332 mmol, 1.1 equiv.), sodium carbonate (257 mg, 2.42 mmol, 2 equiv.), 1,1'-bis(diphenylphosphino)-ferrocene-palladium(II)dichloride dichloromethane complex (49 mg, 0.061 mmol, 0.05 equiv.), tetrahydrofuran (5 mL) and water (1 mL). The mixture was degassed by purging with nitrogen and the vessel was sealed. The mixture was stirred and heated to 100° C. overnight. The resulting mixture was cooled to 0° C., the vessel was opened and the contents poured into aq. sat. NaHCO$_9$ solution (50 mL), extracted with EtOAc (2×50 mL), washed with water (50 mL) and brine (50 mL), dried over MgSO$_4$ and concentrated under reduced pressure. The crude material was purified by silica gel flash column chromatography eluting with a gradient of EtOAc in Heptane to give tert-butyl 2-(5-(p-tolyl)imidazol-2-yl)piperidine-1-carboxylate (314 mg, 0.920 mmol, 76% yield) as a white solid. MS (EI, 70 eV): 341 (4, [M]+*), 285 (11), 268 (3), 240 (30), 185 (100), 172 (16), 91 (6), 57 (99). 1H NMR (DMSO-$d_6$, 400 MHz, mixture of rotamers and tautomers): δ 11.66-12.09 (m, 1H), 7.49-7.70 (m, 2H), 7.20-7.48 (m, 1H), 7.08-7.23 (m, 2H), 5.34-5.23 (m, 1H), 3.89 (br d, J=12.1 Hz, 1H), 3.05 (br t, J=10.9 Hz, 1H), 2.28 (s, 3H), 2.18-2.25 (m, 1H), 1.65-1.78 (m, 1H), 1.22-1.63 (m, 13H) ppm. $^{13}$C NMR (75 MHz, DMSO, mixture of tautomers) δ 155.1 (q), 147.5 (q), 140.2 (q), 135.3 (q), 132.7 (q), 129.4 (t), 124.6 (t), 112.5 (t), 79.3 (q), 63.3 (d), 49.7 (t), 41.2 (d), 28.5 (s), 28.4 (d), 26.8 (d), 25.3 (d), 21.2 (s), 19.9 (d) ppm.

Example 38b: 2-(5-(p-tolyl)-1H-imidazol-2-yl)piperidine

A solution of tert-butyl 2-(5-(p-tolyl)imidazol-2-yl)piperidine-1-carboxylate (304 mg, 0.890 mmol) in dichloromethane (3 mL) was treated dropwise at 5° C. with trifluoroacetic acid (0.549 mL, 7.12 mmol, 8 equiv.) and the resulting mixture stirred at room temperature for 2 hours or until complete consumption of the starting material. The mixture was poured into iced water (30 mL) and the pH made basic by the addition of aqueous 1M NaOH solution. The mixture was then extracted with dichloromethane (3×20 mL), dried over MgSO$_4$ and concentrated under reduced pressure to give 2-(5-(p-tolyl)imidazol-2-yl)piperidine (160 mg, 0.664 mmol, 74% yield) as a pale yellow oil which was used in the next step without further purification. MS (EI, 70 eV): 241 (6, [M]+*), 185 (100), 172 (13), 158 (8), 91 (3), 84 (4). 1H NMR (CHLOROFORM-d, 400 MHz): δ 8.67-8.89 (br s, 1H), 7.50 (d, J=8.1 Hz, 2H), 7.19 (d, J=7.8 Hz, 2H), 7.13 (s, 1H), 4.14 (dd, J=12.3, 3.1 Hz, 1H), 3.30 (br d, J=12.7 Hz, 1H), 2.71-2.84 (m, 1H), 2.37 (s, 3H), 2.15-2.27 (m, 1H), 2.01 (br dd, J=14.4, 3.2 Hz, 1H), 1.90 (br d, J=13.4 Hz, 1H), 1.67-1.77 (m, 2H), 1.32-1.46 ppm (m, 1H).

Example 38c: 2-(methylthio)-1-(2-(5-(p-tolyl)imidazol-2-yl)piperidin-1-yl)propan-1-one Prepared in the same way as Example 36 using 2-(5-(p-tolyl)imidazol-2-yl)piperidine and 2-(methylthio)propanoic acid to furnish 2-(methylthio)-1-(2-(5-(p-tolyl)imidazol-2-yl)piperidin-1-yl)propan-1-one as a white solid. MS (EI, 70 eV): 343 (2, [M]+*), 241 (17), 240 (100), 213 (13), 185 (18), 184 (9), 75 (55), 56 (11), 55 (9), 47 (10), 41 (11). $^1$H NMR (400 MHz, DMSO-$d_6$, mixture of stereoisomers and tautomers) δ 12.07, 11.99, 11.95, 11.76 (brs, 1H), 7.72-7.60 (m, 2H), 7.59-7.42 (m, 1H), 7.26-7.08 (m, 2H), 5.75-5.39 (m, 1H), 4.49-3.00 (m, 3H), 2.71-2.15 (m, 1H), 2.30 (s, 3H), 2.07-1.96 (m, 3H), 1.94-1.48 (m, 5H), 1.43-1.34 (m, 3H) ppm. $^{13}$C NMR (101 MHz, DMSO-$d_6$, mixture of stereoisomers and tautomers) δ 170.2 (q), 170.2 (q), 170.0 (q), 147.0 (q), 146.8 (q), 146.7 (q), 140.4 (q), 140.3 (q), 139.9 (q), 135.3 (q), 135.2 (q), 135.1 (q), 132.7 (q), 132.6 (q), 132.6 (q), 129.7 (t), 129.3 (t), 124.6 (t), 113.0 (t), 112.6 (t), 112.5 (t), 51.5 (t), 47.3 (t), 47.0 (t), 43.1 (d), 43.0 (d), 38.8 (d), 38.0 (t), 37.6 (t), 37.3 (t), 28.8 (d), 28.6 (d), 28.1 (d), 27.9 (d), 26.1 (d), 25.7 (d), 25.4 (d), 21.2 (s), 20.3 (d), 20.1 (d), 18.3 (s), 18.0 (s), 17.8 (s), 11.9 (s), 11.7 (s), 11.6 (s) ppm.

Example 39: 2-methyl-1-(2-(5-(p-tolyl)-1H-imidazol-2-yl)piperidin-1-yl)but-3-en-1-one To a solution of 2-methylbut-3-enoic acid (0.597 g, 5.97 mmol) in dichloromethane (100 mL) was added HOBt (0.914 g, 5.97 mmol) and 3-(((ethylimino)methylene)amino)-N,N-dimethylpropan-1-amine (0.926 g, 5.97 mmol) at 0~5° C. and the mixture was stirred at rt, for 0.5 h. Then 2-(5-(p-tolyl)-1H-imidazol-2-yl)piperidine (1.2 g, 4.97 mmol) and DIPEA (1.563 ml, 8.95 mmol) was added and the mixture was stirred at rt, for 16 h. The suspension was filtered and solvent was removed and the crude product was purified by silica gel chromatography (hexane:MTBE=3:1) to give 2-methyl-1-(2-(5-(p-tolyl)-1H-imidazol-2-yl)piperidin-1-yl)but-3-en-1-one (808 mg, yield: 50%) as white solid. GC/MS (EI, mixture of stereoisomers, ratio 1:2): isomer 1: m/z (%): 323 (2) [M+], 268 (5), 240 (100), 172 (95), 117 (7), 84 (3), 55 (11). isomer 2: m/z (%): 323 (2) [M+], 268 (5), 240 (100), 211 (6), 172 (81), 117 (7), 84 (2), 55(10). $^1$H NMR (300 MHz, DMSO-d$_6$, mixture of stereoisomers and tautomers) δ 12.06, 11.81 (brs, 1H), 7.69-7.62 (m, 2H), 7.49 (s, 1H), 7.15 (d, J=7.3 Hz, 2H), 6.12-5.70 (m, 2H), 5.47-4.81 (m, 2H), 4.63-2.90 (m, 3H), 2.81-2.35 (m, 1H), 2.29 (s, 3H), 1.78-1.29 (m, 5H), 1.17 (t, J=5.6 Hz, 3H). $^{13}$C NMR (75 MHz, DMSO-d$_6$, mixture of stereoisomers and tautomers) δ 172.7 (q), 172.5 (q), 172.3 (q), 147.1 (q), 146.7 (q), 140.3 (q), 139.8 (q), 139.6 (t), 139.1 (t), 135.3 (q), 132.7 (q), 129.4 (t), 124.6 (t), 115.4 (d), 115.3 (d), 113.0 (t), 112.6 (t), 51.7 (t), 51.3 (t), 47.0 (t), 46.8 (t), 42.8 (d), 42.6 (d), 40.2 (t), 39.3 (t), 38.6 (d), 28.4 (d), 28.1 (d), 26.1 (d), 25.8 (d), 25.3 (d), 21.2 (s), 20.3 (d), 20.1 (d), 18.4 (s), 18.2 (s), 18.0 (s) ppm.

Example 40: 2,2-dimethyl-1-(2-(5-(p-tolyl)-1H-imidazol-2-yl)piperidin-1-yl)but-3-en-1-one Following the general procedure described in Example 39: 2,2-dimethylbut-3-enoic acid (170 mg, 1.492 mmol), HOBt (228 mg, 1.492 mmol), 3-(((ethylimino)methylene)amino)-N,N-dimethylpropan-1-amine (232 mg, 1.492 mmol), 2-(5-(p-tolyl)-1H-imidazol-2-yl)piperidine (300 mg, 1.243 mmol) and DIPEA (0.391 ml, 2.238 mmol) in dichloromethane (30 mL) were reacted to give the title product (255 mg, yield: 68%) as white solid. GC/MS (EI): m/z (%): 337 (1) [M+], 322 (3), 268 (10), 240 (89), 213 (6), 197 (6), 172 (100), 117(8), 69 (8). $^1$H NMR (300 MHz, DMSO-d$_6$, mixture of tautomers) δ 12.04-11.70 (m, 1H), 7.83-7.51 (m, 2H), 7.51-7.37 (m, 1H), 7.32-7.00 (m, 2H), 6.23-6.10 (m, 1H), 5.81-5.34 (m, 1H), 5.27-4.80 (m, 2H), 4.60-2.96 (m, 2H), 2.43-2.17 (m, 4H), 1.87-1.43 (m, 5H), 1.40-1.19 (m, 6H). $^{13}$C NMR (75 MHz, DMSO-d$_6$, mixture of tautomers) δ 174.1 (q), 147.0 (q), 144.4 (t), 139.9 (q), 135.2 (q), 132.7 (q), 129.7 (t), 129.3 (t), 124.5 (t), 112.9 (t), 112.5 (d), 52.7 (t), 47.6 (t), 45.1 (s), 43.9 (d), 28.0 (d), 27.4 (s), 27.1 (s), 25.3 (d), 21.2 (s), 20.2 (d) ppm.

Example 41: 2,2-dimethyl-1-(2-(5-(p-tolyl)-1-imidazol-2-yl)piperidin-1-yl)butan-1-one A solution of 2,2-dimethyl-1-(2-(5-(p-tolyl)-1H-imidazol-2-yl)piperidin-1-yl)but-3-en-1-one (120 mg, 0.356 mmol) in ethyl acetate (20 ml) was treated under nitrogen with Pd/C (10 wt %) (71 mg), placed under hydrogen atmosphere and stirred at room temperature overnight. The mixture was then purged with nitrogen, filtered over celite and evaporated to give a crude material which was purified by flash column chromatography (hexane:MTBE=3:1) to give the title product (88 mg, yield: 73%) as white solid. GC/MS (EI): m/z (%): 339 (2) [M+], 324 (1), 268 (3), 240 (100), 212 (3), 185 (12), 172 (3), 71 (12). $^1$H NMR (300 MHz, DMSO-d$_6$, mixture of tautomers) δ 12.02, 11.70 (brs, 1H), 7.83-7.59 (m, 2H), 7.57-7.38 (m, 1H), 7.26-7.04 (m, 2H), 5.75-5.69 (m, 1H), 4.20-3.08 (m, 2H), 2.40-2.19 (m, 4H), 1.86-1.32 (m, 7H), 1.20 (s, 6H), 0.88 (t, J=7.2 Hz, 3H). $^{13}$C NMR (75 MHz, DMSO-d$_6$, mixture of tautomers) δ 175.3 (q), 147.2 (q), 139.9 (q), 135.2 (q), 132.7 (q), 129.7 (t), 129.3 (t), 124.5 (t), 112.7 (t), 48.9 (t), 43.0 (q), 42.7 (d), 33.2 (d), 29.4 (d), 28.6 (d), 27.0 (s), 26.8 (s), 25.8 (d), 21.2 (s), 20.3 (d), 9.8 (s) ppm.

Example 42: 2,2,3-trimethyl-1-(2-(5-(p-tolyl)-1H-imidazol-2-yl)piperidin-1-yl)but-3-en-1-one Following the general procedure described in Example 39: 2,2,3-trimethylbut-3-enoic acid (191 mg, 1.492 mmol), HOBt (228 mg, 1.492 mmol), 3-(((ethylimino)methylene)amino)-N,N-dimethylpropan-1-amine (232 mg, 1.492 mmol), 2-(5-(p-tolyl)-1H-imidazol-2-yl)piperidine (300 mg, 1.243 mmol) and DIPEA (0.391 ml, 2.238 mmol) in dichloromethane (30 mL) were reacted to give the title product (237 mg, yield: 54%) as white solid. GC/MS (EI): m/z (%): 351 (6) [M+], 336 (6), 268(10), 240 (100), 224 (39), 172 (51), 117 (9), 83 (6), 55 (12). $^1$H NMR (300 MHz, DMSO-d$_6$, mixture of tautomers) δ 12.04-11.71 (m, 1H), 7.71-7.49 (m, 2H), 7.46 (s, 1H), 7.23-7.08 (m, 2H), 5.81-5.34 (m, 1H), 4.91-4.86 (m, 2H), 4.61-3.20 (m, 2H), 2.43-2.17 (m, 4H), 1.94-1.47 (m, 8H), 1.43-1.21 (m, 6H). $^{13}$C NMR (75 MHz, DMSO-d$_6$, mixture of tautomers) δ 174.1 (q), 150.6 (q), 147.1 (q), 139.7 (q), 135.2 (q), 132.7 (q), 129.7 (t), 129.3 (t), 124.5 (t), 124.3 (t), 112.6 (t), 109.0 (d), 48.1 (q), 47.4 (t), 43.0 (d), 29.5 (d), 28.5 (d), 27.0 (s), 26.5 (s), 25.4 (d), 21.2 (s), 20.2 (s), 20.2 (d) ppm.

Example 43: 2,2,3-trimethyl-1-(2-(5-(p-tolyl)-1H-imidazol-2-yl)piperidin-1-yl)butan-1-one Following the general procedure described in Example 41: Hydrogenation of 2,2,3-trimethyl-1-(2-(5-(p-tolyl)-1H-imidazol-2-yl)piperidin-1-yl)but-3-en-1-one (100 mg, 0.284 mmol) catalyzed by 10% Pd/C (57 mg) in ethyl acetate (20 ml) under hydrogen atmosphere to give the title product (82 mg, yield: 81%) as white solid. GC/MS (EI): m/z (%): 353 (1) [M+], 338 (1), 268 (3), 240 (100), 224 (3), 185 (15), 172 (4), 130 (4), 117 (4), 85 (10). $^1$H NMR (300 MHz, DMSO-d$_6$, mixture of tautomers) δ 12.00, 11.70 (brs, 1H), 7.81-7.50 (m, 2H), 7.45 (s, 1H), 7.28-7.05 (m, 2H), 5.79-5.65 (m, 1H), 4.34-3.02 (m, 2H), 2.54-2.10 (m, 2H), 2.28 (s, 3H), 1.72-1.27 (m, 5H), 1.13 (s, 6H), 0.92-0.81 (m, 6H). $^{13}$C NMR (75 MHz, DMSO-d$_6$, mixture of tautomers) δ 176.0 (q), 147.2 (q), 140.0 (q), 135.2 (q), 132.7 (q), 129.8 (t), 129.4 (t), 124.6 (t), 112.7 (t), 49.2 (t), 46.2 (q), 43.3 (d), 33.3 (t), 29.4 (d), 28.6 (d), 25.8 (d), 23.1 (s), 22.9 (s), 21.2 (s), 20.4 (d), 18.1 (s) ppm.

Example 44: 2-methyl-1-(2-(5-(p-tolyl)-1H-imidazol-2-yl)piperidin-1-yl)prop-2-en-1-one Following the general procedure described in Example 39: methacrylic acid (171 mg, 1.989 mmol), HOBt (305 mg, 1.989 mmol), 3-(((ethylimino)methylene)amino)-N,N-dimethylpropan-1-amine (309 mg, 1.989 mmol), 2-(5-(p-tolyl)-1H-imidazol-2-yl)piperidine (400 mg, 1.657 mmol) and DIPEA (0.521 ml, 2.98 mmol) in dichloromethane (30 mL) were reacted to give the title product (147 mg, yield: 30%) as white solid. GC/MS (EI): m/z (%): 309 (10) [M$^+$], 240 (100), 185 (12), 159 (36), 117 (6), 69 (6). $^1$H NMR (300 MHz, DMSO-d$_6$, mixture of tautomers) δ 12.15-11.91 (m, 1H), 7.66-7.14 (m, 5H), 5.74-5.11 (m, 3H), 4.52-2.67 (m, 2H), 2.46-2.18 (m, 4H), 1.90 (s, 3H), 1.78-1.30 (m, 5H). $^{13}$C NMR (75 MHz, DMSO-d$_6$, mixture of tautomers) δ 171.4 (q), 146.6 (q), 141.1 (q), 140.4 (q), 135.4 (q), 132.6 (q), 129.4 (t), 124.7 (t), 114.7 (d), 112.9 (t), 53.7 (t), 46.8 (t), 44.4 (d), 38.4 (d), 28.5 (d), 25.6 (d), 21.2 (s), 20.7 (s), 20.3 (d) ppm.

Example 45: 2-methyl-1-(2-(5-(p-tolyl)-1H-imidazol-2-yl)piperidin-1-yl)butan-1-one Following the general procedure described in Example 41: 2-methyl-1-(2-(5-(p-tolyl)-1H-imidazol-2-yl)piperidin-1-yl)but-3-en-1-one (350 mg, 1.082 mmol) was hydrogenated catalysed by 10% Pd/C (216 mg, 0.216 mmol) in ethyl acetate (20 ml) under hydrogen atmosphere to give the title product (290 mg, yield: 82%) as white solid. GC/MS (EI): m/z (%): 325 (10) [M$^+$], 268 (2), 240 (100), 224 (3), 185 (10), 159(2), 142 (1), 84 (2), 57 (4). $^1$H NMR (300 MHz, DMSO-d$_6$, mixture of stereoisomers and tautomers) δ 12.05-11.72 (m, 1H), 7.73-7.53 (m, 2H), 7.51-7.40 (m, 1H), 7.27-7.03 (m, 2H), 5.81-5.28 (m, 1H), 4.61-3.16 (m, 2H), 2.87-2.58 (m, 1H), 2.38-2.19 (m, 4H), 1.86-1.49 (m, 5H), 1.46-1.23 (m, 2H), 1.09-0.95 (m, 3H), 0.94-0.80 (m, 3H). $^{13}$C NMR (75 MHz, DMSO-d$_6$, mixture of stereoisomers and tautomers) δ 175.4 (q), 175.2 (q), 147.3 (q), 147.2 (q), 140.5 (q), 140.1 (q), 135.2 (q), 132.7 (q), 129.7 (t), 129.3 (t), 124.6 (t), 112.9 (t), 112.6 (t), 51.5 (t), 46.9 (t), 46.8 (t), 42.6 (d), 38.6 (d), 36.8 (t), 36.5 (t), 36.1 (t), 29.2 (d), 28.9 (d), 28.4 (d), 27.2 (d), 26.9 (d), 26.2 (d), 25.4 (d), 25.2 (d), 21.2 (s), 20.3 (d), 18.4 (s), 17.7 (s), 17.3 (s), 12.2 (s), 12.0 (s), 11.9 (s) ppm.

Example 46: 2-methyl-2-(methylthio)-1-(2-(5-(p-tolyl)-1H-imidazol-2-yl)piperidin-1-yl)propan-1-one Following the general procedure described in Example 39: 2-methyl-2-(methylthio)propanoic acid (0.267 g, 1.989 mmol), HOBt (305 mg, 1.989 mmol), 3-(((ethylimino)methylene)amino)-N,N-dimethylpropan-1-amine (309 mg, 1.989 mmol), 2-(5-(p-tolyl)-1H-imidazol-2-yl)piperidine (400 mg, 1.657 mmol) and DIPEA (0.521 ml, 2.980 mmol) in dichloromethane (30 mL) were reacted to give the title product (287 mg, yield: 48%) as white solid. GC/MS (EI): m/z (%): 357 (5) [M$^+$], 342(7), 268 (11), 240 (100), 185 (11), 159 (5), 117 (4), 89 (10). $^1$H NMR (300 MHz, DMSO-d$_6$, mixture of tautomers) δ 12.06, 11.82 (brs, 1H), 7.80-7.54 (m, 2H), 7.50 (s, 1H), 7.33-7.08 (m, 2H), 6.15-5.89 (m, 1H), 4.92-2.73 (m, 2H), 2.47-2.23 (m, 4H), 2.19-2.03 (m, 3H), 1.86-1.35 (m, 11H). $^{13}$C NMR (75 MHz, DMSO-d$_6$, mixture of tautomers) δ 171.1 (q), 170.8 (q), 148.3 (q), 146.8 (q), 140.1 (q), 136.1 (q), 135.2 (q), 132.6 (q), 131.6 (q), 129.7 (t), 129.7 (t), 129.3 (t), 124.6 (t), 112.8 (t), 53.5 (t), 48.4 (t), 47.6 (q), 44.4 (d), 29.3 (d), 28.6 (d), 27.6 (s), 25.8 (d), 21.2 (s), 20.2 (d), 12.9 (s) ppm.

Example 47: 2-(allylthio)-1-(2-(5-(p-tolyl)-1H-imidazol-2-yl)piperidin-1-yl)propan-1-one Following the general procedure described in Example 39: 2-(allylthio)propanoic acid (0.236 g, 1.616 mmol), HOBt (0.228 g, 1,492 mmol), 3-(((ethylimino)methylene)amino)-N,N-dimethylpropan-1-amine (232 mg, 1.492 mmol), 2-(5-(p-tolyl)-1H-imidazol-2-yl)piperidine (300 mg, 1.243 mmol) and DIPEA (0.391 ml, 2.238 mmol) in dichloromethane (30 mL) were reacted to give the title product (193 mg, yield: 42%) as white solid. GC/MS (EI, mixture of stereoisomers, ratio 5:4): isomer 1: m/z (%): 369 (2) [M$^+$], 328 (31), 268 (7), 240 (100), 185 (25), 159 (28). isomer 2: m/z (%): 369 (2) [M$^+$], 328 (43), 297 (3), 268 (9), 240 (100), 185 (29), 159 (29), 101 (6), 73 (5). $^1$H NMR (300 MHz, DMSO-d$_6$, mixture of stereoisomers and tautomers) δ 12.02, 11.79 (brs, 1H), 7.87-7.58 (m, 2H), 7.55-7.36 (m, 1H), 7.31-7.04 (m, 2H), 5.99-4.93 (m, 4H), 4.49-3.04 (m, 5H), 2.68-2.29 (s, 4H), 1.93-1.30 (m, 8H). $^{13}$C NMR (75 MHz, DMSO-d$_6$, mixture of stereoisomers and tautomers) δ 170.7 (q), 170.6 (q), 170.5 (q), 147.0 (q), 146.9 (q), 146.6 (q), 140.3 (q), 140.0 (q), 135.4 (q), 135.3 (q), 135.1 (t), 135.0 (t), 134.9 (t), 132.6 (q), 132.5 (q), 129.7 (t), 129.4 (t), 124.6 (t), 117.8 (d), 117.6 (d), 113.1 (t), 112.6 (t), 112.5 (t), 51.6 (t), 47.4 (t), 47.1 (t), 43.2 (d), 43.0 (d), 38.9 (d), 38.2 (t), 37.7 (t), 37.6 (t), 32.7 (d), 32.6 (d), 28.6 (d), 28.0 (d), 26.1 (d), 25.7 (d), 25.2 (d), 21.2 (s), 20.2 (d), 20.1 (d), 19.1 (s), 18.9 (s), 18.7 (s) ppm.

Example 48: (E)-2-methyl-1-(2-(5-(p-tolyl)-1H-imidazol-2-yl)piperidin-1-yl)pent-2-en-1-one Following the general procedure described in Example 39: (E)-2-methylpent-2-enoic acid (213 mg, 1.865 mmol), HOBt (381 mg, 2.486 mmol), 3-(((ethylimino)methylene)-amino)-N,N-dimethylpropan-1-amine (386 mg, 2.486 mmol), 2-(5-(p-tolyl)-1H-imidazol-2-yl)piperidine (300 mg, 1.243 mmol) and DIPEA (0.543 ml, 3.11 mmol) in dichloromethane (50 mL) were reacted to give the title product (76 mg, yield: 19%) as white solid. GC/MS (EI): m/z (%): 337 (5) [M$^+$], 308 (10), 240 (100), 224 (3), 185 (10), 159 (11), 132 (3), 117 (4), 97(3), 69 (6).

Example 49: 2-methyl-1-(2-(5-(p-tolyl)-1H-imidazol-2-yl)piperidin-1-yl)pentan-1-one Following the general procedure described in Example 41: (E)-2-methyl-1-(2-(5-(p-tolyl)-1H-imidazol-2-yl)piperidin-1-yl)pent-2-en-1-one (80 mg, 0.237 mmol) catalyzed by 10% Pd/C (47 mg, 0.047 mmol) in ethyl acetate (10 ml) under hydrogen atmosphere to give the title product (55 mg, yield: 68%) as white solid. GC/MS (EI, mixture of stereoisomers, ratio 1:1): isomer 1: m/z (%): 339 (8) [M$^+$], 310 (1), 268 (2), 240 (100), 224 (3), 185 (8), 159 (2), 117(3), 71 (2). isomer 2: m/z (%): 339 (8) [M$^+$], 310 (1), 268 (2), 240 (100), 224 (3), 185 (8), 159 (2), 117(3), 71 (1). $^1$H NMR (300 MHz, DMSO-d$_6$, mixture of stereoisomers and tautomers) δ 12.09-11.75 (brs, 1H), 7.71-7.08 (m, 5H), 5.83-5.32 (m, 1H), 4.47-2.89 (m, 3H), 2.48-2.22 (m, 4H), 1.70-0.84 (m, 15H). $^{13}$C NMR (75 MHz, DMSO-d$_6$, mixture of stereoisomers and tautomers) δ 175.5 (q), 175.2 (q), 147.2 (q), 147.1 (q), 146.8 (q), 140.4 (q), 140.0 (q), 139.9 (q), 135.3 (q), 135.2 (q), 132.7 (q), 132.6 (q), 129.7 (t), 129.3 (t), 124.6 (t), 112.6 (t), 112.5 (t), 51.5 (t), 51.3 (t), 46.8 (t), 46.8 (t), 42.6 (d), 38.5 (d), 38.4 (d), 37.2 (d), 36.5 (t), 36.4 (t), 36.2 (d), 34.6 (t), 34.4 (t), 29.4 (d), 29.1 (d), 28.4 (d), 26.2 (d), 25.4 (d), 25.2 (d), 21.2 (s), 20.4 (d), 20.3 (d), 18.2 (s), 17.6 (s), 14.6 (s), 14.5 (s) ppm.

Example 50: 2-methyl-1-(2-(5-(p-tolyl)-1H-imidazol-2-yl)piperidin-1-yl)butane-1,3-dione Following the general procedure described in Example 39: 2-methyl-3-oxobutanoic acid (144 mg, 1.243 mmol), HOBt (254 mg, 1.657 mmol), 3-(((ethylimino)methylene)amino)-N,N-dimethylpropan-1-amine (257 mg, 1.657 mmol), 2-(5-(p-tolyl)-1H-imidazol-2-yl)piperidine (200 mg, 0.829 mmol) and DIPEA (0.362 ml, 2.072 mmol) in dichloromethane (50 mL) were reacted to give the title product (45 mg, yield: 16%) as white solid. GC/MS (EI): m/z (%): 339 (1) [M⁺]297 (13), 268 (t), 240 (100), 212 (3), 198 (2), 185 (11), 172 (2), 117(5), 84 (2). ¹H NMR (300 MHz, DMSO-d₆, mixture of stereoisomers and tautomers) δ 11.94, 11.78 (brs, 1H), 7.63 (d, J=7.5 Hz, 2H), 7.42 (s, 1H), 7.14 (d, J=7.5 Hz, 2H), 5.76-5.21 (m, 1H), 4.52-3.04 (m, 2H), 2.70-2.24 (m, 6H), 2.11-1.05 (m, 10H) ppm.

Example 51: 1-(2-(5-benzyl-1H-imidazol-2-yl)piperidin-1-yl)-2-(methylthio)propan-1-one Prepared following an analogous procedure as described in Example 2, using tert-butyl-2-(5-bromo-1H-imidazol-2-yl)piperidine-1-carboxylate, 2-benzyl-4,4,5,5-tetramethyl-1,3,2-dioxaborolane and 2-(methylthio)propanoic acid to give the title product as a light yellow solid. GC/MS (EI): m/z (%): 343 (3) [M⁺], 328 (8), 297 (10), 268 (19), 240 (100), 213 (15), 185 (23), 130 (12), 91(19), 75 (24).

Example 52: 2-methyl-1-(2-(5-(p-tolyl)-1H-imidazol-2-yl)piperidin-1-yl)propan-1-one Following the general procedure described in Example 39: isobutyric acid (142 mg, 1.616 mmol), HOBt (228 mg, 1.492 mmol), 3-(((ethylimino)methylene)amino)-N,N-dimethylpropan-1-amine (232 mg, 1.492 mmol), 2-(5-(p-tolyl)-1H-imidazol-2-yl)piperidine (300 mg, 1.243 mmol) and DIPEA (0.391 ml, 2.238 mmol) in dichloromethane (30 mL) were reacted to give the title product (243 mg, yield: 63%) as white solid. GC/MS (EI): m/z (%): 311 (10) [M⁺], 268 (2), 240 (100), 185 (12), 159 (3), 117 (5). ¹H NMR (300 MHz, DMSO-d₆, mixture of tautomers) δ 11.94-11.72 (m, 1H), 7.81-7.53 (m, 2H), 7.52-7.30 (m, 1H), 7.24-7.02 (m, 2H), 5.78-5.29 (m, 1H), 4.55-2.38 (m, 3H), 2.28 (s, 3H), 1.81-1.16 (m, 6H), 1.12-0.97 (m, 6H). ¹³C NMR (75 MHz, DMSO-d₆, mixture of tautomers) δ 175.8 (q), 147.4 (q), 139.8 (q), 135.4 (q), 132.4 (q), 129.4 (t), 124.6 (t), 112.8 (t), 51.4 (t), 46.8 (t), 42.6 (d), 38.5 (d), 29.8 (t), 28.9 (d), 28.3 (d), 26.2 (d), 25.2 (d), 21.2 (s), 20.6 (s), 20.2 (d), 20.1 (s), 19.5 (s) ppm.

Example 53: 1-(2-(5-(p-tolyl)-1H-imidazol-2-yl)piperidin-1-yl)propan-1-one

Following the general procedure described in Example 39: propionic acid (120 mg, 1.616 mmol), HOBt (228 mg, 1.492 mmol), 3-(((ethylimino)methylene)amino)-N,N-dimethylpropan-1-amine (232 mg, 1.492 mmol), 2-(5-(p-tolyl)-1H-imidazol-2-yl)piperidine (300 mg, 1.243 mmol) and DIPEA (0.391 ml, 2.238 mmol) in dichloromethane (30 ml) were reacted to give the title product (239 mg, yield: 65%) as pale yellow solid. GC/MS (EI): m/z (%): 297 (10) [M⁺], 268 (t), 240 (100), 185 (13), 103 (3), 57 (10). ¹H NMR (300 MHz, DMSO-d₆, mixture of tautomers) δ 11.97, 11.75 (brs, 1H), 7.75-7.03 (m, 5H), 5.78-5.21 (m, 1H), 4.55-2.33 (m, 3H), 2.28 (s, 3H), 1.86-0.98 (m, 10H). ¹³C NMR (75 MHz, DMSO-d₆, mixture of tautomers) δ 172.7 (q), 147.2 (q), 146.8 (q), 140.3 (q), 135.3 (q), 132.6 (q), 129.3 (t), 124.67 (t), 113.0 (t), 112.6 (t), 51.3 (t), 46.9 (t), 42.5 (d), 38.4 (d), 28.5 (d), 28.0 (d), 26.3 (d), 26.0 (d), 25.8 (d), 25.2 (d), 21.1 (s), 20.2 (d), 9.8 (s) ppm.

Example 54: 2-(furan-3-yl)-1-(2-(5-(p-tolyl)-1H-imidazol-2-yl)piperidin-1-yl)propan-1-one Following the general procedure described in Example 39: 2-(furan-3-yl)propanoic acid (439 mg, 3.13 mmol), HOBt (480 mg, 3.13 mmol), 3-(((ethylimino)methylene)amino)-N,N-dimethylpropan-1-amine (486 mg, 3.13 mmol), 2-(5-(p-tolyl)-1H-imidazol-2-yl)piperidine (700 mg, 2.61 mmol) and DIPEA (0.647 ml, 3.92 mmol) in dichloromethane (30 mL) were reacted to give the title product (565 mg, yield: 57%) as white solid. GC/MS (EI, mixture of stereoisomers, ratio 1:1): isomer 1: m/z (%): 363 (4) [M⁺], 348 (3), 334 (t), 268 (6), 240 (100), 185 (19), 95 (41). isomer 2: m/z (%): 363 (3) [M⁺], 348 (3), 334 (t), 268 (8), 240 (100), 185 (18), 95 (40). ¹H NMR (300 MHz, DMSO-d₆, mixture of stereoisomers and tautomers) δ 12.10-11.79 (m, 1H), 7.91-7.13 (m, 7H), 6.56-6.42 (m, 1H), 5.52-5.29 (m, 1H), 4.45-3.77 (m, 2H), 3.21-2.67 (m, 1H), 2.29 (s, 3H), 1.58-1.29 (m, 7H). ¹³C NMR (75 MHz, DMSO-d₆, mixture of stereoisomers and tautomers) δ 172.5 (q), 172.4 (q), 147.2 (q), 147.0 (q), 146.6 (q), 143.8 (t), 143.7 (t), 143.2 (t), 140.5 (t), 139.7 (t), 135.2 (q), 132.7 (q), 129.6 (t), 129.4 (t), 127.9 (q), 126.6 (q), 126.5 (q), 125.8 (q), 124.6 (t), 113.1 (t), 112.7 (t), 110.9 (t), 110.4 (t), 51.4 (t), 47.2 (t), 43.1 (d), 42.8 (d), 40.8 (d), 39.1 (d), 38.7 (d), 32.9 (t), 32.7 (t), 28.5 (d), 27.7 (d), 26.0 (d), 25.4 (d), 25.1 (d), 21.2 (s), 20.3 (d), 20.1 (s), 20.0 (s), 19.3 (s) ppm.

Example 55: cyclopentyl(2-(5-(p-tolyl)-1H-imidazol-2-yl)piperidin-1-yl)methanone Following the general procedure described in Example 39: cyclopentanecarboxylic acid (255 mg, 2.238 mmol), HOBt (343 mg, 2.238 mmol), 3-(((ethylimino)methylene)amino)-N,N-dimethylpropan-1-amine (347 mg, 2.238 mmol), 2-(5-(p-tolyl)-1H-imidazol-2-yl)piperidine (500 mg, 1.865 mmol) and DIPEA (0.462 ml, 2.80 mmol) in dichloromethane (30 mL) were reacted to give the title product (286 mg, yield: 43%) as white solid. GC/MS (EI): m/z (%): 337 (4) [M⁺], 268 (1), 240 (100), 212 (4), 185 (14), 103 (2), 69 (22). ¹H NMR (300 MHz, DMSO-d₆, mixture of tautomers) δ 11.94-11.73 (m, 1H), 7.65-7.12 (m, 5H), 5.77-5.32 (m, 1H), 4.45-3.02 (m, 3H), 2.43-2.28 (m, 4H), 1.87-1.36 (m, 13H). ¹³C NMR (75 MHz, DMSO-d₆, mixture of tautomers) δ 174.7 (q), 174.6 (q), 147.2 (q), 146.9 (q), 140.4 (q), 140.0 (q), 135.2 (q), 132.7 (q), 129.6 (t), 129.3 (t), 124.6 (t), 112.9 (t), 112.6 (t), 51.4 (t), 46.9 (t), 42.6 (d), 40.9 (t), 38.6 (d), 30.8 (d), 30.3 (d), 29.9 (d), 29.5 (d), 28.8 (d), 28.1 (d), 26.3 (d), 26.1 (d), 25.3 (d), 21.2 (s), 20.3 (d) ppm.

Example 56: (2S)-2-methyl-1-(2-(5-(p-tolyl)-1H-imidazol-2-yl)piperidin-1-yl)butan-1-one Following the general procedure described in Example 39: (S)-2-methylbutanoic acid (0.84 g, 8.20 mmol), HOBt (1.37 g, 8.95 mmol), 3-(((ethylimino)methylene)amino)-N,N-dimethylpropan-1-amine (1.39 g, 8.95 mmol), 2-(5-(p-tolyl)-1H-imidazol-2-yl)piperidine (2.00 g, 7.46 mmol) and DIPEA (1.85 ml, 11.19 mmol) in dichloromethane (100 mL) were reacted to give the title product (1.62 g, yield: 67%) as white solid. GC/MS (EI): m/z (%): 325 (5) [M⁺], 310 (1), 268 (2), 240 (100), 185 (14), 171 (3), 159 (3), 84 (3), 57 (17). ¹H NMR (300 MHz, DMSO-d₆, mixture of stereoisomers and tautomers) δ 12.03-11.71 (m, 1H), 7.66-7.63 (m, 2H), 7.54-7.46 (m 1H), 7.20-7.11 (m, 2H), 5.84-5.27 (m, 1H), 4.45-3.83 (m, 1H), 3.39-3.26 (m, 1H), 2.78-2.74 (m, 1H), 2.69-2.43 (m, 1H), 2.29 (s, 3H), 1.67-1.29 (m, 7H), 1.08-1.04 (m, 3H), 0.89-0.85 (m, 3H). $^{13}$C NMR (75 MHz, DMSO-d$_6$, mixture of stereoisomers and tautomers) δ 175.3 (q), 175.2 (q), 175.1 (q), 148.5 (q), 147.2 (q), 147.1 (q), 146.8 (q), 140.5 (q), 140.0 (q), 136.0 (q), 135.1 (q), 132.7 (q), 129.7 (t), 129.3 (t), 124.6 (t), 112.9 (t), 112.6 (t), 51.4 (t), 46.8 (t), 42.6 (d), 40.8 (t), 38.5 (d), 36.4 (d), 28.4 (d), 27.2 (d), 26.9 (d), 26.3 (d), 25.5 (d), 21.2 (s), 20.3 (d), 17.7 (s), 17.3 (s), 12.1 (s), 12.0 (s) ppm.

Example 57: (E)-2-methyl-1-(2-(5-(p-tolyl)-1H-imidazol-2-yl)piperidin-1-yl)pent-3-en-1-one Following the general procedure described in Example 39: (E)-2-methylpent-3-enoic acid (255 mg, 2.24 mmol), HOBt (343 mg, 2.24 mmol), 3-(((ethylimino)methylene)amino)-N,N-dimethylpropan-1-amine (347 mg, 2.24 mmol), 2-(5-(p-tolyl)-1H-imidazol-2-yl)piperidine (500 mg, 1.86 mmol) and DIPEA (0.46 ml, 2.80 mmol) in dichloromethane (30 mL) were reacted to give the title product (460 mg, yield: 69%) as white solid. GC/MS (EI, mixture of stereoisomers, ratio 2:3): isomer 1: m/z (%): 337 (1) [M$^+$], 322 (1), 268 (8), 240 (100), 186 (96), 171 (9), 103 (5), 91 (3), 69 (34). isomer 2: m/z (%): 337 (1) [M$^+$], 322 (1), 268 (8), 240 (92), 186 (100), 171 (8), 159 (6), 103 (6), 69 (34). $^1$H NMR (300 MHz, DMSO-d$_6$, mixture of stereoisomers and tautomers) δ 12.03-11.75 (m, 1H), 7.62-7.13 (m, 5H), 5.77-5.16 (m, 3H), 4.41-2.62 (m, 3H), 2.42-2.23 (m, 4H), 1.68-1.09 (m, 11H) ppm.

Example 58: 2-methoxy-1-(2-(5-(p-tolyl)-1H-imidazol-2-yl)piperidin-1-yl)propan-1-one Following the general procedure described in Example 39: 2-methoxypropanoic acid (233 mg, 2.238 mmol), HOBt (343 mg, 2.238 mmol), 3-(((ethylimino)methylene)amino)-N,N-dimethylpropan-1-amine (347 mg, 2.238 mmol), 2-(5-(p-tolyl)-1H-imidazol-2-yl)piperidine (500 mg, 1.865 mmol) and DIPEA (0.46 ml, 2.80 mmol) in dichloromethane (30 mL) were reacted to give the title product (420 mg, yield: 65%) as white solid. GC/MS (EI, mixture of stereoisomers, ratio 28:72): isomer 1: m/z (%): 327 (6) [M$^+$], 312 (9), 268 (8), 240 (100), 185 (17), 171 (4), 159 (3), 103 (3), 59 (36). isomer 2: m/z (%): 327 (6) [M$^+$], 312 (8), 268 (8), 240 (100), 185 (17), 171 (4), 159 (3), 103 (3), 59 (34). $^1$H NMR (300 MHz, DMSO-d$_6$, mixture of stereoisomers and tautomers) δ 12.04-11.80 (m, 1H), 7.66-7.12 (m, 5H), 5.76-5.35 (m, 1H), 4.35-2.73 (m, 6H), 2.44-2.28 (m, 4H), 1.76-1.26 (m, 8H), $^{13}$C NMR (75 MHz, DMSO-d$_6$, mixture of stereoisomers and tautomers) δ 171.3 (q), 171.1 (q), 170.7 (q), 148.1 (q), 146.8 (q), 146.6 (q), 140.4 (q), 140.1 (q), 136.2 (q), 135.2 (q), 132.7 (q), 129.7 (t), 129.3 (t), 124.6 (t), 113.0 (t), 112.7 (t), 75.6 (t), 75.4 (t), 74.8 (t), 56.8 (s), 56.5 (s), 55.8 (s), 50.9 (t), 47.3 (t), 42.3 (d), 40.8 (d), 38.9 (d), 28.6 (d), 28.2 (d), 26.0 (d), 25.3 (d), 21.2 (s), 20.2 (d), 18.1 (s), 17.0 (s) ppm.

Example 59: 2-(methylthio)-1-(2-(5-(5-methylthiophen-2-yl)imidazol-2-yl)piperidin-1-yl)propan-1-one Prepared following an analogous procedure as described in Example 38, using tert-butyl-2-(5-bromo-1H-imidazol-2-yl)piperidine-1-carboxylate, (5-methylthiophen-2-yl)boronic acid and 2-(methylthio)propanoic acid to give the title product as a white solid. MS (EI, 70 eV): 349 (3, [M]+*), 247 (16), 246 (100), 219 (13), 191 (16), 84 (13), 75 (69), 56 (16), 55 (14), 47 (17), 41 (17).

Example 60: 2-(methylthio)-1-(2-(5-(4-(trifluoromethyl)phenyl)imidazol-2-yl)piperidin-1-yl)propan-1-one Prepared following an analogous procedure as described in Example 38 from tert-butyl 2-(5-bromoimidazol-2-yl)piperidine-1-carboxylate, (4-(trifluoromethyl)phenyl)boronic acid and 2-(methylthio)propanoic acid to furnish 2-(methylthio)-1-(2-(5-(4-(trifluoromethyl)phenyl)imidazol-2-yl)piperidin-1-yl)propan-1-one as a white solid. MS (EI, 70 eV): 397 (4, [M]+*), 382 (2), 378 (1), 322 (8), 294 (100), 239 (46), 84 (64), 82 (16), 75 (78), 56 (18), 55 (20), 47 (17), 41 (26), 28 (28).

Example 61: 2-(methylthio)-1-(2-(5-(p-tolyl)oxazol-2-yl)piperidin-1-yl)propan-1-one

Example 61a: Benzyl 2-((2-oxo-2-(p-tolyl)ethyl)carbamoyl)piperidine-1-carboxylate To a stirred solution of 1-((benzyloxy)carbonyl)piperidine-2-carboxylic acid (8.0 g, 0.030 mol) and 2-amino-1-(p-tolyl)ethan-1-one (5.00 g, 0.033 mol) in DMF (N,N-dimethylformamide) (80 ml) at 0° C. were added EDC·HCl (N-(3-Dimethylaminopropyl)-N'-ethylcarbodiimide hydrochloride) (8.6 g, 0.045 mol). HOBt (6.18 g, 0.045 mol) and N,N-diisopropylethylamine (16 ml, 0.045 mol). The reaction mixture allowed to stir overnight at RT, diluted with water (300 ml) and extracted with ethyl acetate (100 ml×3). The combined organic layer was washed with water (100 ml×3) and brine (150 ml). It was dried under Na$_2$SO$_4$ and concentrated under reduced pressure. The crude product was purified by flash column chromatography by using silica gel (230-400 mesh) using EtOAc in pet ether (0-25%) as eluent to give Benzyl 2-((2-oxo-2-(p-tolyl)ethyl)carbamoyl)piperidine-1-carboxylate (8.0 g, 50%) as a yellow liquid. LC-MS (ESI+): 395 (100, [M+H]+).

Example 61b: Benzyl 2-(5-(p-tolyl)oxazol-2-yl)piperidine-1-carboxylate

To a solution of Benzyl 2-((2-oxo-2-(p-tolyl)ethyl)carbamoyl)piperidine-1-carboxylate (7.5 g, 0.019 mol) in acetonitrile (140 ml), was added POCl3 (3.5 ml, 0.038 mol) and the reaction mixture was heated to 80° C. for 2 h. The reaction mixture was evaporated under reduced pressure and pH was adjusted to 8.0 by adding aq. sodium bicarbonate solution. The aqueous layer was extracted with ethyl acetate (100 ml×2) and the combined organic layer was washed with water (200 ml) and brine (100 ml). It was dried over sodium sulphate and evaporated under reduced pressure. The crude product was purified by flash column chromatography by using silica gel (230-400 mesh) using EtOAc in pet ether (0-25%) as eluent to give Benzyl 2-(5-(p-tolyl)oxazol-2-yl)piperidine-1-carboxylate (4.5 g, 63%) as a pale-yellow liquid. LC-MS (ESI+): 377 (100, [M+H]+).

Example 61c: 2-(piperidin-2-yl)-5-(p-tolyl)oxazole

To a stirred solution of Benzyl 2-(5-(p-tolyl)oxazol-2-yl)piperidine-1-carboxylate (4.5 g, 0.0119 mol) in methanol (90 ml) was added 10% Pd/C (0.45 g, 10 mol %) and it was stirred at RT (room temperature) for 16 h. The reaction mixture was filtered through a plug of celite, washed with methanol (40 mL). The filtrate was concentrated under reduced pressure, diluted with water (50 ml) and extracted with ethyl acetate (50 ml×3). The combined organic layer was washed with water (50 ml×3) and brine (50 ml). It was dried under $Na_2SO_4$ and concentrated under reduced pressure to give 2-(piperidin-2-yl)-5-(p-tolyl)oxazole (2.5 g, 63%) as a liquid. LC-MS (ESI+): 243 (100, [M+H]+). $^{13}$C NMR (101 MHz, DMSO) δ 165.1, 150.6 138.2, 130.0, 125.5, 124.3, 121.9, 54.3, 46.0, 30.3, 26.0, 24.0, 21.3 ppm.

Example 61d: 2-(methylthio)-1-(2-(5-(p-tolyl)oxazol-2-yl)piperidin-1-yl)propan-1-one Prepared following the general procedure described in Example 39 from 2-(piperidin-2-yl)-5-(p-tolyl)oxazole and 2-(methylthio)propanoic acid to give 2-(methylthio)-1-(2-(5-(p-tolyl)oxazol-2-yl)piperidin-1-yl)propan-1-one as a white solid. MS (EI, 70 eV): 344 (3, [M]+*), 241 (100), 119 (27), 91 (32), 84 (40), 75 (76), 56 (21), 55 (39), 47 (20), 41 (37), 28 (36). $^1$H NMR (400 MHz, DMSO, mixture of stereoisomers and tautomers) δ 7.64-7.50 (m, 3H), 7.28 (d, J=7.9 Hz, 2H), 5.91, 5.90, 5.64 (brs, 1H), 4.51-3.04 (m, 3H), 2.80-2.26 (m, 1H), 2.33 (s, 3H), 2.12-1.94 (m, 3H), 1.90-1.42 (m, 5H), 1.40-1.32 (m, 3H). $^{13}$C NMR (101 MHz, DMSO, mixture of stereoisomers and tautomers) δ 170.8 (q), 161.8 (q), 151.3 (q), 138.4 (q), 130.0 (t), 125.2 (q), 124.2 (t), 122.2 (t), 47.3 (t), 43.1 (d), 37.9 (t), 28.8 (d), 27.6 (d), 25.4 (d), 21.3 (s), 20.1 (d), 17.8 (s), 11.9 (s).

Example 62: 2-(methylthio)-1-(2-(5-(p-tolyl)-1,3,4-oxadiazol-2-yl)piperidin-1-yl)propan-1-one

Example 62a: tert-butyl 2-(2-(4-methylbenzoyl)hydrazine-1-carbonyl)piperidine-1-carboxylate To a stirred solution of 1-(tert-butoxycarbonyl)piperidine-2-carboxylic acid (3.0 g, 0.013 mol) and 4-methylbenzohydrazide (2.16 g, 0.014 mol) in DMF (30 ml) at 0° C. were added EDC·HCl (3.7 g, 0.0195 mol), HOBt (2.60 g, 0.0195 mmol) and N,N-diisopropylethylamine (6.8 ml, 0.039 mmol). The reaction mixture allowed to stir overnight at rt, diluted with water (15 ml) and extracted with ethyl acetate (25 ml×3). The combined organic layer was washed with water (15 ml×3) and brine (15 ml). It was dried under Na2SO4 and concentrated under reduced pressure. The crude was purified by silica gel column chromatography using 8% methanol in DCM (dichloromethane) as eluent to obtain tert-butyl 2-(2-(4-methylbenzoyl)hydrazine-1-carbonyl)piperidine-1-carboxylate as a pale yellow gummy solid (3.0 g). LC-MS (ESI–): 360 (100, [M–H]–).

Example 62b: tert-butyl 2-(5-(p-tolyl)-1,3,4-oxadiazol-2-yl)piperidine-1-carboxylate To a stirred solution of tert-butyl 2-(2-(4-methylbenzoyl)hydrazine-1-carbonyl)piperidine-1-carboxylate (4.5 g, 0.017 mol) in MeCN (50 ml) at 0° C. were added TsCl (p-toluenesulfonyl chloride) (3.56 g, 0.0186 mol) and triethylamine (7.1 ml, 0.051 mmol). The reaction mixture allowed to stir overnight at rt, quenched with sat. aq $K_2CO_3$ (50 ml). The reaction mixture was concentrated under reduced pressure, diluted with water (30 ml) and extracted with ethyl acetate (50 ml×3). The combined organic layer was washed with water (50 ml) and brine (50 ml). It was dried under $Na_2SO_4$ and concentrated under reduced pressure. The crude was purified by a silica gel column chromatography using 20% ethyl acetate in pet ether as eluent to obtain tert-butyl 2-(5-(p-tolyl)-1,3,4-oxadiazol-2-yl)piperidine-1-carboxylate as a yellow low melting solid (3.5 g). LC-MS (ESI+): 344 (57, [M+H]+), 288 (100), 244 (28). $^{13}$C NMR (101 MHz, DMSO) δ 165.4, 165.1, 155.0, 142.2, 131.4, 130.4, 130.0, 129.7, 129.6, 127.8, 127.0, 126.8, 121.0, 80.5, 53.5, 47.6, 42.0, 41.3, 37.9, 28.3, 27.2, 24.8, 21.6, 19.8 ppm.

Example 62c: 2-(piperidin-2-yl)-5-(p-tolyl)-1,3,4-oxadiazole

Prepared similarly to Example 38b from tert-butyl 2-(5-(p-tolyl)-1,3,4-oxadiazol-2-yl)piperidine-1-carboxylate to give 2-(piperidin-2-yl)-5-(p-tolyl)-1,3,4-oxadiazole as a yellow oil which was used without further purification.

Example 62d: 2-(methylthio)-1-(2-(5-(p-tolyl)-1,3,4-oxadiazol-2-yl)piperidin-1-yl)propan-1-one Prepared similarly to Example 39 from 2-(piperidin-2-yl)-5-(p-tolyl)-1,3,4-oxadiazole to give 2-(methylthio)-1-(2-(5-(p-tolyl)-1,3,4-oxadiazol-2-yl)piperidin-1-yl)propan-1-one as a white solid. MS (EI, 70 eV): 345 (3, [M]+*), 242 (36), 187 (27), 119 (43), 91 (37), 84 (100), 82 (25), 75 (73), 55 (32), 41 (29), 28 (27). $^1$H NMR (400 MHz, DMSO, mixture of stereoisomers and tautomers) δ 7.86 (d, J=8.1 Hz, 2H), 7.42 (d, J=8.0 Hz, 2H), 6.05, 6.04, 5.82 (brs, J=47.1 Hz, 1H), 4.54-2.98 (m, 3H), 2.85-2.22 (m, 1H), 2.41 (s, 3H), 2.11-2.02 (m, 3H), 1.95-1.44 (m, 5H), 1.41-1.32 (m, 3H). $^{13}$C NMR (101 MHz, DMSO, mixture of stereoisomers and tautomers) δ 170.9 (q), 165.3 (q), 164.8 (q), 142.6 (q), 130.4 (t), 126.9 (t), 121.0 (q), 45.7 (t), 43.2 (d), 37.7 (t), 27.3 (d), 25.2 (d), 21.6 (s), 20.0 (d), 17.7 (s), 11.8 (s).

Example 63: 2-(methylthio)-1-(4-(5-(p-tolyl)imidazol-2-yl)thiazolidin-3-yl)propan-1-one

Example 63a: 3-(2-(methylthio)propanoyl)thiazolidine-4-carboxylic acid

To a suspension of thiazolidine-4-carboxylic acid (2.010 g, 15.09 mmol) in dichloromethane (20 ml) and triethylamine (2.314 ml, 16.60 mmol) was added dropwise at 0° C. a solution of 2-(methylthio)propanoyl chloride (2.301 g, 16.60 mmol) in dichloromethane (10 ml). The reaction mixture was allowed to warm to r.t. and stirred overnight. The resulting mixture was poured on iced 1M HCl (100 mL), extracted with dichloromethane (2×50 mL), washed with 1M HCl (50 mL), water (50 mL), brine (50 mL), dried over MgSO4 and concentrated under reduced pressure to give 3-(2-(methylthio)propanoyl)thiazolidine-4-carboxylic acid (2.83 g, 15.09 mmol, 80% yield) as a colorless oil which was used without further purification. MS (ESI–): 234.2 (100, [M–H]–).

Example 63b: 2-oxo-2-(p-tolyl)ethyl 3-(2-(methylthio)propanoyl)thiazolidine-4-carboxylate A solution of crude 3-(2-(methylthio)propanoyl)thiazolidine-4-carboxylic acid (2.83 g, 12.03 mmol) in DMF (12 ml) was treated with triethylamine (1.844 ml, 13.23 mmol) and 2-bromo-1-(p-tolyl)ethan-1-one (2.82 g, 13.23 mmol) at room temperature. The resulting mixture was stirred overnight at then poured onto water (100 mL), extracted with EtOAc (2×100 mL), washed with 1M HCl (50 mL), sat. aq. NaHCO3 (50 mL), water (50 mL), brine (50 mL), dried over MgSO4 and concentrated under reduced pressure to give 2-oxo-2-(p-tolyl)ethyl 3-(2-(methylthio)propanoyl)thiazolidine-4-carboxylate (4.4 g, 12 mmol, quant.) as a yellow oil which was used in the next step without further purification. MS (EI, 70 eV): 367 (1, [M]+*), 264 (21), 234 (37), 119 (47), 91 (30), 75 (100).

Example 63c: 2-(methylthio)-1-(4-(5-(p-tolyl)imidazol-2-yl)thiazolidin-3-yl)propan-1-one To a solution of 2-oxo-2-(p-tolyl)ethyl 3-(2-(methylthio) propanoyl)thiazolidine-4-carboxylate (4.42 g, 12.03 mmol) in Toluene (60 ml) was added acetic acid (0.826 ml, 14.44 mmol) and ammonium acetate (20.40 g, 265 mmol). The mixture was slowly heated to reflux and stirred at reflux for 20 h. The resulting mixture was poured on water, extracted with EtOAc, washed with brine, dried over MgSO4 and concentrated under reduced pressure. The resulting crude material was purified by flash column chromatography on silica gel eluting with a gradient of EtOAc in Heptane to give 2-(methylthio)-1-(4-(5-(p-tolyl)imidazol-2-yl)thiazolidin-3-yl)propan-1-one (2.45 g, 7.05 mmol, 59% yield) as a pale yellow oil. MS (EI, 70 eV): 347 (11, [M]+*), 332 (4), 301 (14), 244 (59), 217 (33), 185 (100), 184 (94), 103 (17), 91 (15), 75 (59), 28 (23). $^1$H NMR (400 MHz, CDCl$_3$, mixture of stereoisomers and tautomers) δ 10.33, 10.03, 9.87 (brs, 1H), 7.51 (d, J=112.3 Hz, 2H), 7.19 (d, J=9.2 Hz, 3H), 5.92, 5.69, 5.59 (brs, 1H), 5.14-4.40 (m, 2H), 3.79-3.16 (m, 2H), 2.37 (s, 3H), 2.18-2.11 (m, 1H), 2.06 (s, 2H), 1.98 (s, 1H), 1.60-1.32 (m, 3H).

Example 64: 2-(methylthio)-1-((S-2-(5-(p-tolyl) imidazol-2-yl)piperidin-1-yl)propan-1-one

Example 64a: tert-butyl (S)-2-((2-oxo-2-(p-tolyl) ethyl)carbamoyl)piperidine-1-carboxylate A solution of (S)-1-(tert-butoxycarbonyl)piperidine-2-carboxylic acid (3.8 g, 16.57 mmol) in Dichloromethane (20 mL) was cooled to 5° C. HOBt (3.05 g, 19.89 mmol)) and EDC·HCl (3.81 g, 19.89 mmol) were added and the reaction mixture was stirred for 30 min at ambient temperature. 2-amino-1-(p-tolyl)ethan-1-one hydrochloride (3.08 g, 16.57 mmol) and N,N-diisopropylethylamine (2.89 mL, 16.57 mmol) was added and the reaction mixture was stirred overnight at ambient temperature. The red reaction mixture was poured into iced 1M HCl (100 mL) solution, twice extracted with CH2Cl2 (50 mL), washed with water (50 mL), dried over MgSO4 and concentrated under reduced pressure. The crude was purified by silica gel column chromatography eluting with a gradient of EtOAc in Heptane to give tert-butyl (S)-2-((2-oxo-2-(p-tolyl)ethyl)carbamoyl)piperidine-1-carboxylate (4.1 g, 11.37 mmol, 69% yield) as a yellow liquid. $^1$H NMR (DMSO-d$_6$, 400 MHz): δ=8.07 (br s, 1H), 7.90 (d, J=8.3 Hz, 2H), 7.35 (d, J=7.8 Hz, 2H), 4.45-4.77 (m, 3H), 3.85 (br d, J=12.7 Hz, 1H), 2.91-3.24 (m, 1H), 2.39 (s, 3H), 2.09-2.22 (m, 1H), 1.55 (range, 3H), 1.40 (br s, 9H), 1.19-1.35 ppm (m, 2H). MS (EI, 70 eV): 360 (1, [M]+*), 287 (2), 259 (2), 184 (23), 128 (100), 84 (81), 57 (39).

Example 64b: tert-butyl (S)-2-(5-(p-tolyl)imidazol-2-yl)piperidine-1-carboxylate tert-butyl (S)-2-((2-oxo-2-(p-tolyl)ethyl)carbamoyl)piperidine-1-carboxylate (4 g, 11.10 mmol), ammonium acetate (18.82 g, 244 mmol), acetic acid (0.762 mL, 13.32 mmol) and Toluene (50 mL) were heated to reflux and stirred over night. The mixture was cooled to ambient temp. and poured into iced water (50 mL). The organic layer was washed with water (2×50 mL) and brine (50 mL), dried over MgSO4 and concentrated under reduced pressure. The crude material was purified by silica gel column chromatography eluting with a gradient of EtOAc in Heptane to give tert-butyl (S)-2-(5-(p-tolyl)imidazol-2-yl)piperidine-1-carboxylate (1.03 g, 3.02 mmol, 27% yield) as a white solid. MS (EI, 70 eV): 341 (4, [M]+*), 285 (12), 268 (4), 240 (23), 185 (85), 91 (6), 57 (100).

Example 64c: (S)-2-(5-(p-tolyl)imidazol-2-yl)piperidine

Prepared in the same way as Example 38b from (S)-2-(5-(p-tolyl)imidazol-2-yl)piperidine-1-carboxylate to give (S)-2-(5-(p-tolyl)imidazol-2-yl)piperidine as an orange solid which was used in the next step without further purification.

Example 64d: 2-(methylthio)-1-((S)-2-(5-(p-tolyl) imidazol-2-yl)piperidin-1-yl)propan-1-one Prepared in the same way as Example 36 from (S)-2-(5-(p-tolyl)imidazol-2-yl)piperidine (0.40 g, 1.66 mmol) and racemic 2-(methylthio)propanoic acid (0.20 g, 1.66 mmol) to give 2-(methylthio)-1-((S)-2-(5-(p-tolyl)imidazol-2-yl)piperidin-1-yl)propan-1-one (0.150 g, 0.44 mmol, 26% yield) as an off white solid. MS (EI, 70 eV): 343 (4, [M]+*), 241 (17), 240 (100), 213 (17), 185 (21), 184 (11), 132 (11), 130 (11), 117 (17), 75 (49), 41 (13). $^1$H NMR (400 MHz, DMSO, mixture of stereoisomers and tautomers) δ 12.07, 12.02, 11.99, 11.95 (brs, 1H), 7.65 (dd, J=8.0, 2.8 Hz, 2H), 7.58-7.40 (m, 1H), 7.29-7.07 (m, 2H), 5.79-5.40 (brs, 1H), 4.49-2.97 (m, 3H), 2.78-2.35 (m, 1H), 2.34-2.25 (m, 3H), 2.20-1.96 (m, 3H), 1.95-1.42 (m, 5H), 1.42-1.32 (m, 3H). $^{13}$C NMR (101 MHz, DMSO, mixture of stereoisomers and tautomers) δ 170.2 (q), 170.0 (q), 147.0 (q), 146.8 (q), 146.7 (q), 140.3 (q), 135.3 (q), 135.2 (q), 135.1 (q), 132.7 (q), 132.6 (q), 132.6 (q), 129.7 (t), 129.3 (t), 124.8 (t), 124.7 (t), 124.6 (t), 113.0 (t), 112.6 (t), 112.5 (t), 47.3 (t), 47.0 (t), 43.1 (d), 43.0 (d), 38.8 (d), 38.0 (t), 37.6 (t), 37.3 (t), 28.8 (d), 28.6 (d), 28.1 (d), 27.9 (d), 26.1 (d), 25.7 (d), 25.4 (d), 21.2 (s), 20.3 (d), 20.1 (d), 20.1 (d), 18.3 (s), 18.0 (s), 17.8 (s), 11.9 (s), 11.7 (s), 11.6 (s).

Example 65: 2-(methylsulfonyl)-1-(2-(5-(p-tolyl) imidazol-2-yl)piperidin-1yl)propan-1-one 2-(methylthio)-1-(2-(5-(p-tolyl)imidazol-2-yl)piperidin-1-yl)propan-1-one (30 mg, 0.087 mmol) was treated with Water (0.5 ml) and Acetic acid (0.5 ml) and finally with 35% aqueous hydrogen peroxide (0.153 ml, 1.747 mmol) and the mixture stirred overnight at room temperature (r.t.). The mixture was extracted with EtOAc (20 mL), washed with water (10 mL), brine (10 mL), dried over MgSO4 and concentrated under reduced pressure. The crude was purified by silica gel column chromatography eluting with a gradient of EtOAc in Heptane to give 2-(methylsulfonyl)-1-(2-(5-(p-tolyl)imidazol-2-yl)piperidin-1-yl)propan-1-one (25 mg, 0.067 mmol, 76% yield) as a pale yellow foam. HRMS (ESI+): calcd. for $C_{19}H_{26}O_3N_3S$ [M+H]+: 376.1689; found: 376.1696.

Example 66: 2-(methylsulfinyl)-1-(2(5-(p-tolyl)-1H-imidazol-2-yl)piperidin-1-yl)propan-1-one Obtained as a byproduct in the preparation of 2-(methylsulfonyl)-1-(2-(5-(p-tolyl)imidazol-2-yl)piperidin-1-yl)propan-1-one (Example 65). Purified by silica gel column chromatography eluting with a gradient of EtOAc in Heptane to give 2-(methylsulfonyl)-1-(2-(5-(p-tolyl)imidazol-2-yl)piperidin-1-yl)propan-1-one (4 mg, 0.011 mmol, 13% yield) as a pale yellow film. HRMS (ESI+): calcd. for $C_{19}H_{26}O_2N_3S$ [M+H]+: 360.1740; found: 360.1746.

Example 67: (S)-2-(methylthio)-1-((R)-2-(5-(p-tolyl)imidazol-2-yl)piperidin-1-yl)propan-1-one Example 67a: (S)-2-(methylthio)propanoic acid (S)-2-mercaptopropanoic acid (5.0 g, 47 mmol) was added dropwise to the solution of sodium hydroxide (3.8 g, 94 mmol) in water (12 mL) at 10° C. Iodomethane (10.0 g, 71 mmol) was added dropwise over 30 min. The mixture was stirred at rt. for 4 h. The mixture was poured into 2N HCl solution, MTBE (50 mL) was added, the organic phase was separated and the solvent was removed to give (S)-2-(methylthio)propanoic acid (4.8 g, yield: 85%) as light yellow oil. GC/MS (EI): m/z (%): 120 (59) [M+], 105 (t), 91 (t), 87 (t), 75 (100), 59 (15), 55 (6).

Example 67b: (R)-2-(5-(p-tolyl)imidazol-2-yl)piperidine

Prepared in the same way as in Example 64 but starting from (R)-1-(tert-butoxycarbonyl)piperidine-2-carboxylic acid and using (S)-2-(methylthio)propanoic acid in the final step to give (S)-2-(methylthio)-1-((R)-2-(5-(p-tolyl)imidazol-2-yl)piperidin-1-yl)propan-1-one as an off-white solid. MS (EI, 70 eV): 343 (2, [M]+*), 241 (16), 240 (93), 213 (16), 185 (19), 75 (100), 57 (14), 56 (24), 55 (23), 47 (24), 41 (28). $^1$H NMR (400 MHz, DMSO-$d_6$, mixture of rotamers and tautomers) δ 11.95 (brs, 1H), 7.63 (d, J=8.0 Hz, 2H), 7.58-7.42 (m, 1H), 7.28-7.06 (m, 2H), 5.64 (brs, 1H), 4.55-3.38 (m, 3H), 2.80-2.32 (m, 5H), 2.32-2.25 (m, 3H), 2.22-1.96 (m, 3H), 1.96-1.40 (m, 5H), 1.39-1.31 (m, 3H) ppm.

Example 68: 2-(methylthio)-1-(2-(5-(p-tolyl)isoxazol-3-yl)piperidin-1-yl)propan-1-one Example 68a: tert-butyl (E)-2-((hydroxyimino)methyl)piperidine-1-carboxylate To a stirred solution of tert-butyl 2-formylpiperidine-1-carboxylate (4.0 g, 0.0187 mol) in methanol-water (1:1, 80 ml) at 0° C. were added sodium carbonate (1.19 g, 0.01122 mol) and hydroxylamine hydrochloride (1.55 g, 0.0213 mol). It was stirred 0° C. for 30 min followed by overnight at rt. It was concentrated under reduced pressure to half of its volume and extracted with ethyl acetate (50 mL×2), The combined organic layer was washed with brine (20 ml), dried under $Na_2SO_4$ and concentrated under reduced pressure to obtain tert-butyl (E)-2-((hydroxyimino)methyl)piperidine-1-carboxylate as a colorless oil. The crude product (4.27 g) was used in the next step without purification.

Example 68b: tert-butyl (Z)-2-(chloro(hydroxyimino)methyl)piperidine-1-carboxylate To a solution of tert-butyl(E)-2-((hydroxyimino)methyl)piperidine-1-carboxylate (4.25 g, 16.17 mmol) in DMF (45 ml) at rt, was added N-chlorosuccinimide (2.73 g, 17.8 mmol) in portions. The reaction mixture was stirred at 40° C. for 1 h. It was cooled to rt, diluted with ethyl acetate (150 ml), washed with water (50 ml) and brine (50 ml). The organic layer was dried under sodium sulfate and concentrated under reduced pressure to obtain tert-butyl (Z)-2-(chloro(hydroxyimino)methyl)piperidine-1-carboxylate as a gummy solid (6.4 g) which was used in the next step without purification.

Example 68c: tert-butyl 2-(5-(p-tolyl)isoxazol-3-yl)piperidine-1-carboxylate

To a stirred solution of tert-butyl (Z)-2-(chloro(hydroxyimino)methyl)piperidine-1-carboxylate (6.4 g, 24.35 mmol) in DCM (102 ml) at 0° C. were added 4 (7.54 ml, 64.13 mmol) and triethylamine (4.2 ml, 30.11 mmol) dropwise. After 30 min it was warmed to rt and stirred at rt for 3 days. The reaction mixture was concentrated, diluted with ethyl acetate (200 ml) and washed with water (30 ml×2). It was washed with brine (50 ml), dried under sodium sulfate and concentrated under reduced pressure. The crude material was purified by column chromatography using 20% ethyl acetate in pet ether as eluent to obtain 3.5 g of tert-butyl 2-(5-(p-tolyl)isoxazol-3-yl)piperidine-1-carboxylate as a white solid. LC-MS (ESI+): 343 (16, [M+H]+), 243 (100). $^{13}$C NMR (101 MHz, DMSO) δ 205.2, 169.9, 164.5, 154.6, 140.4, 129.7, 125.6, 124.9, 98.3, 79.1, 48.6, 40.6, 27.7, 27.6, 25.1, 20.5, 19.7 ppm.

Example 68d: 3-(piperidin-2-yl)-5-(p-tolyl)isoxazole

Prepared in a similar way as Example 38b using tert-butyl 2-(5-(p-tolyl)isoxazol-3-yl)piperidine-1-carboxylate to give 3-(piperidin-2-yl)-5-(p-tolyl)isoxazole as a yellow oil which was used in the next step without further purification.

Example 68e: 2-(methylthio)-1-(2-(5-(p-tolyl)isoxazol-3-yl)piperidin-1-yl)propan-1-one Prepared similarly to Example 36 using 3-(piperidin-2-yl)-5-(p-tolyl)isoxazole and 2-(methylthio)propanoic acid to give 2-(methylthio)-1-(2-(5-(p-tolyl)isoxazol-3-yl)piperidin-1-yl)propan-1-one as a yellow liquid. MS (EI, 70 eV): 344 (3, (M)+*), 179 (22), 119 (100), 91 (36), 84 (56), 82 (19), 75 (75), 56 (20), 55 (33), 41 (30), 28 (25). $^1$H NMR (400 MHz, DMSO, mixture of stereoisomers and tautomers) δ 7.85-7.66 (m, 2H), 7.34 (d, J=7.9 Hz, 2H), 7.00-6.54 (m, 1H), 5.87-5.55 (m, 1H), 4.13-2.86 (m, 3H), 2.36 (s, 3H), 2.31-2.00 (m, 4H), 1.85-1.42 (m, 5H), 1.37 (d, J=5.3 Hz, 3H) ppm. $^{13}$C NMR (101 MHz, DMSO, mixture of stereoisomers and tautomers) δ 170.8 (q), 170.4 (q), 169.9 (q), 164.4 (q), 164.3 (q), 140.7 (q), 130.2 (t), 126.0 (t), 124.6 (q), 99.4 (t), 46.3 (t), 42.8 (d), 37.7 (t), 27.8 (d), 25.5 (d), 21.4 (s), 21.2 (s), 20.0 (d), 17.8 (s), 11.8 (s) ppm.

Example 69: (R)-2-(methylthio)-1-((R)-2-(5-(p-tolyl)imidazol-2-yl)piperidin-1-yl)propan-1-one Example 69a: (R)-2-(methylthio)propanoic acid Prepared as in Example 67a from (R)-2-mercaptopropanoic acid to give (R)-2-(methylthio)propanoic acid as a colorless oil. GC/MS (EI): m/z (%): 120 (62) [M+].

Example 69b: (R)-2-(methylthio)-1-((R)-2-(5-(p-tolyl)imidazol-2-yl)piperidin-1-yl)propan-1-one Prepared in the same way as in Example 64 but starting from (R)-1-(tert-butoxycarbonyl)piperidine-2-carboxylic acid and using (R)-2-(methylthio)propanoic acid in the final step to give (R)-2-(methylthio)-1-((R)-2-(5-(p-tolyl)imidazol-2-yl)piperidin-1-yl)propan-1-one as an off-white solid. MS (EI, 70 eV): 343 (4, [M]+*), 241 (17), 240 (100), 213 (17), 185 (21), 184 (11), 132 (11), 130 (11), 117 (17), 75 (49), 41 (13). $^1$H NMR (400 MHz, DMSO-d6, mixture of rotamers and tautomers) δ 11.98, 11.75 (brs, 1H), 7.64 (d, J=6.5 Hz, 2H), 7.48 (s, 1H), 7.14 (d, J=7.0 Hz, 2H), 5.77-5.39 (m, 1H), 4.66-3.04 (m, 3H), 2.47-2.32 (m, 1H), 2.29 (s, 3H), 2.14-1.98 (m, 3H), 1.77-1.41 (m, 5H), 1.40-1.33 (m, 3H) ppm. $^{13}$C NMR (101 MHz, DMSO-d6, mixture of rotamers and tautomers) δ 170.2 (q), 146.9 (q), 140.3 (q), 135.2 (q), 132.6 (q), 129.7 (t), 129.3 (t), 124.6 (t), 113.0 (t), 112.7 (t), 49.7 (t), 47.2 (t), 43.2 (d), 43.0 (d), 38.7 (t), 37.6 (t), 37.3 (t), 28.8 (d), 28.1 (d), 25.7 (d), 25.4 (d), 22.5 (d), 21.2 (s), 20.2 (d), 20.1 (d), 18.0 (s), 17.8 (s), 17.1 (s), 11.9 (s), 11.6 (s) ppm.

Example 70: 2-mercapto-1-(2-(5-(p-tolyl)imidazol-2-yl)piperidin-1-yl)propan-1-one Example 70a: 1-(2-(5-(p-tolyl)imidazol-2-yl)piperidin-1-yl)-2-(tritylthio)propan-1-one Prepared in the same way as Example 36 using 2-(5-(p-tolyl)imidazol-2-yl)piperidine and 2-(tritylthio)propanoic acid to give 1-(2-(5-(p-tolyl)imidazol-2-yl)piperidin-1-yl)-2-(tritylthio)propan-1-one as a white solid. MS (EI, 70 eV): 328 (4), 268 (2), 243 (92), 240 (36), 165 (100), 78 (40).

Example 70b: 2-mercapto-1-(2-(5-(p-tolyl)imidazol-2-yl)piperidin-1-yl)propan-1-one A solution of 1-(2-(5-(p-tolyl)imidazol-2-yl)piperidin-1-yl)-2-(tritylthio)propan-1-one (0.43 g, 0.752 mmol) and triethylsilane (0.024 mL, 0.150 mmol) in Dichloromethane (4 mL) was treated with trifluoroacetic acid (0.579 mL, 7.52 mmol) at 5° C. The reaction mixture was stirred for 2 h at ambient temperature then poured into iced 1M NaOH (20 mL), extracted with dichloromethane (50 mL), washed with water (20 mL) and brine (20 mL), dried over MgSO4 and concentrated under reduced pressure. The crude was puried by silica gel flash column chromatography eluting with a gradient of Heptane and a mixture of 80% EtOAc, 10% Hexanes, 9% EtOH and 1% Et3N to give 2-mercapto-1-(2-(5-(p-tolyl)imidazol-2-yl)piperidin-1-yl)propan-1-one (0.210 g, 0.637 mmol, 85% yield) as a white solid. MS (EI, 70 eV): 329 (3, [M]+*), 296 (t), 268 (6), 240 (83), 61 (100).

Example 71: 2-(methylthio)-1-(R)-2-(5-phenylimidazol-2-yl)pyrrolidin-1-yl)propan-1-one Prepared similarly to Example 36 from (R)-5-phenyl-2-(pyrrolidin-2-yl)-1H-imidazole dihydrochloride and and 2-(methylthio)propanoic acid and employing two additional molar equivalents of N,N-diisopropylethylamine to give 2-(methylthio)-1-((R)-2-(5-phenylimidazol-2-yl)pyrrolidin-1-yl)propan-1-one as an orange solid. MS (EI, 70 eV): 315 (3, [M]+*), 300 (5), 269 (4), 240 (4), 212 (36), 172 (19), 77 (13), 75 (100), 47 (32).

Example 72: 2-amino-1-(2-(5-(p-tolyl)imidazol-2-yl)piperidin-1-yl)propan-1-one

Example 72a: tert-butyl (1-oxo-1-(2-(5-(p-tolyl)imidazol-2-yl)piperidin-1-yl)propan-2-yl)carbamate Prepared similarly to Example 36 from 2-(5-(p-tolyl)imidazol-2-yl)piperidine and (tert-butoxycarbonyl)alanine to give tert-butyl (1-oxo-1-(2-(5-(p-tolyl)imidazol-2-yl)piperidin-1-yl)propan-2-yl)carbamate as a white solid which was used in the next step without further purification.

Example 72b: 2-amino-1-(2-(5-(p-tolyl)imidazol-2-yl)piperidin-1-yl)propan-1-one

A solution of tert-butyl (1-oxo-1-(2-(5-(p-tolyl)imidazol-2-yl)piperidin-1-yl)propan-2-yl)carbamate (0.20 g, 0.49 mmol) in dichloromethane (2 mL) was treated at room temperature with trifluoroacetic acid (0.44 g, 3.88 mmol, 8 equiv.). The resulting mixture was stirred for 3 h and then poured into iced water (20 mL), treated with 2M NaOH (20 mL), extracted with dichloromethane (2×30 mL), dried over MgSO4 and concentrated under reduced pressure to give 2-amino-1-(2-(5-(p-tolyl)imidazol-2-yl)piperidin-1-yl)propan-1-one (0.125 g, 0.400 mmol, 83% yield) as a white solid. MS (EI, 70 eV): 312 (3, [M]+*), 240 (41), 44 (100).

Example 73: 2,5-difluoro-4-(2-(1-(2-(methylthio)propanoyl)piperidin-2-yl)-1H-imidazol-4-yl)benzonitrile Prepared following an analogous procedure as described in Example 38, from tert-butyl 2-(5-bromoimidazol-2-yl)piperidine-1-carboxylate, (4-cyano-2,5-difluorophenyl)boronic acid and 2-(methylthio)propanoic acid to furnish 2,5-difluoro-4-(2-(1-(2-(methylthio)propanoyl)piperidin-2-yl)imidazol-4-yl)benzonitrile as a yellow film. HRMS (ESI+): calcd. for $C_{19}H_{20}F_2N_4OS$ [M+H]+: 391.1399; found: 391.1395.

Example 74: (2-(4-phenylimidazol-2-yl)piperidin-1-yl)(1,2,3-thiadiazol-5-yl)methanone Prepared similarly to Example 36 from 2-(5-phenylimidazol-2-yl)piperidine and 1,2,3-Thiadiazole-5-carboxylic acid to give (2-(4-phenylimidazol-2-yl)piperidin-1-yl)(1,2,3-thiadiazol-5-yl)methanone as a pale yellow solid. HRMS (ESI+): calcd. for $C_{17}H_{17}N_5OS$ [M+H]+: 340.1227; found: 340.1223.

Example 75: 2-(furan-3-yl)-1-(2-(4-phenylimidazo-2-yl)piperidin-1-yl)ethan-1-one Prepared similarly to Example 36 from 2-(5-phenylimidazol-2-yl)piperidine and 3-Furanacetic acid to give 2-(furan-3-yl)-1-(2-(4-phenylimidazol-2-yl)piperidin-1-yl)ethan-1-one as a pale yellow solid. HRMS (ESI+): calcd. for $C_{20}H_{21}N_3O_2$ [M+H]+: 336.1707; found: 336.1699.

Example 76: (tetrahydrofuran-3-yl)(2-(4-(p-tolyl)-1H-imidazol-2-yl)piperidin-1-yl)methanone Prepared similarly to Example 36 from 2-(5-(p-tolyl)imidazol-2-yl)piperidine and tetrahydrofuran-3-carboxylic acid to give (tetrahydrofuran-3-yl)(2-(4-(p-tolyl)-1H-imidazol-2-yl)piperidin-1-yl)methanone as a pale yellow oil. HRMS (ESI+): calcd. for $C_{20}H_{25}N_3O_2$ [M+H]+: 340.2020; found: 340.2013.

Example 77: 3,3-difluoro-1-(2-(4-phenyl-1H-imidazol-2-yl)piperidin-1-yl)butan-1-one Prepared similarly to Example 36 from 2-(5-phenylimidazol-2-yl)piperidine and 3,3-difluorobutanoic acid to give 3,3-difluoro-1-(2-(4-phenyl-1H-imidazol-2-yl)piperidin-1- yl)butan-1-one as a white solid. HRMS (ESI+): calcd. for $C_{18}H_{21}F_2N_3O$ [M+H]+: 334.1725; found: 334.1720.

Example 78: cyclobutyl(2-(5-(3-fluorophenyl)imidazol-2-yl)piperidin-1-yl)methanone Prepared following an analogous procedure as described in Example 38, from tert-butyl 2-(5-bromoimidazol-2-yl)piperidine-1-carboxylate, (3-fluorophenyl)boronic acid and cyclobutanecarboxylic acid to furnish cyclobutyl(2-(5-(3-fluorophenyl)-1H-imidazol-2-yl)piperidin-1-yl)methanone as a pale yellow film. HRMS (ESI+): calcd. for $C_{49}H_{22}FN_3O$ [M+H]+: 328.1820; found: 328.1814.

Example 79: 1-(2-(5-(3-fluorophenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, (3-fluorophenyl)boronic acid and 2-(methylthio)propanoic acid to furnish 1-(2-(5-(3-fluorophenyl)-1H-imidazol-2-yl)piperidin-1-yl)-2-(methylthio)propan-1-one as a pale yellow film. HRMS (ESI+): calcd. for $C_{18}H_{22}FN_3OS$ [M+H]+: 348.1540; found: 348.1532.

Example 80: 3-methyl-1-(2-(4-phenyl-1H-imidazol-2-yl)piperidin-1-yl)butan-1-one Prepared similarly to Example 36 from 2-(5-phenylimidazol-2-yl)piperidine and 3-methylbutanoic acid to give 3-methyl-1-(2-(4-phenyl-1H-imidazol-2-yl)piperidin-1-yl)butan-1-one as a white solid. HRMS (ESI+): calcd. for $C_{19}H_{25}N_3O$ [M+H]+: 312.2070; found: 312.2064.

Example 81: 3-(2-(1-(2-(methylthio)propanoyl)piperidin-2-yl)-1H-imidazol-4-yl)benzonitrile Prepared following an analogous procedure as described in Example 38, from tert-butyl 2-(5-bromoimidazol-2-yl)piperidine-1-carboxylate, (3-cyanophenyl)boronic acid and 2-(methylthio)propanoic acid to furnish 3-(2-(1-(2-(methylthio)propanoyl)piperidin-2-yl)-1H-imidazol-4-yl)benzonitrile as a pale yellow film. HRMS (ESI+): calcd. for $C_{19}H_{22}N_4OS$ [M+H]+: 355.1587; found: 355.1581.

Example 82: 4-(2-(1-(2-(methylthio)propanoyl)piperidin-2-yl)-1H-imidazol-4-yl)benzonitrile Prepared following an analogous procedure as described in Example 38, from tert-butyl 2-(5-bromoimidazol-2-yl)piperidine-1-carboxylate, (4-cyanophenyl)boronic acid and 2-(methylthio)propanoic acid to furnish 4-(2-(1-(2-(methylthio)propanoyl)piperidin-2-yl)-1H-imidazol-4-yl)benzonitrile as a yellow film. HRMS (ESI+): calcd. for $C_{19}H_{22}N_4OS$ [M+H]+: 355.1587; found: 355.1581.

Example 83: 2-(methylsulfonyl)-1-(2-(4-phenyl-1H-imidazol-2-yl)piperidin-1-yl)ethan-1-one Prepared similarly to Example 36 from 2-(5-phenylimidazol-2-yl)piperidine and 2-(methylsulfonyl)acetic acid to give 2-(methylsulfonyl)-1-(2-(4-phenyl-1H-imidazol-2-yl)piperidin-1-yl)ethan-1-one as a pale yellow oil. HRMS (ESI+): calcd. for $C_{17}H_{21}N_3O_3S$ [M+H]+: 348.1376; found: 348.1370.

Example 84: 2-cyclopentyl-2-ethoxy-1-(2-(4-phenyl-1H-imidazol-2-yl)piperidin-1-yl)ethan-1-one Prepared similarly to Example 36 from 2-(5-phenylimidazol-2-yl)piperidine and 2-cyclopentyl-2-ethoxyacetic acid to give 2-cyclopentyl-2-ethoxy-1-(2-(4-phenyl-1H-imidazol-2-yl)piperidin-1-yl)ethan-1-one as a pale yellow oil. HRMS (ESI+): calcd. for $C_{23}H_{31}N_3O_2$ [M+H]+: 382.2489; found: 382.2481.

Example 85: 2-methyl-3-(methylthio)-1-(2-(4-phenyl-1H-imidazol-2-yl)piperidin-1-yl)propan-1-one Prepared similarly to Example 36 from 2-(5-phenylimidazol-2-yl)piperidine and 2-methyl-3-(methylthio)propanoic acid to give 2-methyl-3-(methylthio)-1-(2-(4-phenyl-1H-imidazol-2-yl)piperidin-1-yl)propan-1-one as a yellow oil. HRMS (ESI+): calcd. for $C_{19}H_{25}N_3OS$ [M+H]+: 344.1791; found: 344.1786.

Example 86: 2-(methylthio)-1-(2-(4-(thiophen-3-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 3-Thienylboronic acid and 2-(methylthio)propanoic acid to furnish 2-(methylthio)-1-(2-(4-(thiophen-3-yl)-1H-imidazol-2-yl)piperidin-1-yl)propan-1-one as a yellow film. HRMS (ESI+): calcd. for $C_{18}H_{21}N_3OS_2$ [M+H]+: 336.1199: found: 336.1192.

Example 87: 1-(2-(4-(4-fluorophenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-fluorophenylboronic acid and 2-(methylthio)propanoic acid to furnish 1-(2-(4-(4-fluorophenyl)-1H-imidazol-2-yl)piperidin-1-yl)-2-(methylthio)propan-1-one as a yellow film. HRMS (ESI+): calcd. for $C_{18}H_{22}FN_3OS$ [M+H]+: 348.1540; found: 348.1533.

Example 88: 2-(methylsulfonyl)-1-(2-(4-phenyl-1H-imidazol-2-yl)piperidin-1-yl)propan-1-one Prepared similarly to Example 36 from 2-(5-phenylimidazol-2-yl)piperidine and 2-(methylsulfonyl)propanoic acid to give 2-(methylsulfonyl)-1-(2-(4-phenyl-1H-imidazol-2-yl)piperidin-1-yl)propan-1-one as a white waxy solid. HRMS (ESI+): calcd. for $C_{18}H_{23}N_3O_3S$ [M+H]+: 362.1533; found: 362.1524.

Example 89: 2-(methylthio-1-(2-(4-p-tolyl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, o-Tolylboronic acid and 2-(methylthio)propanoic acid to furnish 2-(methylthio)-1-(2-(4-(o-tolyl)-1H-imidazol-2-yl)piperidin-1-yl)propan-1-one as a colorless film. HRMS (ESI+): calcd. for $C_{19}H_{25}N_3OS$ [M+H]+: 344.1791; found: 344.1786.

Example 90: 2-(methylthio)-1-(2-(4-(pyridin-4-yl)-1H-imidazol-2-yl)piperidin-1-yl)propan-1-one Prepared following an analogous procedure as described in Example 38, from tert-butyl 2-(5-bromoimidazol-2-yl)

piperidine-1-carboxylate, 4-Pyridinylboronic acid and 2-(methylthio)propanoic acid to furnish 2-(methylthio)-1-(2-(4-(pyridin-4-yl)-1H-imidazol-2-yl)piperidin-1-yl)propan-1-one as a pale yellow film. HRMS (ESI+): calcd. for $C_{17}H_{22}N_4OS$ [M+H]+: 331.1587; found: 331.1582.

Example 91: 1-(2-(4-(2-chlorophenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-chlorophenylboronic acid and 2-(methylthio)propanoic acid to furnish 1-(2-(4-(2-chlorophenyl)-1H-imidazol-2-yl)piperidin-1-yl)-2-(methylthio)propan-1-one as a pale yellow film. HRMS (ESI+): calcd. for $C_{18}H_{22}ClN_3OS$ [M+H]+: 364.1245: found: 364.1238.

Example 92: 1-(2-(4-(4-ethylphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-ethylphenylboronic acid and 2-(methylthio)propanoic acid to furnish 1-(2-(4-(4-ethylphenyl)-1H-imidazol-2-yl)piperidin-1-yl)-2-(methylthio)propan-1-one as a pale yellow film. HRMS (ESI+): calcd. for $C_{20}H_{27}N_3OS$ [M+H]+: 358.1948; found: 358.1942.

Example 93: 1-(2-(4-(4-hydroxyphenyl)-1H-imidazol-2-yl)piperidin-1-yl)-2-(methylthio)propan-1-one Prepared following an analogous procedure as described in Example 38, from tert-butyl 2-(5-bromoimidazo-2-yl)piperidine-1-carboxylate, 4-hydroxyphenylboronic acid and 2-(methylthio)propanoic acid to furnish 1-(2-(4-(4-hydroxyphenyl)-1H-imidazol-2-yl)piperidin-1-yl)-2-(methylthio)propan-1-one as a pale yellow film. HRMS (ESI+): calcd. for $C_{18}H_{23}N_3O_2S$ [M+H]+: 346.1584; found: 346.1578.

Example 94: 2-(methylthio)-1-(2-(4-(m-tolyl) 1H-imidazol-2-yl)piperidin-1-yl)propan-1-one Prepared following an analogous procedure as described in Example 38, from tert-butyl 2-(5-bromoimidazol-2-yl)piperidine-1-carboxylate, m-tolylboronic acid and 2-(methylthio)propanoic acid to furnish 2-(methylthio)-1-(2-(4-(m-tolyl)-1H-imidazol-2-yl)piperidin-1-yl)propan-1-one as a pale yellow film. HRMS (ESI+): calcd. for $C_{19}H_{25}N_3OS$ [M+H]+: 344.1791; found: 344.1786.

Example 95: 1-(2-(4-(2-fluorophenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-fluorophenylboronic acid and 2-(methylthio)propanoic acid to furnish 1-(2-(4-(2-fluorophenyl)-1H-imidazol-2-yl)piperidin-1-yl)-2-(methylthio)propan-1-one as a pale yellow oil. HRMS (ESI+): calcd. for $C_{19}H_{22}N_3OS$ [M+H]+: 348.1540; found: 348.1535.

Example 96: 2-methyl-1-(2-(4-phenyl-1H-imidazol-2-yl)piperidin-1-yl)propan-1-one Prepared similarly to Example 36 from 2-(5-phenylimidazol-2-yl)piperidine and isobutyric acid to give 2-methyl-1-(2-(4-phenyl-1H-imidazol-2-yl)piperidin-1-yl)propan-1-one as a white solid. HRMS (ESI+): calcd. for $C_{18}H_{23}N_3O$ [M+H]+: 298.1914; found: 298.191.

Example 97: 2-methoxy-1-(2-(4-phenyl-1H-imidazol-2-yl)piperidin-1-yl)propan-1-one Prepared similarly to Example 36 from 2-(5-phenylimidazol-2-yl)piperidine 2-methoxypropanoic acid to give 2-methoxy-1-(2-(4-phenyl-1H-imidazol-2-yl)piperidin-1-yl)propan-1-one as a white solid. HRMS (ESI+): calcd. for $C_{18}H_{23}N_3O_2$ [M+H]+: 314.1863; found: 314.1859.

Example 98: 3,3,4,4-pentafluoro-1-(2-(4-phenyl-1H-imidazol-2-yl)piperidin-1-yl)butan-1-one Prepared similarly to Example 36 from 2-(5-phenylimidazol-2-yl)piperidine 3,3,4,4,4-pentafluorobutanoic acid to give 3,3,4,4,4-pentafluoro-1-(2-(4-phenyl-1H-imidazol-2-yl)piperidin-1-yl)butan-1-one as a pale yellow film. HRMS (ESI+): calcd. for $C_{18}H_{18}F_5N_3O$ [M+H]+: 388.1443; found: 388.1439.

Example 99: N-(4-(2-(1-(2-(methylthio)propanoyl)piperidin-2-yl)-1H-imidazol-4-yl)phenyl)methanesulfonamide Prepared following an analogous procedure as described in Example 38, from tert-butyl 2-(5-bromoimidazol-2-yl)piperidine-1-carboxylate, (4-(methylsulfonamido)phenyl)boronic acid and 2-(methylthio)propanoic acid to furnish N-(4-(2-(1-(2-(methylthio)propanoyl)piperidin-2-yl)-1H-imidazol-4-yl)phenyl)methanesulfonamide as a pale yellow wax. HRMS (ESI+): calcd. for $C_{19}H_{26}N_4O_3S_2$ [M+H]+: 423.1519; found: 423.1515.

Example 100: 1-(2-(4-(4-methoxy-2-methylphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-Methoxy-2-methylphenylboronic acid and 2-(methylthio)propanoic acid to furnish 1-(2-(4-(4-methoxy-2-methylphenyl)-1H-imidazol-2-yl)piperidin-1-yl)-2-(methylthio)propan-1-one as a pale yellow film. HRMS (ESI+): calcd. for $C_{20}H_{27}N_3O_2S$ [M+H]+: 374.1897; found: 374.1894.

Example 101: 2-(methylthio)-1-(2-(4-(5-methylthiophen-3-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, (5-methylfuran-3-yl)boronic acid and 2-(methylthio)propanoic acid to furnish 2-(methylthio)-1-(2-(4-(5-methylthiophen-3-yl)-1H-imidazol-2-yl)piperidin-1-yl)propan-1-one as a pale yellow film. HRMS (ESI+): calcd. for $C_{17}H_{23}N_3OS_2$ [M+H]+: 350.1355; found: 350.1352.

Example 102: 1-(2-(4-(5-methylpyridin-3-yl)-1H-imidazol-2-yl)piperidin-1-yl)-2-(methylthio)propan-1-one Prepared following an analogous procedure as described in Example 38, from tert-butyl 2-(5-bromoimidazol-2-yl)

piperidine-1-carboxylate, 5-Methylpyridine-3-boronic acid and 2-(methylthio)propanoic acid to furnish 1-(2-(4-(5-methylpyridin-3-yl)-1H-imidazol-2-yl)piperidin-1-yl)-2-(methylthio)propan-1-one as a pale yellow film. HRMS (ESI+): calcd. for $C_{18}H_{24}N_4OS$ [M+H]+: 345.1744; found: 345.1743.

Example 103: 1-(2-(4-(2-hydroxyphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-hydroxyphenylboronic acid and 2-(methylthio)propanoic acid to furnish 1-(2-(4-(2-hydroxyphenyl)-1H-imidazol-2-yl)piperidin-1-yl)-2-(methylthio)propan-1-one as a yellow film. HRMS (ESI+): calcd. for $C_{18}H_{23}N_3O_2S$ [M+H]+: 346.1584; found: 346.1584.

Example 104: 1-(2-(4-(3,5-difluorophenyl-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 3,5-difluorophenylboronic acid and 2-(methylthio)propanoic acid to furnish 1-(2-(4-(3,5-difluorophenyl)-1H-imidazol-2-yl)piperidin-1-yl)-2-(methylthio)propan-1-one as a yellow film. HRMS (ESI+): calcd. for $C_{18}H_{21}F_2N_3OS$ [M+H]+: 366.1446; found: 366.1446.

Example 105: 1-(2-(4-(6-methylpyridin-3-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 6-Methylpyridine-3-boronic acid and 2-(methylthio)propanoic acid to furnish 1-(2-(4-(6-methylpyridin-3-yl)-1H-imidazol-2-yl)piperidin-1-yl)-2-(methylthio)propan-1-one as a pale yellow film. HRMS (ESI+): calcd. for $C_{17}H_{24}N_4OS$ [M+H]+: 345.1744; found: 345.1744.

Example 106: 1-(2-(4-(5-methylfuran-2-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 5-Methyl-2-furanboronic acid and 2-(methylthio)propanoic acid to furnish 1-(2-(4-(5-methylfuran-2-yl)-1H-imidazol-2-yl)piperidin-1-yl)-2-(methylthio)propan-1-one as a pale yellow film. HRMS (ESI+): calcd. for $C_{17}H_{23}N_3O_2S$ [M+H]+: 334.1584; found: 334.1583.

Example 107: 1-(2-(4-(4-methyl-3-(trifluoromethyl)phenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, [4-methyl-3-(trifluoromethyl)phenyl]boronic acid and 2-(methylthio)propanoic acid to furnish 1-(2-(4-(4-methyl-3-(trifluoromethyl)phenyl)-1H-imidazol-2-yl)piperidin-1-yl)-2-(methylthio)propan-1-one as a pale yellow film. HRMS (ESI+): calcd. for $C_{20}H_{24}F_3N_3OS$ [M+H]+: 412.1665; found: 412.1665.

Example 108: 1-(2-(4-(2-methoxypyrimidin-5-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-Methoxypyrimidine-5-boronic acid and 2-(methylthio)propanoic acid to furnish 1-(2-(4-(2-methoxypyrimidin-5-yl)-1H-imidazol-2-yl)piperidin-1-yl)-2-(methylthio)propan-1-one as a yellow oil. HRMS (ESI+): calcd. for $C_{17}H_{23}N_5O_2S$ [M+H]+: 362.1645; found: 362.1642.

Example 109: 1-(2-(4-(benzo[b]thiophen-6-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 6-(4,4,5,5-Tetramethyl-1,3,2-dioxaborolan-2-yl)benzothiophene and 2-(methylthio)propanoic acid to furnish 1-(2-(4-(benzo[b]thiophen-6-yl)-1H-imidazol-2-yl)piperidin-1-yl)-2-(methylthio)propan-1-one as a yellow film. HRMS (ESI+): calcd. for $C_{20}H_{23}N_3OS_2$ [M+H]+: 386-1355; found: 386.1353.

Example 110: 1-(2-(4-(2,3-dihydrobenzofuran-6-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, (2,3-Dihydrobenzofuran-6-yl)boronic acid and 2-(methylthio)propanoic acid to furnish 1-(2-(4-(2,3-dihydrobenzofuran-6-yl)-1H-imidazol-2-yl)piperidin-1-yl)-2-(methylthio)propan-1-one as a pale yellow film. HRMS (ESI+): calcd. for $C_{20}H_{25}N_3O_2S$ [M+H]+: 372.1740; found: 372.1737.

Example 111: 2-(methylthio)-1-(2-(4-(4-vinylphenyl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 4-Vinylphenylboronic acid and 2-(methylthio)propanoic acid to furnish 2-(methylthio)-1-(2-(4-(4-vinylphenyl)-1H-imidazol-2-yl)piperidin-1-yl)propan-1-one as a white wax. HRMS (ESI+): calcd. for $C_{20}H_{25}N_3OS$ [M+H]+: 356.1791; found: 356.1788.

Example 112: 1-(2-(4-(3-(dimethylamino)methyl)phenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 3-(N,N-Dimethylaminomethyl)phenylboronic acid and 2-(methylthio)propanoic acid to furnish 1-(2-(4-(3-((dimethylamino)methyl)phenyl)-1H-imidazol-2-yl)piperidin-1-yl)-2-(methylthio)propan-1-one as a pale yellow film. HRMS (ESI+): calcd. for $C_{21}H_{30}N_4OS$ [M+H]+: 387.2213: found: 387.2208.

Example 113: 1-(2-(4-(4-isopropylphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-isopropylphenylboronic acid and 2-(methylthio)propanoic acid to furnish 1-(2-(4-(4-isopropylphenyl)-1H-imidazol-2-yl)piperidin-1-yl)-2-(methylthio)propan-1-one as a pale yellow film. HRMS (ESI+): calcd. for $C_{21}H_{29}N_3OS$ [M+H]+: 372.2104; found: 372.2101.

Example 114: 1-(2-(4-(4-cyclopropyl-2-fluorophenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-cyclopropyl-2-fluorophenylboronic acid pinacol ester and 2-(methylthio)propanoic acid to furnish 1-(2-(4-(4-cyclopropyl-2-fluorophenyl)-1H-imidazol-2-yl)piperidin-1-yl)-2-(methylthio)propan-1-one as a pale yellow film. HRMS (ESI+): calcd. for $C_{21}H_{26}FN_3OS$ [M+H]+: 388.1853; found: 388.1847.

Example 115: 1-(2-(4-(2-fluoro-4-methoxyphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-fluoro-4-methoxyphenylboronic acid and 2-(methylthio)propanoic acid to furnish 1-(2-(4-(2-fluoro-4-methoxyphenyl)-1H-imidazol-2-yl)piperidin-1-yl)-2-(methylthio)propan-1-one as a pale yellow film. HRMS (ESI+): calcd. for $C_{19}H_{24}FN_3O_2S$ [M+H]+: 378.1646; found: 378.1642.

Example 116: 1-(2-(4-(4-(methylsulfonyl)phenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-(Methanesulfonyl)phenylboronic acid and 2-(methylthio)propanoic acid to furnish 1-(2-(4-(4-(methylsulfonyl)phenyl)-1H-imidazol-2-yl)piperidin-1-yl)-2-(methylthio)propan-1-one as a colorless wax. HRMS (ESI+): calcd. for $C_{19}H_{25}N_3O_3S_2$ [M+H]+: 408.1410; found: 408.1406.

Example 117: 1-(2-(4-(3,5-dimethylisoxazol-4-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 3,5-dimethylisoxazol-4-yl-4-boronic acid and 2-(methylthio)propanoic acid to furnish 1-(2-(4-(3,5-dimethylisoxazol-4-yl)-1H-imidazol-2-yl)piperidin-1-yl)-2-(methylthio)propan-1-one as a pale yellow oil. HRMS (ESI+): calcd. for $C_{17}H_{24}N_4O_2S$ [M+H]+: 349.1693; found: 349.1689.

Example 118: 1-(2-(4-(2,3-dihydrobenzofuran-5-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2,3-dihydro-1-benzofuran-5-yl-boranediol and 2-(methylthio)propanoic acid to furnish 1-(2-(4-(2,3-dihydrobenzofuran-5-yl)-1H-imidazol-2-yl)piperidin-1-yl)-2-(methylthio)propan-1-one as a yellow film. HRMS (ESI+): calcd. for $C_{20}H_{25}N_3O_2S$ [M+H]+: 372.1740; found: 372.1736.

Example 119: 1-(2-(4-(3-methylfuran-2-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4,4,5,5-tetramethyl-2-(3-methylfuran-2-yl)-1,3,2-dioxaborolane and 2-(methylthio)propanoic acid to furnish 1-(2-(4-(3-methylfuran-2-yl)-1H-imidazol-2-yl)piperidin-1-yl)-2-(methylthio)propan-1-one as an off-white solid. HRMS (ESI+): calcd. for $C_{17}H_{23}N_3O_2S$ [M+H]+: 334.1584; found: 334.1580.

Example 120: 1-(2-(4-(5-((dimethylamino)methyl)thiophen-2-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, dimethyl({[5-(tetramethyl-1,3,2-dioxaborolan-2-yl)thiophen-2-yl]methyl})amine and 2-(methylthio)propanoic acid to furnish 1-(2-(4-(5-((dimethylamino)methyl)thiophen-2-yl)-1H-imidazol-2-yl)piperidin-1-yl)-2-(methylthio)propan-1-one as a pale yellow film. HRMS (ESI+): calcd. for $C_{19}H_{26}N_4OS_2$ [M+H]+: 393.1777; found: 393.1772.

Example 121: 2-(methylthio)-1-(2-(4-(5-(trifluoromethyl)thiophen-2-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, [5-(trifluoromethyl)thiophen-2-yl]boronic acid and 2-(methylthio)propanoic acid to furnish 2-(methylthio)-1-(2-(4-(5-(trifluoromethyl)thiophen-2-yl)-1H-imidazol-2-yl)piperidin-1-yl)propan-1-one as a pale yellow oil. HRMS (ESI+): calcd. for $C_{17}H_{20}F_3N_3OS_2$ [M+H]+: 404.1073; found: 404.1070.

Example 122: 1-(2-(4-(4-methyl-6-(methylthio)pyridin-3-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-Methyl-2-(methylthio)-5-pyridylboronic acid and 2-(methylthio)propanoic acid to furnish 1-(2-(4-(4-methyl-6-(methylthio)pyridin-3-yl)-1H-imidazol-2-yl)piperidin-1-yl)-2-(methylthio)propan-1-one as a pale yellow film. HRMS (ESI+): calcd. for $C_{19}H_{25}N_4OS_2$ [M+H]+: 391.1621; found: 391.1616.

Example 123: 2-(methylthio-1-(2-(4-(4-propylphenyl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 4-Propylphenylboronic acid and 2-(methylthio)propanoic acid to furnish 2-(methylthio)-1-(2-(4-(4-propylphenyl)-1H-imidazol-2-yl)piperidin-1-yl)propan-1-one as a pale yellow film. HRMS (ESI+): calcd. for $C_{21}H_{29}N_3OS$ [M+H]+: 372.2104; found: 372.2101.

Example 124: 1-(2-(4-(4-(2-methoxyethyl)phenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, [4-(2-methoxyethyl)phenyl]boranediol and 2-(methylthio)propanoic acid to furnish 1-(2-(4-(4-(2-methoxyethyl)phenyl)-1H-imidazol-2-yl)piperidin-1-yl)-2-(methylthio)propan-1-one as a pale yellow film. HRMS (ESI+): calcd. for $C_{21}H_{29}N_3O_2S$ [M+H]+: 388.2053; found: 388.2047.

Example 125: 1-(2-(4-(4-(difluoromethyl)thiophen-3-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, [4-(difluoromethyl)thiophen-3-yl]boronic acid and 2-(methylthio)propanoic acid to furnish 1-(2-(4-(4-(difluoromethyl)thiophen-3-yl)-1H-imidazol-2-yl)piperidin-1-yl)-2-(methylthio)propan-1-one as a yellow film. HRMS (ESI+): calcd. for $C_{17}H_{21}F_2N_3OS_2$ [M+H]+: 386.1167; found: 386.1162.

Example 126: 1-(2-(4-(4-cyclobutylphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, (4-cyclobutylphenyl)boronic acid and 2-(methylthio)propanoic acid to furnish 1-(2-(4-(4-cyclobutylphenyl)-1H-imidazol-2-yl)piperidin-1-yl)-2-(methylthio)propan-1-one as a pale yellow wax. HRMS (ESI+): calcd. for $C_{22}H_{29}N_3OS$ [M+H]+: 384.2104; found: 384.2100.

Example 127: 1-(2-(4-(3-chloro-4-methylphenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 3-chloro-4-methylphenylboronic acid and 2-(methylthio)propanoic acid to furnish 1-(2-(4-(3-chloro-4-methylphenyl)-1H-imidazol-2-yl)piperidin-1-yl)-2-(methylthio)propan-1-one as a pale yellow film. HRMS (ESI+): calcd. for $C_{19}H_{24}ClN_3OS$ [M+H]+: 378.1401; found: 378.1397.

Example 128: 1-(2-(4-(4-((1,1-dioxidothiomorpholino)methyl)phenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 4-([4-(tetramethyl-1,3,2-dioxaborolan-2-yl)phenyl]methyl)thiomorpholine-1,1-dione and 2-(methylthio)propanoic acid to furnish 1-(2-(4-(4-((1,1-dioxidothiomorpholino)methyl)phenyl)-1H-imidazol-2-yl)piperidin-1-yl)-2-(methylthio)propan-1-one as a pale yellow film. HRMS (ESI+): calcd. for $C_{23}H_{32}N_4O_3S_2$ [M+H]+: 477.1989: found: 477.1990.

Example 129: 2-cyclopropyl-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and 2-cyclopropylpropanoic acid to furnish 2-cyclopropyl-1-(2-(4-phenyl-1H-imidazol-2-yl)piperidin-1-yl)propan-1-one as an off-white wax. HRMS (ESI+): calcd. for $C_{18}H_{21}N_3O$ [M+H]+: 324.2071; found: 324.2071.

Example 130: cyclopropyl(2-(4-phenyl-1H-imidazol-2-yl)piperidin-1-yl)methanone Prepared following an analogous procedure as described in Example 36, from 2-(4-phenyl-1H-imidazol-2-yl)piperidine and cyclopropanecarboxylic acid to furnish cyclopropyl(2-(4-phenyl-1H-imidazol-2-yl)piperidin-1-yl)methanone as an off-white wax. HRMS (ESI+): calcd. for $C_{18}H_{21}N_3O$ [M+H]+: 296.1758; found: 296.1759.

Example 131: (2R)-2-(dimethylamino)-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and dimethyl-D-alanine to furnish (2R)-2-(dimethylamino)-1-(2-(4-phenyl-1H-imidazol-2-yl)piperidin-1-yl)propan-1-one as a pale yellow gum. HRMS (ESI+): calcd. for $C_{19}H_{26}N_4O$ [M+H]+: 327.2180; found: 327.2180.

Example 132: 3-methyl-1-(2-(4-phenyl-1H-imidazol-2-yl)piperidin-1-yl)but-2-en-1-one Prepared following an analogous procedure as described in Example 36, from 2-(4-phenyl-1H-imidazol-2-yl)piperidine and 3-methylbut-2-enoic acid to furnish 3-methyl-1-(2-(4-phenyl-1H-imidazol-2-yl)piperidin-1-yl)but-2-en-1-one as a pale yellow oil. HRMS (ESI+): calcd. for $C_{19}H_{23}N_3O$ [M+H]+: 310.1914; found: 310.1916.

Example 133: cyclopentyl(2-(4-phenyl-1H-imidazol-2-yl)piperidin-1-yl)methanone Prepared following an analogous procedure as described in Example 36, from 2-(4-phenyl-1H-imidazol-2-yl)piperidine and cyclopentanecarboxylic acid to furnish cyclopentyl(2-(4-phenyl-1H-imidazol-2-yl)piperidin-1-yl)methanone as a pale yellow oil. HRMS (ESI+): calcd. for $C_{20}H_{25}N_3O$ [M+H]+: 324.2071; found: 324.2071.

Example 134: 2-(furan-2-yl)-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and 2-(furan-2-yl)propanoic acid to furnish 2-(furan-2-yl)-1-(2-(4-phenyl-1H-imidazol-2-yl)piperidin-1-yl)propan-1-one as a pale yellow oil. HRMS (ESI+): calcd. for $C_{21}H_{23}N_3O_2$ [M+H]+: 350.1863: found: 350.1861.

Example 135: 2-ethyl-1-(2-(4-phenyl-1H-imidazol-2-yl)piperidin-1-yl)but-2-en-1-one Prepared following an analogous procedure as described in Example 36, from 2-(4-phenyl-1H-imidazol-2-yl)piperidine and 2-ethylbut-2-enoic acid to furnish 2-ethyl-1-(2-(4-phenyl-1H-imidazol-2-yl)piperidin-1-yl)but-2-en-1-one as a pale yellow oil. HRMS (ESI+): calcd. for $C_{20}H_{25}N_3O$ [M+H]+: 324.2071; found: 324.2070.

Example 136: 2-methoxy-1-(2-(4-phenyl-1H-imidazol-2-yl)piperidin-1-yl)butan-1-one Prepared following an analogous procedure as described in Example 36, from 2-(4-phenyl-1H-imidazol-2-yl)piperidine and 2-methoxybutanoic acid to furnish 2-methoxy-1-(2-(4-phenyl-1H-imidazol-2-yl)piperidin-1-yl)butan-1-one as a colorless wax. HRMS (ESI+): calcd. for $C_{19}H_{25}N_3O$ [M+H]+: 328.2020; found: 328.2019.

Example 137: 2-cyclopropyl-2-methoxy-1-(2-(4-phenyl-1H-imidazol-2-yl)piperidin-1-yl)ethan-1-one Prepared following an analogous procedure as described in Example 36, from 2-(4-phenyl-1H-imidazol-2-yl)piperidine and 2-cyclopropyl-2-methoxyacetic acid to furnish 2-cyclopropyl-2-methoxy-1-(2-(4-phenyl-1H-imidazol-2-yl)piperidin-1-yl)ethan-1-one as a colorless film. HRMS (ESI+): calcd. for $C_{20}H_{25}N_3O_2$[M+H]+: 340.2020; found: 340.2020.

Example 138: 1-(2-(4-phenyl-1H-imidazol-2-yl)piperidin-1-yl)butan-1-one

Prepared following an analogous procedure as described in Example 36, from 2-(4-phenyl-1H-imidazol-2-yl)piperidine and butanoic acid to furnish 1-(2-(4-phenyl-1H-imidazol-2-yl)piperidin-1-yl)butan-1-one as a pale yellow oil. HRMS (ESI+): calcd. for $C_{18}H_{23}N_3O$ [M+H]+: 298.1914; found: 298.1914.

Example 139: (5-methyltetrahydrofuran-3-yl)(2-(4-phenyl-1H-imidazol-2-yl)piperidin-1-yl)methanone Prepared following an analogous procedure as described in Example 36, from 2-(4-phenyl-1H-imidazol-2-yl)piperidine and 5-methyltetrahydrofuran-3-carboxylic acid to furnish (5-methyltetrahydrofuran-3-yl)(2-(4-phenyl-1H-imidazol-2-yl)piperidin-1-yl)methanone as a pale yellow film. HRMS (ESI+): calcd. for $C_{20}H_{25}N_3O_2$ [M+H]+: 340.2020; found: 340.2019.

Example 140: 1-(2-(4-phenyl-1H-imidazol-2-yl)piperidin-1-yl)propan-1-one

Prepared following an analogous procedure as described in Example 36, from 2-(4-phenyl-1H-imidazol-2-yl)piperidine and propionic acid to furnish 1-(2-(4-phenyl-1H-imidazol-2-yl)piperidin-1-yl)propan-1-one as a white solid. HRMS (ESI+): calcd. for $C_{17}H_{21}N_3O$ [M+H]+: 284.1758; found: 284.1757.

Example 141: 3,3,3-trifluoro-2-methyl-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and 3,3,3-trifluoro-2-methylpropanoic acid to furnish 3,3,3-trifluoro-2-methyl-1-(2-(4-phenyl-1H-imidazol-2-yl)piperidin-1-yl)propan-1-one as a yellow film. HRMS (ESI+): calcd. for $C_{18}H_{20}F_3N_3O$ [M+H]+: 352.1631; found: 352.1630.

Example 142: 4,4,4-trifluoro-2-methyl-1-(2-(4-phenyl-1H-imidazol-2-yl)piperidin-1-yl)butan-1-one Prepared following an analogous procedure as described in Example 36, from 2-(4-phenyl-1H-imidazol-2-yl)piperidine and 4,4,4-trifluoro-2-methylbutanoic acid to furnish 4,4,4-trifluoro-2-methyl-1-(2-(4-phenyl-1H-imidazol-2-yl)piperidin-1-yl)butan-1-one as a yellow film. HRMS (ESI+): calcd. for $C_{19}H_{22}F_3N_3O$ [M+H]+: 366.1788; found: 366.1787.

Example 143: (2,2-dimethylcyclopropyl)(2-(4-phenyl-1H-imidazol-2-yl)piperidin-1-yl)methanone Prepared following an analogous procedure as described in Example 36, from 2-(4-phenyl-1H-imidazol-2-yl)piperidine and 2,2-dimethylcyclopropane-1-carboxylic acid to furnish (2,2-dimethylcyclopropyl)(2-(4-phenyl-1H-imidazol-2-yl)piperidin-1-yl)methanone as a pale yellow film. HRMS (ESI+): calcd. for $C_{20}H_{25}N_3O$ [M+H]+: 324.2071: found: 324.2070.

Example 144: cis-2-(2-(4-phenyl-1H-imidazol-2-yl)piperidine-1-carbonyl)cyclopropane-1-carbonitrile Prepared following an analogous procedure as described in Example 36, from 2-(4-phenyl-1H-imidazol-2-yl)piperidine and cis-2-cyanocyclopropane-1-carboxylic acid to furnish cis-2-(2-(4-phenyl-1H-imidazol-2-yl)piperidine-1-carbonyl)cyclopropane-1-carbonitrile as a yellow film. HRMS (ESI+): calcd. for $C_{19}H_{20}N_4O$ [M+H]+: 321.1710; found: 321.1709.

Example 145: 2,3-dimethoxy-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and 2,3-dimethoxypropanoic acid to furnish 2,3-dimethoxy-1-(2-(4-phenyl-1H-imidazol-2-yl)piperidin-1-yl)propan-1-one as a yellow film. HRMS (ESI+): calcd. for $C_{19}H_{25}N_3O$ [M+H]+: 344.1969; found: 344.1968.

Example 146: 1-(2-(4-phenyl-1H-imidazol-2-yl)piperidin-1-yl)hexa-3,5-dien-1-one Prepared following an analogous procedure as described in Example 36, from 2-(4-phenyl-1H-imidazol-2-yl)piperidine and 3,5-hexadienoic acid to furnish 1-(2-(4-phenyl-1H-imidazol-2-yl)piperidin-1-yl)hexa-3,5-dien-1-one as a yellow film. HRMS (ESI+): calcd. for $C_{20}H_{23}N_3O$ [M+H]+: 322.1914; found: 322.1913.

Example 147: 2-(5-methylfuran-2-yl)-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and 2-(5-methylfuran-2-yl)propanoic acid to furnish 2-(5-methylfuran-2-yl)-1-(2-(4-phenyl-1H-imidazol-2-yl)

piperidin-1-yl)propan-1-one as a pale yellow film. HRMS (ESI+): calcd. for $C_{22}H_{25}N_3O_2$ [M+H]+: 364.2020; found: 364.2017.

Example 148: (trans-2-methoxycyclopropyl)(2-(4-phenyl-1H-imidazol-2-yl)piperidin-1-yl)methanone Prepared following an analogous procedure as described in Example 36, from 2-(4-phenyl-1H-imidazol-2-yl)piperidine and trans-2-methoxycyclopropane-1-carboxylic acid to furnish (trans-2-methoxycyclopropyl)(2-(4-phenyl-1H-imidazol-2-yl)piperidin-1-yl)methanone as a yellow wax. HRMS (ESI+): calcd. for $C_{19}H_{23}N_3O_2$ [M+H]+: 326.1863; found: 326.1862.

Example 149: (2-ethoxycyclopropyl)(2-(4-phenyl-1H-imidazol-2-yl)piperidin-1-yl)methanone Prepared following an analogous procedure as described in Example 36, from 2-(4-phenyl-1H-imidazol-2-yl)piperidine and 2-ethoxycyclopropane-1-carboxylic acid to furnish (2-ethoxycyclopropyl)(2-(4-phenyl-1H-imidazol-2-yl)piperidin-1-yl)methanone as a pale yellow film. HRMS (ESI+): calcd. for $C_{20}H_{25}N_3O_2$[M+H]+: 340.2020; found: 340.2020.

Example 150: bicyclo[1.1.1]pentan-1-yl(2-(4-phenyl-1H-imidazol-2-yl)piperidin-1-yl)methanone Prepared following an analogous procedure as described in Example 36, from 2-(4-phenyl-1H-imidazol-2-yl)piperidine and bicyclo[1.1.1]pentane-1-carboxylic acid to furnish bicyclo[1.1.1]pentan-1-yl(2-(4-phenyl-1H-imidazol-2-yl)piperidin-1-yl)methanone as a white solid. HRMS (ESI+): calcd. for $C_{20}H_{23}N_3O$ [M+H]+: 322.1914; found: 322.1914.

Example 151: (2-methylcyclopropyl(2-(4-phenyl-1H-imidazol-2-yl)piperidin-1-yl)methanone Prepared following an analogous procedure as described in Example 36, from 2-(4-phenyl-1H-imidazol-2-yl)piperidine and 2-methylcyclopropane-1-carboxylic acid to furnish (2-methylcyclopropyl)(2-(4-phenyl-1H-imidazol-2-yl)piperidin-1-yl)methanone as a white solid. HRMS (ESI+): calcd. for $C_{19}H_{23}N_3O$ [M+H]+: 310.1914; found: 310.1913.

Example 152: (2-(4-phenyl-1H-imidazol-2-yl)piperidin-1-yl)(thietan-3-yl)methanone Prepared following an analogous procedure as described in Example 36, from 2-(4-phenyl-1H-imidazol-2-yl)piperidine and thietane-3-carboxylic acid to furnish (2-(4-phenyl-1H-imidazol-2-yl)piperidin-1-yl)(thietan-3-yl)methanone as a pale yellow solid. HRMS (ESI+): calcd. for $C_{18}H_{21}N_3OS$ [M+H]+: 328.1478: found: 328.1478.

Example 153: 2-cyclobutyl-1-(2-(4-phenyl-1H-imidazol-2-yl)piperidin-1-yl)propan-1-one Prepared following an analogous procedure as described in Example 36, from 2-(4-phenyl-1H-imidazol-2-yl)piperidine and 2-cyclobutylpropanoic acid to furnish 2-cyclobutyl-1-(2-(4-phenyl-1H-imidazol-2-yl)piperidin-1-yl)propan-1-one as a pale yellow film. HRMS (ESI+): calcd. for $C_{21}H_{27}N_3O$ [M+H]+: 338.2227; found: 338.2226.

Example 154: 2-cyclopropyl-1-(2-(4-phenyl-1H-imidazol-2-yl)piperidin-1-yl)ethan-1-one Prepared following an analogous procedure as described in Example 36, from 2-(4-phenyl-1H-imidazol-2-yl)piperidine and 2-cyclopropylacetic acid to furnish 2-cyclopropyl-1-(2-(4-phenyl-1H-imidazol-2-yl)piperidin-1-yl)ethan-1-one as a pale yellow film. HRMS (ESI+): calcd. for $C_{19}H_{23}N_3O$ [M+H]+: 310.1914; found: 310.1914.

Example 155: 1-(2-(4-(5-(methoxymethyl)thiophen-3-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-(5-(methoxymethyl)thiophen-3-yl)-4,4,5,5-tetramethyl-1,3,2-dioxaborolane and 2-(methylthio)propanoic acid to furnish 1-(2-(4-(5-(methoxymethyl)thiophen-3-yl)-1H-imidazol-2-yl)piperidin-1-yl)-2-(methylthio)propan-1-one as a yellow film. HRMS (ESI+): calcd. for $C_{18}H_{25}N_3O_2S_2$ [M+H]+: 380.1461; found: 380.1461.

Example 156: 1-(2-(4-(3-(methylamino)phenyl)-1H-imidazol-2-yl)piperidin-1-yl)-2-(methylthio propan-1-one Prepared following an analogous procedure as described in Example 38, from tert-butyl 2-(5-bromoimidazol-2-yl)piperidine-1-carboxylate, N-methyl-3-(4,4,5,5-tetramethyl-1,3,2-dioxaborolan-2-yl)aniline and 2-(methylthio)propanoic acid to furnish 1-(2-(4-(3-(methylamino)phenyl)-1H-imidazol-2-yl)piperidin-1-yl)-2-(methylthio)propan-1-one as a yellow film. HRMS (ESI+): calcd. for $C_{19}H_{26}N_4OS$ [M+H]+: 359.1900: found: 359.1900.

Example 157: 1-(2-(4-(6-methoxypyridin-3-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-methoxy-5-(4,4,5,5-tetramethyl-1,3,2-dioxaborolan-2-yl)pyridine and 2-(methylthio)propanoic acid to furnish 1-(2-(4-(6-methoxypyridin-3-yl)-1H-imidazol-2-yl)piperidin-1-yl)-2-(methylthio)propan-1-one as a yellow film. HRMS (ESI+): calcd. for $C_{18}H_{24}N_4O_2S$ [M+H]+: 361.1693; found: 361.1692.

Example 158: 2-(methylthio)-1-(2-(4-(4-(morpholinomethyl)phenyl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 4-(4-(4,4,5,5-tetramethyl-1,3,2-dioxaborolan-2-yl)benzyl)morpholine and 2-(methylthio)propanoic acid to furnish 2-(methylthio)-1-(2-(4-(4-(morpholinomethyl)phenyl)-1H-imidazol-2-yl)piperidin-1-yl)propan-1-one as a pale yellow film. HRMS (ESI+): calcd. for $C_{23}H_{32}N_4O_2S$ [M+H]+: 429.2319; found: 429.2321.

Example 159: 1-(2-(4-(4-(1-hydroxyethyl)phenyl)-1H-imidazol-2-yl)piperidin-1-yl)-2-(methylthio) propan-1-one Prepared following an analogous procedure as described in Example 38, from tert-butyl 2-(5-bromoimidazol-2-yl)piperidine-1-carboxylate, 1-(4-(4,4,5,5-tetramethyl-1,3,2-dioxaborolan-2-yl)phenyl)ethan-1-ol and 2-(methylthio) propanoic acid to furnish 1-(2-(4-(4-(1-hydroxyethyl)

phenyl)-1H-imidazol-2-yl)piperidin-1-yl)-2-(methylthio)propan-1-one as a pale yellow wax. HRMS (ESI+): calcd. for $C_{20}H_{27}N_3O_2S$ [M+H]+: 374.1897; found: 374.1899.

Example 160: 2-(methylthio)-1-(2-(4-(5-(trifluoromethyl)furan-2-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 4,4,5,5-tetramethyl-2-(5-(trifluoromethyl)furan-2-yl)-1,3,2-dioxaborolane and 2-(methylthio)propanoic acid to furnish 2-(methylthio)-1-(2-(4-(5-(trifluoromethyl)furan-2-yl)-1H-imidazol-2-yl)piperidin-1-yl)propan-1-one as a pale yellow film. HRMS (ESI+): calcd. for $C_{17}H_{20}F_3N_3O_2S$ [M+H]+: 388.1301; found: 388.1300.

Example 161: 2-(methylthio)-1-(2-(4-(1-(trifluoromethyl)-1H-pyrazol-4-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 4-(4,4,5,5-tetramethyl-1,3,2-dioxaborolan-2-yl)-1-(trifluoromethyl)-1H-pyrazole and 2-(methylthio)propanoic acid to furnish 2-(methylthio)-1-(2-(4-(1-(trifluoromethyl)-1H-pyrazol-4-yl)-1H-imidazol-2-yl)piperidin-1-yl)propan-1-one as a yellow oil. HRMS (ESI+): calcd. for $C_{16}H_{20}F_3N_5OS$ [M+H]+: 388.1414; found: 388.1413.

Example 162: 2-(methylthio)-1-(2-(4-(quinoxalin-6-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 6-(4,4,5,5-tetramethyl-1,3,2-dioxaborolan-2-yl)quinoxaline and 2-(methylthio)propanoic acid to furnish 2-(methylthio)-1-(2-(4-(quinoxalin-6-yl)-1H-imidazol-2-yl)piperidin-1-yl)propan-1-one as a yellow solid. HRMS (ESI+): calcd. for $C_{20}H_{23}N_5OS$ [M+H]+: 382.1696; found: 382.1696.

Example 163: 2-(methylthio)-1-(2-(4-(pyrimidin-5-yl)-1H-imidazol-2-yl)piperidin-1-yl)propan-1-one Prepared following an analogous procedure as described in Example 38, from tert-butyl 2-(5-bromoimidazol-2-yl)piperidine-1-carboxylate, 5-(4,4,5,5-tetramethyl-1,3,2-dioxaborolan-2-yl)pyrimidine and 2-(methylthio)propanoic acid to furnish 2-(methylthio)-1-(2-(4-(pyrimidin-5-yl)-1H-imidazol-2-yl)piperidin-1-yl)propan-1-one as a pale yellow film. HRMS (ESI+): calcd. for $C_{16}H_{21}N_5OS$ [M+H]+: 332.1540; found: 332.1540.

Example 164: 1-(2-(4-(3-fluoro-4-(methoxymethyl)phenyl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, (3-fluoro-4-(methoxymethyl)phenyl)boronic acid and 2-(methylthio)propanoic acid to furnish 1-(2-(4-(3-fluoro-4-(methoxymethyl)phenyl)-1H-imidazol-2-yl)piperidin-1-yl)-2-(methylthio)propan-1-one as a pale yellow film. HRMS (ESI+): calcd. for $C_{20}H_{26}FN_3O_2S$ [M+H]+: 392.1803; found: 392.1803.

Example 165: 1-(2-(4-(4-(difluoromethoxy)-3-fluorophenyl)-1H-imidazol-2-yl)piperidin-1-yl-2-(methylthio)propan-1-one Prepared following an analogous procedure as described in Example 38, from tert-butyl 2-(5-bromoimidazol-2-yl)piperidine-1-carboxylate, (4-(difluoromethoxy)-3-fluorophenyl)boronic acid and 2-(methylthio)propanoic acid to furnish 1-(2-(4-(4-(difluoromethoxy)-3-fluorophenyl)-1H-imidazol-2-yl)piperidin-1-yl)-2-(methylthio)propan-1-one as a pale yellow film. HRMS (ESI+): calcd. for $C_{19}H_{22}F_3N_3O_2S$ [M+H]+: 414.1458; found: 414.1460.

Example 166: N-(2-hydroxyethyl)-4-(2-(1-(2-(methylthio)propanoyl)piperidin-2-yl)-1H-imidazol-4-yl)benzenesulfonamide Prepared following an analogous procedure as described in Example 38, from tert-butyl 2-(5-bromoimidazol-2-yl)piperidine-1-carboxylate, (4-(N-(2-hydroxyethyl)sulfamoyl)phenyl)boronic acid and 2-(methylthio)propanoic acid to furnish N-(2-hydroxyethyl)-4-(2-(1-(2-(methylthio)propanoyl)piperidin-2-yl)-1H-imidazol-4-yl)benzenesulfonamide as a pale yellow film. HRMS (ESI+): calcd. for $C_{20}H_{28}N_4O_4S_2$ [M+H]+: 453.1625: found: 453.1625.

Example 167: 1-(2-(4-(2-cyclopropyloxazol-5-yl-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, 2-cyclopropyl-5-(4,4,5,5-tetramethyl-1,3,2-dioxaborolan-2-yl)oxazole and 2-(methylthio)propanoic acid to furnish 1-(2-(4-(2-cyclopropyloxazol-5-yl)-1H-imidazol-2-yl)piperidin-1-yl)-2-(methylthio)propan-1-one as a pale yellow film. HRMS (ESI+): calcd. for $C_{18}H_{24}N_4O_2S$ [M+H]+: 361.1693; found: 361.1692.

Example 168: 1-(2-(4-phenyl-1H-imidazol-2-yl)piperidin-1-yl)pent-4-en-1-one

Prepared following an analogous procedure as described in Example 36, from 2-(4-phenyl-1H-imidazol-2-yl)piperidine and 4-pentenoic acid to furnish 1-(2-(4-phenyl-1H-imidazol-2-yl)piperidin-1-yl)pent-4-en-1-one as a pale yellow solid. HRMS (ESI+): calcd. for $C_{19}H_{23}N_3O$ [M+H]+: 310.1914: found: 310.1914.

Example 169: 1-(2-(4-(2,2-difluorobenzo[d][1,3]dioxol-5-yl)-1H-imidazol-2-yl)piperidin-1-yl)-2-(methylthio)propan-1-one Prepared following an analogous procedure as described in Example 38, from tert-butyl 2-(5-bromoimidazol-2-yl)piperidine-1-carboxylate, (2,2-difluorobenzo[d][1,3]dioxol-5-yl)boronic acid and 2-(methylthio)propanoic acid to furnish 1-(2-(4-(2,2-difluorobenzo[d][1,3]dioxol-5-yl)-1H-imidazol-2-yl)piperidin-1-yl)-2-(methylthio)propan-1-one as a pale yellow film. HRMS (ESI+): calcd. for $C_{19}H_{21}F_2N_3O_3S$ [M+H]+: 410.1345; found: 410.1346.

Example 170: 1-(2-(4-(1-methyl-1H-pyrazol-4-yl)-1H-imidazol-2-yl)piperidin-1-yl)-2-(methylthio propan-1-one Prepared following an analogous procedure as described in Example 38, from tert-butyl 2-(5-bromoimidazol-2-yl)piperidine-1-carboxylate, 1-methyl-4-(4,4,5,5-tetramethyl-1,3,2-dioxaborolan-2-yl)-1H-pyrazole and 2-(methylthio)propanoic acid to furnish 1-(2-(4-(1-methyl-1H-pyrazol-4-yl)-1H-imidazol-2-yl)piperidin-1-yl)-2-(methylthio)propan-1-one as a pale yellow film, HRMS (ESI+): calcd. for $C_{16}H_{23}N_5OS$ [M+H]+: 334.1696; found: 334.1696.

Example 171: 2-(methylthio)-1-(2-(5-(p-tolyl)-4H-1,2,4-triazol-3-yl)piperidin-1-yl)propan-1-one

Example 171a: tert-butyl-2-(5-(p-tolyl)-4H-1,2,4-triazol-3-yl)piperidine-1-carboxylate In a 100 mL round-bottomed flask was charged with tert-butyl-2-cyanopiperidine-1-carboxylate (19.6 g, 93.0 mmol) and 4-methylbenzohydrazide (7.0 g, 46.6 mmol) in butanol (350 mL). Potassium carbonate (3.2 g, 5.0 mmol) was added. The reaction was heat to reflux overnight. The solvent was removed and dissolved in dichloromethane, and 1N HCl was added until pH=6, the aqueous layer was extracted by dichloromethane, and the combined organic layer was dried with $MgSO_4$. The crude product was purified by column chromatography silica gel to give tert-butyl-2-(5-(p-tolyl)-4H-1,2,4-triazol-3-yl)piperidine-1-carboxylate (7.5 g, yield: 47%) as white solid. GC/MS (EI): m/z (%): 342 (1) [M+], 281 (1), 242 (6), 226 (3), 186 (100), 173 (10), 91 (6). $^1H$ NMR (300 MHz, $CDCl_3$) δ 14.17, 13.84 (brs, 1H), 7.96-7.88 (m, 2H), 7.31-7.22 (m, 2H), 5.54-5.34 (m, 1H), 4.02-3.91 (m, 1H), 3.14-2.90 (m, 1H), 2.48-2.29 (m, 4H), 1.97-1.30 (m, 14H). $^{13}C$ NMR (75 MHz, $CDCl_3$) δ 170.6 (q), 163.6 (q), 161.5 (q), 157.1 (q), 155.3 (q), 155.0 (q), 140.1 (q), 138.5 (q), 129.9 (t), 129.4 (t), 129.3 (t), 126.4 (t), 126.2 (t), 125.2 (q), 79.5 (q), 78.9 (q), 50.2 (t), 48.7 (t), 41.2 (d), 28.5 (d), 28.4 (s), 25.3 (d), 25.1 (d), 21.3 (s), 21.1 (s), 19.8 (d) ppm.

Example 171b: 2-(methylthio)-1-(2-(5-(p-tolyl)-4H-1,2,4-triazol-3-yl)piperidin-1-yl)propan-1-one a) To a solution of tert-butyl-2-(5-(p-tolyl)-4H-1,2,4-triazol-3-yl)piperidine-1-carboxylate (500 mg, 1.46 mmol) in dichloromethane (50 mL) was added 2,2,2-trifluoroacetic acid (1330 mg, 11.60 mmol) at 5° C., and the mixture was stirred 6 h at rt. After the solution was cooled to 5° C., diluted $NaHCO_3$ solution was added, extracted with ethyl acetate (50 mL*3) and the organic phase was concentrated to give 2-(5-(p-tolyl)-4H-1,2,4-triazol-3-yl)piperidine as yellow solid.

b) To a solution of 2-(methylthio)propanoic acid (200 mg, 1.73 mmol) in dichloromethane (50 mL) was added HOBt (220 mg, 1.44 mmol) and 3-(((ethylimino)methylene)amino)-N,N-dimethylpropan-1-amine (220 mg, 1.44 mmol) at 0~5° C. and the mixture was stirred for 0.5 h at rt. Then 2-(5-(p-tolyl)-4H-1,2,4-triazol-3-yl)piperidine (350 mg, 1.44 mmol) and DIPEA (0.50 mL, 2.89 mmol) was added and the mixture was stirred at rt. for 16 h. The mixture was filtered and solvent was removed and purified by silica gel chromatography (hexane:MTBE=3:1) to give 2-(methylthio)-1-(2-(5-(p-tolyl)-4H-1,2,4-triazol-3-yl)piperidin-1-yl)propan-1-one (400 mg, yield: 80%) as white solid. GC/MS (EI): m/z (%): 344 (3) [M+], 329 (6), 298 (46), 269 (36), 241 (100), 226 (14), 186 (79). $^1H$ NMR (300 MHz, DMSO-$d_6$, mixture of stereoisomers and tautomers) δ 14.24-13.80 (m, 1H), 7.91-7.80 (m, 2H), 7.32-7.27 (m, 2H), 5.88-5.32 (m, 1H), 4.51-2.92 (m, 3H), 2.63-2.28 (m, 4H), 2.09-2.01 (m, 3H), 1.91-1.33 (m, 8H). $^{13}C$ NMR (75 MHz, DMSO-$d_6$, mixture of stereoisomers and tautomers) δ 170.8 (q), 170.4 (q), 169.8 (q), 162.9 (q), 161.4 (q), 156.4 (q), 154.7 (q), 140.1 (q), 138.5 (q), 129.7 (t), 129.4 (t), 128.9 (q), 126.0 (t), 124.7 (q), 51.0 (t), 47.2 (t), 46.1 (t), 43.0 (d), 42.7 (d), 38.4 (d), 37.6 (t), 37.3 (t), 29.1 (d), 28.1 (d), 27.8 (d), 27.7 (d), 25.7 (d), 25.3 (d), 25.0 (d), 21.1 (s), 19.8 (d), 17.9 (s), 17.6 (s), 17.5 (s), 11.8 (s), 11.5 (s), 11.4 (s) ppm.

Example 172: 1-(2-(5-(4-fluorophenyl)-4H-1,2,4-triazol-3-yl)piperidin-1-yl)-2-(methylthio)propan-1-one Prepared following an analogous procedure to Example 171 from tert-butyl-2-cyanopiperidine-1-carboxylate, 4-fluorobenzoic hydrazide and 2-(methylthio)propanoic acid to give the title product as a white solid. GC/MS (EI): m/z (%): 348 (4) [M+], 333 (5), 302 (70), 273 (40), 245 (100), 230(17), 190 (84), 84 (63).

Example 173: 2-(methylthio)-1-(2-(5-phenyl-4H-1,2,4-triazol-3-yl)piperidin-1-yl)propan-1-one Prepared following an analogous procedure to Example 171 from tert-butyl-2-cyanopiperidine-1-carboxylate, benzhydrazide and 2-(methylthio)propanoic acid to give the title product as a white solid. GC/MS (EI): m/z (%): 330 (3) [M+], 315 (7), 284 (71), 255 (43), 227 (100), 172 (85), 146 (13), 84 (57).

Example 174: 2-(methylthio)-1-(2-(5-phenyloxazol-2-yl)piperidin-1-yl)propan-1-one

Example 174a: tert-butyl-2-((2-oxo-2-phenylethyl)carbamoyl)piperidine-1-carboxylate To a solution of 1-(tert-butoxycarbonyl)piperidine-2-carboxylic acid (5.0 g, 21.8 mmol), HOBt (4.0 g, 26.2 mmol). EDC (5.0 g, 26.2 mmol) in dichloromethane (50 mL) was added 2-amino-1-phenylethan-1-one hydrochloride (3.7 g, 21.8 mmol) and DIPEA (5.64 g, 43.6 mmol) at 0~5° C. and the mixture was stirred at rt. for 16 h. The mixture was filtered and solvent was removed, the residue was purified by silica gel chromatography (hexane:MTBE=5:1) to give tert-butyl-2-((2-oxo-2-phenylethyl)carbamoyl)piperidine-1-carboxylate (5.0 g, yield: 66%) of product as pale yellow solid.

Example 174b: 5-phenyl-2-(piperidin-2-yl)oxazole

To a solution of tert-butyl-2-((2-oxo-2-phenylethyl)carbamoyl)piperidine-1-carboxylate (5.0 g, 14.4 mmol) was added sulfuric acid (14.2 g, 144.0 mmol) at ice bath, and a mixture was stirred for 1 h at 100° C. After the solution was cooled to rt., diluted $NaHCO_3$ solution was added, extracted with ethyl acetate (50 mL*3) and the organic phase was concentrated. The residue was purified by silica gel column chromatography to get 5-phenyl-2-(piperidin-2-yl)oxazole (2.0 g, yield: 61%) of product as pale yellow oil. GC/MS (EI): m/z (%): 228 (13) [M+], 207 (10), 199 (4), 185 (14), 172 (100), 159 (16), 123 (13), 115 (5), 102 (10), 85 (15).

Example 174c: 2-(methylthio)-1-(2-(5-phenyloxazol-2-yl)piperidin-1-yl)propan-1-one To a solution of 2-(methylthio)propanoic acid (520 mg, 4.38 mmol) in dichloromethane (50 mL) was added HOBt (670 mg, 4.38 mmol) and 3-(((ethylimino)methylene)amino)-N,N-dimethylpropan-1-amine (680 mg, 4.38 mmol) at 0~5° C. and the mixture was stirred at rt. for 0.5 h. Then 5-phenyl-2-(piperidin-2-yl)oxazole (1000 mg, 4.38 mmol) and DIPEA (1.53 mL, 8.76 mmol) was added and the mixture was stirred at r.t. for 16 h. The mixture was filtered and solvent was removed and the residue was purified by silica gel chromatography (hexane:MTBE=50:1) to crude product as pale yellow oil. The oil was distilled via kugelrohr (0.12 mbar, 110° C.) to give 2-(methylthio)-1-(2-(5-phenyloxazol-2-yl)piperidin-1-yl)propan-1-one (475 mg, yield: 33%) as white solid. GC/MS (EI): m/z (%): 330 (9) [M$^+$], 315 (1), 255 (8), 227 (100), 75 (13). $^1$H NMR (300 MHz, CDCl$_3$, mixture of stereoisomers and tautomers) δ 7.60-7.26 (m, 6H), 6.15-6.14 (m, 1H), 4.02-3.97 (m, 1H), 3.77-3.70 (m, 1H), 3.46-3.25 (m, 1H), 2.46-2.42 (m, 1H), 2.10 (s, 3H), 1.94-1.53 (m, 8H). $^{13}$C NMR (75 MHz, CDCl$_3$ mixture of stereoisomers and tautomers) δ 170.5 (q), 162.0 (q), 160.9 (q), 151.5 (q), 128.8 (t), 128.4 (t), 127.8 (q), 124.1 (t), 121.8 (t), 47.5 (t), 43.2 (d), 37.8 (t), 27.6 (d), 25.4 (d), 20.1 (d), 17.3 (s), 11.5 (s) ppm.

Example 175: 1-(2-(4-methyl-5-phenyl-1H-imidazol-2-yl)piperidin-1-yl)-2-(methylthio)-propan-1-one

Example 175a: tert-butyl 2-(4-methyl-5-phenyl-1H-imidazol-2-yl)piperidine-1-carboxylate A solution of tert-butyl 2-formylpiperidine-1-carboxylate (1.0 g, 4.69 mmol) and DABCO (0.040 mg, 0.32 mmol) in n-butanol (25 mL) was stirred for 10 min, then NH$_4$OAc (1.8 g, 23.44 mmol) was added and followed by 1-phenylpropane-1,2-dione (0.69 mg, 4.69 mmol) was added, and a mixture was heated to 60-65° C. and stirred for overnight. After the solution was cooled to rt., diluted NaHCO$_3$ solution was added, extracted with Ethyl Acetate (50 mL*3) and the organic phase was concentrated. The residue was purified by column chromatography (hexane:MTBE=3:1) to get tert-butyl 2-(4-methyl-5-phenyl-1H-imidazol-2-yl)piperidine-1-carboxylate (1.0 g, yield: 63%) of product as white solid. GC/MS (EI): m/z (%): 341 (8) [M+], 285 (14), 240 (35), 185 (100), 172 (18), 159 (6), 117 (6), 103 (8), 73 (18).

Example 175b: 1-(2-(4-methyl-5-phenyl-1H-imidazol-2-yl)piperidin-1-yl)-2-(methylthio)propan-1-one To a solution of 2-(methylthio)propanoic acid (300 mg, 2.48 mmol) in dichloromethane (50 mL) was added HOBt (380 mg, 2.48 mmol) and 3-(((ethylimino)methylene)amino)-N,N-dimethylpropan-1-amine (380 mg, 2.48 mmol) at 0~5° C. and the mixture was stirred for 0.5 h at rt. Then 2-(4-methyl-5-phenyl-1H-imidazol-2-yl)piperidine-1-carboxylate (500 mg, 2.07 mmol) and DIPEA (0.72 mL, 4.14 mmol) was added and the mixture was stirred at rt. for 16 h. The mixture was filtered and solvent was removed and purified by silica gel chromatography (hexane:MTBE=3:1) to give 1-(2-(4-methyl-5-phenyl-1H-imidazol-2-yl)piperidin-1-yl)-2-(methylthio)propan-1-one (500 mg, yield: 70%) as white solid. GC/MS (E): m/z (%): 343 (6) [M$^+$], 328 (5), 268 (9), 240 (100), 213 (12), 185 (12), 159 (4), 103 (6), 75 (10). $^1$H NMR (300 MHz, DMSO-d$_6$, mixture of stereoisomers and tautomers) δ 11.81-11.59 (m, 1H), 7.78-7.09 (m, 5H), 5.76-5.36 (m, 1H), 4.59-3.04 (m, 3H), 2.68-2.23 (m, 4H), 2.05-2.00 (m, 3H), 1.74-1.20 (m, 8H). C NMR (75 MHz, DMSO-d$_6$, mixture of stereoisomers and tautomers) δ 169.6 (q), 144.2 (q), 143.9 (q), 135.8 (q), 134.8 (q), 134.7 (q), 128.5 (t), 128.2 (t), 125.7 (t), 125.6 (t), 125.2 (t), 123.0 (q), 122.5 (q), 51.0 (t), 46.6 (t), 46.3 (t), 42.7 (d), 42.5 (d), 38.3 (d), 37.1 (t), 36.9 (t), 28.2 (d), 27.7 (d), 27.4 (d), 25.7 (d), 25.3 (d), 25.0 (d), 19.8 (d), 19.6 (d), 17.9 (s), 17.5 (s), 17.4 (s), 11.5 (s), 11.1 (s) ppm.

Example 176: 1-(2-(1H-benzo[d]imidazol-2-yl)piperidin-1-yl)-2-(methylthio)propan-1-one

Example 176a: tert-butyl 2-(1H-benzo[d]imidazol-2-yl)piperidine-1-carboxylate To a solution of tert-butyl 2-formylpiperidine-1-carboxylate (1000 mg, 4.69 mmol) in methanol (50 ml) at 0° C. was added dropwise benzene-1,2-diamine (1014 mg, 9.38 mmol). The solution was allowed to warm to room temperature and stirred for 16 h. The solution was concentrated under reduced pressure, and the resultant residue was extracted with EtOAc (2*150 mL). Any precipitate was removed by filtration, and the organic phase was washed with concentrated aqueous NaHCO$_3$ solution (2*100 mL) and brine (2*100 mL). The solution was then concentrated under reduced pressure to give tert-butyl 2-(1H-benzo[d]imidazol-2-yl)piperidine-1-carboxylate (450 mg, yield: 32%) as yellow solid. GC/MS (EI): m/z (%): 301 (6) [M$^+$], 245 (6), 228 (7), 200 (20), 184 (12), 145 (100), 119 (7), 92 (3), 57 (13).

Example 176b: 1-(2-(1H-benzo[d]imidazol-2-yl)piperidin-1-yl)-2-(methylthio)propan-1-one a) To a solution of tert-butyl 2-(1H-benzo[d]imidazol-2-yl)piperidine-1-carboxylate (500 mg, 1.493 mmol) in dichloromethane (50 mL) was added 2,2,2-trifluoroacetic acid (1362 mg, 11.94 mmol) at 5° C., and the mixture was stirred 6 h at r.t. After the solution was cooled to 5° C., diluted NaHCO$_3$ solution was added, extracted with ethyl acetate (50 mL*3) and the organic phase was concentrated to give 2-(piperidin-2-yl)-1H-benzo[d]imidazole as white solid (260 mg, yield: 78%).

b) To a solution of 2-(methylthio)propanoic acid (179 mg, 1.491 mmol) in dichloromethane (30 mL) was added HOBt (304 mg, 1.987 mmol) and 3-(((ethylimino)methylene)amino)-N,N-dimethylpropan-1-amine (309 mg, 1.987 mmol) at 0~5° C. and the mixture was stirred for 0.5 h at rt. Then 2-(piperidin-2-yl)-1H-benzo[d]imidazole (200 mg, 0.994 mmol) and DIPEA (0.434 ml, 2.484 mmol) was added and the mixture was stirred at rt. for 16 h. The mixture was filtered and solvent was removed and purified by silica gel chromatography (hexane:MTBE=3:1) to give 1-(2-(1H-benzo[d]imidazol-2-yl)piperidin-1-yl)-2-(methylthio)propan-1-one (74 mg, yield: 24%) as white solid. GC/MS (EI, mixture of stereoisomers, ratio 1:1): isomer 1: m/z (%): 303 (1) [M$^+$], 288 (5), 257 (42), 228 (29), 200 (100), 173 (10), 158 (7), 145 (41), 75 (12). isomer 2: m/z (%): 303 (3) [M$^+$], 288 (7), 257 (31), 228 (36), 200 (100), 173 (14), 158 (6), 145 (46), 75 (13). $^1$H NMR (300 MHz, DMSO-d$_6$, mixture of stereoisomers and tautomers) δ 12.39, 12.16 (brs, 1H), 7.60-7.44 (m, 2H), 7.16-7.15 (m, 2H), 5.98-5.62 (m, 1H), 4.55-3.00 (m, 3H), 2.60-2.19 (m, 1H), 2.05 (s, 3H), 2.01-1.35 (m, 8H). $^{13}$C NMR (75 MHz, DMSO-d$_6$, mixture of stereoisomers and tautomers) δ 170.7 (q), 170.3 (q), 169.9 (q), 153.9 (q), 153.8 (q), 153.6 (q), 143.7 (q), 135.3 (q), 135.0 (q), 122.3 (t), 122.3 (t), 121.5 (t), 121.4 (t), 119.0 (t), 118.9 (t), 111.6 (t), 111.5 (t), 52.2 (t), 47.8 (t), 47.5 (t), 43.4 (d), 43.3 (d), 38.4 (t), 37.3 (t), 37.3 (t), 28.5 (d), 28.0 (d), 27.9 (d), 25.9 (d), 25.5 (d), 25.3 (d), 20.4 (d), 20.2 (d), 20.1 (d), 18.4 (s), 17.9 (s), 17.8 (s), 12.0 (s), 11.6 (s), 11.5 (s) ppm.

Example 177: (S)-2-methyl-1-((R)-2-(5-(p-tolyl)-1H-imidazol-2-yl)piperidin-1-yl)butan-1-one Prepared following an analogous procedure as in Example 39: (S)-2-methylbutanoic acid (0.84 mg, 8.20 mmol), HOBt (1.37 mg, 8.95 mmol), 3-(((ethylimino)methylene)amino)-N,N-dimethylpropan-1-amine (1.39 mg, 8.95 mmol), (R)-2-(5-(p-tolyl)-1H-imidazol-2-yl)piperidine (2.00 g, 7.46 mmol) and DIPEA (1.85 ml, 11.19 mmol) in dichloromethane (100 mL) were reacted to give the title product (1.65 g, yield: 68%) as white solid. GC/MS (EI): m/z (%): 325 (5) [M+], 310 (1), 268 (2), 240 (100), 224 (3), 185 (14), 159 (2), 117 (6), 57 (15). $^1$H NMR (300 MHz, DMSO-$d_6$, mixture of stereoisomers and tautomers) δ 12.0, 11.90, 11.72 (brs, 1H), 7.68-7.47 (m, 3H), 7.21-7.12 (m, 2H), 5.83-5.28 (m, 1H), 4.49-2.74 (m, 3H), 2.45-2.19 (m, 1H), 2.29 (s, 3H), 1.74-1.55 (m, 5H), 1.37-1.33 (m, 2H), 1.07-1.05 (m, 3H), 0.89-0.78 (m, 3H). $^{13}$C NMR (75 MHz, DMSO-$d_6$, mixture of stereoisomers and tautomers) δ 175.4 (q), 175.1 (q), 148.5 (q), 147.2 (q), 147.0 (q), 140.5 (q), 140.1 (q), 136.1 (q), 135.2 (q), 132.8 (q), 129.7 (t), 129.3 (t), 124.6 (t), 112.8 (t), 112.6 (t), 51.4 (t), 46.9 (t), 46.7 (t), 42.6 (d), 38.5 (d), 36.8 (t), 36.5 (t), 29.1 (d), 28.4 (d), 27.2 (d), 26.9 (d), 26.3 (d), 25.3 (d), 21.2 (s), 20.3 (d), 20.1 (d), 18.4 (s), 17.3 (s), 12.2 (s), 12.0 (s) ppm.

Example 178: 2-(methylthio)-1-(2-(5-(p-tolyl)-1H-imidazol-2-yl)azepan-1-yl)propan-1-one Prepared in an analogous procedure to Example 64 from 1-(tert-butoxycarbonyl)-azepane-2-carboxylic acid, 2-amino-1-(p-tolyl)ethan-1-one hydrochloride and 2-(methylthio)propanoic acid to give 2-(methylthio)-1-(2-(5-(p-tolyl)-1H-imidazol-2-yl)azepan-1-yl)propan-1-one as an off-white solid. GC/MS (E): m/z (%): 357 (9) [M+], 342 (12), 282 (6), 254 (100). $^{13}$C NMR (101 MHz, DMSO-d6, mixture of stereoisomers and tautomers): δ=174.1, 172.7, 172.3, 171.1, 170.8, 170.0, 149.1, 135.4, 129.5, 129.4, 128.3, 127.3, 124.7, 124.7, 124.6, 124.6, 119.5, 110.2, 60.2, 55.1, 54.0, 51.9, 51.2, 44.0, 43.1, 42.3, 41.7, 41.7, 38.6, 37.3, 36.9, 33.7, 33.3, 32.8, 31.7, 31.1, 29.5, 29.3, 29.3, 29.0, 28.9, 28.8, 28.5, 25.4, 25.1, 24.9, 24.9, 22.6, 21.2, 18.6, 18.4, 18.2, 17.5, 17.1, 14.5, 14.4, 13.8, 13.2, 12.6, 11.7, 11.2 ppm.

Example 179: (2,2-dimethylcyclopropyl)(2-(5-(p-tolyl)-1H-imidazol-2-yl)piperidin-1-yl)methanone Prepared following an analogous procedure as described in Example 39 from 2,2-dimethylcyclopropane-1-carboxylic acid, HOBt, 3-(((ethylimino)methylene)amino)-N,N-dimethylpropan-1-amine, 2-(5-(p-tolyl)-1H-imidazol-2-yl)piperidine and DIPEA in dichloromethane to give the title product as white solid. GC/MS (EI): m/z (%): 337 (8) [M+], 322 (1), 268 (1), 240 (100), 185 (33), 97 (6). 1H NMR (400 MHz, DMSO-d6, 25° C., mixture of stereoisomers): δ=11.52-12.19 (m, 1H), 7.08-7.72 (m, 5H), 5.24-6.02 (m, 1H), 3.83-4.56 (m, 1H), 3.21-3.32 (m, 1H), 2.15-2.47 (m, 4H), 1.75-1.84 (m, 1H), 1.46-1.74 (m, 4H), 1.27-1.43 (m, 1H), 1.19 (br d, J=10.8 Hz, 3H), 0.87-1.08 (m, 4H), 0.61-0.77 ppm (m, 1H).

Example 180: 1-(2-(5-bromo-1H-imidazol-2-yl)piperidin-1-yl)-2-methylbutan-1-one

Prepared following an analogous procedure as described in Example 22a using 2-methylbutanoic acid instead of 2-(methylthio)propanoic acid, to give the title product as a white solid. GC/MS (EI): m/z (%): 315 (5) [M+], 313 (5) [M+], 300 (1), 287 (1), 258 (2), 256 (2), 228 (100), 230 (99), 173 (33), 57 (39). 1H NMR (300 MHz, DMSO-d6, mixture of stereoisomers and tautomers) δ 7.23-7.15 (m, 1H), 5.74-5.24 (m, 1H), 4.41-3.82 (m, 1H), 3.29-3.10 (m, 1H), 2.81-2.60 (m, 1H), 2.38-2.10 (m, 1H), 1.77-1.18 (m, 8H), 1.06-0.93 (m, 3H), 0.90-0.70 (m, 3H) ppm.

Example 181: 1-(2-(5-(4-chlorophenyl)-1H-imidazol-2-yl)piperidin-1-yl)-2-methylbutan-1-one Prepared following an analogous procedure as described in Example 22b from 1-(2-(5-bromo-1H-imidazol-2-yl)piperidin-1-yl)-2-methylbutan-1-one and 4-chlorophenylboronic acid to give the title product as a white solid. GC/MS (EI): m/z (%): 345 (11) [M+], 330 (1), 260 (100). 1H NMR (400 MHz, CHLOROFORM-d, 25° C., mixture of stereoisomers): δ=9.83-10.84 (m, 1H), 7.37-7.79 (m, 2H), 7.32 (d, J=8.6 Hz, 2H), 7.17 (s, 1H), 5.32-5.93 (m, 1H), 3.72-4.76 (m, 1H), 3.08-3.24 (m, 1H), 2.20-2.78 (m, 4H), 1.36-1.89 (m, 7H), 1.04-1.23 (m, 3H), 0.80-1.00 ppm (m, 3H).

Example 182: 2-(4-(2-(1-(2-(methylthio)propanoyl)piperidin-2-yl)-1H-imidazol-5-yl)phenyl)acetonitrile Prepared following an analogous procedure as described in Example 22b from 1-(2-(5-bromo-1H-imidazol-2-yl)piperidin-1-yl)-2-(methylthio)propan-1-one and (4-(cyanomethyl)phenyl)boronic acid to give the title product as a pale yellow waxy solid. GC/MS (EI): m/z (%): 368 (10) [M+], 353 (7), 322 (4), 293 (10), 265 (100), 238 (8), 210 (18), 75 (18). 1H NMR (300 MHz, DMSO-d6, mixture of stereoisomers and tautomers) δ 12.26-11.85 (m, 1H), 7.85-7.53 (m, 3H), 7.44-7.26 (m, 2H), 5.86-5.39 (m, 1H), 4.01 (s, 2H), 4.45-1.30 (m, 15H) ppm.

Example 183: 2-(4-(2-(1-(2-methylbutanoyl)piperidin-2-yl)-1H-imidazol-5-yl)phenyl)acetonitrile Prepared following an analogous procedure as described in Example 22b from 1-(2-(5-bromo-1H-imidazol-2-yl)piperidin-1-yl)-2-methylbutan-1-one and (4-(cyanomethyl)phenyl)boronic acid to give the title product as a white solid. GC/MS (EI): m/z (%): 350 (7) [M+], 293 (2), 265 (100), 249 (4), 210 (14), 184 (2), 155 (3), 117 (5), 57 (14). 1H NMR (300 MHz, DMSO-d6, mixture of stereoisomers and tautomers) δ 12.20-11.75 (m, 1H), 7.80-7.69 (m, 2H), 7.68-7.52 (m, 1H), 7.43-7.27 (m, 2H), 5.89-5.28 (m, 1H), 4.00 (s, 2H), 4.52-2.20 (m, 3H), 1.80-1.14 (m, 8H), 1.11-0.71 (m, 6H) ppm.

Example 184: 2-(4-(2-(1-(2-methylbutanoyl)piperidin-2-yl)-1H-imidazol-5-yl)phenyl)acetonitrile Prepared following an analogous procedure as described in Example 22b from 1-(2-(5-bromo-1H-imidazol-2-yl)piperidin-1-yl)-2-methylbutan-1-one and 4-cyanophenylboronic acid to give the title product as a white solid. GC/MS (EI): m/z (%): 336 (7) [M+], 321 (1), 279 (2), 251 (100), 196 (24), 57 (25). 1H NMR (400 MHz, DMSO-d6, 25° C., mixture of stereoisomers): δ=7.93-8.11 (m, 3H), 7.88 (br t, J=8.3 Hz, 2H), 5.87 (br d, J=14.9 Hz, 1H), 3.97-5.59 (m, 9H), 3.82-3.97 (m, 1H), 3.15-3.43 (m, 1H), 2.72-2.92 (m, 1H), 2.24-2.46 (m, 1H), 1.23-1.87 (m, 7H), 0.96-1.13 (m, 3H), 0.87 ppm (br t, J=7.5 Hz, 3H).

Example 185: 2,3-dimethyl-1-(2-(5-(p-tolyl)-1H-imidazol-2-yl)piperidin-1-yl)butan-1-one Prepared following an analogous procedure as described in Example 39 from 2,3-dimethylbutanoic acid, HOBt, 3-(((ethylimino)methylene)amino)-N,N-dimethylpropan-1-amine, 2-(5-(p-tolyl)-1H-imidazol-2-yl)piperidine and DIPEA in dichloromethane to give the title product as white solid. GC/MS (EI): m/z (%): 339 (9) [M$^+$], 324 (1), 296 (1), 268 (2), 240 (100), 185 (16). 1H NMR (400 MHz, DMSO-d6, 25° C., mixture of stereoisomers): δ=11.54-12.12 (m, 1H), 7.08-7.71 (m, 5H), 4.36-6.00 (m, 2H), 3.82-3.99 (m, 1H), 3.40-3.79 (m, 1H), 2.65 (br d, J=8.6 Hz, 1H), 2.24-2.38 (m, 3H), 1.48-1.91 (m, 5H), 1.23-1.35 (m, 4H), 0.78-1.08 ppm (m, 9H).

Example 186: 2-methyl-1-(2-(5-(o-tolyl)-1H-imidazol-2-yl)piperidin-1-yl)butan-1-one Prepared following an analogous procedure as described in Example 22b from 1-(2-(5-bromo-1H-imidazol-2-yl)piperidin-1-yl)-2-methylbutan-1-one and p-tolylboronic acid to give the title product as a white solid. GC/MS (EI): m/z (%): 325 (10) [M$^+$], 310 (1), 268 (2), 240 (100), 224 (3), 185 (13), 159 (2), 117 (6), 57 (9). 1H NMR (300 MHz, DMSO-d6, mixture of stereoisomers and tautomers) δ 12.08-11.72 (m, 1H), 7.86-6.96 (m, 5H), 5.94-5.26 (m, 1H), 4.53-2.18 (m, 3H), 2.45 (s, 3H), 1.86-1.21 (m, 8H), 1.10-0.72 (m, 6H) ppm.

Example 187: 2-methyl-1-(2-(5-(m-tolyl)-1H-imidazol-2-yl)piperidin-1-yl)butan-1-one Prepared following an analogous procedure as described in Example 22b from 1-(2-(5-bromo-1H-imidazol-2-yl)piperidin-1-yl)-2-methylbutan-1-one and m-tolylboronic acid to give the title product as a white solid. GC/MS (EI): m/z (%): 325 (10) [M$^+$], 310 (1), 268 (2), 240 (100), 224 (4), 185 (12), 159 (2), 117 (5), 57 (10). 1H NMR (300 MHz, DMSO-d6, mixture of stereoisomers and tautomers) δ 12.17-11.67 (m, 1H), 7.64-6.93 (m, 5H), 5.88-5.24 (m, 1H), 4.52-2.23 (m, 3H), 2.32 (s, 3H), 1.78-0.75 (m, 14H) ppm.

Example 188: 1-(2-(5-(4-(hydroxymethyl)phenyl)-1H-imidazol-2-yl)piperidin-1-yl)-2-methylbutan-1-one Prepared following an analogous procedure as described in Example 38, from tert-butyl 2-(5-bromoimidazol-2-yl)piperidine-1-carboxylate, (4-(4,4,5,5-tetramethyl-1,3,2-dioxaborolan-2-yl)phenyl)methanol and 2-methylbutanoic acid to furnish the title compound as a white solid. DIP-MS (EI): m/z (%): 341 (7) [M$^+$], 284 (2), 256 (100), 201 (13), 57 (51). 1H NMR (500 MHz, DMSO-d6, 140° C., mixture of stereoisomers): δ=7.90-8.01 (m, 1H), 7.65-7.70 (m, 2H), 7.36-7.55 (m, 1H), 7.31 (d, J=0.6 Hz, 2H), 7.30 (s, 1H), 5.65 (br s, 1H), 3.96-4.16 (m, 1H), 3.21-3.43 (m, 1H), 2.92 (br s, 2H), 2.78 (dq, J=13.3, 6.7 Hz, 3H), 2.26-2.35 (m, 1H), 1.59-1.87 (m, 5H), 1.34-1.53 (m, 2H), 1.08 (dd, J=9.9, 6.6 Hz, 3H), 0.84-0.93 ppm (m, 3H), 13C NMR (126 MHz, DMSO-d6, 140° C., mixture of stereoisomers): δ=175.6, 175.6, 140.8, 127.4, 127.1, 124.7, 119.5, 110.0, 63.6, 36.9, 36.7, 28.9, 28.8, 27.3, 27.1, 25.9, 25.8, 20.1, 20.1, 17.5, 17.5, 11.7, 11.6 ppm.

Example 189: 1-(isopropylsulfonyl)-2-(5-(p-tolyl)-1H-imidazol-2-yl)piperidine A solution of 2-(5-(p-tolyl)-1H-imidazol-2-yl)piperidine (0.25 g, 1.04 mmol) in THF (2 mL) was cooled to −78° C. and then treated dropwise with KHMDS (potassium hexamethyldisilazide) (1M in THF, 1.14 mL, 1.14 mmol, 1.1 equiv.). The mixture was stirred for 15 min at −78° C. and then treated slowly over 5 min with a solution of propane-2-sulfonyl chloride (0.16 g, 1.14 mmol, 1.1 equiv.) in THF (1 mL). The mixture was allowed to reach room temperature then poured into iced 2M HCl solution (50 mL), extracted with DCM (3×20 mL), washed with water (20 mL), brine (20 mL), dried over MgSO$_4$, filtered and concentrated. The residue was purified by flash column chromatography on silica gel (gradient elution with heptanes containing 1-50% of a mixture of 80% EtOAc, 10% Hexanes, 9% EtOH, 1% Et$_3$N) to give the title compound 1-(isopropylsulfonyl)-2-(5-(p-tolyl)-1H-imidazol-2-yl)piperidine (65 mg, 0.187 mmol, 18% yield) as an orange liquid. GC/MS (EI): m/z (%): 347 (2) [M$^+$], 291 (5), 240 (100), 185 (71), 43 (85). 1H NMR (400 MHz, DMSO-d6, 25° C.): δ=7.91 (s, 1H), 7.73-7.78 (m, 2H), 7.21 (d, J=7.8 Hz, 2H), 4.40 (dquin, J=13.6, 6.7 Hz, 1H), 4.13 (br dd, J=8.7, 4.5 Hz, 1H), 2.93-3.04 (m, 1H), 2.56-2.70 (m, 1H), 2.32 (s, 4H), 1.78-1.99 (m, 4H), 1.47-1.59 (m, 2H), 1.38 (d, J=6.8 Hz, 3H), 1.23 ppm (dd, J=6.7, 2.3 Hz, 4H), 13C NMR (101 MHz, DMSO-d6, 25° C.): Shift=138.6, 136.8, 129.5, 129.1, 124.9, 115.6, 59.7, 56.0, 53.4, 52.8, 46.0, 30.8, 24.0, 20.8, 16.6, 16.0, 15.1, 14.1 ppm.

Example 190: 1-(sec-butylsulfonyl)-2-(5-(p-tolyl)-1H-imidazol-2-yl)piperidine A solution of 2-(5-(p-tolyl)-1H-imidazol-2-yl)piperidine (0.15 g, 0.62 mmol) in THF (2 mL) was cooled to −78° C. and then treated dropwise with KHMDS (potassium hexamethyldisilazide) (1M in THF, 0.68 mL, 0.68 mmol, 1.1 equiv.). The mixture was stirred for 15 min at −78° C. and then treated slowly over 5 min with a solution of butane-2-sulfonyl chloride (0.107 g, 0.68 mmol, 1.1 equiv.) in THF (1 mL). The mixture was allowed to reach room temperature then poured into iced 2M HCl solution (50 mL), extracted with DCM (3×20 mL), washed with water (20 mL), brine (20 mL), dried over MgSO$_4$, filtered and concentrated. The residue was purified by flash column chromatography on silica gel (gradient elution with heptanes containing 1-50% of a mixture of 80% EtOAc, 10% Hexanes, 9%/a EtOH, 1% Et$_3$N) to give the title compound 1-(sec-butylsulfonyl)-2-(5-(p-tolyl)-1H-imidazol-2-yl)piperidine (95 mg, 0.62 mmol, 42% yield) as an orange liquid. GC/MS (EI): m/z (%): 361 (4) [M$^+$], 305 (6), 240 (100), 185 (77), 57 (24). 1H NMR (400 MHz, DMSO-d6, 25° C., mixture of stereoisomers): δ=7.87-8.04 (m, 1H), 7.71-7.82 (m, 2H), 7.17-7.26 (m, 2H), 6.77-7.05 (m, 1H), 6.65 (s, 1H), 4.08-4.43 (m, 2H), 2.93-3.14 (m, 1H), 2.78 (dqd, J=9.3, 6.8, 4.2 Hz, 1H), 2.56-2.70 (m, 1H), 2.29-2.36 (m, 3H), 1.77-2.04 (m, 5H), 1.31-1.77 (m, 7H), 1.17-1.26 (m, 3H), 1.07-1.16 (m, 1H), 0.87-1.06 ppm (m, 4H).

Example 191: 2-methyl-1-(2-(5-(5-methylthiophen-2-yl)-1H-imidazol-2-yl)piperidin-1-yl)butan-1-one Prepared following an analogous procedure as described in Example 38, from tert-butyl 2-(5-bromoimidazol-2-yl)

piperidine-1-carboxylate. (5-methylthiophen-2-yl)boronic acid and 2-methylbutanoic acid to furnish the title compound as a white solid. GC/MS (EI): m/z (%): 331 (8) [M$^+$], 274 (2), 246 (100), 57 (21), 1H NMR (400 MHz, DMSO-d6, 25° C. mixture of stereoisomers): δ=11.62-12.20 (m, 1H), 7.24-7.37 (m, 1H), 6.98 (br d, J=3.2 Hz, 1H), 6.61-6.79 (m, 1H), 5.14-5.85 (m, 1H), 3.78-4.51 (m, 1H), 3.20-3.32 (m, 1H), 2.64-2.85 (m, 1H), 2.41 (s, 3H), 2.14-2.35 (m, 1H), 1.47-1.77 (m, 5H), 1.21-1.46 (m, 2H), 0.97-1.09 (m, 3H), 0.74-0.92 ppm (m, 3H).

Example 192: 2-(methylthio-1-(2-(5-(p-tolyl)-1H-imidazol-2-yl)piperazin-1-yl)propan-1-one Example 192a: 4-(tert-butoxycarbonyl)-1-(2-(methylthio)propanoyl)piperazine-2-carboxylic acid A flask was charged with NaOH (1.39 g, 34.7 mmol) and water (29 mL) and the mixture stirred. Once fully dissolved, the solution was cooled to 5° C. and treated with 4-(tert-butoxycarbonyl)piperazine-2-carboxylic acid (4.0 g, 17.4 mmol) and stirred for 20 min. The resulting mixture was treated dropwise at 5° C. with 2-(methylthio)propanoyl chloride (2.41 g, 17.8 mmol) and stirred for 4 h at 5° C. The mixture was then poured into iced 1M HCl solution (100 mL) and extracted with EtOAc (3×70 mL), washed with water (70 mL), brine (70 mL), dried over MgSO$_4$ and concentrated to give the title product 4-(tert-butoxycarbonyl)-1-(2-(methylthio)propanoyl)piperazine-2-carboxylic acid (4.4 g, 13.2 mmol, 76% yield) as a white solid which was used in the next step without further purification. DIP-MS (EI): m/z (%): 276 (2) [M$^+$-Isobutylene], 259 (1), 230 (10), 75 (53), 57 (100).

Example 192b: 1-(tert-butyl) 3-(2-oxo-2-(p-tolyl)ethyl) 4-(2-(methylthio)propanoyl)piperazine-1,3-dicarboxylate A solution of 4-(tert-butoxycarbonyl)-1-(2-(methylthio)propanoyl)piperazine-2-carboxylic acid (4.4 g, 13.2 mmol) and Triethylamine (2.03 mL, 14.6 mmol, 1.1 equiv.) in DMF (40 mL) was treated with 2-bromo-1-(p-tolyl)ethan-1-one (2.96 g, 13.9 mmol) at 5° C. and the resulting mixture stirred at r.t. for 1 h. The mixture was then poured into iced 1M HCl solution (100 mL) and extracted with EtOAc (3×70 mL), washed with water (70 mL), brine (70 mL), dried over MgSO$_4$ and concentrated. The crude was then purified by flash column chromatography on silica gel, eluting with a gradient of 7-60% EtOAc in Heptane to give the title product 1-(tert-butyl) 3-(2-oxo-2-(p-tolyl)ethyl) 4-(2-(methylthio)propanoyl)piperazine-1,3-dicarboxylate (5.1 g, 11.0 mmol, 83% yield) as a yellow liquid. DIP-MS (EI): m/z (%): 418 (2) [M$^+$-SCH$_3$], 331 (6), 275 (15), 231 (29), 119 (66), 91 (27), 75 (100), 57 (78).

Example 192c: tert-butyl 4-(2-(methylthio)propanoyl)-3-(5-(p-tolyl)-1H-imidazol-2-yl)piperazine-1-carboxylate A mixture of 1-(tert-butyl) 3-(2-oxo-2-(p-tolyl)ethyl) 4-(2-(methylthio)propanoyl)piperazine-1,3-dicarboxylate (5.1 g, 11.0 mmol), ammonium acetate (6.77 g, 88 mmol) and acetic acid (0.791 g, 13.17 mmol) in Xylene (50 mL) was stirred at reflux for 2 h. The mixture was then poured into iced 1M HCl solution (100 mL) and extracted with EtOAc (3×70 mL), washed with water (70 mL), brine (70 mL), dried over MgSO$_4$ and concentrated. The crude was then purified by flash column chromatography on silica gel, eluting with a gradient of 7-60% EtOAc in Heptane to give the title product tert-butyl 4-(2-(methylthio)propanoyl)-3-(5-(p-tolyl)-1H-imidazol-2-yl)piperazine-1-carboxylate (1.1 g, 2.47 mmol, 23% yield) as a yellow solid. DIP-MS (EI): m/z (%): 444 (1) [M$^+$], 429 (1), 341 (1), 285 (6), 241 (5), 103 (3), 75 (44), 57 (100).

Example 192d: 2-(methylthio)-1-(2-(5-(p-tolyl)-1H-imidazol-2-yl)piperazin-1-yl)propan-1-one A solution of tert-butyl 4-(2-(methylthio)propanoyl)-3-(5-(p-tolyl)-1H-imidazol-2-yl)piperazine-1-carboxylate (1 g, 2.25 mmol) in Dichloromethane (10 mL) was treated with Trifluoroacetic acid (TFA) (1.4 mL, 18 mmol) at 5° C. The cooling bath was removed and the reaction mixture was stirred at ambient temperature for 3 h. A second portion of TFA (1.4 mL, 18 mmol) was added and the reaction mixture was stirred for 3 h at ambient temperature, at which point TLC indicated the reaction was complete. The mixture was then poured into iced water (50 mL) and treated with 2M NaOH solution until basic pH was observed, extracted with DCM (3×50 mL), dried over MgSO$_4$ and concentrated. The crude was then purified by flash column chromatography on silica gel, eluting with a mixture of DCM/EtOH/AcOH in ratio 7:2:1. The fractions containing product were collected and washed with water to remove AcOH, dried over MgSO$_4$, filtered and concentrated to give the title product 2-(methylthio)-1-(2-(5-(p-tolyl)-1H-imidazol-2-yl)piperazin-1-yl)propan-1-one (0.75 g, 2.18 mmol, 97% yield) as a yellow solid. GC/MS (EI): m/z (%): 344 (49) [M$^+$], 329 (45), 269 (51), 241 (49), 186 (100), 103 (20), 75 (73). 1H NMR (400 MHz, DMSO-d6, 25° C.): δ=11.77 (br s, 1H), 7.64 (d, J=8.1 Hz, 2H), 7.44 (br s, 1H), 7.15 (d, J=8.1 Hz, 2H), 5.13-5.58 (m, 1H), 3.73-3.99 (m, 2H), 3.17-3.63 (m, 4H), 2.59-3.01 (m, 3H), 2.30 (s, 3H), 2.01-2.10 (m, 2H), 1.95-2.01 (m, 2H), 1.38 ppm (d, J=6.8 Hz, 3H).

Example 193: 2-(methylthio)-1-(2-(4-(P-tolyl)oxazol-2-yl)piperidin-1-yl)propan-1-one Isolated as a minor byproduct (yellow solid) when preparing 2-(methylthio)-1-(2-(5-(p-tolyl)imidazol-2-yl)piperidin-1-yl)propan-1-one from piperidine-2-carboxylic acid, 2-(methylthio)propanoyl chloride, 2-bromo-1-(p-tolyl)ethan-1-one and ammonium acetate according to the sequence described in Example 63. 1H NMR (500 MHz, CHLOROFORM-d, 25° C., mixture of stereoisomers): δ=7.82 (s, 1H), 7.63 (d, J=7.9 Hz, 2H), 7.21 (d, J=8.2 Hz, 2H), 6.11 (br d, J=4.0 Hz, 1H), 3.98 (br d, J=13.1 Hz, 1H), 3.74 (q, J=6.9 Hz, 1H), 3.26-3.39 (m, 1H), 2.46 (br d, J=13.1 Hz, 1H), 2.38 (s, 3H), 2.01-2.19 (m, 3H), 1.66-1.89 (m, 5H), 1.56 ppm (d, J=6.7 Hz, 3H), 13C NMR (126 MHz, CHLOROFORM-d, 25° C., mixture of stereoisomers): δ=170.6, 162.6, 140.8, 137.8, 133.1, 129.4, 128.3, 125.5, 47.4, 43.3, 37.9, 27.6, 25.5, 21.3, 20.0, 17.3, 11.6 ppm.

Example 194: 2-methyl-1-(2-(4-(p-tolyl)oxazol-2-yl)piperidin-1-yl)butan-1-one

Isolated as a minor byproduct (red oil) when preparing 2-methyl-1-(2-(5-(p-tolyl)-1H-imidazol-2-yl)piperidin-1-yl)butan-1-one from piperidine-2-carboxylic acid, 2-methylbutanoyl chloride, 2-bromo-1-(p-tolyl)ethan-1-one and ammonium acetate according to the sequence described in Example 63. GC/MS (EI): m/z (%): 326 (8) [M$^+$], 269 (1), 241 (92), 186 (10), 84 (100), 57 (44). 1H NMR (600 MHz, BENZENE-d6, 25° C., mixture of stereoisomers): δ=7.71-7.80 (m, 1H), 7.51-7.59 (m, 2H), 7.11-7.17 (m, 2H), 5.19-6.11 (m, 1H), 3.80-4.67 (m, 1H), 3.16-3.27 (m, 1H), 2.64-2.76 (m, 1H), 2.32-2.64 (m, 2H), 2.28-2.32 (m, 3H), 1.58-1.84 (m, 6H), 1.37-1.51 (m, 2H), 1.17-1.28 (m, 1H), 1.07-1.15 (m, 4H), 0.86-0.94 (m, 4H), 0.76-0.85 ppm (m, 1H).

Example 1: Assay on TRPM8 Modulators

A HEK293 cell line stably expressing hTRPM8 was generated according to Klein of at, (Chem. Senses 36: 649-458, 2011) and receptor activation was monitored by calcium imaging in a Flexstation. For Ca-imaging assays of TRPM8 channel activation, cells were seeded on day 0 at a density of 12000 cells per well in Dulbecco's modified Eagle medium (DMEM) containing 9% foetal bovine serum in black, clear bottom 96-well plates that had been coated with 0.001% polyethyleneimine (molecular weight=60 000, Acros Organics). On day 2, agonists were evaluated via calcium imaging using Fluo-4. Briefly, growth medium was discarded, and the cells were incubated in the dark for 1 h at 37° C. in 50 μL loading buffer consisting of 2.7 μM Fluo-4 AM (Invitrogen) and 2.5 μM probenecid (Sigma-Aldrich) in DMEM (without serum). After incubation, the plates were washed five times with 100 μL of assay buffer (in mM: 130 NaCl, 5 KCl, 10 HEPES, 2 $CaCl_2$, and 10 glucose, pH7.4.) and further incubated in the dark at room temperature for 30 min. The cells were then washed five times with 100 μL assay buffer and then calcium influx to serial dilutions of inventive compounds were measured in a Flexstation 3 (Molecular Devices). Receptor activation was initiated following addition of 20 μl of a 10-fold concentrated ligand stock solution, which is also prepared in assay buffer. Fluorescence was continuously monitored for 15 seconds prior to ligand addition and for 105 seconds after ligand addition, for a total of 120 seconds. Maximal receptor activation in relation to solvent control and relative to 31.6 μM menthol is determined. Data from serial dilutions were processed with a KNIME workflow to fit a sigmoidal dose-response curve and to extrapolate EC5 values.

TRPM8 agonist exhibiting an EC50 value below 35 μM are presented in Table 1 below.

TABLE 1

| Comp. No. | Chemical Name | EC50 |
|---|---|---|
| 1 | (2-(4-phenyl-1H-imidazol-2-y)piperidin-1-yl)(1,2,3-thiadiazol-5-yl)methanone | + |
| 2 | (2-(4-phenyl-1H-imidazol-2-yl)piperidin-1-yl)(thietan-3-yl)methanone | ++ |
| 3 | (2,2-dimethylcyclopropyl)(2-(4-phenyl-1H-imidazol-2-yl)piperidin-1-yl)methanone | ++++ |
| 4 | (2-ethoxycyclopropyl)(2-(4-phenyl-1H-imidazol-2-yl)piperidin-1-yl)methanone | ++ |
| 5 | (trans-2-methoxycyclopropyl)(2-(4-phenyl-1H-imidazol-2-yl)piperidin-1-yl)methanone | + |
| 6 | (2-methylcyclopropyl)(2-(4-phenyl-1H-imidazol-2-yl)piperidin-1-yl)methanone | +++ |
| 7 | (5-methyltetrahydrofuran-3-yl)(2-(4-phenyl-1H-imidazol-2-yl)piperidin-1-yl)methanone | + |
| 8 | (E)-1-(2-(5-(3,4-difluorophenyl)-1H-imidazol-2-yl)piperidin-1-yl)-2-methylbut-2-en-1-one | +++ |
| 9 | (E)-2-methyl-1-(2-(5-(p-tolyl)-1H-imidazol-2-yl)piperidin-1-yl)but-2-en-1-one | ++++ |
| 10 | (E)-2-methyl-1-(2-(5-(p-tolyl)-1H-imidazol-2-yl)piperidin-1-yl)pent-3-en-1-one | ++++ |
| 11 | (R)-2-(methylthio)-1-((R)-2-(5-(p-tolyl)-1H-imidazol-2-yl)piperidin-1-yl)propan-1-one | ++++ |
| 12 | (S)-2-(methylthio)-1-((R)-2-(5-(p-tolyl)-1H-imidazol-2-yl)piperidin-1-yl)propan-1-one | ++++ |
| 13 | (S)-2-(methylthio)-1-((S)-2-(5-(p-tolyl)-1H-imidazol-2-yl)piperidin-1-yl)propan-1-one | +++ |
| 14 | (tetrahydrofuran-3-yl)(2-(5-(p-toly)-1H-imidazol-2-yl)piperidin-1-yl)methanone | ++ |
| 15 | 1-(2-(1H-benzo[d]imidazol-2-yl)piperidin-1-yl)-2-(methylthio)propan-1-one | + |
| 16 | 1-(2-(4-(1-methyl-1H-pyrazol-4-yl)-1H-imidazol-2-yl)piperidin-1-yl)-2-(methylthio)propan-1-one | ++ |
| 17 | 1-(2-(4-(2,2-difluorobenzo[d][1,3]dioxol-5-yl)-1H-imidazol-2-yl)piperidin-1-yl)-2-(methylthio)propan-1-one | ++++ |
| 18 | 1-(2-(4-(2,3-dihydrobenzofuran-5-yl)-1H-imidazol-2-yl)piperidin-1-yl)-2-(methylthio)propan-1-one | ++++ |
| 19 | 1-(2-(4-(2,3-dihydrobenzofuran-6-yl)-1H-imidazol-2-yl)piperidin-1-yl)-2-(methylthio)propan-1-one | ++++ |
| 20 | 1-(2-(4-(2,5-dimethylphenyl)-1H-imidazol-2-yl)piperidin-1-yl)-2-(methylthio)propan-1-one | ++ |
| 21 | 1-(2-(4-(2-chlorophenyl)-1H-imidazol-2-yl)piperidin-1-yl)-2-(methylthio)propan-1-one | ++++ |
| 22 | 1-(2-(4-(2-cyclopropyloxazol-5-yl)-1H-imidazol-2-yl)piperidin-1-yl)-2-(methylthio)propan-1-one | +++ |
| 23 | 1-(2-(4-(2-fluorophenyl)-1H-imidazol-2-yl)piperidin-1-yl)-2-(methylthio)propan-1-one | ++++ |
| 24 | 1-(2-(4-(2-hydroxyphenyl)-1H-imidazol-2-yl)piperidin-1-yl)-2-(methylthio)propan-1-one | +++ |
| 25 | 1-(2-(4-(3-((dimethylamino)methyl)phenyl)-1H-imidazol-2-yl)piperidin-1-yl)-2-(methylthio)propan-1-one | ++ |

TABLE 1-continued

| Comp. No. | Chemical Name | EC50 |
|---|---|---|
| 26 | 1-(2-(4-(3,5-difluorophenyl)-1H-imidazol-2-yl)piperidin-1-yl)-2-(methylthio)propan-1-one | ++++ |
| 27 | 1-(2-(4-(3,5-dimethylisoxazol-4-yl)-1H-imidazol-2-yl)piperidin-1-yl)-2-(methylthio)propan-1-one | + |
| 28 | 1-(2-(4-(3-chloro-4-methylphenyl)-1H-imidazol-2-yl)piperidin-1-yl)-2-(methylthio)propan-1-one | ++++ |
| 29 | 1-(2-(4-(3-methylfuran-2-yl)-1H-imidazol-2-yl)piperidin-1-yl)-2-(methylthio)propan-1-one | +++ |
| 30 | 1-(2-(4-(4-((1,1-dioxidothiomorpholino)methyl)phenyl)-1H-imidazol-2-yl)piperidin-1-yl)-2-(methylthio)propan-1-one | + |
| 31 | 1-(2-(4-(4-(1-hydroxyethyl)phenyl)-1H-imidazol-2-yl)piperidin-1-yl)-2-(methylthio)propan-1-one | +++ |
| 32 | 1-(2-(4-(4-(difluoromethoxy)-3-fluorophenyl)-1H-imidazol-2-yl)piperidin-1-yl)-2-(methylthio)propan-1-one | ++++ |
| 33 | 1-(2-(4-(4-(difluoromethyl)(hiophen-3-yl)-1H-imidazol-2-yl)piperidin-1-yl)-2-(methylthio)propan-1-one | +++ |
| 34 | 1-(2-(4-(4-(methylsulfonyl)phenyl)-1H-imidazol-2-yl)piperidin-1-yl)-2-(methylthio)propan-1-one | + |
| 35 | 1-(2-(4-(4-methylsulfonyl)phenyl)-1H-imidazol-2-yl)piperidin-1-yl)-2-(methylthio)propan-1-one | + |
| 36 | 1-(2-(4-(4-cyclobutylphenyl)-1H-imidazol-2-yl)piperidin-1-yl)-2-(methylthio)propan-1-one | ++++ |
| 37 | 1-(2-(4-(4-cyclopropyl-2-fluorophenyl)-1H-imidazol-2-yl)piperidin-1-yl)-2-(methylthio)propan-1-one | ++++ |
| 38 | 1-(2-(4-(4-fluorophenyl)-1H-imidazol-2-yl)piperidin-1-yl)-2-(methylthio)propan-1-one | ++++ |
| 39 | 1-(2-(4-(4-hydroxyphenyl)-1H-imidazol-2-yl)piperidin-1-yl)-2-(methylthio)propan-1-one | ++++ |
| 40 | 1-(2-(4-(4-isopropylphenyl)-1H-imidazol-2-yl)piperidin-1-yl)-2-(methylthio)propan-1-one | ++++ |
| 41 | 1-(2-(4-(4-methyl-3-(trifluoromethyl)phenyl)-1H-imidazol-2-yl)piperidin-1-yl)-2-(methylthio)propan-1-one | +++ |
| 42 | 1-(2-(4-(5-((dimethylamino)methyl)thiophen-2-yl)-1H-imidazol-2-yl)piperidin-1-yl)-2-(methylthio)propan-1-one | + |
| 43 | 1-(2-(4-(5-methylfuran-2-yl)-1H-imidazol-2-yl)piperidin-1-yl)-2-(methylthio)propan-1-one | ++++ |
| 44 | 1-(2-(4-(5-methylpyridin-3-yl)-1H-imidazol-2-yl)piperidin-1-yl)-2-(methylthio)propan-1-one | +++ |
| 45 | 1-(2-(4-(6-methylpyridin-3-yl)-1H-imidazol-2-yl)piperidin-1-yl)-2-(methylthio)propan-1-one | ++++ |
| 46 | 1-(2-(4-(benzo[b]thiophen-6-yl)-1H-imidazol-2-yl)piperidin-1-yl)-2-(methylthio)propan-1-one | ++++ |
| 47 | 1-(2-(4-methyl-5-phenyl-1H-imidazol-2-yl)piperidin-1-yl)-2-(methylthio)propan-1-one | +++ |
| 48 | 1-(2-(4-phenyl-1H-imidazol-2-yl)piperidin-1-yl)-2-((trifluoromethyl)thio)ethan-1-one | + |
| 49 | 1-(2-(4-phenyl-1H-imidazol-2-yl)piperidin-1-yl)butan-1-one | ++ |
| 50 | 1-(2-(4-phenyl-1H-imidazol-2-yl)piperidin-1-yl)hexa-3,5-dien-1-one | + |
| 51 | 1-(2-(4-phenyl-1H-imidazol-2-yl)piperidin-1-yl)pent-4-en-1-one | ++ |
| 52 | 1-(2-(4-phenyl-1H-imidazol-2-yl)piperidin-1-yl)propan-1-one | + |
| 53 | 1-(2-(5-(2,3-difluorophenyl)-1H-imidazol-2-yl)piperidin-1-yl)-2-(methylthio)propan-1-one | +++ |
| 54 | 1-(2-(5-(2,4-difluorophenyl)-1H-imidazol-2-yl)piperidin-1-yl)-2-(methylthio)propan-1-one | ++++ |
| 55 | 1-(2-(5-(2,5-difluorophenyl)-1H-imidazol-2-yl)piperidin-1-yl)-2-(methylthio)propan-1-one | ++++ |
| 56 | 1-(2-(5-(2-fluoro-4-methoxyphenyl)-1H-imidazol-2-yl)piperidin-1-yl)-2-(methylthio)propan-1-one | ++++ |
| 57 | 1-(2-(5-(2-fluoro-4-methylphenyl)-1H-imidazol-2-yl)piperidin-1-yl)-2-(methylthio)propan-1-one | ++++ |
| 58 | 1-(2-(5-(2-methoxypyrimidin-5-yl)-1H-imidazol-2-yl)piperidin-1-yl)-2-(methylthio)propan-1-one | ++ |
| 59 | 1-(2-(5-(3-(methylamino)phenyl)-1H-imidazol-2-yl)piperidin-1-yl)-2-(methylthio)propan-1-one | +++ |
| 60 | 1-(2-(5-(3,4-difluorophenyl)-1H-imidazol-2-yl)piperidin-1-yl)-2-(methylthio)propan-1-one | ++++ |
| 61 | 1-(2-(5-(3,4-difluorophenyl)-1H-imidazol-2-yl)piperidin-1-yl)-2-methylbut-3-en-1-one | ++++ |
| 62 | 1-(2-(5-(3,4-dimethoxyphenyl)-1H-imidazol-2-yl)piperidin-1-yl)-2-(methylthio)propan-1-one | + |
| 63 | 1-(2-(5-(3,4-dimethylphenyl)-1H-imidazol-2-yl)piperidin-1-yl)-2-(methylthio)propan-1-one | ++++ |
| 64 | 1-(2-(5-(3-fluoro-4-(methoxymethyl)phenyl)-1H-imidazol-2-yl)piperidin-1-yl)-2-(methylthio)propan-1-one | +++ |
| 65 | 1-(2-(5-(3-fluoro-4-methylphenyl)-1H-imidazol-2-yl)piperidin-1-yl)-2-(methylthio)propan-1-one | ++++ |

TABLE 1-continued

| Comp. No. | Chemical Name | EC50 |
|---|---|---|
| 66 | 1-(2-(5-(3-fluorophenyl)-1H-imidazol-2-yl)piperidin-1-yl)-2-(methylthio)propan-1-one | ++++ |
| 67 | 1-(2-(5-(3-methoxyisothiazol-4-yl)-1H-imidazol-2-yl)piperidin-1-yl)-2-(methylthio)propan-1-one | + |
| 68 | 1-(2-(5-(3-methoxyphenyl)-1H-imidazol-2-yl)piperidin-1-yl)-2-(methylthio)propan-1-one | +++ |
| 69 | 1-(2-(5-(4-((methylamino)methyl)phenyl)-1H-imidazol-2-yl)piperidin-1-yl)-2-(methylthio)propan-1-one | + |
| 70 | 1-(2-(5-(4-(2-methoxyethyl)phenyl)-1H-imidazol-2-yl)piperidin-1-yl)-2-(methylthio)propan-1-one | +++ |
| 71 | 1-(2-(5-(4-(aminomethyl)phenyl)-1H-imidazol-2-yl)piperidin-1-yl)-2-(methylthio)propan-1-one | ++++ |
| 72 | 1-(2-(5-(4-(dimethylamino)phenyl)-1H-imidazol-2-yl)piperidin-1-yl)-2-(methylthio)propan-1-one | +++ |
| 73 | 1-(2-(5-(4-(hydroxymethyl)phenyl)-1H-imidazol-2-yl)piperidin-1-yl)-2-(methylthio)propan-1-one | ++ |
| 74 | 1-(2-(5-(4-acetylphenyl)-1H-imidazol-2-yl)piperidin-1-yl)-2-(methylthio)propan--one | ++++ |
| 75 | 1-(2-(5-(4-aminophenyl)-1H-imidazol-2-yl)piperidin-1-yl)-2-(methylthio)propan-1-one | ++++ |
| 76 | 1-(2-(5-(4-chloro-3-fluorophenyl)-1H-imidazol-2-yl)piperidin-1-yl)-2-(methylthio)propan-1-one | ++++ |
| 77 | 1-(2-(5-(4-chlorophenyl)-1H-imidazol-2-yl)piperidin-1-yl)-2-(methyltbio)propan-1-one | ++++ |
| 78 | 1-(2-(5-(4-ethylphenyl)-1H-imidazol-2-yl)piperidin-1-yl)-2-(methylthio)propan-1-one | ++++ |
| 79 | 1-(2-(5-(4-fluorophenyl)-4H-1,2,4-triazol-3-yl)piperidin-1-yl)-2-(methylthio)propan-1-one | ++++ |
| 80 | 1-(2-(5-(4-methoxy-2-methylphenyl)-1H-imidazol-2-yl)piperidin-1-yl)-2-(methylthio)propan-1-one | ++++ |
| 81 | 1-(2-(5-(4-methoxyphenyl)-1H-imidazol-2-yl)piperidin-1-yl)-2-(methylthio)propan-1-one | ++++ |
| 82 | 1-(2-(5-(4-methyl-6-(methylthio)pyridin-3-yl)-1H-imidazol-2-yl)piperidin-1-yl)-2-(methylthio)propan-1-one | ++ |
| 83 | 1-(2-(5-(5-(methoxymethyl)thiophen-3-yl)-1H-imidazol-2-yl)piperidin-1-yl)-2-(methylthio)propan-1-one | +++ |
| 84 | 1-(2-(5-(6-methoxypyridin-3-yl)-1H-imidazol-2-yl)piperidin-1-yl)-2-(methylthio)propan-1-one | +++ |
| 85 | 1-(2-(5-(benzo[d][1,3]dioxol-5-yl)-1H-imidazol-2-yl)piperidin-1-yl)-2-(methylthio)propan-1-one | ++++ |
| 86 | 1-(2-(5-(p-tolyl)-1H-imidazol-2-yl)piperidin-1-yl)propan-1-one | +++ |
| 87 | 1-(2-(5-benzyl-1H-imidazol-2-yl)piperidin-1-yl)-2-(methylthio)propan-1-one | + |
| 88 | 1-(2-(5-bromo-1H-imidazol-2-yl)piperidin-1-yl)-2-(methylthio)propan-1-one | ++ |
| 89 | 2-(2-(1-(2-(methylthio)propanoyl)piperidin-2-yl)-1H-imidazol-5-yl)benzonitrile | ++ |
| 90 | cis-2-(2-(4-phenyl-1H-imidazol-2-yl)piperidine-1-carbonyl)cyclopropane-1-carbonitrile | + |
| 91 | 2-(5-methylfuran-2-yl)-1-(2-(4-phenyl-1H-imidazol-2-yl)piperidin-1-yl)propan-1-one | +++ |
| 92 | 2-(allylthio)-1-(2-(5-(p-tolyl)-1H-imidazol-2-yl)piperidin-1-yl)propan-1-one | ++++ |
| 93 | 2-(dimethylamino)-1-(2-(4-phenyl-1H-imidazol-2-yl)piperidin-1-yl)butan-1-one | + |
| 94 | (2R)-2-(dimethylamino)-1-(2-(4-phenyl-1H-imidazol-2-yl)piperidin-1-yl)propan-1-one | ++ |
| 95 | 2-(ethylthio)-1-(2-(5-(p-toly)-1H-imidazol-2-yl)piperidin-1-yl)propan-1-one | ++++ |
| 96 | 2-(furan-2-yl)-1-(2-(4-phenyl-1H-imidazol-2-yl)piperidin-1-yl)ethan-1-one | + |
| 97 | 2-(furan-2-yl)-1-(2-(4-phenyl-1H-imidazol-2-yl)piperidin-1-yl)propan-1-one | +++ |
| 98 | 2-(furan-3-y)-1-(2-4-phenyl-1H-imidazol-2-y)piperidin-1-yl)ethan-1-one | +++ |
| 99 | 2-(furan-3-yl)-1-(2-(5-(p-tolyl)-1H-imidazol-2-yl)piperidin-1-yl)propan-1-one | ++++ |
| 100 | 2-(methylamino)-N-(4-(2-(1-(2-(methylthio)propanoyl)piperidin-2-yl)-1H-imidazol-5-yl)phenyl)acetamide | +++ |
| 101 | 2-(methylsulfinyl)-1-(2-(5-(p-tolyl)-1H-imidazol-2-yl)piperidin-1-yl)propan-1-one | +++ |
| 102 | 2-(methylsulfonyl)-1-(2-(4-phenyl-1H-imidazol-2-yl)piperidin-1-yl)ethan-1-one | + |
| 103 | 2-(methylsulfonyl)-1-(2-(4-phenyl-1H-imidazol-2-yl)piperidin-1-yl)propan-1-one | + |
| 104 | 2-(methylthio)-1-(2-(2-(p-toly)-2H-tetrazol-5-yl)piperidin-1-yl)propan-1-one | ++++ |

TABLE 1-continued

| Comp. No. | Chemical Name | EC50 |
|---|---|---|
| 105 | 2-(methylthio)-1-(2-(3-phenyl-1,2,4-oxadiazol-5-yl)piperidin-1-yl)propan-1-one | ++ |
| 106 | 2-(methylthio)-1-(2-(4-(1-(trifluoromethyl)-1H-pyrazol-4-yl)-1H-imidazol-2-yl)piperidin-1-yl)propan-1-one | +++ |
| 107 | 2-(methylthio)-1-(2-(4-(4-(morpholinomethyl)phenyl)-1H-imidazol-2-yl)piperidin-1-yl)propan-1-one | + |
| 108 | 2-(methylthio)-1-(2-(4-(5-(trifluoromethyl)furan-2-yl)-1H-imidazol-2-yl)piperidin-1-yl)propan-1-one | ++++ |
| 109 | 2-(methylthio)-1-(2-(4-(5-(trifluoromethyl)thiophen-2-yl)-1H-imidazol-2-yl)piperidin-1-yl)propan-1-one | ++++ |
| 110 | 2-(methylthio)-1-(2-(4-(5-methylthiophen-3-yl)-1H-imidazol-2-yl)piperidin-1-yl)propan-1-one | ++++ |
| 111 | 2-(methylthio)-1-(2-(4-(m-tolyl)-1H-imidazol-2-yl)piperidin-1-yl)propan-1-one | +++ |
| 112 | 2-(methylthio)-1-(2-(4-(o-tolyl)-1H-imidazol-2-yl)piperidin-1-yl)propan-1-one | +++ |
| 113 | 2-(methylthio)-1-(2-(4-(pyridin-3-yl)-1H-imidazol-2-yl)piperidin-1-yl)propan-1-one | ++ |
| 114 | 2-(methylthio)-1-(2-(4-(pyridin-4-yl)-1H-imidazol-2-yl)piperidin-1-yl)propan-1-one | ++ |
| 115 | 2-(methylthio)-1-(2-(4-(pyrimidin-5-yl)-1H-imidazol-2-yl)piperidin-1-yl)propan-1-one | + |
| 116 | 2-(methylthio)-1-(2-(4-(quinoxalin-6-yl)-1H-imidazol-2-yl)piperidin-1-yl)propan-1-one | ++ |
| 117 | 2-(methylthio)-1-(2-(4-(thiophen-3-yl)-1H-imidazol-2-yl)piperidin-1-yl)propan-1-one | +++ |
| 118 | 2-(methylthio)-1-(2-(4-phenyl-1H-imidazol-2-yl)piperidin-1-yl)ethan-1-one | ++ |
| 119 | 2-(methylthio)-1-(2-(5-(2-(trifluoromethyl)phenyl)-1H-imidazol-2-yl)piperidin-1-yl)propan-1-one | ++ |
| 120 | 2-(methylthio)-1-(2-(5-(2,3,4-trifluorophenyl)-1H-imidazol-2-yl)piperidin-1-yl)propan-1-one | ++++ |
| 121 | 2-(methylthio)-1-(2-(5-(2,4,5-trifluorophenyl)-1H-imidazol-2-yl)piperidin-1-yl)propan-1-one | ++++ |
| 122 | 2-(methylthio)-1-(2-(5-(3-(trifluoromethyl)phenyl)-1H-imidazol-2-yl)piperidin-1-yl)propan-1-one | +++ |
| 123 | 2-(methylthio)-1-(2-(5-(4-(trifluoromethoxy)phenyl)-1H-imidazol-2-yl)piperidin-1-yl)propan-1-one | ++++ |
| 124 | 2-(methylthio)-1-(2-(5-(4-(trifluoromethyl)phenyl)-1H-imidazol-2-yl)piperidin-1-yl)propan-1-one | ++++ |
| 125 | 2-(methylthio)-1-(2-(5-(4-propylphenyl)-1H-imidazol-2-yl)piperidin-1-yl)propan-1-one | ++++ |
| 126 | 2-(methylthio)-1-(2-(5-(4-vinylphenyl)-1H-imidazol-2-yl)piperidin-1-yl)propan-1-one | ++++ |
| 127 | 2-(methylthio)-1-(2-(5-(5-methylthiophen-2-yl)-1H-imidazol-2-yl)piperidin-1-yl)propan-1-one | ++++ |
| 128 | 2-(methylthio)-1-(2-(5-(p-tolyl)-1,3,4-oxadiazol-2-yl)piperidin-1-yl)propan-1-one | ++ |
| 129 | 2-(methylthio)-1-(2-(5-(p-tolyl)-1H-imidazol-2-yl)azepan-1-yl)propan-1-one | ++++ |
| 130 | 2-(methylthio)-1-(2-(5-(p-toly)-1H-imidazol-2-yl)piperidin-1-yl)propan-1-one | ++++ |
| 131 | 2-(methylthio)- 1-(2-(5-(p-tolyl)-4H-1,2,4-triazol-3-yl)piperidin-1-yl)propan-1-one | ++++ |
| 132 | 2-(methylthio)-1-(2-(5-(p-toly)isoxazol-3-yl)piperidin-1-yl)propan-1-one | +++ |
| 133 | 2-(methylthio)-1-(2-(5-(p-tolyl)oxazol-2-yl)piperidin-1-yl)propan-1-one | ++++ |
| 134 | 2-(methylthio)-1-(2-(5-(p-tolyl)thiazol-2-yl)piperidin-1-yl)propan-1-one | ++++ |
| 135 | 2-(methylthio)-1-(2-(5-phenyl-1H-imidazol-2-yl)piperidin-1-yl)propan-1-one | ++++ |
| 136 | 2-(methylthio)-1-((R)-2-(5-phenyl-1H-imidazol-2-yl)pyrrolidin-1-yl)propan-1-one | + |
| 137 | 2-(methylthio)-1-(2-(5-phenyl-4H-1,2,4-triazol-3-yl)piperidin-1-yl)propan-1-one | +++ |
| 138 | 2-(methylthio)-1-(2-(5-phenyloxazol-2-yl)piperidin-1-yl)propan-1-one | ++ |
| 139 | 2-(methylthio)-1-(4-(5-(p-tolyl)-1H-imidazol-2-yl)thiazolidin-3-yl)propan-1-one | +++ |
| 140 | 2,2,3-trimethyl-1-(2-(5-(p-tolyl)-1H-imidazol-2-yl)piperidin-1-yl)but-3-en-1-one | ++++ |
| 141 | 2,2,3-trimethyl-1-(2-(5-(p-tolyl)-1H-imidazol-2-yl)piperidin-1-yl)butan-1-one | ++++ |
| 142 | 2,2-dimethyl-1-(2-(5-(p-tolyl)-1H-imidazol-2-yl)piperidin-1-yl)but-3-en-1-one | ++++ |
| 143 | 2,2-dimethyl-1-(2-(5-(p-tolyl)-1H-imidazol-2-yl)piperidin-1-yl)butan-1-one | ++++ |
| 144 | 2,3-dimethoxy-1-(2-(4-phenyl-1H-imidazol-2-yl)piperidin-1-yl)propan-1-one | + |

TABLE 1-continued

| Comp. No. | Chemical Name | EC50 |
|---|---|---|
| 145 | 2,3-dimethyl-1-(2-(4-phenyl-1H-imidazol-2-yl)piperidin-1-yl)butan-1-one | +++ |
| 146 | 2,5-difluoro-4-(2-(1-(2-(methylthio)propanoyl)piperidin-2-yl)-1H-imidazol-4-yl)benzonitrile | ++++ |
| 147 | 2-amino-1-(2-(5-(p-toly)-1H-imidazol-2-yl)piperidin-1-yl)propan-1-one | + |
| 148 | 2-cyclobutyl-1-(2-(4-phenyl-1H-imidazol-2-yl)piperidin-1-yl)propan-1-one | +++ |
| 149 | 2-cyclopentyl-2-ethoxy-1-(2-(4-phenyl-1H-imidazol-2-yl)piperidin-1-yl)ethan-1-one | + |
| 150 | 2-cyclopropyl-1-(2-(4-phenyl-1H-imidazol-2-yl)piperidin-1-yl)ethan-1-one | + |
| 151 | 2-cyclopropyl-1-(2-(4-phenyl-1H-imidazol-2-yl)piperidin-1-yl)propan-1-one | +++ |
| 152 | 2-cyclopropyl-2-methoxy-1-(2-(4-phenyl-1H-imidazol-2-yl)piperidin-1-yl)ethan-1-one | ++ |
| 153 | 2-ethoxy-1-(2-(5-(3-fluorophenyl)-1H-imidazol-2-yl)piperidin-1-yl)propan-1-one | + |
| 154 | 2-ethyl-1-(2-(4-phenyl-1H-imidazol-2-yl)piperidin-1-yl)but-2-en-1-one | +++ |
| 155 | 2-ethyl-1-(2-(4-phenyl-1H-imidazol-2-yl)piperidin-1-yl)butan-1-one | +++ |
| 156 | 2-fluoro-4-(2-(1-(2-(methylthio)propanoyl)piperidin-2-yl)-1H-imidazol-5-yl)benzonitrile | ++++ |
| 157 | 2-mercapto-1-(2-(5-(p-tolyl)-1H-imidazol-2-yl)piperidin-1-yl)propan-1-one | +++ |
| 158 | 2-methoxy-1-(2-(4-phenyl-1H-imidazol-2-yl)piperidin-1-yl)butan-1-one | ++ |
| 159 | 2-methoxy-1-(2-(4-phenyl-1H-imidazol-2-yl)piperidin-1-yl)propan-1-one | + |
| 160 | 2-methoxy-1-(2-(5-(p-tolyl)-1H-imidazol-2-yl)piperidin-1-yl)propan-1-one | +++ |
| 161 | 2-methyl-1-(2-(4-phenyl-1H-imidazol-2-yl)piperidin-1-yl)butan-1-one | +++ |
| 162 | 2-methyl-1-(2-(4-phenyl-1H-imidazol-2-yl)piperidin-1-yl)propan-1-one | ++ |
| 163 | 2-methyl-1-(2-(5-(p-tolyl)-1H-imidazol-2-yl)piperidin-1-yl)but-3-en-1-one | ++++ |
| 164 | 2-methyl-1-(2-(5-(p-tolyl)-1H-imidazol-2-yl)piperidin-1-yl)butan-1-one | ++++ |
| 165 | (S)-2-methyl-1-((R)-2-(5-(p-tolyl)-1H-imidazol-2-yl)piperidin-1-yl)butan-1-one | ++++ |
| 166 | (2S)-2-methyl-1-(2-(5-(p-tolyl)-1H-imidazol-2-yl)piperidin-1-yl)butan-1-one | ++++ |
| 167 | 2-methyl-1-(2-(5-(p-toly)-1H-imidazol-2-yl)piperidin-1-yl)butane-1,3-dione | +++ |
| 168 | 2-methyl-1-(2-(5-(p-tolyl)-1H-imidazol-2-yl)piperidin-1-yl)pentan-1-one | ++++ |
| 169 | 2-methyl-1-(2-(5-(p-tolyl)-1H-imidazol-2-yl)piperidin-1-yl)prop-2-en-1-one | ++++ |
| 170 | 2-methyl-1-(2-(5-(p-tolyl)-1H-imidazol-2-yl)piperidin-1-yl)propan-1-one | ++++ |
| 171 | 2-methyl-2-(methylthio)-1-(2-(5-(p-tolyl)-1H-imidazol-2-yl)piperidin-1-yl)propan-1-one | ++++ |
| 172 | 2-methyl-3-(methylthio)-1-(2-(4-phenyl-1H-imidazol-2-yl)piperidin-1-yl)propan-1-one | ++ |
| 173 | 2-methylene-1-(2-(5-(p-toly)-1H-imidazol-2-yl)piperidin-1-yl)butan-1-one | ++++ |
| 174 | 3-(2-(1-(2-(methylthio)propanoyl)piperidin-2-yl)-1H-imidazol-4-yl)benzonitrile | +++ |
| 175 | 3,3,3-trifluoro-2-methyl-1-(2-(4-phenyl-1H-imidazol-2-yl)piperidin-1-yl)propan-1-one | +++ |
| 176 | 3,3,4,4,4-pentafluoro-1-(2-(4-phenyl-1H-imidazol-2-yl)piperidin-1-yl)butan-1-one | + |
| 177 | 3,3-difluoro-1-(2-(4-phenyl-1H-imidazol-2-yl)piperidin-1-yl)butan-1-one | + |
| 178 | 3-fluoro-4-(2-(1-(2-(methylthio)propanoyl)piperidin-2-yl)-1H-imidazol-5-yl)benzonitrile | ++++ |
| 179 | 3-methyl-1-(2-(4-phenyl-1H-imidazol-2-yl)piperidin-1-yl)but-2-en-1-one | + |
| 180 | 3-methyl-1-(2-(4-phenyl-1H-imidazol-2-yl)piperidin-1-yl)butan-1-one | + |
| 181 | 4-(2-(1-(2-(methylthio)propanoyl)piperidin-2-yl)-1H-imidazol-4-yl)benzonitrile | ++++ |
| 182 | 4-(2-(1-(2-(methylthio)propanoyl)piperidin-2-yl)-1H-imidazol-5-yl)benzaldehyde | ++++ |
| 183 | 4,4,4-trifluoro-2-methyl-1-(2-(4-phenyl-1H-imidazol-2-yl)piperidin-1-yl)butan-1-one | ++ |
| 184 | bicyclo[1.1.1]pentan-1-yl(2-(4-phenyl-1H-imidazol-2-yl)piperidin-1-yl)methanone | ++ |
| 185 | cyclobutyl(2-(5-(3-fluorophenyl)-1H-imidazol-2-yl)piperdin-1-yl)methanone | ++ |
| 186 | cyclopentyl(2-(4-phenyl-1H-imidazol-2-yl)piperidin-1-yl)methanone | ++ |
| 187 | cyclopropyl(2-(4-phenyl-1H-imidazol-2-yl)piperidin-1-yl)methanone | + |
| 188 | methyl 4-(2-(1-(2-(methylthio)propanoyl)piperidin-2-yl)-1H-imidazol-5-yl)benzoate | +++ |
| 189 | N-(2-hydroxyethyl)-4-(2-(1-(2-(methylthio)propanoyl)piperidin-2-yl)-1H-imidazol-4-yl)benzenesulfonamide | + |
| 190 | 2-(methylthio)-1-(2-(5-(3-nitrophenyl)-1H-imidazol-2-yl)piperidin-1-yl)propan-1-one | ++++ |

TABLE 1-continued

| Comp. No. | Chemical Name | EC50 |
|---|---|---|
| 191 | N-(4-(2-(1-(2-(methylthio)propanoyl)piperidin-2-yl)-1H-imidazol-4-yl)phenyl)methanesulfonamide | + |
| 192 | 2-(methylthio)-1-(2-(5-(4-nitrophenyl)-1H-imidazol-2-yl)piperidin-1-yl)propan-1-one | ++++ |
| 193 | (2,2-dimethylcyclopropyl)(2-(5-(p-toly)-1H-imidazol-2-yl)piperidin-1-yl)methanone | ++++ |
| 194 | 1-(2-(5-bromo-1H-imidazol-2-yl)piperidin-1-yl)-2-methylbutan-1-one | + |
| 195 | 1-(2-(5-(4-chlorophenyl)-1H-imidazol-2-yl)piperidin-1-yl)-2-methylbutan-1-one | ++++ |
| 196 | 2-(4-(2-(1-(2-(methylthio)propanoyl)piperidin-2-yl)-1H-imidazol-5-yl)phenyl)acetonitrile | ++++ |
| 197 | 2-(4-(2-(1-(2-methylbutanoyl)piperidin-2-yl)-1H-imidazol-5-yl)phenyl)acetonitrile | ++++ |
| 198 | 2-(4-(2-(1-(2-methylbutanoyl)piperidin-2-yl)-1H-imidazol-5-yl)phenyl)acetonitrile | ++++ |
| 199 | 2,3-dimethyl-1-(2-(5-(p-tolyl)-1H-imidazol-2-yl)piperidin-1-yl)butan-1-one | ++++ |
| 200 | 2-methyl-1-(2-(5-(o-tolyl)-1H-imidazol-2-yl)piperidin-1-yl)butan-1-one | +++ |
| 201 | 2-methyl-1-(2-(5-(m-tolyl)-1H-imidazol-2-yl)piperidin-1-yl)butan-1-one | +++ |
| 202 | 1-(2-(5-(4-(hydroxymethyl)phenyl)-1H-imidazol-2-yl)piperidin-1-yl)-2-methylbutan-1-one | +++ |
| 203 | 1-(isopropylsulfonyl)-2-(5-(p-tolyl)-1H-imidazol-2-yl)piperidine | ++ |
| 204 | 1-(sec-butylsulfonyl)-2-(5-(p-tolyl)-1H-imidazol-2-yl)piperidine | + |
| 205 | 2-methyl-1-(2-(5-(5-methylthiophen-2-yl)-1H-imidazol-2-yl)piperidin-1-yl)butan-1-one | ++++ |
| 206 | 2-(methylthio)-1-(2-(5-(p-toly)-1H-imidazol-2-yl)piperazin-1-yl)propan-1-one | ++++ |
| 207 | 2-(methylthio)-1-(2-(4-(p-tolyl)oxazol-2-yl)piperidin-1-yl)propan-1-one | ++++ |
| 208 | 2-methyl-1-(2-(4-(p-tolyl)oxazol-2-yl)piperidin-1-yl)butan-1-one | ++++ |

++++ $EC_{50}$ Value in the range of 0.05 μM and lower
+++ $EC_{50}$ value in the range of 0.05-0.3 μM
++ $EC_{50}$ value in the range of 0.3-1.00 μM
+ $EC_{50}$ value in the range of 1.00-35 μM Example 2: Sensory Studies in Aqueous Solution The compounds as listed below in Table 2 were dissolved at a concentration of 1 wt-% in propylene glycol. These solutions were then dispensed in appropriate quantities into deionized water containing 0.5 wt-% Poloxamer 407 (which is a hydrophilic non-ionic surfactant, e.g., commercially available from SigmaAldrich) and 0.25 wt-% Cremaphor® RH40 (obtained from BASF) as solubilizer, to obtain the desired final concentration of 10 ppm (parts per million) of the respective compound.

A trained group of panelists evaluated the aqueous solutions containing test compound by swilling 20 mL of the solution in the mouth for 60 seconds, followed by spitting, without rinsing the mouth afterwards for the duration of the evaluation. Panelists evaluated and recorded the cooling performance as well as other sensorial and organoleptic attributes at different timepoints over a period of two hours. Cooling performance was rated on a scale from 0 to 10 with 0 being no effect and 10 being freezing. Scores were averaged for all panelists and the cooling intensity qualified as "none" (score of 0), "low" (score above 0, up to 1), "medium" (score above 1, up to 4) "strong" (score above 4, up to 8) and "freezing" (score above 8), which are provided in Table 2. None of the tested compounds showed any statistically significant bitterness or negative organoleptic features.

TABLE 2

| Comp. No | Chemical Name | Max. cooling | Time of max. cooling | Cooling after 1 h |
|---|---|---|---|---|
| 135 Ex. 37 | 2-(methylthio)-1-(5-phenyl-1H-imidazol-2-yl)piperidin-1-yl)propan-1-one | M | 10 min | L |
| 130 Ex. 38 | 2-(methylthio)-1-(2-(5-(p-toly))-1H-imidazol-2-yl)piperdin-1-yl)propan-1-one | S | 20 min | M |
| 124 Ex. 60 | 2-(methylthio)-1-(2-(5-(4-(trifluoromethyl)phenyl)-1H-imidazol-2-yl)piperidin-1-yl)propan-1-one | M | 20 min | M |
| 127 Ex. 59 | 2-(methylthio)-1-(2-(5-(5-methylthiophen-2-yl)-1H-imidazol-2-yl)piperidin-1-yl)propan-1-one | S | 10 min | M |
| 95 Ex. 13 | 2-(ethylthio)-1-(2-(5-(p-tolyl)-1H-imidazol-2-yl)piperidin-1-yl)propan-1-one | M | 10 min | M |
| 163 Ex. 39 | 2-methyl-1-(2-(5-(p-tolyl)-1H-imidazol-2-yl)piperidin-1-yl)but-3-en-1-one | S | 10 min | M |
| 164 Ex. 45 | 2-methyl-1-(2-(5-(p-tolyl)-1H-imidazol-2-yl)piperidin-1-yl)butan-1-one | S | 10 min | M |
| 11 | (R)-2-(methylthio)-1-((R)-2-(5-(p-tolyl)- | S | 10 min | M |

TABLE 2-continued

| Comp. No | Chemical Name | Max. cooling | Time of max. cooling | Cooling after 1 h |
|---|---|---|---|---|
| Ex. 69 | 1H-imidazol-2-yl)piperidin-1-yl)propan-1-one | | | |
| 166 Ex. 56 | (2S)-2-methyl-1-(2-(5-(p-toly)-1H-imidazol-2-yl)piperidin-1-yl)butan-1-one | S | 20 min | M |

M = medium;
S = Strong,
L = Low

Example 3: Sensory Studies in Model Dentifrice

The compounds listed in Table 3 were dissolved at a concentration of 1 wt-% in propylene glycol[A] or benzyl alcohol[B] (respective solvents indicated in Table 3). These solutions were then dispersed in appropriate quantities to obtain the desired final concentration of 40 ppm (parts per million) of the test compound into a model, unflavored dentifrice, the formula of which is given below (ingredients obtained from the suppliers respectively indicated in parenthesis).

| | wt % |
|---|---|
| Trisodium Phosphate dodecahydrate | 0.2 |
| Sorbitol | 50.0 |
| Precipitated Silica - Sorbosil ™ AC77 (Surfachem) | 8.0 |
| Precipitated Silica - Sorbosil ™ TC15 (Surfachem) | 9.0 |
| Sodium Carboxy Methyl Cellulose 9M31XF (Ashland) | 0.8 |
| Titanium Dioxide | 1.0 |
| Sodium Lauryl Sulphate | 1.5 |
| PEG 1500 (Kilo) | 5.0 |
| Demin Water | 24.5 |

A trained group of panelists evaluated the dentifrice containing a compound of formula (I), by brushing their teeth with 1 g of the dentifrice using a toothbrush for 60 seconds, followed by spitting, without rinsing the mouth afterwards for the duration of the evaluation. Panelists evaluated and recorded the cooling performance as well as other sensorial and organoleptic attributes at different time-points over a period of two hours. Cooling performance was rated on a scale from 0 to 10 with 0 being no effect and 10 being freezing. Scores were averaged for all panelists and the cooling intensity qualified as "none" (score of 0), "low" (score above 0, up to 1), "medium" (score above 1, up to 4) "strong" (score above 4, up to 8) and "freezing" (score above 8), which are summarized below in Table 3. None of the tested compounds showed any statistically significant bitterness or negative organoleptic features.

TABLE 3

| Comp. No. | Chemical Name | Max. cooling | Time of max. cooling | Cooling after 1 h |
|---|---|---|---|---|
| 130 Ex. 38 | 2-(methylthio)-1-(2-(5-(p-tolyl)-1H-imidazol-2-yl)piperidin-1-yl)propan-1-one[A] | S | 20 min | M |
| 124 Ex. 60 | 2-(methylthio)-1-(2-(5-(4-(trifluoromethyl)phenyl)-1H-imidazol-2-yl)piperidin-1-yl)propan-1-one[A] | M | 30 min | M |
| 95 Ex. 13 | 2-(ethylthio)-1-(2-(5-(p-tolyl)-1H-imidazol-2-yl)piperidin-1-yl)propan-1-one[A] | M | 5 min | L |
| 163 Ex. 39 | 2-methyl-1-(2-(5-(p-tolyl)-1H-imidazol-2-yl)piperidin-1-yl)but-3-en-1-one[A] | M | 5 min | M |
| 164 Ex. 45 | 2-methyl-1-(2-(5-(p-tolyl)-1H-imidazol-2-yl)piperidin-1-yl)butan-1-one[B] | S | 10 min | M |
| 11 Ex. 69 | (R)-2-(methylthio)-1-((R)-2-(5-(p-toly)-1H-imidazol-2-yl)piperidin-1-yl)propan-1-one[A] | S | 20 min | M |
| 166 Ex. 56 | (2S)-2-methyl-1-(2-(5-(p-tolyl)-1H-imidazol-2-yl)piperidin-1-yl)butan-1-one[B] | S | 10 min | M |

M = medium;
S = Strong,
L = Low

The invention claimed is:

1. A method of modulating of transient receptor potential channel melastatin member 8 (TRPM8) comprising bringing the receptor into contact with a compound of formula (Ia), a salt or solvate thereof

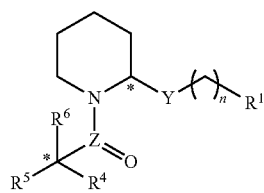

(Ia)

wherein
n is 0 or 1;
$R^1$ is selected from
$C_6$-$C_{10}$ aryl optionally substituted with up to four substituents independently selected from the group consisting of
halogen; OH (hydroxyl); C≡N (cyano); $NO_2$ (nitro);
$C_1$-$C_6$ alkyl optionally comprising up to 5 halogen atoms;

$C_1$-$C_3$ alkyl comprising up to 3 OH groups;
$C_2$-$C_6$ alkenyl;
$C_1$-$C_6$ alkoxy optionally comprising up to 3 halogen atoms;
$C_1$-$C_3$ alkoxy $C_1$-$C_3$ alkyl;
$C_3$-$C_7$ cycloalkyl;
—C(O)$R^{10}$ wherein $R^{10}$ is selected from $C_1$-$C_3$ alkyl;
—OC(O)$R^{11}$ wherein $R^{11}$ is selected from H, and $C_1$-$C_3$ alkyl;
—C(O)O—$R^{12}$ wherein $R^{12}$ is selected from hydrogen and $C_1$-$C_3$ alkyl;
—(CH$_2$)$_m$N($R^{13}$)$R^{14}$ wherein m is 0 or 1, $R^{13}$ is selected from hydrogen, $C_1$-$C_3$ alkyl, and —SO$_2$$R^{15}$ wherein $R^{15}$ is $C_1$-$C_3$ alkyl, and $R^{14}$ is selected from hydrogen, $C_1$-$C_3$ alkyl, and —SO$_2$$R^{16}$ wherein $R^{16}$ is $C_1$-$C_3$ alkyl, or wherein $R^{13}$ and $R^{14}$ form together with the N atom to which they are attached morpholine, thiomorpholine, or 1,1-dioxothiomorpholine;
—SR17 wherein $R^{17}$ is selected from hydrogen and $C_1$-$C_3$ alkyl; and
—S(O) 2$R^{18}$ wherein $R^{18}$ is selected from hydrogen and $C_1$-$C_3$ alkyl;
with the proviso that when the aryl ring is substituted with two or more substituents two substituents may form a cyclic ring together with the carbon atoms to which they are attached, and
$C_5$-$C_{10}$ mono- or bicyclic heteroaryl wherein up to 2 C-atoms are replaced by hetero atoms independently selected from sulfur, nitrogen, and oxygen, optionally substituted with up to four substituents selected from the group consisting of
halogen; OH (hydroxyl); C≡N (cyano); NO$_2$ (nitro);
$C_1$-$C_6$ alkyl optionally comprising up to 5 halogen atoms;
$C_2$-$C_6$ alkenyl;
$C_1$-$C_6$ alkoxy optionally comprising up to 3 halogen atoms;
$C_1$-$C_3$ alkoxy $C_1$-$C_3$ alkyl;
$C_3$-$C_7$ cycloalkyl;
—C(O) $R^{20}$ wherein $R^{20}$ is selected from $C_1$-$C_3$ alkyl;
—OC(O)$R^{21}$ wherein $R^{21}$ is selected from H, and $C_1$-$C_3$ alkyl;
—C(O)O—$R^{22}$ wherein $R^{22}$ is selected from hydrogen and $C_1$-$C_3$ alkyl);
—(CH$_2$)mN($R^{23}$)$R^{24}$ wherein m is 0 or 1, $R^{23}$ is selected from hydrogen, $C_1$-$C_3$ alkyl, and —SO$_2$$R^{25}$ wherein $R^{25}$ is $C_1$-$C_3$ alkyl, and $R^{24}$ is selected from hydrogen, $C_1$-$C_3$ alkyl, and —SO$_2$$R^{26}$ wherein $R^{26}$ is $C_1$-$C_3$ alkyl, or wherein $R^{23}$ and $R^{24}$ form together with the N atom to which they are attached morpholine, thiomorpholine, or 1,1-dioxothiomorpholine;
—$SR^{27}$ wherein $R^{27}$ is selected from hydrogen and $C_1$-$C_3$ alkyl; and
—S(O)$_2$$R^{28}$ wherein $R^{28}$ is selected from hydrogen and $C_1$-$C_3$ alkyl;
Y is a monocyclic, unsaturated or aromatic heterocyclic ring comprising one, two, three or four heteroatoms independently selected from nitrogen, sulfur and oxygen, wherein the ring is optionally mon-, di-, or tri-substituted with a group selected from halogen, methyl, ethyl, —N($R^{40}$)$R^{41}$, —CON($R^{40}$)$R^{41}$, —[C$R^{40}$$R^{41}$]$_p$-C(O)O$R^{40}$, —C(O)$R^{40}$, and —SO$_2$N($R^{40}$)$R^{41}$ wherein $R^{40}$ and $R^{41}$ are independently selected from hydrogen and $C_1$-$C_4$ alkyl (including ethyl and propyl), and p is 0, 1 or 2;

Z is C; and
$R^4$, $R^5$ and $R^6$ form together with the carbon atom to which they are attached a hydrocarbon group comprising 2 to 15 C-atoms, optionally comprising up to five hetero atoms selected from O, N, S, and F.

2. The method according to claim 1, wherein the compound of formula (Ia) is selected from the group consisting of (2-(4-phenyl-1H-imidazol-2-yl)piperidin-1-yl)(1,2,3-thiadiazol-5-yl)methanone, (2-(4-phenyl-1H-imidazol-2-yl)piperidin-1-yl)(thietan-3-yl)methanone, (2,2-dimethylcyclopropyl) (2-(4-phenyl-1H-imidazol-2-yl)piperidin-1-yl)methanone, (2-ethoxycyclopropyl) (2-(4-phenyl-1H-imidazol-2-yl)piperidin-1-yl)methanone, (2-methoxycyclopropyl) (2-(4-phenyl-1H-imidazol-2-yl)piperidin-1-yl)methanone, (2-methylcyclopropyl) (2-(4-phenyl-1H-imidazol-2-yl)piperidin-1-yl)methanone, (2S)-2-methyl-1-(2-(5-(p-tolyl)-1H-imidazol-2-yl)piperidin-1-yl)butan-1-one, (5-methyltetrahydrofuran-3-yl)(2-(4-phenyl-1H-imidazol-2-yl)piperidin-1-yl)methanone, (E)-1-(2-(5-(3,4-difluorophenyl)-1H-imidazol-2-yl)piperidin-1-yl)-2-methylbut-2-en-1-one, (E)-2-methyl-1-(2-(5-(p-tolyl)-1H-imidazol-2-yl)piperidin-1-yl)but-2-en-1-one, (E)-2-methyl-1-(2-(5-(p-tolyl)-1H-imidazol-2-yl)piperidin-1-yl)pent-3-en-1-one, (R)-2-(methylthio)-1-((R)-2-(5-(p-tolyl)-1H-imidazol-2-yl)piperidin-1-yl)propan-1-one, (S)-2-(methylthio)-1-((R)-2-(5-(p-tolyl)-1H-imidazol-2-yl) piperidin-1-yl)propan-1-one, (S)-2-(methylthio)-1-((S)-2-(5-(p-tolyl)-1H-imidazol-2-yl)piperidin-1-yl)propan-1-one, (S)-2-methyl-1-((R)-2-(5-(p-tolyl)-1H-imidazol-2-(tetrahydrofuran-3-yl)(2-(5-(p-tolyl)-1H-imidazol-2-yl)piperidin-1-yl)butan-1-one, 1-(2-(4-(1-methyl-1H-pyrazol-4-yl)-1H-imidazol-2-yl)piperidin-1-yl)methanone, yl)piperidin-1-yl)-2-(methylthio)propan-1-one, 1-(2-(4-(2,2-difluorobenzo[d][1,3]dioxol-5-yl)-1H-imidazol-2-yl)piperidin-1-yl)-2-(methylthio)propan-1-one, 1-(2-(4-(2,3-dihydrobenzofuran-5-yl)-1H-imidazol-2-yl)piperidin-1-yl)-2-(methylthio) propan-1-one, 1-(2-(4-(2,3-dihydrobenzofuran-6-yl)-1H-imidazol-2-yl)piperidin-1-yl)-2-(methylthio)propan-1-one, 1-(2-(4-(2,5-dimethylphenyl)-1H-imidazol-2-yl)piperidin-1-yl)-2-(methylthio)propan-1-one, 1-(2-(4-(2-chlorophenyl)-1H-imidazol-2-yl)piperidin-1-yl)-2-(methylthio)propan-1-one, 1-(2-(4-(2-cyclopropyloxazol-5-yl)-1H-imidazol-2-yl)piperidin-1-yl)-2-(methylthio)propan-1-one, 1-(2-(4-(2-fluorophenyl)-1H-imidazol-2-yl)piperidin-1-yl)-2-(methylthio)propan-1-one, 1-(2-(4-(2-hydroxyphenyl)-1H-imidazol-2-yl)piperidin-1-yl)-2-(methylthio)propan-1-one, 1-(2-(4-(3-((dimethylamino) methyl) phenyl)-1H-imidazol-2-yl)piperidin-1-yl)-2-(methylthio)propan-1-one, 1-(2-(4-(3,5-difluorophenyl)-1H-imidazol-2-yl)piperidin-1-yl)-2-(methylthio)propan-1-one, 1-(2-(4-(3,5-dimethylisoxazol-4-yl)-1H-imidazol-2-yl)piperidin-1-yl)-2-(methylthio)propan-1-one, 1-(2-(4-(3-chloro-4-methylphenyl)-1H-imidazol-2-yl)piperidin-1-yl)-2-(methylthio)propan-1-one, 1-(2-(4-(3-methylfuran-2-yl)-1H-imidazol-2-yl)piperidin-1-yl)-2-(methylthio)propan-1-one, 1-(2-(4-(4-((1,1-dioxidothiomorpholino) methyl) phenyl)-1H-imidazol-2-yl)piperidin-1-yl)-2-(methylthio)propan-1-one, 1-(2-(4-(4-(1-hydroxyethyl) phenyl)-1H-imidazol-2-yl)piperidin-1-yl)-2-(methylthio)propan-1-one, 1-(2-(4-(4-(difluoromethoxy)-3-fluorophenyl)-1H-imidazol-2-yl)piperidin-1-yl)-2-(methylthio)propan-1-one, 1-(2-(4-(4-(difluoromethyl) thiophen-3-yl)-1H-imidazol-2-yl)piperidin-1-yl)-2-(methylthio)propan-1-one, 1-(2-(4-(4-(methylsulfonyl) phenyl)-1H-imidazol-2-yl)piperidin-1-yl)-2-(methylthio)propan-1-one, 1-(2-(4-(4-(tert-butyl) phenyl)-1H-imidazol-2-yl)piperidin-1-yl)-2-(methylthio)propan-1-one, 1-(2-(4-(4-cyclobutylphenyl)-1H-imidazol-2-yl)piperidin-1-yl)-2-(methylthio)propan-1-one, 1-(2-(4-(4-cyclopropyl-2- fluorophenyl)-1H-imidazol-2-yl)piperidin-1-yl)-2-(methylthio)propan-1-one, 1-(2-(4-(4-fluorophenyl)-1H-imidazol-2-yl)piperidin-1-yl)-2-(methylthio)propan-1-one, 1-(2-(4-(4-hydroxyphenyl)-1H-imidazol-2-yl)piperidin-1-yl)-2-(methylthio)propan-1-one, 1-(2-(4-(4-isopropylphenyl)-1H-imidazol-2-yl)piperidin-1-yl)-2-(methylthio)propan-1-one, 1-(2-(4-(4-methyl-3-(trifluoromethyl) phenyl)-1H-imidazol-2-yl)piperidin-1-yl)-2-(methylthio)propan-1-one, 1-(2-(4-(5-((dimethylamino) methyl) thiophen-2-yl)-1H-imidazol-2-yl)piperidin-1-yl)-2-(methylthio)propan-1-one, 1-(2-(4-(5-methylfuran-2-yl)-1H-imidazol-2-yl) piperidin-1-yl)-2-(methylthio)propan-1-one, 1-(2-(4-(5-methylpyridin-3-yl)-1H-imidazol-2-yl)piperidin-1-yl)-2-(methylthio)propan-1-one, 1-(2-(4-(6-methylpyridin-3-yl)-1H-imidazol-2-yl)piperidin-1-yl)-2-(methylthio)propan-1-one, 1-(2-(4-(benzo[b]thiophen-6-yl)-1H-imidazol-2-yl) piperidin-1-yl)-2-(methylthio)propan-1-one, 1-(2-(4-methyl-5-phenyl-1H-imidazol-2-yl)piperidin-1-yl)-2-(methylthio)propan-1-one, 1-(2-(4-phenyl-1H-imidazol-2-yl)piperidin-1-yl)-2-((trifluoromethyl) thio) ethan-1-one, 1-(2-(4-phenyl-1H-imidazol-2-yl)piperidin-1-yl)butan-1-one, 1-(2-(4-phenyl-1H-imidazol-2-yl)piperidin-1-yl)hexa-3,5-dien-1-one, 1-(2-(4-phenyl-1H-imidazol-2-yl)piperidin-1-yl)pent-4-en-1-one, 1-(2-(4-phenyl-1H-imidazol-2-yl) piperidin-1-yl)propan-1-one, 1-(2-(5-(2,3-difluorophenyl)-1H-imidazol-2-yl)piperidin-1-yl)-2-(methylthio)propan-1-one, 1-(2-(5-(2,4-difluorophenyl)-1H-imidazol-2-yl) piperidin-1-yl)-2-(methylthio)propan-1-one, 1-(2-(5-(2,5-difluorophenyl)-1H-imidazol-2-yl)piperidin-1-yl)-2-(methylthio)propan-1-one, 1-(2-(5-(2-fluoro-4-methoxyphenyl)-1H-imidazol-2-yl)piperidin-1-yl)-2-(methylthio)propan-1-one, 1-(2-(5-(2-fluoro-4-methylphenyl)-1H-imidazol-2-yl)piperidin-1-yl)-2-(methylthio)propan-1-one, 1-(2-(5-(2-methoxypyrimidin-5-yl)-1H-imidazol-2-yl)piperidin-1-yl)-2-(methylthio)propan-1-one, 1-(2-(5-(3-(methylamino) phenyl)-1H-imidazol-2-yl) piperidin-1-yl)-2-(methylthio)propan-1-one, 1-(2-(5-(3,4-difluorophenyl)-1H-imidazol-2-yl)piperidin-1-yl)-2-(methylthio)propan-1-one, 1-(2-(5-(3,4-difluorophenyl)-1H-imidazol-2-yl)piperidin-1-yl)-2-methylbut-3-en-1-one, 1-(2-(5-(3,4-dimethoxyphenyl)-1H-imidazol-2-yl)piperidin-1-yl)-2-(methylthio)propan-1-one, 1-(2-(5-(3,4-dimethylphenyl)-1H-imidazol-2-yl)piperidin-1-yl)-2-(methylthio) propan-1-one, 1-(2-(5-(3-fluoro-4-(methoxymethyl) phenyl)-1H-imidazol-2-yl)piperidin-1-yl)-2-(methylthio) propan-1-one, 1-(2-(5-(3-fluoro-4-methylphenyl)-1H-imidazol-2-yl)piperidin-1-yl)-2-(methylthio)propan-1-one, 1-(2-(5-(3-fluorophenyl)-1H-imidazol-2-yl)piperidin-1-yl)-2-(methylthio)propan-1-one, 1-(2-(5-(3-methoxyisothiazol-4-yl)-1H-imidazol-2-yl)piperidin-1-yl)-2-(methylthio)propan-1-one, 1-(2-(5-(3-methoxyphenyl)-1H-imidazol-2-yl) piperidin-1-yl)-2-(methylthio)propan-1-one, 1-(2-(5-(4-((methylamino) methyl) phenyl)-1H-imidazol-2-yl) piperidin-1-yl)-2-(methylthio)propan-1-one, 1-(2-(5-(4-(2-methoxyethyl) phenyl)-1H-imidazol-2-yl)piperidin-1-yl)-2-(methylthio)propan-1-one, 1-(2-(5-(4-(aminomethyl) phenyl)-1H-imidazol-2-yl)piperidin-1-yl)-2-(methylthio) propan-1-one, 1-(2-(5-(4-(dimethylamino) phenyl)-1H-imidazol-2-yl)piperidin-1-yl)-2-(methylthio)propan-1-one, 1-(2-(5-(4-(hydroxymethyl) phenyl)-1H-imidazol-2-yl)piperidin-1-yl)-2-(methylthio)propan-1-one, 1-(2-(5-(4-acetylphenyl)-1H-imidazol-2-yl)piperidin-1-yl)-2-(methylthio)propan-1-one, 1-(2-(5-(4-aminophenyl)-1H-imidazol-2-yl)piperidin-1-yl)-2-(methylthio)propan-1-one, 1-(2-(5-(4-chloro-3-fluorophenyl)-1H-imidazol-2-yl)piperidin-1-yl)-2-(methylthio)propan-1-one, 1-(2-(5-(4-chlorophenyl)-1H-imidazol-2-yl)piperidin-1-yl)-2-(methylthio)propan-1-one, 1-(2-(5-(4-ethylphenyl)-1H-imidazol-2-yl)piperidin-1-yl)-2-(methylthio)propan-1-one, 1-(2-(5-(4-fluorophenyl)-4H-1,2,4-triazol-3-yl)piperidin-1-yl)-2-(methylthio)propan-1-one, 1-(2-(5-(4-methoxy-2-methylphenyl)-1H-imidazol-2-yl)piperidin-1-yl)-2-(methylthio)propan-1-one, 1-(2-(5-(4-methoxyphenyl)-1H-imidazol-2-yl)piperidin-1-yl)-2-(methylthio)propan-1-one, 1-(2-(5-(4-methyl-6-(methylthio) pyridin-3-yl)-1H-imidazol-2-yl)piperidin-1-yl)-2-(methylthio)propan-1-one, 1-(2-(5-(5-(methoxymethyl) thiophen-3-yl)-1H-imidazol-2-yl) piperidin-1-yl)-2-(methylthio)propan-1-one, 1-(2-(5-(6-methoxypyridin-3-yl)-1H-imidazol-2-yl)piperidin-1-yl)-2-(methylthio)propan-1-one, 1-(2-(5-(benzo[d][1,3]dioxol-5-yl)-1H-imidazol-2-yl)piperidin-1-yl)-2-(methylthio)propan-1-one, 1-(2-(5-(p-tolyl)-1H-imidazol-2-yl)piperidin-1-yl) propan-1-one, 1-(2-(5-benzyl-1H-imidazol-2-yl)piperidin-1-yl)-2-(methylthio)propan-1-one, 2-(2-(1-(2-(methylthio) propanoyl)piperidin-2-yl)-1H-2-(2-(4-phenyl-1H-imidazol-2-yl)piperidine-1-imidazol-5-yl)benzonitrile, carbonyl) cyclopropane-1-carbonitrile, 2-(5-methylfuran-2-yl)-1-(2-(4-phenyl-1H-imidazol-2-yl)piperidin-1-yl)propan-1-one, 2-(allylthio)-1-(2-(5-(p-tolyl)-1H-imidazol-2-yl)piperidin-1-yl)propan-1-one, 2-(dimethylamino)-1-(2-(4-phenyl-1H-imidazol-2-yl)piperidin-1-yl)butan-1-one, 2-(dimethylamino)-1-(2-(4-phenyl-1H-imidazol-2-yl)piperidin-1-yl) propan-1-one, 2-(ethylthio)-1-(2-(5-(p-tolyl)-1H-imidazol-2-yl)piperidin-1-yl)propan-1-one, 2-(furan-2-yl)-1-(2-(4-phenyl-1H-imidazol-2-yl)piperidin-1-yl)ethan-1-one, 2-(furan-2-yl)-1-(2-(4-phenyl-1H-imidazol-2-yl)piperidin-1-yl)propan-1-one, 2-(furan-3-yl)-1-(2-(4-phenyl-1H-imidazol-2-yl)piperidin-1-yl)ethan-1-one, 2-(furan-3-yl)-1-(2-(5-(p-tolyl)-1H-imidazol-2-yl)piperidin-1-yl)propan-1-one, 2-(methylamino)-N-(4-(2-(1-(2-(methylthio)propanoyl)piperidin-2-yl)-1H-imidazol-5-yl)phenyl) acetamide, 2-(methylsulfinyl)-1-(2-(5-(p-tolyl)-1H-imidazol-2-yl)piperidin-1-yl)propan-1-one, 2-(methylsulfonyl)-1-(2-(4-phenyl-1H-imidazol-2-yl)piperidin-1-yl)ethan-1-one, 2-(methylsulfonyl)-1-(2-(4-phenyl-1H-imidazol-2-yl)piperidin-1-yl)propan-1-one, 2-(methylthio)-1-(2-(2-(p-tolyl)-2H-tetrazol-5-yl)piperidin-1-yl)propan-1-one, 2-(methylthio)-1-(2-(3-phenyl-1,2,4-oxadiazol-5-yl)piperidin-1-yl) propan-1-one, 2-(methylthio)-1-(2-(4-(1-(trifluoromethyl)-1H-pyrazol-4-yl)-1H-imidazol-2-yl)piperidin-1-yl)propan-1-one, 2-(methylthio)-1-(2-(4-(4-(morpholinomethyl) phenyl)-1H-imidazol-2-yl)piperidin-1-yl)propan-1-one, 2-(methylthio)-1-(2-(4-(5-(trifluoromethyl) furan-2-yl)-1H-imidazol-2-yl)piperidin-1-yl)propan-1-one, 2-(methylthio)-1-(2-(4-(5-(trifluoromethyl) thiophen-2-yl)-1H-imidazol-2-yl)piperidin-1-yl)propan-1-one, 2-(methylthio)-1-(2-(4-(5-methylthiophen-3-yl)-1H-imidazol-2-yl)piperidin-1-yl) propan-1-one, 2-(methylthio)-1-(2-(4-(m-tolyl)-1H-imidazol-2-yl)piperidin-1-yl)propan-1-one, 2-(methylthio)-1-(2-(4-(o-tolyl)-1H-imidazol-2-yl)piperidin-1-yl)propan-1-one, 2-(methylthio)-1-(2-(4-(pyridin-3-yl)-1H-imidazol-2-yl)piperidin-1-yl)propan-1-one, 2-(methylthio)-1-(2-(4-(pyridin-4-yl)-1H-imidazol-2-yl)piperidin-1-yl)propan-1-one, 2-(methylthio)-1-(2-(4-(pyrimidin-5-yl)-1H-imidazol-2-yl)piperidin-1-yl)propan-1-one, 2-(methylthio)-1-(2-(4-(quinoxalin-6-yl)-1H-imidazol-2-yl)piperidin-1-yl)propan-1-one, 2-(methylthio)-1-(2-(4-(quinoxalin-6-yl)-1H-imidazol-2yl)piperidin-1-yl)propan-1-one, 2-(methylthio)-1-(2-(4-phenyl-1H-imidazol-2-yl)piperidin-1-yl)ethan-1-one, 2-(methylthio)-1-(2-(5-(2-(trifluoromethyl) phenyl)-1H-imidazol-2-yl)piperidin-1-yl)propan-1-one, 2-(methylthio)-1-(2-(5-(2,3,4-trifluorophenyl)-1H-imidazol-2-yl)piperidin-1-yl)propan-1-one, 2-(methylthio)-1-(2-(5-(2,4,5-trifluorophenyl)-1H-imidazol-2-yl)piperidin-1-yl)

propan-1-one, 2-(methylthio)-1-(2-(5-(3-(trifluoromethyl)phenyl)-1H-imidazol-2-yl)piperidin-1-yl)propan-1-one, 2-(methylthio)-1-(2-(5-(4-(trifluoromethoxy) phenyl)-1H-imidazol-2-yl)piperidin-1-2-(methylthio)-1-(2-(4-(thiophen-3-yl)-1H-imidazol-2-yl)propan-1-one, 2-(methylthio)-1-(2-(5-(4-(trifluoromethyl) phenyl)-1H-imidazol-2-yl)piperidin-1-yl)propan-1-one, 2-(methylthio)-1-(2-(5-(4-propylphenyl)-1H-imidazol-2-yl)piperidin-1-yl)propan-1-one, 2-(methylthio)-1-(2-(5-(4-vinylphenyl)-1H-imidazol-2-yl)piperidin-1-yl)propan-1-one, 2-(methylthio)-1-(2-(5-(5-methylthiophen-2-yl)-1H-imidazol-2-yl)piperidin-1-yl)propan-1-one, 2-(methylthio)-1-(2-(5-(p-tolyl)-1,3,4-oxadiazol-2-yl)piperidin-1-yl)propan-1-one, 2-(methylthio)-1-(2-(5-(p-tolyl)-1H-imidazol-2-yl)azepan-1-yl)propan-1-one, 2-(methylthio)-1-(2-(5-(p-tolyl)-1H-imidazol-2-yl)piperidin-1-yl)propan-1-one, 2-(methylthio)-1-(2-(5-(p-tolyl)-4H-1,2,4-triazol-3-yl)piperidin-1-yl)propan-1-one, 2-(methylthio)-1-(2-(5-(p-tolyl) isoxazol-3-yl)piperidin-1-yl)propan-1-one, 2-(methylthio)-1-(2-(5-(p-tolyl) oxazol-2-yl)piperidin-1-yl)propan-1-one, 2-(methylthio)-1-(2-(5-(p-tolyl) thiazol-2-yl)piperidin-1-yl)propan-1-one, 2-(methylthio)-1-(2-(5-phenyl-1H-imidazol-2-yl)piperidin-1-yl)propan-1-one, 2-(methylthio)-1-(2-(5-phenyl-1H-imidazol-2-yl)pyrrolidin-1-yl)propan-1-one, 2-(methylthio)-1-(2-(5-phenyl-4H-1,2,4-triazol-3-yl)piperidin-1-yl)propan-1-one, 2-(methylthio)-1-(2-(5-phenyloxazol-2-yl)piperidin-1-yl)propan-1-one, 2-(methylthio)-1-(4-(5-(p-tolyl)-1H-imidazol-2-yl)thiazolidin-3-yl)propan-1-one, 2,2,3-trimethyl-1-(2-(5-(p-tolyl)-1H-imidazol-2-yl)piperidin-1-yl)but-3-en-1-one, 2,2,3-trimethyl-1-(2-(5-(p-tolyl)-1H-imidazol-2-yl)piperidin-1-yl)butan-1-one, 2,2-dimethyl-1-(2-(5-(p-tolyl)-1H-imidazol-2-yl)piperidin-1-yl)but-3-en-1-one, 2,2-dimethyl-1-(2-(5-(p-tolyl)-1H-imidazol-2-yl)piperidin-1-yl)butan-1-one, 2,3-dimethoxy-1-(2-(4-phenyl-1H-imidazol-2-yl)piperidin-1-yl)propan-1-one, 2,3-dimethyl-1-(2-(4-phenyl-1H-imidazol-2-yl)piperidin-1-yl)butan-1-one, 2,5-difluoro-4-(2-(1-(2-(methylthio)propanoyl)piperidin-2-yl)-1H-imidazol-4-yl)benzonitrile, 2-amino-1-(2-(5-(p-tolyl)-1H-imidazol-2-yl)piperidin-1-yl)propan-1-one, 2-cyclobutyl-1-(2-(4-phenyl-1H-imidazol-2-yl)piperidin-1-yl)propan-1-one, 2-cyclopentyl-2-ethoxy-1-(2-(4-phenyl-1H-imidazol-2-yl)piperidin-1-yl)ethan-1-one, 2-cyclopropyl-1-(2-(4-phenyl-1H-imidazol-2-yl)piperidin-1-yl)ethan-1-one, 2-cyclopropyl-1-(2-(4-phenyl-1H-imidazol-2-yl)piperidin-1-yl)propan-1-one, 2-cyclopropyl-2-methoxy-1-(2-(4-phenyl-1H-imidazol-2-yl)piperidin-1-yl)ethan-1-one, 2-ethoxy-1-(2-(5-(3-fluorophenyl)-1H-imidazol-2-yl)piperidin-1-yl)propan-1-one, 2-ethyl-1-(2-(4-phenyl-1H-imidazol-2-yl)piperidin-1-yl)but-2-en-1-one, 2-ethyl-1-(2-(4-phenyl-1H-imidazol-2-yl)piperidin-1-yl)butan-1-one, 2-fluoro-4-(2-(1-(2-(methylthio)propanoyl)piperidin-2-yl)-1H-imidazol-5-yl)benzonitrile, 2-mercapto-1-(2-(5-(p-tolyl)-1H-imidazol-2-yl)piperidin-1-yl)propan-1-one, 2-methoxy-1-(2-(4-phenyl-1H-imidazol-2-yl)piperidin-1-yl)butan-1-one, 2-methoxy-1-(2-(4-phenyl-1H-imidazol-2-yl)piperidin-1-yl)propan-1-one, 2-methoxy-1-(2-(5-(p-tolyl)-1H-imidazol-2-yl)piperidin-1-yl)propan-1-one, 2-methyl-1-(2-(4-phenyl-1H-imidazol-2-yl)piperidin-1-yl)butan-1-one, 2-methyl-1-(2-(4-phenyl-1H-imidazol-2-yl)piperidin-1-yl)propan-1-one, 2-methyl-1-(2-(5-(p-tolyl)-1H-imidazol-2-yl)piperidin-1-yl)but-3-en-1-one, 2-methyl-1-(2-(5-(p-tolyl)-1H-imidazol-2-yl)piperidin-1-yl)butan-1-one, 2-methyl-1-(2-(5-(p-tolyl)-1H-imidazol-2-yl)piperidin-1-yl)butane-1,3-dione, 2-methyl-1-(2-(5-(p-tolyl)-1H-imidazol-2-yl)piperidin-1-yl)pentan-1-one, 2-methyl-1-(2-(5-(p-tolyl)-1H-imidazol-2-yl)piperidin-1-yl)prop-2-en-1-one, 2-methyl-1-(2-(5-(p-tolyl)-1H-imidazol-2-yl)piperidin-1-yl)propan-1-one, 2-methyl-2-(methylthio)-1-(2-(5-(p-tolyl)-1H-imidazol-2-yl)piperidin-1-yl)propan-1-one, 2-methyl-3-(methylthio)-1-(2-(4-phenyl-1H-imidazol-2-yl)piperidin-1-yl)propan-1-one, 2-methylene-1-(2-(5-(p-tolyl)-1H-imidazol-2-yl)piperidin-1-yl)butan-1-one, 3-(2-(1-(2-(methylthio)propanoyl)piperidin-2-yl)-1H-imidazol-4-yl)benzonitrile, 3,3,3-trifluoro-2-methyl-1-(2-(4-phenyl-1H-imidazol-2-yl)piperidin-1-yl)propan-1-one, 3,3,4,4,4-pentafluoro-1-(2-(4-phenyl-1H-imidazol-2-yl)piperidin-1-yl)butan-1-one, 3,3-difluoro-1-(2-(4-phenyl-1H-imidazol-2-yl)piperidin-1-yl)butan-1-one, 3-fluoro-4-(2-(1-(2-(methylthio)propanoyl)piperidin-2-yl)-1H-imidazol-5-yl)benzonitrile, 3-methyl-1-(2-(4-phenyl-1H-imidazol-2-yl)piperidin-1-yl)but-2-en-1-one, 3-methyl-1-(2-(4-phenyl-1H-imidazol-2-yl)piperidin-1-yl)butan-1-one, 4-(2-(1-(2-(methylthio)propanoyl)piperidin-2-yl)-1H-imidazol-4-yl)benzonitrile, 4-(2-(1-(2-(methylthio)propanoyl)piperidin-2-yl)-1H-imidazol-5-yl)benzaldehyde, 4,4,4-trifluoro-2-methyl-1-(2-(4-phenyl-1H-imidazol-2-bicyclo[1.1.1]pentan-1-yl (2-(4-phenyl-1H-imidazol-2-yl)piperidin-1-yl)butan-1-one, yl)piperidin-1-yl)methanone, cyclobutyl (2-(5-(3-fluorophenyl)-1H-imidazol-2-cyclopentyl (2-(4-phenyl-1H-imidazol-2-yl)piperidin-1-yl)piperidin-1-yl)methanone, yl) methanone, cyclopropyl (2-(4-phenyl-1H-imidazol-2-yl)piperidin-1-yl)methanone, methyl 4-(2-(1-(2-(methylthio)propanoyl)piperidin-2-yl)-1H-imidazol-5-yl)benzoate, N-(2-hydroxyethyl)-4-(2-(1-(2-(methylthio)propanoyl)piperidin-2-yl)-1H-imidazol-4-yl)benzenesulfonamide, 2-(methylthio)-1-(2-(5-(3-nitrophenyl)-1H-imidazol-2-yl)piperidin-1-yl)propan-1-one, N-(4-(2-(1-(2-(methylthio)propanoyl)piperidin-2-yl)-1H-imidazol-4-yl)phenyl) methane-sulfonamide, 2-(methylthio)-1-(2-(5-(4-nitrophenyl)-1H-imidazol-2-yl)piperidin-1-yl)propan-1-one, 1-(2-(5-(4-(hydroxymethyl)-phenyl)-1H-imidazol-2-yl)piperidin-1-yl)-2-methylbutan-1-one, 2-(methylsulfonyl)-1-(2-(5-(p-tolyl)-1H-imidazol-2-yl)piperidin-1-yl)propan-1-one, 1-(4-hydroxy-2-(5-(p-tolyl)-1H-imidazol-2-yl)piperidin-1-yl)-2-(methylthio)propan-1-one, 1-(5-hydroxy-2-(5-(p-tolyl)-1H-imidazol-2-yl)piperidin-1-yl)-2-(methylthio)propan-1-one, 1-(4-hydroxy-2-(5-(p-tolyl)-1H-imidazol-2-yl)piperidin-1-yl)-2-methylbutan-1-one, 1-(5-hydroxy-2-(5-(p-tolyl)-1H-imidazol-2-yl)piperidin-1-yl)-2-methylbutan-1-one, 1-(2-(5-(4-(hydroxymethyl) phenyl)-1H-imidazol-2-yl)piperidin-1-yl)-2-(methylsulfonyl)propan-1-one, 1-(4-hydroxy-2-(5-(p-tolyl)-1H-imidazol-2-yl)piperidin-1-yl)-2-(methylsulfonyl)propan-1-one, 1-(5-hydroxy-2-(5-(p-tolyl)-1H-imidazol-2-yl)piperidin-1-yl)-2-(methylsulfonyl)propan-1-one, 1-(2-hydroxy-6-(5-(p-tolyl)-1H-imidazol-2-yl)piperidin-1-yl)-2-(methylthio)propan-1-one, 1-(2-hydroxy-6-(5-(p-tolyl)-1H-imidazol-2-yl)piperidin-1-yl)-2-methylbutan-1-one, 1-(2-hydroxy-6-(5-(p-tolyl)-1H-imidazol-2-yl)piperidin-1-yl)-2-(methylsulfonyl)propan-1-one, 1-(3-hydroxy-2-(5-(p-tolyl)-1H-imidazol-2-yl)piperidin-1-yl)-2-(methylthio)propan-1-one, 1-(3-hydroxy-2-(5-(p-tolyl)-1H-imidazol-2-yl)piperidin-1-yl)-2-methylbutan-1-one, 1-(3-hydroxy-2-(5-(p-tolyl)-1H-imidazol-2-yl)piperidin-1-yl)-2-(methylsulfonyl)propan-1-one, 1-(2-(5-(4-(hydroxymethyl) phenyl)-1H-imidazol-2-yl)piperidin-1-yl)-2-(methylsulfinyl)-propan-1-one, 1-(4-hydroxy-2-(5-(p-tolyl)-1H-imidazol-2-yl)piperidin-1-yl)-2-(methylsulfinyl)propan-1-one, 1-(5-hydroxy-2-(5-(p-tolyl)-1H-imidazol-2-yl)piperidin-1-yl)-2-(methylsulfinyl)propan-1-one, 1-(2-hydroxy-6-(5-(p-tolyl)-1H-imidazol-2-yl)piperidin-1-yl)-2-(methylsulfinyl)propan-1-one, 1-(3-hydroxy-2-(5-(p-tolyl)-1H-imidazol-2-yl)piperidin-1-yl)-2-(methylsulfinyl)propan-1-one, 1-(2-hydroxy-6-(5-(4-

(hydroxymethyl) phenyl)-1H-imidazol-2-yl)piperidin-1-yl)-2-(methylthio)propan-1-one, 1-(5-hydroxy-2-(5-(4-(hydroxymethyl) phenyl)-1H-imidazol-2-yl)piperidin-1-yl)-2-(methylthio)propan-1-one, 1-(4-hydroxy-2-(5-(4-(hydroxymethyl) phenyl)-1H-imidazol-2-yl)piperidin-1-yl)-2-(methylthio)propan-1-one, 1-(3-hydroxy-2-(5-(4-(hydroxymethyl)-phenyl)-1H-imidazol-2-yl)piperidin-1-yl)-2-(methylthio)propan-1-one, 1-(2-hydroxy-6-(5-(4-(hydroxymethyl) phenyl)-1H-imidazol-2-yl)piperidin-1-yl)-2-methylbutan-1-one, 1-(5-hydroxy-2-(5-(4-(hydroxymethyl) phenyl)-1H-imidazol-2-yl)piperidin-1-yl)-2-methylbutan-1-one, hydroxy-2-(5-(4-(hydroxymethyl) phenyl)-1H-imidazol-2-yl)piperidin-1-yl)-2-1-(4-methylbutan-1-one, 1-(3-hydroxy-2-(5-(4-(hydroxymethyl) phenyl)-1H-imidazol-2-yl)piperidin-1-yl)-2-methylbutan-1-one, 4-(2-(1-(2-methylbutanoyl)piperidin-2-yl)-1H-imidazol-5-yl)benzaldehyde, 4-(2-(1-(2-(methylthio)propanoyl)piperidin-2-yl)-1H-imidazol-5-yl)benzoic acid, 4-(2-(1-(2-methylbutanoyl)piperidin-2-yl)-1H-imidazol-5-yl)benzoic acid, (2,2-dimethylcyclopropyl) (2-(5-(p-tolyl)-1H-imidazol-2-yl)piperidin-1-yl)methanone, 1-(2-(5-(4-chlorophenyl)-1H-imidazol-2-yl)piperidin-1-yl)-2-methylbutan-1-one, 2-(4-(2-(1-(2-(methylthio)propanoyl)piperidin-2-yl)-1H-imidazol-5-yl)phenyl) acetonitrile, 2-(4-(2-(1-(2-methylbutanoyl)piperidin-2-yl)-1H-imidazol-5-yl)phenyl) acetonitrile, 2-(4-(2-(1-(2-methylbutanoyl)piperidin-2-yl)-1H-imidazol-5-yl)phenyl) acetonitrile, 2,3-dimethyl-1-(2-(5-(p-tolyl)-1H-imidazol-2-yl)piperidin-1-yl)butan-1-one, 2-methyl-1-(2-(5-(o-tolyl)-1H-imidazol-2-yl)piperidin-1-yl)butan-1-one, 2-methyl-1-(2-(5-(m-tolyl)-1H-imidazol-2-yl)piperidin-1-yl)butan-1-one, 1-(2-(5-(4-(hydroxymethyl) phenyl)-1H-imidazol-2-yl)piperidin-1-yl)-2-methylbutan-1-one, 2-methyl-1-(2-(5-(5-methylthiophen-2-yl)-1H-imidazol-2-yl)piperidin-1-yl)butan-1-one, 2-(methylthio)-1-(2-(5-(p-tolyl)-1H-imidazol-2-yl)piperazin-1-yl)propan-1-one, 2-(methylthio)-1-(2-(4-(p-tolyl) oxazol-2-yl)piperidin-1-yl) propan-1-one, and 2-methyl-1-(2-(4-(p-tolyl) oxazol-2-yl)piperidin-1-yl)butan-1-one, 2-(furan-2-yl)-1-(2-(5-phenylimidazol-2-yl)piperidin-1-yl)ethan-1-one, cyclopentyl (2-(5-(p-tolyl)-1H-imidazol-2-yl)piperidin-1-yl)methanone, (E)-2-methyl-1-(2-(5-(p-tolyl)-1H-imidazol-2-yl)piperidin-1-yl)pent-3-en-1-one, (tetrahydrofuran-3-yl)(2-(4-(p-tolyl)-1H-imidazol-2-yl)piperidin-1-yl)methanone, 1-(2-(4-(4-ethylphenyl)-1H-imidazol-2-yl)piperidin-1-yl)-2-(methylthio) propan-1-one, 1-(2-(4-(4-methoxy-2-methylphenyl)-1H-imidazol-2-yl)piperidin-1-yl)-2-(methylthio)propan-1-one, 1-(2-(4-(2-methoxypyrimidin-5-yl)-1H-imidazol-2-yl)piperidin-1-yl)-2-(methylthio)propan-1-one, 2-(methylthio)-1-(2-(4-(4-vinylphenyl)-1H-imidazol-2-yl)piperidin-1-yl)propan-1-one, 1-(2-(4-(2-fluoro-4-methoxyphenyl)-1H-imidazol-2-yl)piperidin-1-yl)-2-(methylthio)propan-1-one, 1-(2-(4-(4-methyl-6-(methylthio) pyridin-3-yl)-1H-imidazol-2-yl)piperidin-1-yl)-2-(methylthio)propan-1-one, 2-(methylthio)-1-(2-(4-(4-propylphenyl)-1H-imidazol-2-yl) piperidin-1-yl)propan-1-one, 1-(2-(4-(4-(2-methoxyethyl) phenyl)-1H-imidazol-2-yl)piperidin-1-yl)-2-(methylthio) propan-1-one, 1-(2-(4-(5-(methoxymethyl) thiophen-3-yl)-1H-imidazol-2-yl)piperidin-1-yl)-2-(methylthio)propan-1-one, 1-(2-(4-(3-(methylamino) phenyl)-1H-imidazol-2-yl) piperidin-1-yl)-2-(methylthio)propan-1-one, 1-(2-(4-(6-methoxypyridin-3-yl)-1H-imidazol-2-yl)piperidin-1-yl)-2-(methylthio)propan-1-one, and 1-(2-(4-(3-fluoro-4-(methoxymethyl) phenyl)-1H-imidazol-2-yl)piperidin-1-yl)-2-(methylthio)propan-1-one.

3. A non-medical method of inducing a cooling sensation in a human or animal comprising contacting the human or animal with a compound of formula (Ia), or a salt or solvate thereof, as defined in claim 1.

4. A method of achieving a cooling effect or sensation on the skin or mucosa comprising contacting the skin or mucosa with a product comprising one or more compounds of formula (Ia) as defined in claim 1.

5. A non-medical method of inducing a cooling sensation in a human or animal comprising contacting the human or animal with a compound of formula (Ia), or a salt or solvate thereof, as defined in claim 2.

6. A method of achieving a cooling effect or sensation on the skin or mucosa comprising contacting the skin or mucosa with a product comprising one or more compounds of formula (Ia) as defined in claim 2.

* * * * *